United States Patent [19]

Schmitz et al.

[11] Patent Number: 5,544,318

[45] Date of Patent: Aug. 6, 1996

[54] ASYNCHRONOUS MEDIA SERVER REQUEST PROCESSING SYSTEM FOR SERVICING REPRIORITIZING REQUEST FROM A CLIENT DETERMINES WHETHER OR NOT TO DELAY EXECUTING SAID REPRIORITIZING REQUEST

[75] Inventors: Patrick L. Schmitz, San Francisco; Shern Jauhal, Mountain View, both of Calif.

[73] Assignee: Accom, Inc.,, Menlo Park, Calif.

[21] Appl. No.: 49,255

[22] Filed: Apr. 16, 1993

[51] Int. Cl.$^6$ .............................. G06F 13/00; G06F 13/14
[52] U.S. Cl. .................. 395/200.04; 395/200.11; 395/650; 395/158; 364/941.1; 364/941.3; 364/941.6; 364/DIG. 2
[58] Field of Search ..................................... 395/650, 200, 395/157, 200.04, 200.11, 158; 345/144

[56] References Cited

U.S. PATENT DOCUMENTS

| 4,005,391 | 1/1977 | MacPherson | 340/172.5 |
|---|---|---|---|
| 4,497,023 | 1/1985 | Moorer | 364/200 |
| 4,937,784 | 6/1990 | Masai et al. | 364/900 |
| 5,254,984 | 10/1993 | Wakeland | 345/144 |
| 5,339,413 | 8/1994 | Koval et al. | 395/650 |
| 5,347,624 | 9/1994 | Takahashi et al. | 395/157 |
| 5,392,400 | 2/1995 | Berkowitz et al. | 395/200 |

OTHER PUBLICATIONS

Intel Corporation, "iAPX 86/88, 186/188 User's Manual Hardware Reference", 1985, pp. 1–16 to 1–17.

*Primary Examiner*—Thomas C. Lee
*Assistant Examiner*—Le Hien Luu
*Attorney, Agent, or Firm*—Flehr, Hohbach, Test, Albritton & Herbert

[57] ABSTRACT

An asynchronous adaptive media server mechanism permits a user to navigate around a modelled multimedia space as quickly as input events or instances are handled. The mechanism permits cancellation of outstanding queued requests that have become obsolete as the user navigates out of the area for which the request was needed. A client module generates display requests by defining a client object for every active multimedia instance, and at least one server module acts as a request queue manager and processes the requests. The server module includes a media server that preferably provides service of user-selected quality. Upon request cancellation, client resources can be released immediately; a server state module mechanism may release server resources until there is no risk of endangering system operations. The ability to cancel or de-serialize queued requests permits prioritizing the requests in a fashion that will permit media server performance to be adaptively optimized to match the users' actions. The disclosed mechanism has application to any media that does not have a time-linear nature that maps directly onto some dimension of the modelled space displayed to the user.

23 Claims, 13 Drawing Sheets

ASYNCHRONOUS MEDIA SERVER REQUEST PROCESSING SYSTEM FOR SERVICING REPRIORITIZING REQUEST FROM A CLIENT DETERMINES WHETHER OR NOT TO DELAY EXECUTING SAID REPRIORITIZING REQUEST

FIELD OF THE INVENTION

This invention relates to true multimedia server request mechanisms, and more specifically to a mechanism permitting prioritizing and cancellation of requests queued into such mechanisms to permit adaptive optimization of media server performance.

BACKGROUND OF THE INVENTION

As used herein, the term multimedia space refers to a dimension set that defines a domain navigable by a user. The multimedia space may have a single dimension (for example, a program timeline running from time start to time end), or many dimensions (for example, a three dimensional map). The multimedia space may be realworld, as in the case of an aircraft flight simulator, or it may be logical, as in the case of an n-dimensional virtual space representation.

An essential aspect of multimedia systems is to provide the user with the ability to traverse a virtual space that is represented with text, still or short-sequence graphics, and some time-linear media (e.g. longer video or audio sequences).

The multimedia space to be navigated is typically data found in one or more media servers, for example a hard disk holding video, text, and/or audio information. Using a suitable interface such as a mouse, joystick or other mechanism, a user can navigate or traverse multimedia space by requesting displays on a video monitor. In a virtual reality application, moving a joystick to the right or left changes the displayed image from scenery on the user's right to scenery on the user's left. The joystick movement in essence requests display of the new scenery. Instead of using a joystick, the user could wear a motion-sensing apparatus such as a glove, Within a typical multimedia space, there are many dimensions for traversal or navigation, some of which map to time-linear media, and some of which do not. For a multimedia encyclopedia, for example, there is a linear dimension in the alphabetical ordering of items, and there is an X-Y space in the display of any given page. However, these dimensions have no mapping to the time-linear nature of a video or graphical sequence that might be displayed in association with a body of text about a given subject in the encyclopedia. Understandably, a user viewing a multimedia space wants the freedom to navigate along any direction and at any rate he or she chooses. Such freedom of navigation should not burden the user with real-world constraints of the media servers, for example, by having to wait excessively long for the pictures to be displayed.

It must be recognized that the media servers containing the representations of the multimedia space have certain ballistic and linear constraints. Ballistic constraints concern how quickly data associated with a desired image can be moved from the media servers (hard disks, for example) to the system display engine. Video tape recorders, and many video servers, can provide quality video only within a small speed range around normal playback speed. Linearity constraints reflect the inability of a media server to truly accomplish random access. For example, one cannot randomly traverse different segments recorded on a video tape, and even a computer hard disk used for video playback and recording has limitations as to random access. Further, user request of certain recombinations of video material can result in further delays, so that the system can, for example, make video copies for use in special effects or to pre-render video sequences.

Prior art multimedia representation mechanisms perform reasonably well, but only for multimedia spaces in which there exists a mapping of a time-linear media to a navigable dimension. However in the more generalized case where such mapping did not exist, prior art products and mechanisms perform poorly because they force the user interface to be locked synchronously to the media servers.

In practice, these prior art mechanisms lock the sequence of user interface events synchronously to the display of the associated media. Because the display is considered to be a single timeline, it is navigable only at the rate of the slowest mechanism in the display path, typically the video server. A user requests displays (for example by moving a joystick), but once a request enters the request queue, it must be displayed, and a given user request cannot be processed until all preceding requests in the queue are completed.

Because prior art multimedia representation mechanisms employ a serialized, non-cancelable queue, system throughput is degraded if incorrect requests are queued. What would be desirable, for example, in a virtual reality simulator application, is for intelligent software to decide to pre-queue images representing adjacent pages of display, perhaps on the assumption that the user may next wish to see adjacent scenery. Unfortunately because prior art mechanisms do not permit cancelling uncompleted requests, the user would be forced to view such pre-queued scenery, even if the user had "walked" out of the area depicted in the pre-queued scenes. Thus, any efficiency that might be gained by pre-queuing is foregone because it would create an unalterable queue.

Video editors constitute another area of application for multimedia display mechanisms. Video editors are used in video tape productions to combine selected video scenes into a desired sequence, such as special effects seen on television. To produce the sequence, the video editor must accurately frame-synchronize video tape recorders and peripheral devices. A user controls the editor from a keyboard while watching a monitor that displays information from the video editor.

"Off-line" video editing systems are used to review source tapes, and to create simple editing effects such as "cut" and "dissolve". Such editors generate an intermediate work tape whose frames are marked according to an accompanying edit decision list ("EDL") that documents what future video changes are desired.

By contrast, "on-line" editing systems are quite sophisticated, and control a variety of devices to produce complicated video effects. On-line editing systems are used to make post-production changes, including changes based upon the work tape and EDL from an off-line editor. The output from an on-line editing system is a final video master tape and an EDL documenting, at a minimum, the most recent generation of changes made to the master tape.

A conventional EDL is a complex collection of timecode numbers and cryptic designations for keying, dissolve and other video effect operations.. The timecode numbers give the precise time and video frame numbers where events occur on the finished tape, and also provide "in" and "out" times at which a given video source was transferred onto the finished tape. However at best, such conventional EDLs are a one-dimensional historical time record of the most currently issued commands that resulted in changes appearing on the finished video tape.

In video (and audio) editing, the primary space being traversed is the program timeline that is being constructed, namely the EDL, which conventionally is shown graphically or textually as a timeline of edit-events on graphical editing systems. The media of primary interest is the time-linear program being constructed, whose description is the EDL. This is a special case within the general multimedia domain, because there is a direct mapping between the time-linear dimension of the media, and one dimension of the space being traversed, namely the EDL description for the program segment.

Among video editing systems, the interaction between ballistically and linearly limited media servers distinguishes between linear and non-linear edit controllers. As noted, the linear and ballistic characteristics of video tape transports greatly reduce the speed with which a user can move about within the video representation of a program. As a result, application software rarely links the virtual program representation and the media. This constraint interferes substantially with the creative process.

More flexible are non-linear systems, wherein the program timeline is typically locked to the timeline position of a textual or graphical representation of the program. Some commercially available editing products allow a user to navigate a timeline in a limited fashion to produce limited quality video images. Such mechanisms are relatively limited, especially with respect to the quality of the video provided.

Because textual representations of EDLs are difficult to work with, manufacturers of off-line and on-line video editors have sought to embed video within the EDL. One such product is the AVID Media Composer, manufactured by Avid Technology, Inc. of Burlington, Mass. This AVID product is an off-line video editor that embeds low quality video in the editor system.

FIG. 1 depicts the display 1 of an AVID system, wherein a first portion 2 of the screen is a current source window/monitor, a second portion 3 is the current program monitor, and third portion 4 presents a number of still video images that map directly to a displayed edit timeline 6 having discrete points 8. The images in regions 2 and 3 are sequences of images, whereas portion 4 presents various still video images. For a given length timeframe, a fixed number of still images 8 are displayed, interspersed uniformly along the timeframe. By means of a computer mouse, a user can click on a timeline point and display a corresponding video frame.

In the conventional fashion, the AVID system binds the time linearity of the display media to the navigable dimension, namely the program timeline 6. Essentially such systems require that the display media be formatted in the same manner as the navigable dimension, thus creating arbitrary media events (timeline points) for the convenience of the system. In a broad sense, these two parallel timeline are then synchronously locked together.

While the synchronous lock can prevent the navigation from proceeding faster than the display media, so doing can limit navigation. In practice, when the user moves along the virtual dimension at speeds in excess of the media server capability, the AVID system temporarily unlocks the two timelines and simply samples the media timeline, skipping video frames as needed. The sampling occurs as often as the server can handle, or only when the user stops at some point on the virtual timeline.

In AVID-type systems, sampling provides a workable fallback mechanism, only because dimension mapping exists. The application software must issue but one request at a time, and issue the next request only after the first request has completed. When it is time to issue a request, the multimedia dimension reference point is mapped to the equivalent media timeline, and provides the sampling mechanism. Understandably, if no mapping existed, the application software could not pick a "next" picture without possibly leaving certain pictures blank, an unacceptable solution when a set of still pictures is to be displayed. No mapping exists because for still pictures, because such pictures are merely events not sequences. Sampling works for the window mechanisms depicted in FIG. 1 as regions 2 and 3, although sampling can produce a somewhat jerky sequence because some stills in the sequence are omitted from display. For the stills in region 4, each individual picture must be displayed because there is no way to sample.

That the limited AVID system works at all is because of the direct mapping between the time-linear media dimension and the navigable dimension of the multimedia space, i.e., the described program timeline. As noted, but for that mapping, the AVID system would not know how to sample the media timeline.

This capability exists only because the AVID system has the direct mapping noted above. Because the AVID system maps one timeline position to one media position, the availability of the media position suffices. If the timeline position does not correspond to such media position, then by definition the requested timeline position is obsolete and may safely be discarded. Thus AVID-type systems can readily determine what requests are obsolete.

Since the timeline can represent more data events than can be conveniently presented-in a single display window, the AVID system displays one window that may be user scrolled left and right. However because the AVID model must first make a request for a still picture and then wait for that request to be completed, a user scrolling to the next page of timeline must first wait until all outstanding still video requests have been displayed. While this time delay may only be a few seconds, professional users scroll hundreds of times per day and often prefer to simply disable this feature to save time.

Unfortunately for much multimedia there is no such mapping, and prior art systems such as AVID that rely upon the mapping breakdown completely. Assume for example that the user simply wants to display "head" or "tail" frames for events on the timeline, e.g., the first or last frames for a segment. If the user navigates the timeline faster than the media server can retrieve and display head or tail frames, no straightforward way exists to sample the media. The user wants to stop navigation at any point and expects to see all the pictures for the currently displayed region of program timeline. Because there is no mapping, sampling would omit pictures along the way, and leave blank pictures in portions of the display. Furthermore, since there is no linear dimension to sample, it would be difficult to develop a general algorithm that would never overburden the media server.

Commercial products including the AVID system that are available for multimedia display, manipulation, and coordination address this problem forcing traversal of the multimedia space to be tied synchronously to the media servers. This forced synchronization makes such systems unbearably slow, especially for head frame display of a timeline, head and tail frame display of media segment libraries, and the like.

As noted, in practice such systems are so slow that users prefer to turn off the media servers for these applications, sacrificing the additional information that a display might provide to obtain speed of navigation. While this may be an alternative for certain video editing systems, this alternative defeats the whole purpose of a true multimedia system by reducing the system to a mono-media representation of the virtual space.

As an alternative, some prior art multimedia applications require the user to explicitly request the media within the display. Such applications can undesirably require more user interaction than is justified in many applications. Navigation can be slowed because the user is forced to make too many specific decisions. For example, the user may be forced to click on multiple icons before a preliminary decision can be made whether a displayed area is even an area of interest to the user.

Further, because prior art multimedia display mechanisms synchronously couple the media server to the user interface, they lack the ability to pre-queue requests and then cancel queued requests, or to prioritize requests. For example, in a virtual reality display, as the user "walks" slowly past a building it may be desirable to render the building image with detail. However as the user begins to "walk" faster, it would be sufficient to render the building with less detail, and as the user "runs" to render the building with still less detail.

Understandably rendering the building as a wire frame model useful for navigation requires less system resources (for example, video-or graphics memory, computer resources or hard disk access, and thus time) than rendering the building in full detail. Because prior art systems cannot cancel a request, it is not feasible for such systems to issue both fast and slow requests for an object, and then (if desired) cancel whichever request has not completed before it is obsolete. By way of example, this constraint precludes requesting a wire frame image of a building and a fully rendered image for the same building, and then cancelling the fully rendered image if the user navigates past the building before the slower completing image displays. The request to display a wireframe image could be in response to a user joystick motion, or application software could detect that a "walking" velocity had carried the user past the building. Similarly, the cancel request could be in response to the user's walking past the building, thus rendering obsolete all requests to display images of the building.

Clearly the inability to cancel such requests commits system resources longer than required in prior art systems. The result is considerably slowed navigation, or the requirement that all display requests be shifted to low quality. The flexibility to cancel outstanding requests and thus make better use of system resources and to expedite navigation is just not available in the prior art.

In summary, there is a need for an asynchronous media server mechanism that allows the user to navigate a modelled space as quickly as input events are handled. The mechanism should recognize media events or instances as defined by the user, rather than imposing such definitions upon the user. The mechanism should permit cancellation of outstanding requests that have become obsolete as the user navigates out of an area for which the video was needed. Further, the mechanism should permit navigation that is independent of the ballistic and linear constraints of the media servers.

Such mechanism should de-serialize the request queue such that media server performance is adaptively optimized to match the users' actions. The mechanism should be applicable to any media not having have a time-linear nature mapping directly onto some dimension of the modelled space displayed to the user. If applied to cases where such mapping does exist, the mechanism should provide a smooth sequence of high quality images, as contrasted with what is offered by prior art mechanisms. Finally, such mechanism should permit prioritizing requests according to system resources required to complete the request, and application-related priorities.

The present invention discloses such a mechanism.

SUMMARY OF THE PRESENT INVENTION

For use with a computer system having a main computer and memory, the present invention provides an asynchronous adaptive media server mechanism coupled to the computer. A mechanism according to the present invention permits a user to navigate around a modelled multimedia space as quickly as requested input events or instances are processed, and can provide media display service of user-selected quality in response to the requests.

The present invention includes a client module that generates access requests to the media server, and a server module that includes the media server According to the invention, each request defines a client object for every active multimedia instance. The media server queues the requests, which it processes as the requests reach the top of the queue. The media server also processes the requests and, unless cancelled, provides the requests to an output device. If the client module cancels a request that is being processed by the media server, client module resources associated with the request often can be released immediately. However, release of associated media server resources (and on occasion, client module resources) may be deferred until a critical state that could endanger system operation has been passed. More specifically, release of media server resources may be deferred until copying of associated information from the media server to the main memory has been completed.

Communications between the modules is largely inter-module rather than inter-process. Because of its ability to be used in a true multi-tasking environment, the present invention includes a lock/unlock mechanism that provides inter-module mutual exclusion that makes atomic the module state changes during periods of mutual exclusion. In general, a lock is enabled whenever module state changes are made. Because it provides an asynchronous request mechanism, the client module includes a callback routine, for inter-module communication.

The present invention permits queuing requests in order of a priority that can be associated with the amount of system resources required to complete the request and/or benefit to the user associated with completing the request. The present invention further permits reprioritizing requests at any time there are in the queue, and cancelling requests at anytime in the queue. Thus, the mechanism permits cancellation of outstanding queued requests that have become obsolete as the user navigates out of the area for which the request was needed.

The ability to cancel or de-serialize queued requests permits prioritizing the requests in a fashion that will permit media server performance to be adaptively optimized to match the users' actions. Because priority may be assigned in terms of server resources and/or in terms of user benefit, both high and low priority requests may be queued since obsolete requests may be cancelled before they are displayed. A mechanism according to the present invention has application to any media that does not have a time-linear nature that maps directly onto some dimension of the modelled space displayed to the user.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
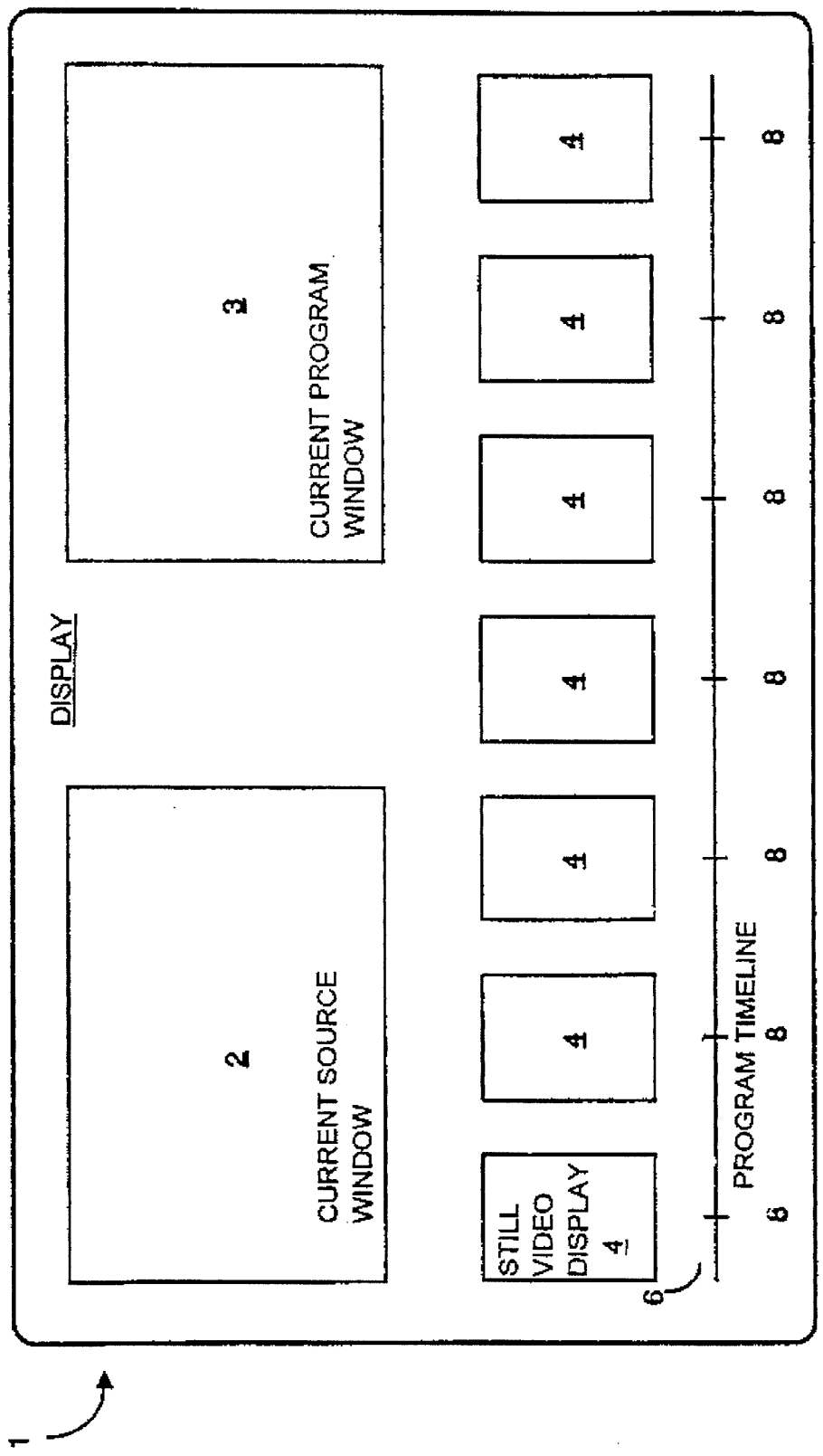
FIG. 1 depicts an AVID off-line editor display, according to the prior art.

In overview, the present invention provides a media server-client model that handles asynchronous media service requests, and that permits the client to cancel any outstanding queued requests to the media server that have become obsolete. A single client preferably controls and coordinates distributed media servers. The user may navigate a virtual multi-media space as quickly as the application software can handle user-input events, the navigation being completely independent of the ballistic and linear constraints of the media servers. A very pleasing user interface results because the media servers can keep up (or very rapidly catchup) with the reference point in the virtual space. A model provided by the present invention has application to any media that does not have a time-linear nature that maps directly onto some dimension of the modelled space displayed to the user.

Based upon client state changes, the client knows what region of the virtual space is displayed (or "active") at any time as the user navigates within in the virtual space. As the active region changes, client software recognizes media objects that have moved out of the active region. For those objects that are already displayed, the client generally releases some associated system resources (such as video memory). However for those media objects for which requests to the media server(s) are still outstanding, the client cancels the requests. This effectively de-serializes the request queue, allowing still-valid requests to move-up in the queue. As a result, the media server can advantageously always be working on requests that are relatively current, without bogging down on obsolete requests. Further, the ability to cancel queued requests permits heuristic software to intelligently pre-queue requests, based upon anticipated user demand.

The client adaptively optimizes the media server queue for any navigation path that the user follows. It will be appreciated that in a multimedia environment that includes networked or distributed media servers will especially benefit from the present invention, due to the transmission latency ballistics inherent in such environment. In one embodiment, requests are queued according to a priority that can reflect the request cost in terms of system resources and/or the user benefit of the request. Higher priority requests are displayed first that may obviate the need to continue processing lower priority, higher quality requests if it is cancelled. Further, by using a request ID that is associated with the request, the present invention permits re-prioritizing requests at any time they are within the queue.

The present invention includes a client module that generates display requests by defining a client object for every active multimedia instance, and at least one server module that acts as a request queue manager and processes the requests. The server module includes at least one media server that preferably provides service of user-selected quality. Communications between the modules is inter-module rather than inter-process.

It is not sufficient for the present invention simply to provide for making asynchronous requests to a separate process providing media services. If only asynchronicity were provided, the media server would quickly back-up and bog down with requests, as do prior art models. Even if the user slowed or stopped navigation within the virtual space, the media server(s) could take far too long to catch up with the user's reference point. Such delay would render the system nearly as unusable as prior art synchronous-based models.

In the preferred embodiment, the present invention is implemented as an asynchronous video request mechanism that provides video context to a graphical or textual view of information. When used for video editing, for example, the present invention permits a more flexible user interface, and a more pleasing response than do prior art mechanisms, such as the AVID video system.

Figure 2:
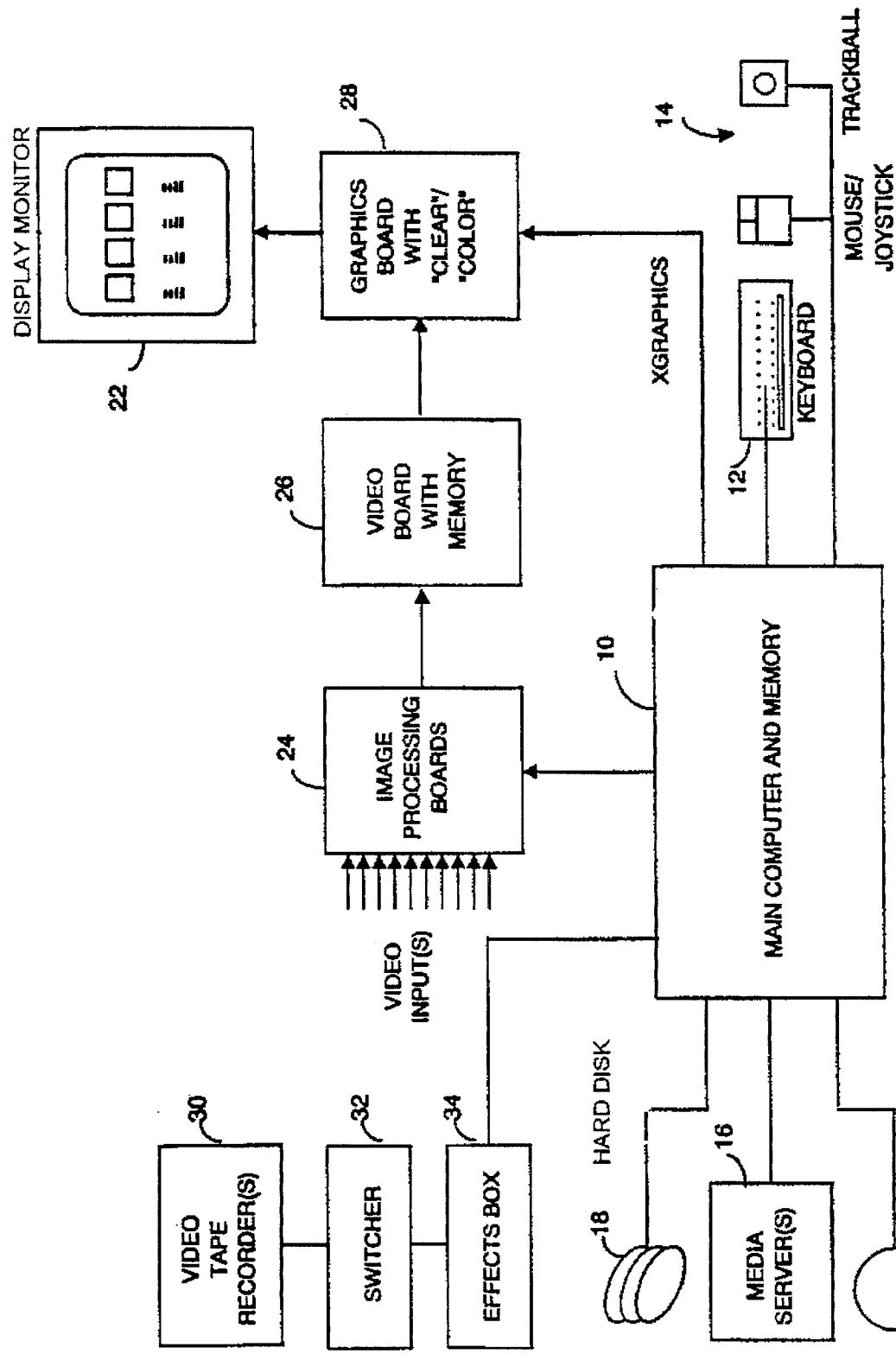
FIG. 2 depicts an on-line video editor with which the present invention is preferably practiced.

FIG. 2 depicts a modern on-line editing system, with which the present invention may advantageously be practiced. In the preferred embodiment, the on-line editing system is a model Axial 20-20 editor, manufactured by Accom, Inc. of Menlo Park, Calif. However, the present invention may be used with other systems, provided they are capable of true asynchronous (general multi-tasking or multi-processing) operations. With reference to FIG. 2, the system includes a main computer and memory 10, coupled to user-input devices such as a keyboard 12, a trackball or mouse 14 (or joystick, pen, etc.), and to media servers 16, including perhaps hard disks 18 and optical disk(s) 20. The various media servers hold graphic, video, audio and text data to be displayed in a suitable format on a display monitor.

The system can receive, in addition, video inputs that are provided to video imaging processing boards 24. Processed video signals are coupled from boards 24 to a video board, and video memory unit 26 that in turn is coupled to a graphics board 28 that includes graphics memory associated with the hardware display engine. Graphics board 28 is also coupled to the main computer/memory 10, and provides video input to display monitor 22. As will be described more fully later, graphics board 28 provides drawable images to display 22, but can draw a color overlay atop the images. If the overlay is a color, the drawn image is not displayed, and if the overlay is the color "clear", the drawn image is visible to a user. This overlay of graphics atop video is in contrast to prior art graphical user interface implementations such as the Macintosh computer, wherein video often overlays graphics.

In an on-line video editing application, the system may also include video tape recorders 30, video switchers 32, and effects processing equipment 34. In such applications, main computer/memory 10 can generate an edit decision list ("EDL"), or receive as an input an EDL prepared elsewhere, perhaps using an off-line video editing suite.

The modules (or collections of code) comprising the present invention reside primarily within the main computer and memory 10, although other implementations could of course store the software elsewhere. The VFile module provides the media services to retrieve video stills from files stored on the media servers 16, hard disk 18, and/or removable optical disks 20. While tape drives or floppy diskettes could of course also be used, the associated latency would be unbearably long.

The present invention uses X or XWindow system, a generic windowing software well known to those skilled in the art. For background, refer to Jones, Oliver "Introduction to the X WINDOWS System" (1989, Prentice Hall), which is incorporated herein by reference. Applicants modified some device dependent portions of X to accommodate the described graphics system, a standard modification when porting X to specific hardware. The XClient software also is modified to work in a true multi-tasking environment. More specifically, the XClient event loop, required modification to accept input events from processes other than the XServer process. This requires that XClient must either perform a select on a variety of input pipes, or that a work process is added to the XClient event loop, which checks for messages from other client processes. All requests to the XServer must be channelled through the single XClient process. The reason for and nature of these modifications are known to those skilled in the relevant art and will not be described here.

Is should be noted, however, that XServer itself is an asynchronous serial server that, upon receiving a picture request, must eventually draw the picture without possibility of cancellation. In the present invention, after XServer has been commanded to draw black at the proper screen location (e.g., to draw a black masking layer), the video image is then formed but is not visible until X is later commanded to draw clear, thus revealing the image. XServer is a remote server that can be on a network. This enables the graphics applications to be drawn on a work station and send via Ethernet, whereupon a server will catch and draw the image.

It should be noted that the term "client" is not necessarily synonymous with the application software. For example, XServer extensions have been proposed to provide bundled services of video windows. If such software were used, the application software would request a video window, and the server-would take care of putting the video in a graphigs window. In such a scenario, the XServer becomes the client of the video server mechanism.

A brief overview of several aspects of the present invention will now be presented, a more detailed description appearing later herein.

The Basic Mechanism to Display a Picture:

A VWin module provides an interface to the hardware allowing the display of video on the display monitor 22, and an XServer provides graphic rendering services. To display an image on monitor 22, a client creates a VWin object, and binds this object to a graphic window within the X domain. In the preferred embodiment, the client draws the window as opaque, i.e., some color other than clear.

The client requests the picture retrieval from the VFile server, and provides the VFile module with a callback routine and callback context (client state, usually a reference to the VWin/Xwidget object). In return the client receives a request ID.

When the VFile server has completed retrieval of the picture information into video memory 26, and the picture is ready for display on monitor 22, the callback routine is called with the client state. The client makes Xserver requests to draw the associated graphical window as "clear" whereupon the video is displayed on screen. As described elsewhere herein, one color within the X color space is interpreted by the graphics board 28 as "clear". When invoked, this feature allows video from the video display board 26 to show through a graphics overlay and be seen on monitor 22.

The Asynchronous Nature of the Model:

The present invention provides asynchronous media service requests in the following fashion. Requests to the VFile server make a change in the VFile module state, adding the request to a queue of outstanding requests. This occurs within the client process execution thread. (As used herein, "thread" shall be synonymous with "task" or "process".) The final step of the request mechanism makes the VFile process runable. All Vfile module states are protected with a mutual exclusion semaphore. While inter-process synchronization is implemented with a semaphore in the preferred embodiment, those skilled in the art will appreciate that a message or other interprocess synchronization mechanism could be used.

The (lower priority) VFile thread calls back into the client module when the picture is available, this occurring within the VFile server process execution thread. The code in the client module sets up the requests to draw the graphics, and marks the client state to indicate that the picture is displayed. In the preferred embodiment, requests for drawing are actually requests to a window process that, in turn, issues X requests to the XServer. The embodiment serializes all X requests to the XServer, and provides a required mutual exclusion function not provided in standard X software (release 11, version 4).

Implementing De-serialization of Requests:

In the present invention, de-serialization of requests is implemented as follows. When the reference point within the virtual space changes (usually but not necessarily in response to some user input action), the client determines that a media object is no longer "active". Stated differently, the client recognizes that the point in the virtual space with which the media object is associated has moved out of the active or displayed region. In the preferred embodiment, the system recognizes that the user has scrolled the graphical timeline or segment library display, such that one or more stills effectively scroll off-screen. The client checks its state to determine whether the requested object was displayed, or whether the associated request to the file server is still outstanding.

If the requested image was already displayed, then the video memory resources are preferably freed (making them available for other requests and other purposes), and the object is deleted from the module state. In some applications, if the video memory resource is not needed elsewhere, the object may be retained in video memory. So doing would reduce the number of picture reloads as a user scrolls back and forth within one area. Understandably, implementing this further optimization to the asynchronous VFile mechanism involves the use of special memory management facilities.

If the request is still outstanding, a call is made into the VFile module to cancel the request, the call occurring within the client process execution thread. This deletes the request from the queue of pending requests, with the result that the VFile process never sees the request.

Implementing Multi-tasking Mutual Exclusion

A request may be in process by the media server at the time a client wishes to cancel the request, and in fact the request may be in a critical state within the media server that must preclude the cancellation from proceeding normally. When this occurs, either the media server module or the client module must mark some state to indicate that the object is obsolete, and that the object should be released as soon as the critical phase is complete.

If the critical phase is somewhere before the final copy into the client resource space (video memory 26 in the preferred embodiment), then the server will handle the delete. From the client's perspective, the request is considered cancelled, and the client can free any client resources associated with the request.

However, if the critical phase involves the use of any client resources, then the server will complete the request, and call back the client in the normal manner. In this instance, the cancel request fails, and the client marks its internal state to indicate that the object is obsolete. When the callback comes through, the client module callback routine sees that the object is obsolete. This callback runs in the media server execution thread. The callback handles the object deletion (freeing resources, etc.), rather than attempting to display the request.

Understandably, it is important to carefully ensure the mutual exclusion of module resources. In a race condition, the object may become obsolete just as it becomes available for display. In such case, system deadlock can result unless rules are established and followed with respect to who may lock and hold what when performing critical inter-module operations.

Request Prioritization and Re-prioritization

The present invention permits prioritizing requests for queuing, and re-prioritizing requests at any time there are in the queue, using the request ID that is associated with a request. Re-prioritization involves moving requests to different locations within the queue, whereas cancellation involves removing the requests altogether from the queue. It is noted that a re-prioritization request on a request in process will generally have no effect. Generally, in actual implementation, a cancellation request may fail, whereas re-prioritization generally will not fail.

A preferred embodiment of the present invention can recognize that different requests can involve different amounts of associated system overhead, and provides a mechanism for prioritizing the requests. For example, some requests may involve rapidly rendered, low quality wire-frame images, whereas other requests require high quality, video memory intensive images that will take longer to render. The requests are preferably classified, with different requests providing different levels of quality, with different levels of associated overhead. The number of classification variants could vary from 2 to N, and is simply a matter of media server design.

In this embodiment, the media server first services all outstanding lower quality requests (from any one client in a multi-client model), before servicing any higher quality requests. Thus, if queued media events become obsolete, the more expensive requests will tend not to begin processing and thus provide a quicker response to new actions in the queue. This helps preclude the server from getting locked into time-expensive operations that will be canceled during request processing and enhances media server throughput. This feature is especially important when the user's navigation speed is just slightly faster than the media server(s) response capability.

A series of requests for a media event, one request for each quality level available or desired, is issued. If necessary, the requests may be adjusted for the current navigation speed, to optimize the media server throughput. However, where the media server is implemented such that successive requests for higher quality of a given item can build upon previously completed lower quality requests, such client-side optimizing is unnecessary.

One application for this embodiment involves picture data stored in a memory space, with all luminance bytes appearing at the front of a file, and the chrominance bytes stored later in the file (or in a separate file). A black and white picture may be retrieved in half the time to retrieve a full color picture. However requests for both quality levels can advantageously complete in the same amount of time (with some negligible overhead) as a single high quality request. In this sense, the color bytes would simply augment the luminance bytes. Alternatively, the information could be stored not in pixel linear order but in modulo N order, where N is a sampling rate to reduce the quality (and associated data) for faster request throughput.

A rendering server can provide a wireframe request in addition to a fully-rendered request. In this instance, the speed difference would be more marked, and the two requests would take somewhat longer to complete than completing only the higher quality request. In this application, a heuristic software associated with the present invention can decide to omit the low-quality request, perhaps according to the pattern of user input events.

Figure 3:
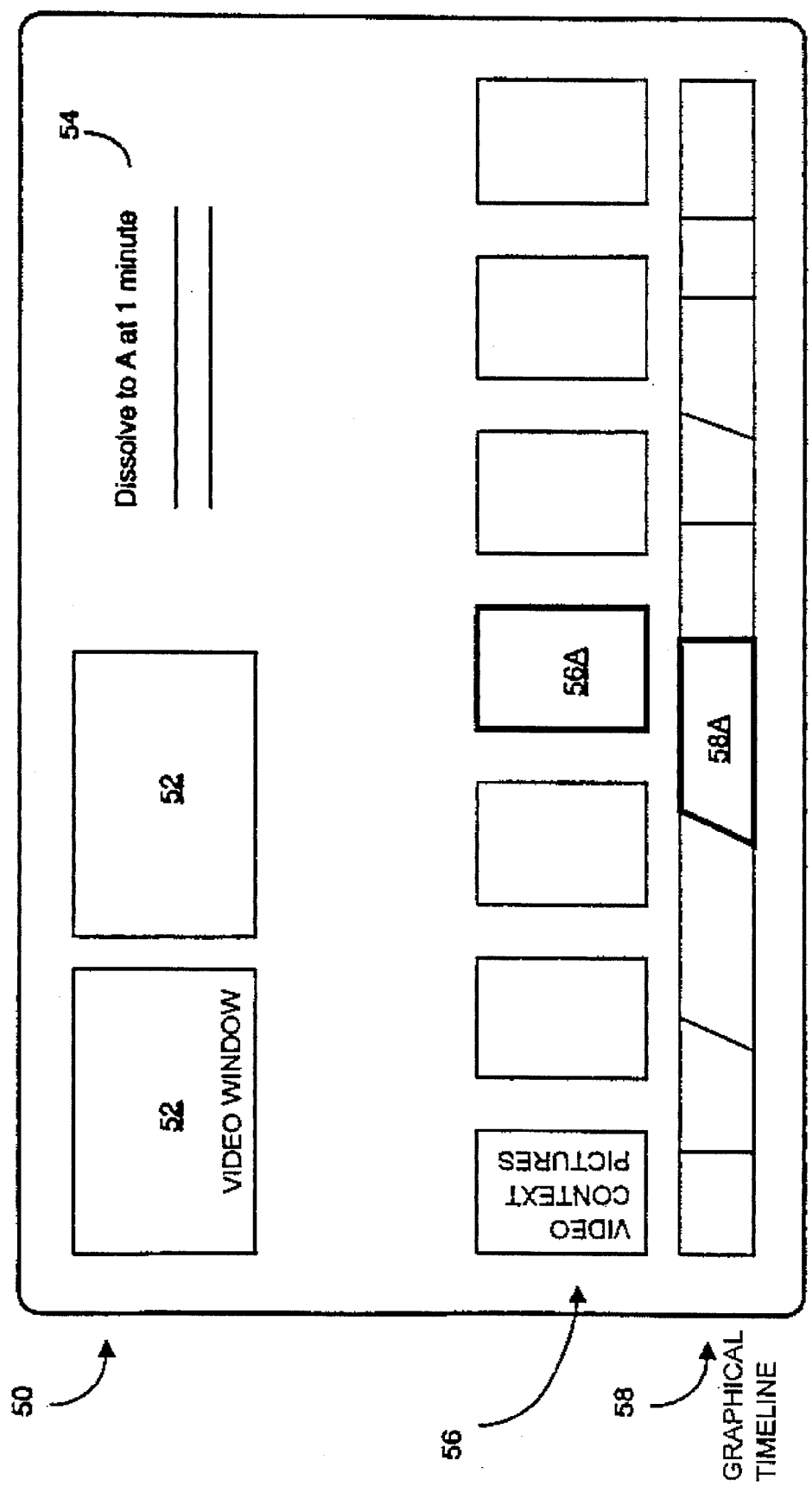
FIG. 3 depicts a graphical display of a program timeline, as displayed on an on-line video editor, according to the present invention.

FIG. 3 depicts the screen display 50 of a monitor 22 coupled to an on-line video editor provided with the present invention. A manufacturer of such editors in Accom, Corporation, located in Menlo Park, Calif. The display typically includes two video windows 52, with which the present invention is not directly concerned, a text display representing the current edit 54, a group of video context pictures 56, and a graphical timeline 58. Timeline 58 is a graphical view of the program material viewed along the x-axis of time. An element along timeline 58, element 58A for example, represents an edit, and any number of edits may exist on screen at one time. Edit 58A is highlighted in FIG. 3 to indicate that it is the current edit, representing where the user is currently on the timeline. The user selection of the current edit may be made graphically, using the mouse or trackball 14 in FIG. 2.

The video context pictures 56 are representations of the edit elements of the graphical timeline. Thus, in FIG. 3, picture 56A is highlighted to reflect that it is the current picture that corresponds to, or is the picture for, the current edit element 58A. The picture to the left of the current picture 56A represents the edit to the left of the current edit 58A on the graphical timeline 58. In similar fashion, the other pictures of the video context are related to the elements of the graphical timeline.

There are only seven video context pictures in the embodiment depicted, but there can be more than seven edit elements in the graphical timeline. Essentially, the video context window shows head frames around the current cursor context within the graphical timeline display. In the preferred embodiment, video context pictures 56 will be provided only for those seven edits centered around the current edit on the graphical timeline. For reasons of geometry the number of video context pictures displayed is seven for NTSC video format, and six for PAL video format.

This embodiment provides a user with pictorial feedback on a graphical timeline, even if the editing machines are linear (tape transports, for example). Users can edit visually, instead of having to .rely on EDL numbers or text alone. Because the present invention does not bind retrieval of the video context pictures synchronously to the user navigation along the timeline, the user may navigate rapidly.

Figure 4:
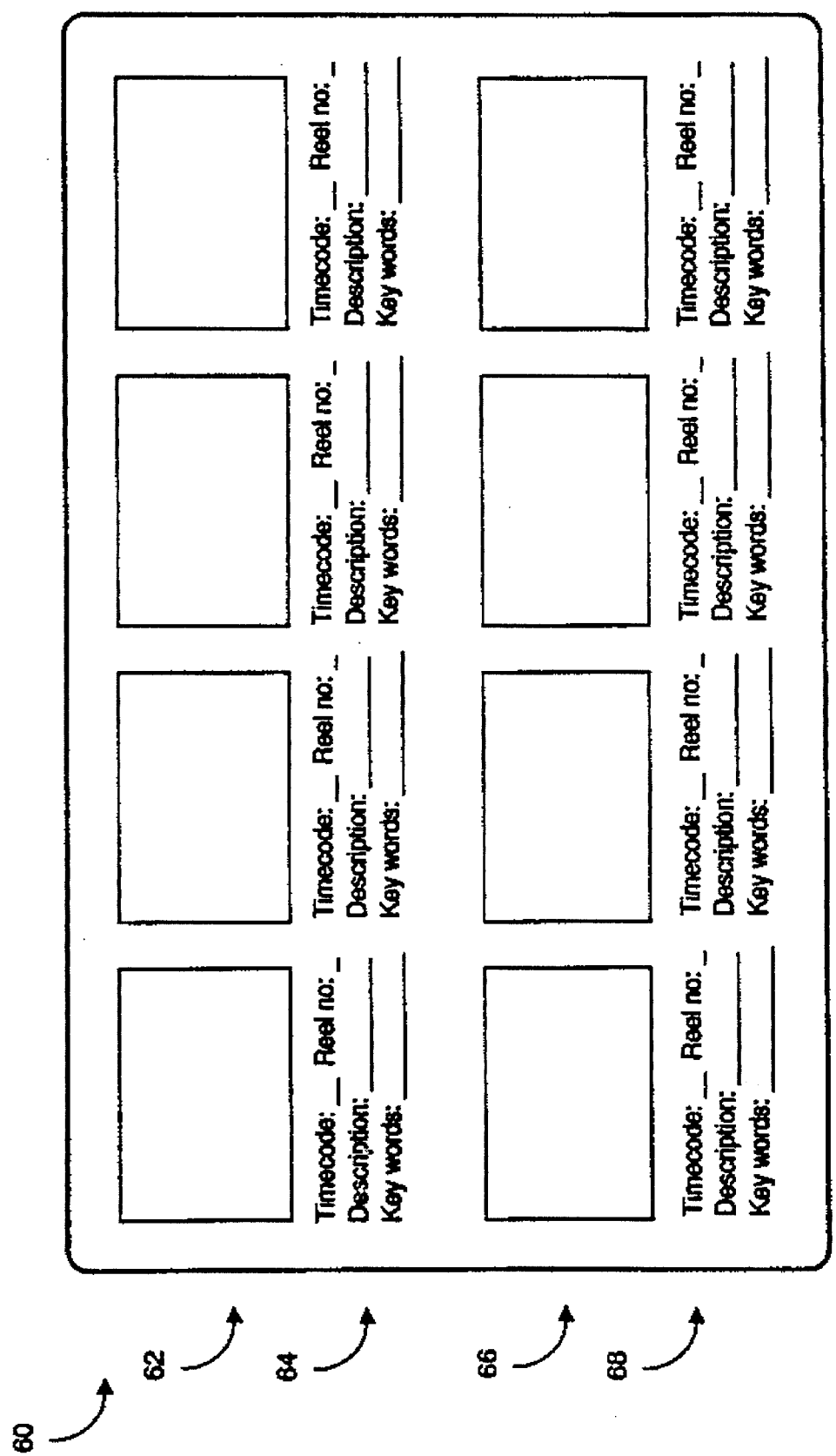
FIG. 4 depicts the video form of a markfile display, as displayed on an on-line video editor, according to the present invention.

FIG. 4 depicts the video form of a markfile display 60, as seen on a monitor 22 coupled to an on-line video editor. Each element in the markfile describes a segment or piece of source material that can be used to build program material. For the video form of the markfile depicted in FIG. 4, each element in the window consists of a picture and corresponding text.

FIG. 4 shows two rows of pictures 62, 66, beneath which are displayed two rows of text 64, 68. The pictures 62, 68 are still video images that relate visually to the source material. The windows in which the pictures fit can also be made to display live video images. The text 64, 68 describes each markfile element. As shown, the text preferably shows the time code, source reel number, an optional description (for example, "beach scene 3"), and key words (matte, background, fill, for example). The present invention can parse or filter the comment string, sorting and selecting according to whatever terms the user has provided as key words. It is not necessary that the present invention have any understanding of what is meant by the user-provided comments. Understandably the pictures 62, 66 that will be displayed can be in any order, which precludes storing them in an optimum sequence for retrieval. It will be appreciated that the displayed media events have no mapping or linearity running along any navigable dimension, but are merely events that happen to occur at a point on the screen.

Figure 5:
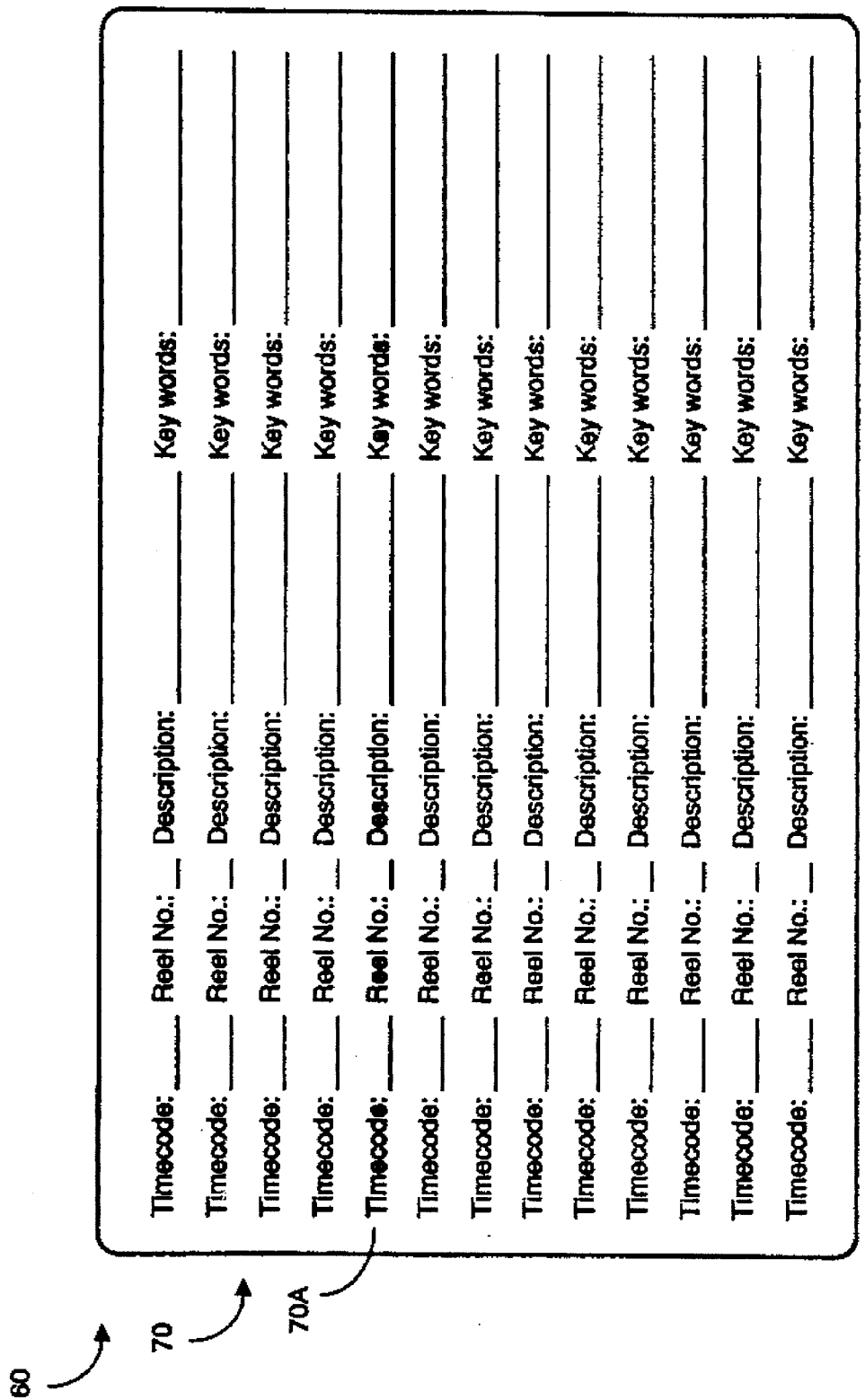
FIG. 5 depicts a text-only form of a markfile display, as displayed on an on-line video editor, according to the present invention.

FIG. 5 depicts a text-only form of a markfile display, as displayed on monitor 22 coupled to an on-line video editor. The content of the text displayed is similar to what was depicted in FIG. 4, except that each element is represented by one or more rows 70 of text. In FIG. 5, row 70A is highlighted to indicate that it has been selected by the user. FIG. 5 is similar to what might be displayed on a prior art system where, for ease of rapid navigation, corresponding video pictures were not displayed.

Figure 6:
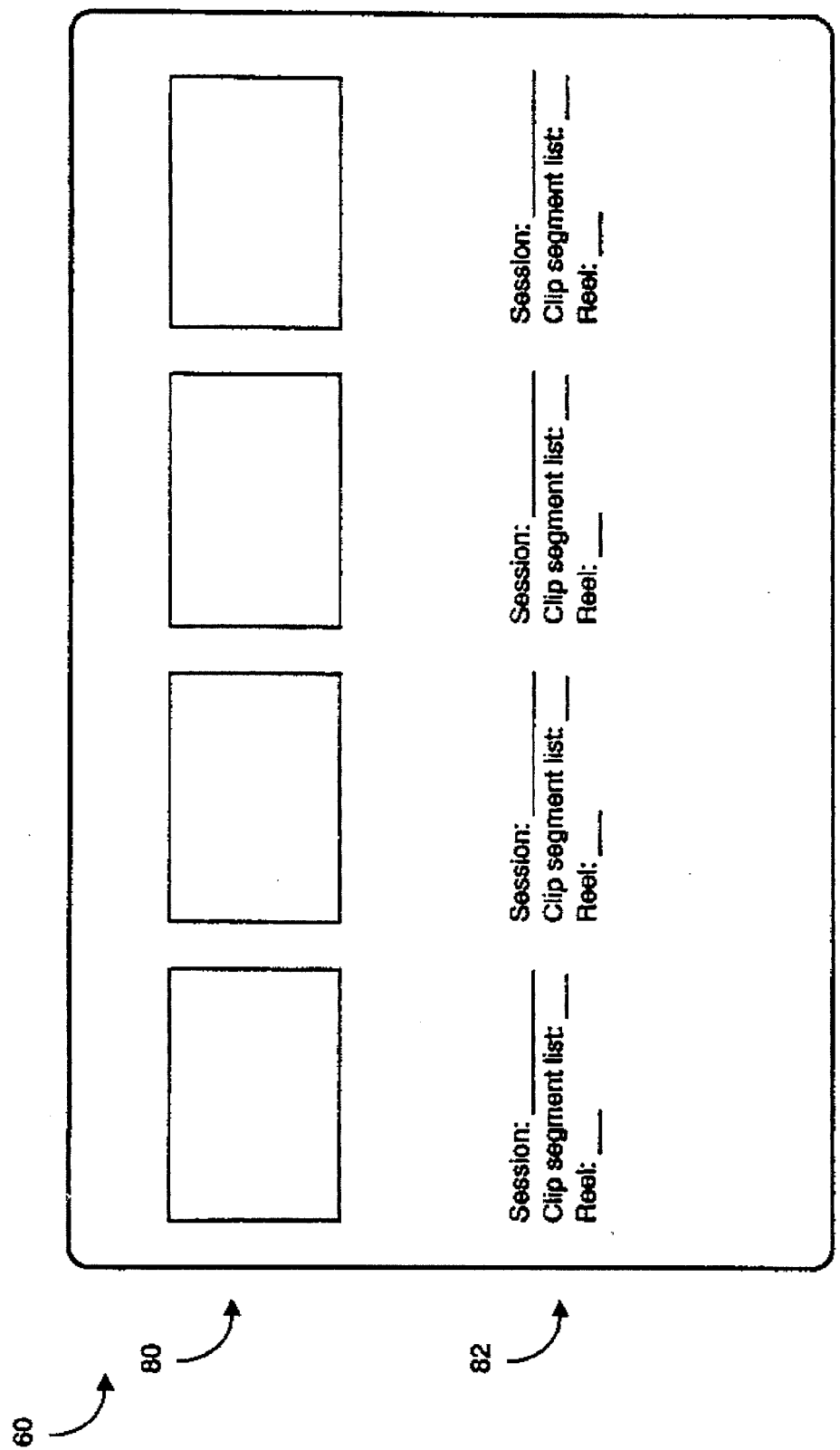
FIG. 6 depicts the display for a session browser, as displayed on an on-line video editor, according to the present invention.

FIG. 6 depicts the display 60 for a session browser, as displayed on a monitor 22 coupled to an on-line video editor. A session browser is used to review short animations of program material for an editing session. The "session" is a large file representing the contents of a hierarchial database representation of an EDL, found in Accom on-line video editors with which this embodiment is preferably used. This database includes information as to edit history, devices used, the hierarchical relationship giving rise to the final edit (for example, a key overlying a picture to which the key is bound).

In this embodiment, program overview video sequences are used to represent an entire program, to permit rapid browsing among all of the stored edit-sessions. Each element in the session browser describes the program material for a single session. An element consists of a picture and a list of programs. In FIG. 6, a row rows of pictures 80 is shown, beneath which is a row 82 of program lists. Using the trackball, mouse or equivalent device 14, the user can select a program from the list of programs. Animation will appear in the corresponding picture for the element selected. The present invention permits the user to rapidly browse (or navigate) through what may be a very considerable quantity of session material.

Figure 7:
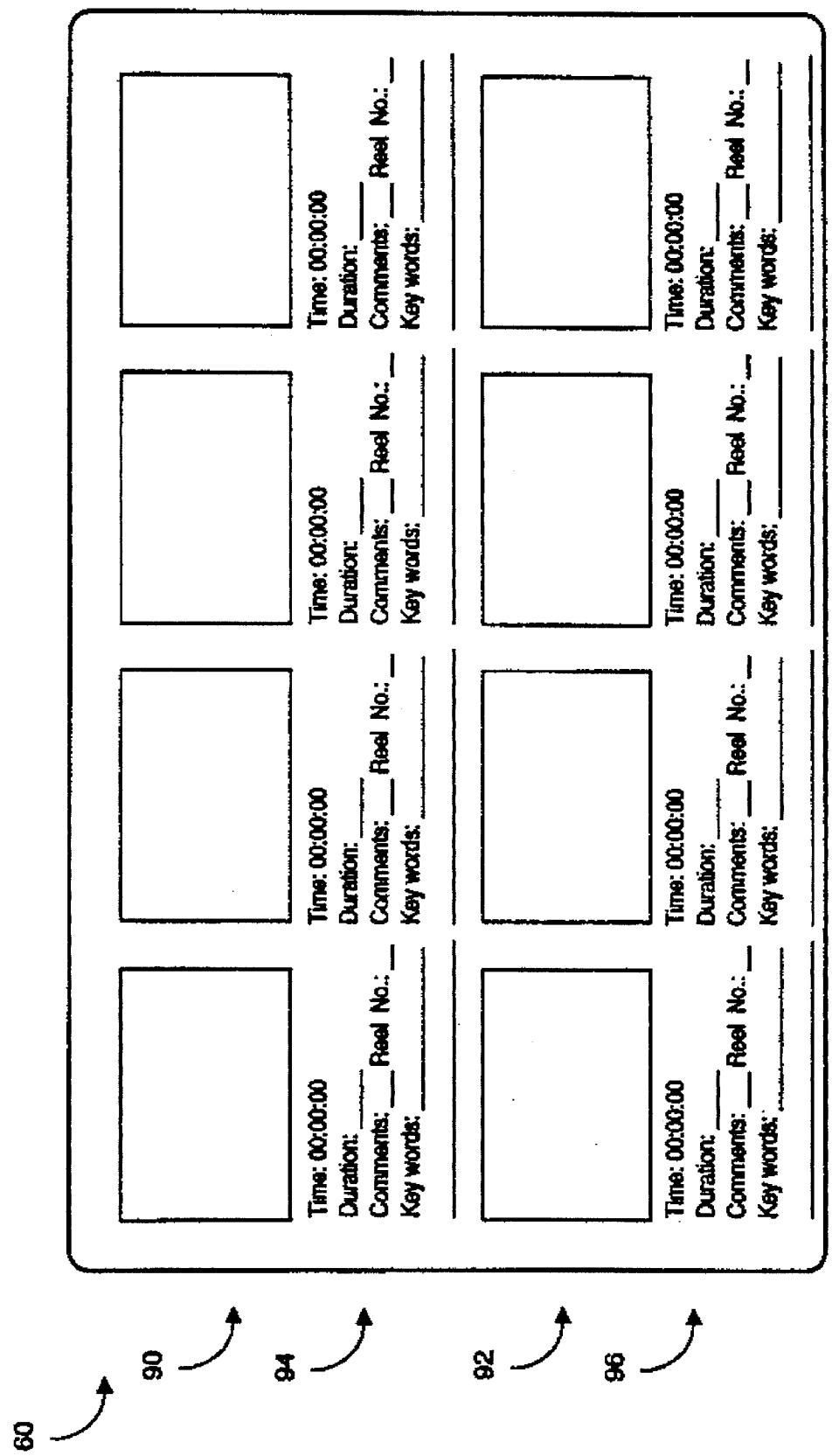
FIG. 7 depicts the display for an effects palette, as displayed on an on-line video editor, according to the present invention.

FIG. 7 depicts a display 60 of an effects palette, a display somewhat similar to that of FIG. 4. Each element in the effects palette describes an effect. Each element consists of a picture that contains an animation for a given effect, and text that contains information about the effect. In FIG. 7, two rows of pictures 90, 92 are depicted, beneath which are rows of text 94, 96. The pictures 90, 92 are preferably sequences of still images that animate the actual effect, but they may be stills as well. The pictures may, for example, be icons representing the effect, which icons when selected by the user demonstrate the effect. The effects palette binds the still picture or an icon in the sequence to the effect, a video roll for example. Because requested images may be cancelled without being displayed, the user is free to cursor off the display, producing an auto scroll that will display new media events.

Other embodiments that can be achieved with the present invention include a heads display that augments a textual program display. While having similar utility to the above-described video context window application, a different format is used. Another embodiment provides a heads display for a layering timeline display, somewhat like the video context window, but using a layering-oriented screen layout. In yet another embodiment, head/tail displays are made for current source marks, the video server essentially providing a small swap-palette for "undo" operations, and for saved pages of marks.

Having described several applications of the present invention, the operation of the invention will now be described. The present invention does not implement a procedural design but rather an Object Oriented design, in which various procedures flow through different threads. The operation of the present invention will first be described with reference to simplified state transitions, namely FIGS. 8A–11, which show simplified state transitions, and then with reference to the flow chart of FIG. 12.

Figure 8A:
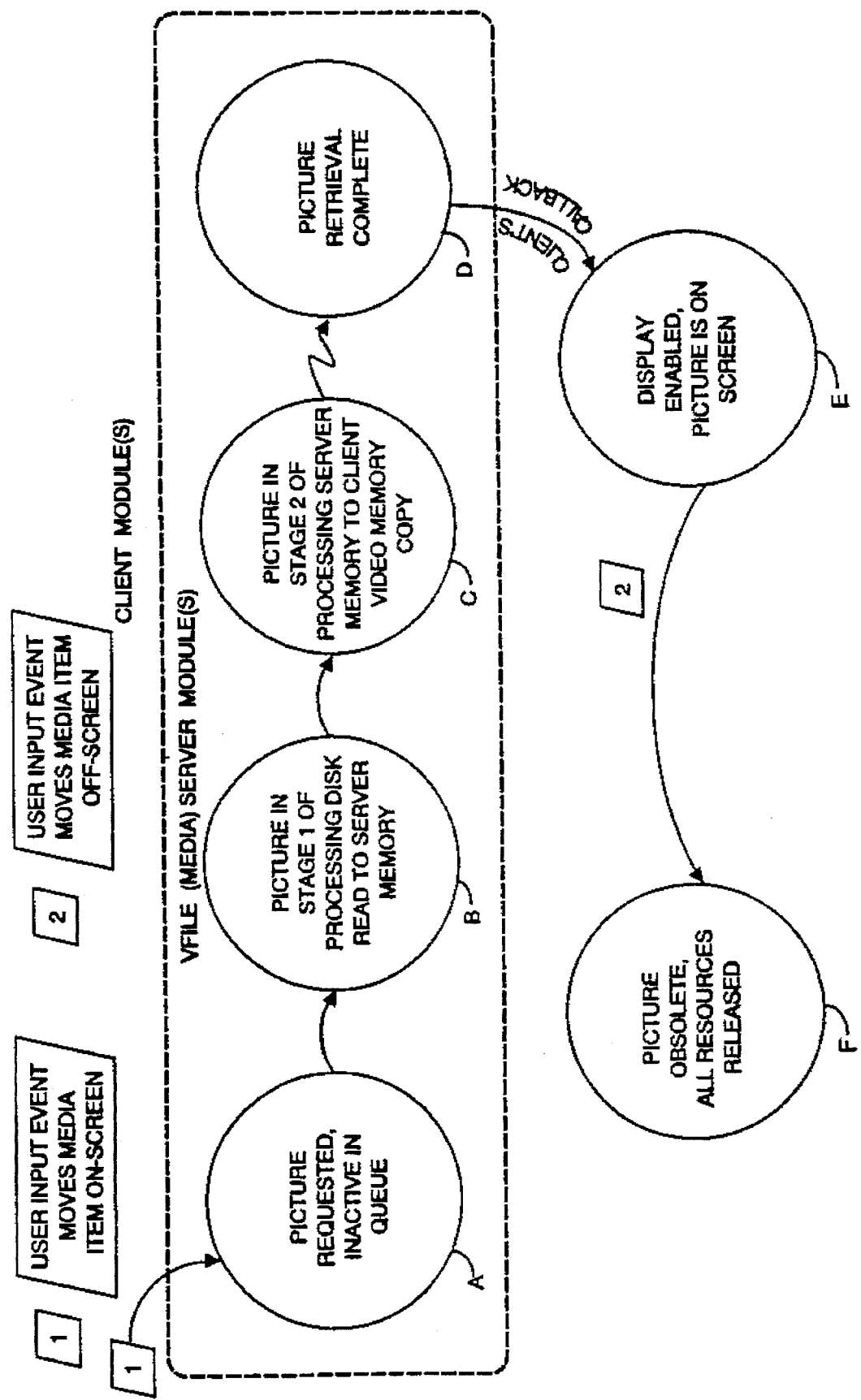
FIG. 8A is a state diagram depicting the normal full life cycle of a media request, and delineating client module domains and media server module(s) domains, according to the present invention.

FIG. 8A is a state diagram depicting the normal full life cycle of a media request, according to the present invention. The various possible states, or events along the picture processing stage, are denoted A–F. As depicted in FIG. 8A, at all times states A, B, C and D are within the domain of the media server module(s), while states E and F and any user or other input event [1] are at all times within domain of the client module(s). The media server module is also referred to herein as the VFILE media server module. Code for the present invention resides primarily within the VFILE media server modules (which encompass or encapsulate states A, B, C and D). Code for the application software is contained primarily within the client modules, which encompasses everything not within the media server module(s), according to FIG. 8A. As used herein, modules refer to collections of code, and include a variety of data structures and define actions that can be taken with respect to the structures. According to the present invention, the modules are encapsulated in well defined user space that permits communication to be inter-module (as contrasted to interprocess). By inter-module, it is understood that one or more than one processes can run through two blocks of code controlling two different sets of resources, whereas inter-process denotes that two processes can run in parallel through a single block of code. As used herein, the terms "thread", "task" and "process" are interchangeable.

Thus, within the client module, event [1] occurs, moving the desired media item on the display screen of monitor 22 (see FIG. 2). Typically event [1] is defined by a movement of the mouse/joystick/trackball 14 (see FIG. 2) causing a media item to move on the display screen into or out of an active region of interest. Those skilled in the art will appreciate that event [1] may more properly be defined as an event associated with an instantiation of a multimedia instance. Similarly, FIG. 8A depicts the occurrence of a user input event (or instance) [2], which event or instance moves the media item off-screen. This off-screen movement renders the image request obsolete, and constitutes a user request to delete or cancel the request for the image.

It is to be understood that event [1] (or "instance [1]") may in fact be provided by the application software rather than by a direct user movement. For example, in a virtual reality application, velocity can carry the user's reference point through space, without further user intervention. Motion of this reference point in turn can generate multimedia events. However for the sake of simplicity and with this understanding, event or instance [1] will be referred as a user input event or instance.

In any case, with reference to FIG. 8A, in event or instance [1] client software within the client thread detects that certain active events have moved across a boundary defining the active region. In state A, a picture is thus requested, the request entering the request queue but remaining inactive therein. As described elsewhere herein, it may be desirable to associate a priority with the request, permitting the request to be prioritized in terms of cost of server resources, user benefits, or a combination of each. Such prioritization would allow, for example, rapidly drawn wireframe images during rapid user navigation, which images are rendered more fully when the navigation slows, or black and white images during rapid navigation to transition to color images when navigation slows. From a client perspective, the flight simulator, for example, would pace higher priority on images along the line of trajectory, than on those along the side. From a client and user benefit, it would therefore be advantageous to place higher priority upon forward-looking images rather than side-looking images.

Once state A occurs, event [2] may occur anywhere between states A and F. By way of overview, as will be seen with respect to FIGS. 8A–11, if event [2] occurs at states A or B, we proceed directly to state F. If event [2] occurs at state C, the state transition splits. The client thread and client module proceed directly to state F; the server thread and server module may wait to first complete state D before proceeding to state F. If event [2] occurs after state E (as shown in FIG. 8A), the full request life cycle has occurred, and we proceed directly to state F. However should event [2] occur between state D and state E, we cannot proceed directly to state F without potentially creating a conflict state. The state C to state D transition is depicted in FIG. 8A with a somewhat lengthened path to depict that this transition can take a relatively significant amount of time, as typically a large block of data is copied into client resources. While this copying process is ongoing, the client resources (e.g., video memory 26 (FIG. 2) must be protected. Therefore a cancel request [2] that arrives before state D has completed is denied until completion of state D, whereupon the transition occurs directly to state F, as will be seen.

With reference to FIG. 8A, at state B, the requested picture is in the first stage of processing, and the appropriate portion of the media server 16, or hard disk 18 or optical disk 20 (see FIG. 2) holding the image is read into the server memory. At state C, the requested picture is in the second stage of processing, and is copied from the server memory to the client video memory (see 20, FIG. 2). However according to the present invention, the image is drawn in black but is hidden beneath a colored graphics overlay until fully present.

As noted, the state C to state D transition may relatively considerable time, and can represent a critical time wherein event [2] may arrive. In terms of time, the B to C transition can actually be longer, but does not represent a critical time period. It will also be that some implementations may omit state C, and proceed directly from a state combining states B and C, to state D. In FIG. 8A, at state D the picture retrieval is complete and a callback is generated.

At state E the display 22 is enabled (e.g., the colored graphics layer atop the image is changed to "clear") and the underlying previously drawn image (drawn at state C) is now visible on the display. At this point in FIG. 8A, user input event [2] moves the media item off-screen, and state F depicts that the requested picture is now obsolete. At this state, all resources (for example video memory 28) are released.

It will be appreciated that event [2] can occur other than after state E has been attained. As such, FIG. 8A depicts the normal full life cycle of a media request.

Figure 8B:
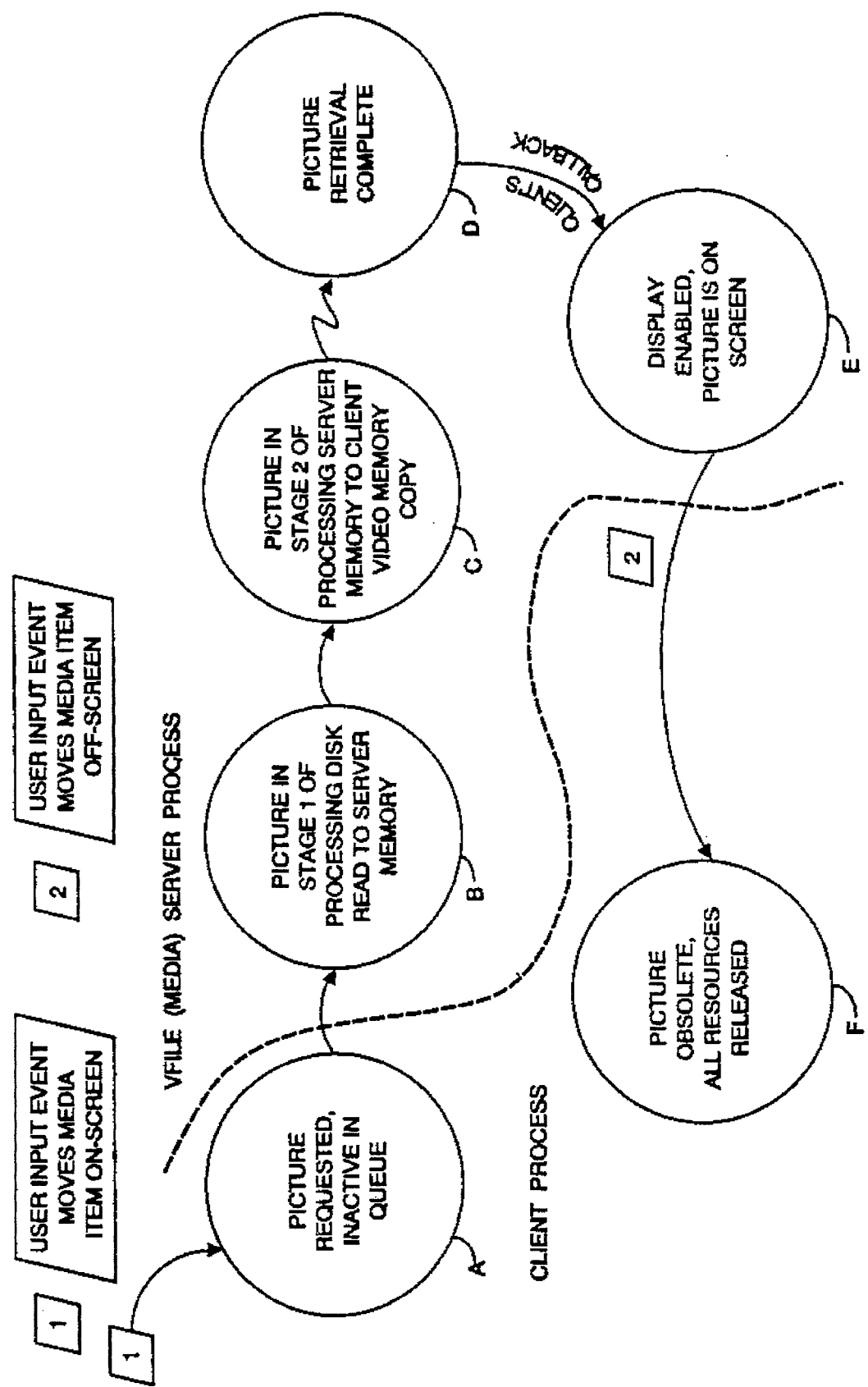
FIG. 8B is a state diagram depicting the normal full life cycle of a media request, and demarcates client processes from media server processes showing in which modules the relevant code resides, according to the present invention.

FIG. 8B is similar to FIG. 8A, but depicts the demarcation between the client process and the media server process.

Figure 9:
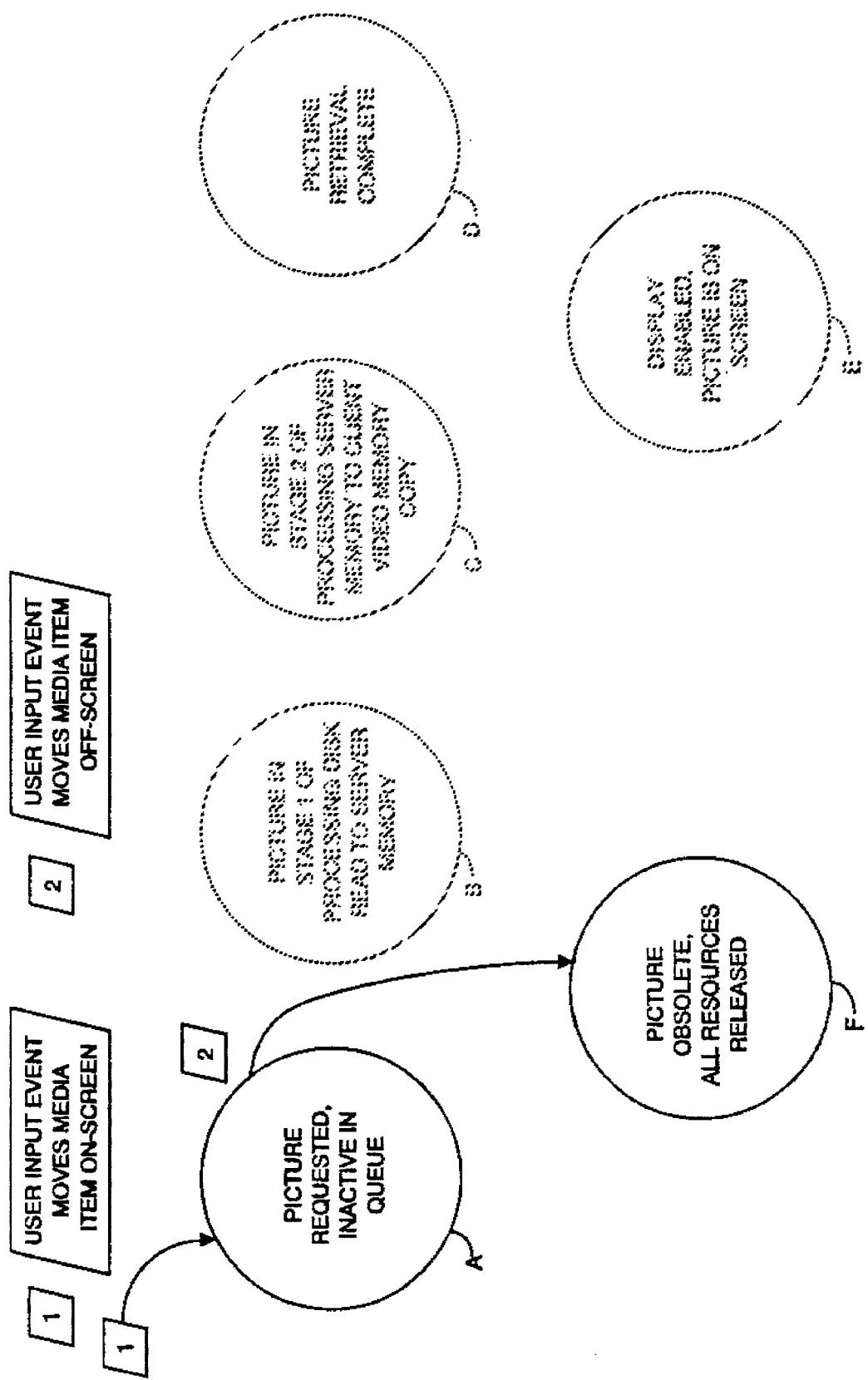
FIG. 9 is a state diagram depicting the simple case where a picture moves off-screen before its request reaches the front of the queue, according to the present invention.

As noted, instance [2] may in fact occur before the requested picture has been displayed on screen (state E). FIG. 9, for example, depicts the best case for media server throughput in a heavy request scenario, namely where the user causes the picture to move off-screen before it has ever reached the front of the request queue.

In FIG. 9, the user input event [1] occurs as before. However before state B is attained, the user input instance [2] moves the media item off-screen. As noted, the off-screen movement renders the request for the picture obsolete, and constitutes a cancellation request. Because as yet no server resources have been committed to this request, the transition from state A may go directly to state F, and the cancel request succeeds. In FIG. 9, states B, C, D and E are shown in phantom to indicate that while potentially these states could exist within their respective modules, they in fact are never entered according to the present invention.

Figure 10:
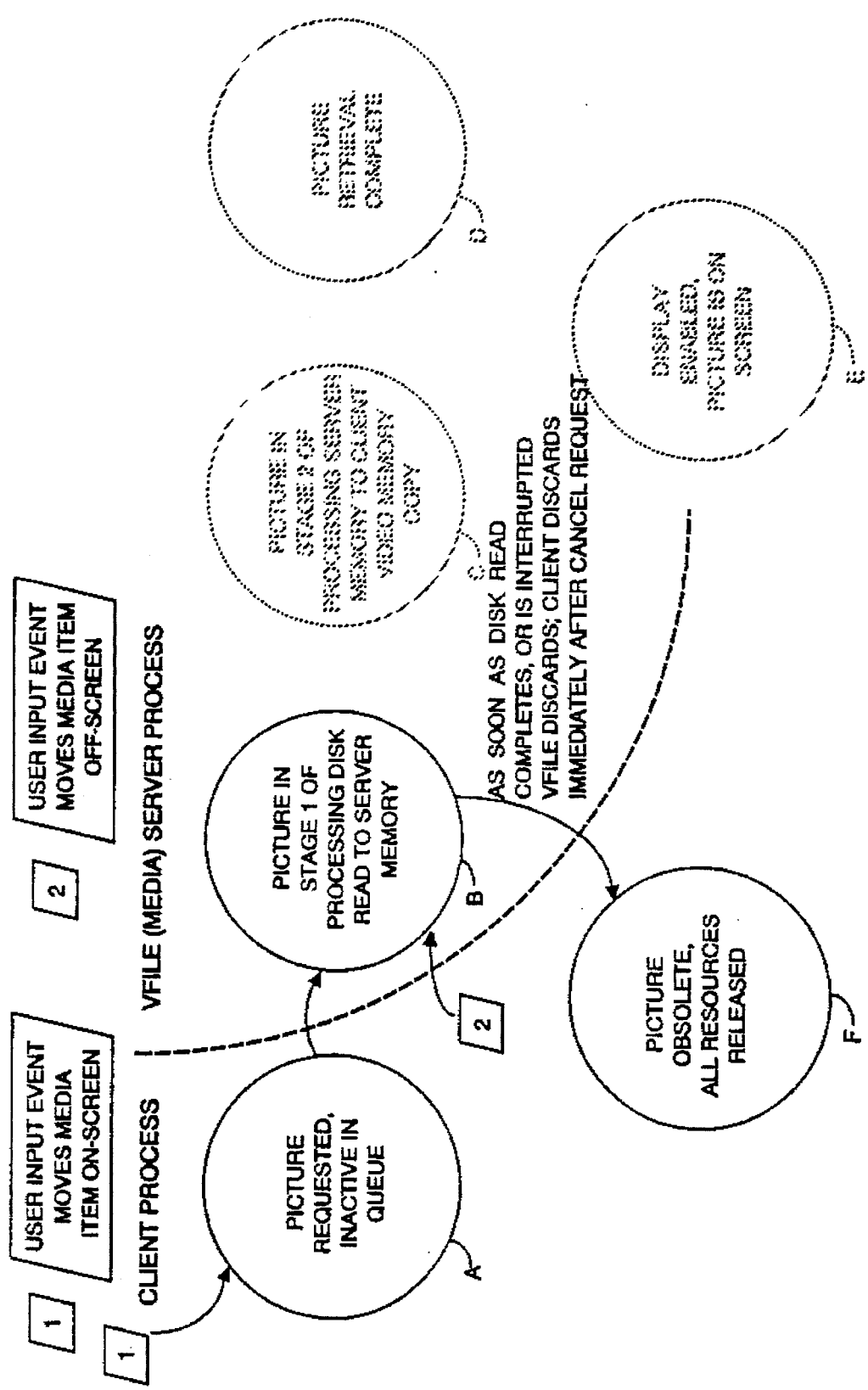
FIG. 10 is a state diagram depicting the case where the picture moves off-screen after retrieval has begun, but before client resources have been used, according to the present invention.

FIG. 10 depicts the sequence of states for the condition where the user input instance [2] moves the media item off-screen after retrieval has begun (state B), but before client resources have been used (state C). In this instance, the transition is from state B to state F, the transition occurring in the client immediately, and occurring in the server as soon as the read from hard disk 18 (or media server 16, or optical disk 20, see FIG. 2) completes or is interrupted. This is an important aspect of the asynchronicity of the present invention. The cancel request succeeds, and the client module is free to immediately release client resources. Again states C, D and E are shown in phantom, as these states are never reached under the scenario depicted in FIG. 10.

Figure 11:
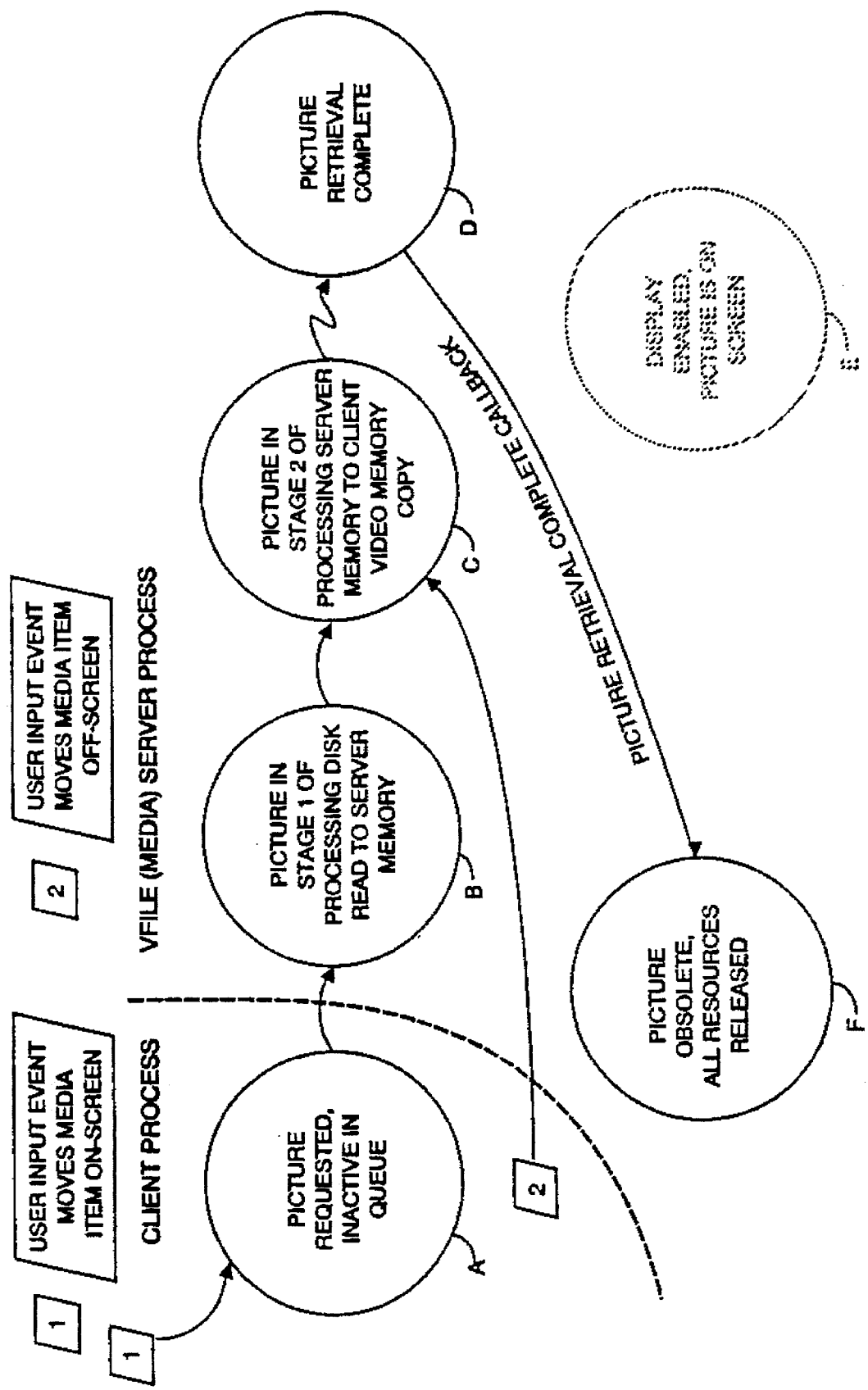
FIG. 11 is a state diagram depicting the case where the picture moves off-screen while retrieval is in a critical stage, after client resources have been involved in the transfer process, according to the present invention.

FIG. 11 depicts the more interesting and critical case where the picture moves off-screen after state B but before state C has completed, which is to say after client resources become involved in the transfer process. In this critical case, the cancel request fails, and client resources are eventually freed by a callback routine. As will be described in detail later herein, unless this critical case is properly accounted for, the present invention can crash computer 10 or trash the images displayed on monitor 22.

Figure 12:
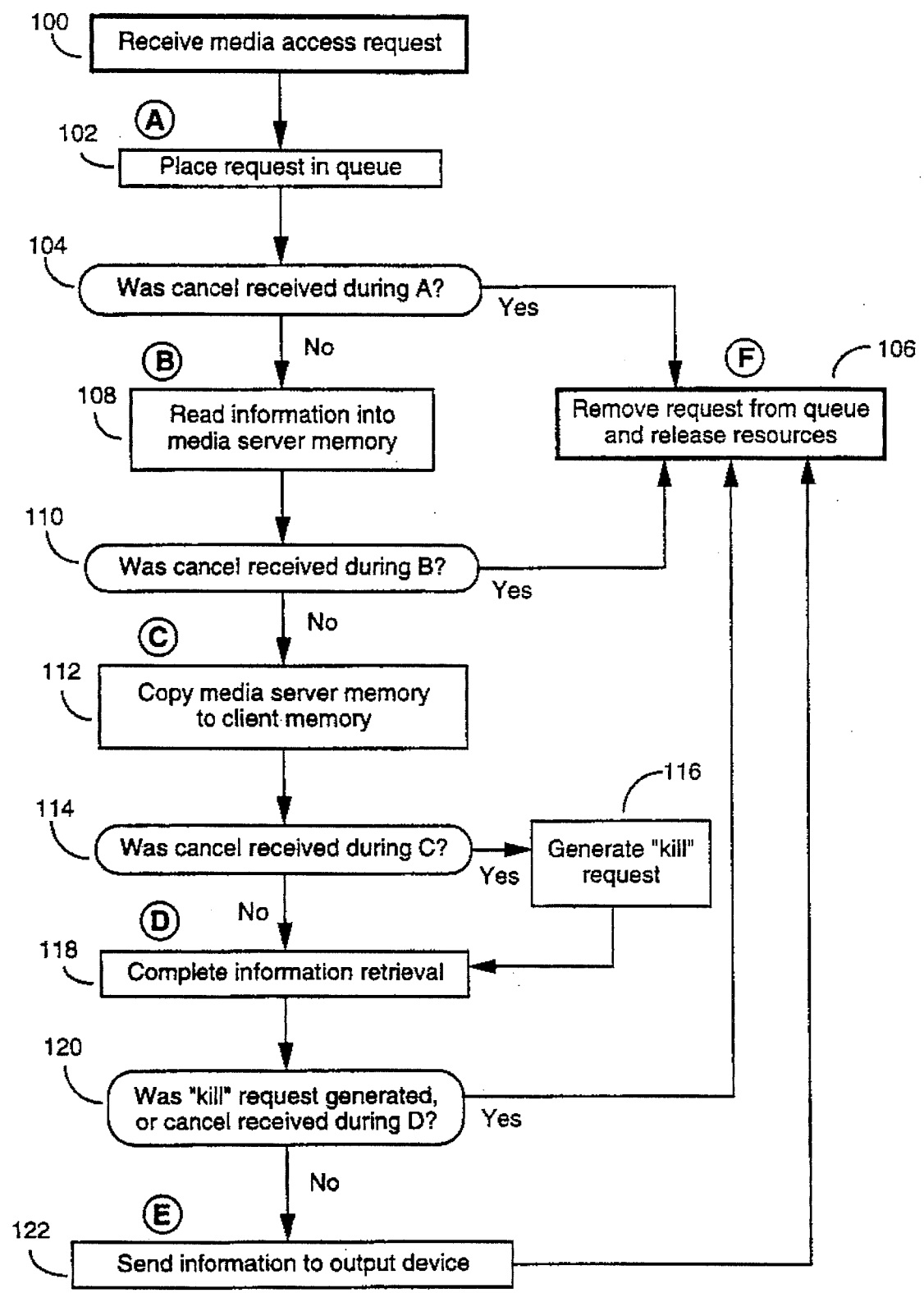
FIG. 12 is a flow diagram depicting the procedures following in responding to a received a media access request.

FIG. 12 depicts the procedure of the present invention from the time a media access request is received 100 in response to a user event [1], through the display of the requested information 122 and the release of system resources 106.

At step 100, a user event [1] creates a media access request that is received and placed in the request queue at step 102. Step 102 corresponds to state A, which was described earlier. If, at step 104, a cancel is received (from user event [2]), the procedure can go directly to state F, step 106, whereupon the cancelled request is removed from the queue, and system resources are released. If a cancel request has not yet been received, processing of the request continues and state B is entered.

As shown at step 110, if a cancel request is received during state B, there is a transition directly to state F, whereupon the cancelled request is removed from the queue, and system resources are released. If a cancel request has not yet been received, processing of the request continues and state C is entered.

As shown by step 114, if a cancel request is received during state C, a "kill request" is generated and at step 118, there is a transition to state D, whereupon retrieval of the requested information is completed.

If during state D either the "kill request" or a cancellation from user event [2] was received, the process transitions to state F, whereupon the cancelled request is removed from the queue, and system resources are released. If neither a "kill request" nor a cancel request has thus far been received, then at step 122 there is a transition to state E. At this point the request is displayed, for example on output monitor 22 in FIG. 2, the cancelled request is removed from the queue, and system resources are released.

APPENDIX I, attached hereto, sets forth the source code implementing the various modules used in the present invention.

Having described the scenarios depicted in FIGS. 8A–11, and the procedure flow depicted in FIG. 12, the user events [1] and [2] will now be described from the perspective of the client module and from the perspective of the server module. The following detailed description will provide those skilled in the art with a full understanding of the operation of the present invention.

Instance [1] as viewed from the client module:

What follows describes the normal procedure of two different threads proceeding through a single client module, and requesting services from other modules as needed. Steps (2)–(7) will represent the client module side of state A, which has been triggered by event [1]. Steps (8)–(13) represent what occurs when the client module server thread transitions to state E.

(1) The user (or background update) takes some action to move the context within the multimedia space As noted, event [1] will be a user action (a mouse movement and click, a joystick movement, etc.), or a background update action, such as a perceived velocity change in a virtual space simulation application. Event [1] essentially moves the context within the multimedia space.

(2) Client checks newly active screen region for instances [1] and receives a picture ID for each client object The client (which need not be synonymous with the application software) knows how much (more specifically, which region) of the virtual space is displayed (or "active") at any time, based upon the client state. The active region changes as the user navigates within in the virtual space, software detecting activation of the mouse cursor (or the equivalent). The software further detects media objects that have moved out of the active region of the display.

The client then checks the newly activated screen region for events. In representing the multimedia space, when the mouse causes a new region to be entered, that region is described in terms of text, and a pointer. As used herein, it is understood that the multimedia space may include more than pictures, sound and text, for example. The pointer is a picture identification ("ID") that, in the preferred embodiment, is implemented as a file name and a slot number within the client module. A header on the file says where the slot is physically located, the slot then mapping to an address in the hard disk where the associated file is located.

Typically the picture ID is hard coded in a map containing IDs boundup with a library server for media. Alternatively, the picture ID may be described in a text file with locations and names, the text file being read at system bootup. Upon a client request, the library server is called for a picture and returns a picture ID. However the picture ID may be implemented, it suffices that the VFILE media server knows what it is retrieving. Alternatively, the user could specify a time frame or command a jump to a given video page where a mark file picture is expected to be found for a given video segment. In a preferred embodiment, the server module maps the video segment to a picture ID. Upon being given that picture ID, the VFILE media server knows where on the hard disk to find the picture.

(3) For each media incident [1], client resources are obtained

For each media incident [1], client resources must be obtained, which requires an allocation within the video output memory 26 (FIG. 2).

(4) The state is locked, and for each media incident [1], a new multimedia client object is created To ensure inter-module mutual exclusivity, a lock is placed on the state, and for each media incident [1], a new multimedia client object is created and added to a client object list, and a reference is set to the video output memory. The lock could have been enacted earlier, but at a minimum must be enabled at this point. The lock state is carried with the object within the client object list. The enabled lock ensures that nothing will alter state tables until the multimedia object is completely created and an atomic update of the state relative to any other processes is complete.

Associated with the client object will be a picture ID, a pointer to video memory output (pVOMem), a pointer to VWin (the binding software object for XWidget that ensures that the proper video memory contents are put on screen to match Xwidget), a request ID (a unique identifier returned by the picture transfer service) and two flags that are initially set to "no". The first flag is labelled "Is Request Complete" and the second flag is labelled "Must Request Be Killed?".

The client object also includes a pointer to XWidget that instructs how to draw the graphics window into which the picture will be drawn.

Of course between steps 1–5, it is permissible to create other objects to draw into. In such instances, XWidget is created at the proper point on screen. If, for example, a requested picture were in the top display row and the user then did a half page scroll, the video request would not be cancelled, according to the preferred embodiment. Instead, XWidget would move, to which XWidget the client object simply has a reference, without requiring knowledge as to exactly where XWidget was located. Preferably, whatever moves XWidget (a scroll for example) is made to also move VWIN. Alternatively, VWIN can be drawn, and a query made into X to learn the location of XWidget for drawing at that location. So doing permits the state to move from XWidget to VWin, rather that having the client modify the VWin state. Thus, XWidget arid VWin are bundled by the extensions to X such that VWin moves when XWidget is moved by the client, and is unnecessary to modify the XServer code. This is in accord with an underlying philosophy of the present invention that distinct, distributed servers that the client manages shall be employed. A less desirable alternative would be to use monolithic servers that do everything but demand substantial knowledge about the video window.

(5) For each media incident [1], the picture transfer request service is called

In this step, the client sets up a picture retrieval (or queue item) request to the media server module, after which the system proceeds upon receipt of a returned request ID from step (6), but without having to await the actual picture retrieval. The request is made to the picture transfer request service whose file and slot number were designated in step (2). The client provides the media server module with a callback routine and a callback context (client state, usually a reference to the VWin/Xwidget object), and in return receives a request ID that identifies the requested picture and states how to get the picture out into the system resources. The request ID is an abstract identifier that uniquely identifies the particular multimedia instance [1]. The ID is intentionally abstract because the client cannot and should not do anything to the ID except pass it into the VFILE media server module. This abstraction promotes module encapsulation. Those skilled in the art will appreciate that because the present invention is asynchronous, a callback routine is required. In the preferred embodiment, the VFILE module maintains the callback pointer as part of the request object, and this function is called back at the appropriate time. In turn, this function will make a request to the XServer for the display of the requested image, using the client state passed in when the original request was made. The XServer provides a memory blast when writing within state E, when the display is enabled (e.g., overlay color changed to clear), and when XWidget is relocated.

When the media server module completes retrieving the picture information into video memory, and the picture is ready for display, the callback routine is called with the client state. A pointer to the function that is the callback routine, and the client state, were saved associated with the picture request that was originally made. The callback routine is usually called for a completed action, and resides within a client module. The callback routine requires the picture request ID and/or the client state to determine which picture request has just been completed. From the client's perspective, what is seen in the callback is the client object created in step (4).

In short, at system initialization, the client module(s) create a client ID, and when requesting a picture, the client receives a picture ID and passes in the client ID so the VFILE media server module can identify the requesting client, and know how to handle all events for that client. A single callback procedure is used in the system, as contrasted with the use of a per-picture callback. As step (5) only involves media server module state resources or input/ output, blocking on the picture retrieval is not required. A message is then sent to a separate server process advising that at least one additional item is now in the queue, which message causes the server process, if idle, to wakeup and act. The message is preferably implemented using a semaphore. Note that this inter-process communication occurs entirely within the server module. The client module need not know the details.

In FIG. 8A, the picture transfer request to display is the interaction between instance [1] and state A. More specifically, the picture transfer request service is called and is passed a client ID created by the server module, and a picture ID and client state. The picture ID advises how to find the picture, and the client ID advises how to callback the client, and the client state is passed back to the client callback to advise which picture has been completed. The client ID is used in preference to passing a new pointer to the picture transfer request service. Because the client ID includes a reference to a name, it is especially useful for error logging documentation purposes. Whenever the picture is done, the server module maps the picture to a client ID, which in turn is mapped to a callback to the client. This callback is called with the client context for the just completed request. Alternatively, the function could be passed in whenever a transfer request is made.

In the preferred embodiment, the picture transfer is actually to resources that will make the request displayable. The client makes Xserver requests to draw the associated graphical window as "clear" whereupon the previously drawn video is displayed on screen. The client provides the VFile module with a callback routine and callback context (client state, usually a reference to the vwin/Xwidget object).

A preferred embodiment includes a segment library that can quickly put text description on screen for use in requesting a picture. The segment library maps many VFiles into an abstract collection for browsing, sorting, etc. When the request is made, the segment library provides the picture ID, whereupon the picture transfer request service fetches the picture. A layer of abstraction is provided that permits the client to indicate a desired timecode range, whereupon the segment library, which manages many files, can identify which file contains the corresponding images. A module provides the initialization routine where the list of files holding media is examined, and each file is opened to learn from the file headers what pictures are contained therein. The list goes to the library to update segments. When client has an event described, for example in a mark file segment sense, a list is constructed from which the associated pictures may be identified.

(6) For each media event/incident [1], the request ID field of the client object is set When the request ID is returned, it is put into the client multimedia object created at step (4) by setting the client object request ID field. This permits the system to proceed without waiting for the actual picture retrieval. If user input instance [2] occurs and moves the request off-screen, the map of the multimedia document will so indicate. The media server module checks its list of client events by picture ID, to try to locate the client object associated with the client instance that moved off-screen. With the picture ID and with the request ID, the module knows how to cancel the outstanding picture request.

The request ID provides a binding up of the multimedia instance [1] and its processing. The present invention further provides a flag that queries "is request complete"? If the request is complete (state E), then the request. ID is no longer meaningful, there is no need to concern the system with cancellation, and the only required action is to release resources (state F).

As noted, at a minimum between steps (4) and continuing through step (6), a lock mechanism must be enabled to ensure consistent, atomic state changes. However, having created the client object at step (4), the lock is now disabled to permit updating client module tables.

From the client perspective, this completes input media instance [1], and everything that occurs hereafter occurs in another function stream, namely the media server process thread.

(7) For each media incident [1], set the "Is Request Complete" flag to "no"

Because the present invention is used in a true multitasking environment, the lock/unlock semaphore mechanism provides inter-module mutual exclusion to prevent module file states from being changed inconsistently. Essentially the state changes are bundled between periods of mutual exclusion. The client-server model is highly encapsulated such that while various services are provided, the media server module has no knowledge of why the services are provided. It will be appreciated that the requirement for an intermodule mutual exclusion mechanism arises because of the versatility inherent in the present invention. By contrast, a single thread application would by definition involve but a single process running in a single module, and would not require any external locking mechanism. Further, a single thread system would by synchronous and could simply call into a picture transfer mechanism that would instantly act upon the call.

(8) For each media incident [1], the client module is called back

Steps (8) to (11) describe what happens to the client module server thread when transition to state E occurs. Within the multi-tasking environment, the process thread that does the reading is the server task. According to the present invention, the server task advises the client module via a callback routine (a function call) that the requested picture is now complete, whereupon the client module knows what action to take. Thus, the conclusion of event [1] in the normal case will be that the user module is called back with the callback routine. Step (8) is asynchronous in that, having made the request, the client thread simply continues execution. At some point after the original client request, the request is actually processed in the server thread, which callbacks into the client module to advise completion of the request. Because step (8) is asynchronous, the callback function is required to advises the client module that the picture is done. Further, because multiple requests can be outstanding, the client callback must be passed either the request ID or the client state object to advise the client module which picture request has been completed.

This server thread is setup to accommodate resource and time expensive actions, thereby freeing the client thread from such activities. This permits the client thread to handle items that are less expensive from a user-resource perspective, such as modifying user states based upon user inputs. Again, it undesired that the client module be required to handle details associated with the drawing of a requested picture.

The client module is reentered in the server thread and notified via the callback routine that the request is complete. When the copying from server memory to client memory has occurred and state C to state D transition is complete, the VFILE media server has a pointer to the callback function (essentially a function call). The pointer which returns to the client module, while retaining the current thread.

It will be appreciated that simultaneously the client thread could be requesting another picture, and be running through the module while the server task is completing the picture request. It is this aspect of the present invention that requires a mutual exclusion mechanism that is provided by lock/unlock semaphores in the preferred embodiment.

(9) Look for Completed Picture in Client Object List

By way of assertion checking, upon completion of the picture a confirmation is made that the completed picture is in fact on the user's list of client objects. If not, the callback routine fails because an error has occurred, which error is logged whereupon the server proceeds as if no error had occurred. Such error could result from careless software making a false assumption that cancellation had occurred, and clearing resources. The error could also result from a second user attempting to cancel the request without first checking a return value to see whether the cancellation is allowed. The second user might then simply assume cancellation had occurred and clear resources, while a different user is requesting the same object. Such error could also occur if upon completion of a first user's request, a second user has already deleted the same picture from the client object list.

Generally in the case of such errors, the video output memory will probably be invalid, whereupon state C will be trashed, or the video output memory will have been orphaned (e.g., the only reference to the memory was in an object that has been freed). It will therefore be appreciated that such assertion checks are necessary to provide robust software in the present invention.

Thus, before examining the client object list, it is necessary to enable the lock to prevent another user from altering the client object list while it is being examined.

(10) Check for "Must This Request Be Killed" Flag

The second flag, "Must This Request Be Killed" is necessary to account for the critical edge case referred to earlier. If the cancel request cannot be immediately completed, the cancel request "fails" and the second flag is marked "Yes" indicating that at some appropriate time that will not crash or otherwise endanger the system, the request must be killed.

If the object must in fact be killed, resources may be released and the object deleted from the object list, after which the lock may be disabled.

(11) Map Client Object to Widget

After confirming that the client object is on the client list, the client object is mapped to a widget. The VWin service tells the system where the object is to be drawn, and VWin preferably is always made drawable, for example permitting XWidget to be drawn upon request, in black on a white background. As noted, in the preferred embodiment, the graphics board permits drawing a layer of color over the video image, which does not appear on the display because of the color,

(12) Request Draw "Clear" into Widget

As noted, drawing requests have been made asynchronously. In the absence of a cancellation, a request is now made to draw "clear" into widget, which means filling an array in graphics memory (but not on-screen) with a particular number. In the graphics table associated with video board 26 (see FIG. 2), the number 0=clear, 1=white, 2=black, 3=blue, 4=red, and so on. Thus by filling the graphics memory array with 0's, the opaque colored overlay atop the previously drawn video is removed.

(13) Mark Client Object as "Done", Mark "Is Request Complete" Flag "Yes"

At this point, the request has completed, the client object is marked as done, and the "Is Request Complete" flag is set to "yes". The previously drawn image now appears on display 22 (see FIG. 2). At this point, the server resources used to complete the now displayed request are unlocked and released.

What will now be described is the same instance [1], but as viewed from the server module. To avoid ambiguity in cross-referencing the descriptions, the steps will continue to be numbered serially. However it must be understood that while, for example, step (14) in the following description is a higher number than step (13) in the above description, it in fact occurs earlier in time.

Instance [1] as viewed from the server module:

(14) Client Thread Calls into Picture Transfer Request Service

A call is made by the client thread into the picture transfer request service.

(15) Create New Request Item and Request ID

After first enabling the lock mechanism, a new request item and request ID are created and video memory is allocated. At this point, the client thread is still at state A.

The requested queued object has several attributes, some of which have been described. There is an associated picture ID, a callback routine used for every queued object, an associated client state, a function state that can be "inactive" "in process" or "locked" a "must request be killed" attribute and preferably a priority attribute.

A client state is needed to support the callback routine, which in turn is needed because of the asynchronous request mechanism provided by the present invention. The "inactive" state denotes that the request is still sitting in the request queue with no action having been taken yet. "In process" denotes that some action is being taken with respect to the request, and the nature of the action will allow interruption or cancellation. The "locked" state denotes that the request is at a process stage that precludes interruption or cancellation at this time.

Because the present invention permits cancelling a queued request that has not completed, requests may be prioritized and even re-prioritized at any time they in the queue. This aspect of the present invention enhances overall system performance. Priority can be assigned according to expense of system performance (e.g., relative amount of video memory required for the image, relative time to complete the image), and/or according to user benefits (e.g., how important is it to now view a fully rendered image as opposed to a wireframe image, or a black and white image as compared to a full color image). High priority requests (those requiring less media resources/time) can be queued before lower priority requests.

As an alternative to assigning a priority number per se, the picture ID enables the server module to guess whether the picture should be rendered fast or slow, by querying the segment library as to the file size.

Requests for both high and low priority images can be made, by the user directly or by software less directly. The high priority image might be a request for a wireframe depiction of a building, whereas the lower priority request may be for the fully rendered building image. Both requests are queued and the wireframe request will complete processing first. If the user "runs" rapidly past the wireframe-rendered building image, there is no need to complete the now obsolete request for the fully rendered image of the already passed building. The present invention cancels that request and goes on to the next request. Intelligent software permits the present invention to pre-queue scenes likely to be visited or requested by the user, which requests if not needed may be cancelled before they are complete.

In this example, the present invention can automatically adapt the quality of the displayed images to the navigation speed of the user, showing wireframe images during rapid navigation, showing better rendered images when slowing or halted. In this fashion, the present invention is adaptively controlled to keep up with the user navigation as best it can. System throughput is enhanced because cancelled requests make system resources available to other requests. This in turn permits the user to rapidly and freely navigate the multimedia space, essentially with minimum real-world constraints.

(16) Save Request ID on Stack (or Set Return Value)

The just created request ID is entered into a memory stack as it is desired to pass the request ID out of module state space, which spage can now be unlocked. It will be appreciated that once unlocked, nothing should be referenced within the module. At a later time, the request ID will be referenced (and thus required), namely when it is returned (see step (6), above).

At this point, a return value is set. Alternatively, a pointer could be passed to a space that held the request ID.

(17) Wakeup Server Thread

The presently executing thread is the client thread, and it is necessary to wakeup the server thread. In the preferred embodiment, the server thread normally runs but is blocked from continuing to run by a semaphore. The wakeup advises the server thread that a new item has entered the request queue. This semaphore blocking/unblocking is preferable to an implementation wherein the non-desired thread is kept in a "busy waiting" state, wherein it constantly had to use computer 10 CPU resources.

In the present invention, the semaphore is a lock-type mechanism provided within any kernel that provides multitasking as a procedural call, typically denoted SemTake, SemLock, etc.. Essentially the semaphore knows only "yes", "no" and who owns it Semaphores in the present invention allow one process to execute while another process is in a wait state.

Eventually the client will add an item to the request queue, at which point the client raises a semaphore that wakes-up the server thread, alerting it to the existence of at least one newly queued request. In the preferred embodiment, the server is defined as having a lower priority than the user, so as not to unduly stress the system when a picture is to be drawn. When the client wishes to raise the semaphore to the server thread, this makes the server runable. When the client process next pauses, for example to wait for more user input, the server can begin processing requests. This represents a scheduling aspect of multi-tasking in the present invention, in that the next highest priority runable task is permitted to run.

(18) Return

At this point, the client thread returns.

(19) Server Thread Waits for Request

Having been awakened at step (17), within the server module the server thread now runs, and checks the request queue.

(20) WakeUp Arrives

Sometime after the wakeup arrives, the next request will be fetched from the queue by the server thread, although not necessarily immediately, depending upon other processes in the system. At step (20), the module is locked.

(21) Get Next Request From Queue

After the user event [1] created the request at step (1), the request was added to a list of requests at step (5). To ensure consistent state changes, the lock is enabled before step (21).

According to the present invention, the requests to be queued may be prioritized, and queued according to priority such that faster executing requests are ordered before slower executing requests (although other ordering or priority considerations may govern). Sometime after the walk-up arrives, the server thread will be able to proceed but in the interim remains in a pending state without having to loop or engage in other activity that would require extensive use of the computer 10 CPU.

(22) Mark Request as in Stage 1 Processing

As indicated by FIGS. 8A, stage 1 processing implies the request will be using server resources (but not client resources). The "in process" mark implies that the picture request is being processed. The server thread proceeds to obtain the requested picture from the media server, without locking module resources at this point. It is understood that the lock is enable when marking the requested object, but is disabled before the relatively expensive media read proceeds.

(23) Read From Disk or Other First Stage Media

At this point, the server thread reads from the first stage media server resource (e.g., hard disk 18 in FIG. 2), and brings the retrieved information into server module resources to make the information available. During the relatively slow file input/output process, the lock is disabled. When the file input/output process is complete, the data is within server module memory.

As we move through the server thread handling the requests, step (23) is a point whereat the requested object may actually be examined. The lock is enabled and, as will be described, at step (24) the process determines whether the request is still active, and further checks to see if the request has been killed.

It should be noted that the low level facilities of the operating system are provided by commercially available software. For example, VXWorks provides some file input/output facilities, and scheduling and semaphores facilities. As noted, XWindows is similarly a commercially available product, known to those skilled in the relevant art.

(24) Check to See Whether Request Is Still Active

Step (24) describes how the server module, within the server thread, actually proceeds through the process of handling a request. Because determining whether the request is still active involves a branch operation, the module is locked for the duration of this step.

If the request is still active, we proceed to step (25). If, however, the request is no longer active, then the server module considers itself done with the request, and server resources previously allocated for the request are released. The lock is disabled, and the process returns to step (21) to see whether there are additional outstanding requests in the queue. It is not required that step (19) be re-traversed before reentering step (21).

When a request is cancelled during actual processing of the request, the request on the server side will be marked as deleted but will remain in the queue. To avoid inconsistent module state, server side resources are not freed at this point. Understandably a race condition could result if while a request file was in process, the server memory into which the file is to be copied is itself freed. Further, it must be recognized that the calling thread wishing to cancel is not the server thread but the client thread.

(25) Mark Requested Object as Uninterruptible

The object whose request is still active is now marked as "uninterruptible" and the lock is disabled, which permits read access to the client object list. However because the request is marked "uninterruptible" no action can occur in response to anything on the list. Note that this action is solely within the server module. The only client access into the module is via well defined procedural calls, and there need be no reliance upon the client module not altering server module states.

(26) Copy Requested Object into Client Resources

At this point, the requested object is copied into the video output memory, for example into memory 26 in FIG. 2. Upon completion of the copying, the lock is enabled.

(27) Get Callback Pointer

Associated with the queued object whose request is still active is a callback pointer that is set as a field within the picture request.

(28) Callback Is Called

At this juncture, the lock is disabled and the callback function is called, with the client state. Again, it is the callback function that facilitates the communication, which is inter-module rather than inter-process.

What will now be described is user instance [2], as viewed from the client module. As before, for the sake of avoiding ambiguities, the steps will continue to be numbered serially. It should be noted that event [2] occurs entirely within client thread(s) and never within any server thread. Event [2] is simply another event along the execution stream, namely a branching from the end of the thread in event [1].

Instance [2] as viewed from the client module:

(29) User Input Causes Action to Move User Context/ Reference Point within the Multimedia Space As has been noted, user input might be a client thread representing mouse or trackball movement, or it might be a different client thread representing a software recognition that a velocity or acceleration threshold has been exceeded. In any case, such event [1] results in an action moving the user context or reference point within the multimedia space being navigated.

(30) Client Software Detection that Certain Active Events Have Moved Out of the Active Region Based upon the used instance or event [1], client software within the calling client thread detects that certain active events have moved outside the active region on display 22. The active region is client defined, and may in fact be arbitrarily defined with several levels. The active region could be what is displayed, or perhaps what is displayed plus what the system wishes to retain for performance reasons. A system providing heuristic software function might prerequest pictures representing scenes adjacent to what is currently displayed.

(31) For Each Such Event, Search Picture Object List For Event

The lock is enabled, and the list of picture objects is searched for the event being requested. If not found, the lock is disabled, an appropriate error message is generated, and the process loops back to step (31), where a similar assertion check is made for the next such event.

(32) For Each Such Event Found on Picture Object List, Check Picture State

If, however, the picture object list contains the event (as it normally would), the state of the picture is next examined. If the active region has already been drawn (e.g., state E), then by definition the request is complete, resources may be released, the object request is deleted from the queue, the lock is disabled, and the procedure loops back to step (31) to search the object list for the next such event.

However If not yet drawn (e.g., the request is somewhere within the server queue, between states A and D), the cancel request routine in the server module is called. The call is made with the request ID that was saved with the description of the client object corresponding to the multimedia event. (The client object also contained the picture ID that was passed to the picture server.)

A cancel request success flag is returned that is either in a "yes" state or a "no" state. A "yes" means that the request was either successfully cancelled, or that the cancel request was noted. A "no" means the request cannot be cancelled, and the process continues to step (33). Because of the encapsulation provided by the present invention, the client module has no concern with why the request was or was not cancelled.

If the cancellation succeeded, the process returns to step (32) for the already drawn state, whereupon client resources are released, the object request deleted from the queue, etc. As far as the client module is concerned, the request is now cancelled. It is noted that while the client module is free to immediately release its resources, the server module may defer cancellation (and resource release) until a suitably noncritical time. The present situation is described by FIG. 9, state A wherein cancellation succeeds because the request was still inactive, or by FIG. 10, state B, wherein cancellation succeeded because client resources had not yet been involved from perspective of client, safe to cancel. Thus, as shown in FIG. 9 and FIG. 10, from the client perspective, it is safe to now release all system resources.

(33) For Each Such Event Found on Picture Object List For Which Cancellation Is Denied, Mark Object "Must Be Killed"

If the success flag call returns a "no", then the request object sought to be cancelled cannot at this instant be cancelled. It is, however, marked or flagged as "Must Be Killed", which flag enables the request to be killed within the server module at an early non-critical time, e.g., a time whereat the system will not be crashed. Beyond this, the client thread can do no more. With reference to FIG. 11, such a "no" return will result after state C. However, by the time the process reaches state E, the pending picture request will be killed. The kill time will be when the server thread calls the callback, at which time rather than draw the object, it is killed, resources deleted, the object deleted from the client object list.

(34) For Each Such Event, Unlock and Loop Back to (31)

At this point, the process returns to step (31), and searches the list of picture objects for the next detected event [2]. As will be seen from the following description, the marked and pending kill request will be accounted for the next time the callback function issues out of the server thread. In essence, because of the asynchronous nature of the present invention, the system can rely that at some later time, another thread will enter the client module and complete the pending cancellation.

What will now be described is user instance [2], as viewed from the server module, the process steps again being numbered serially. The following actions occur within several threads, but on an intra-module basis. Instance [2] as viewed from the server module:

(35) Request to Cancel Request by Request ID Returned from Request to Transfer Service In the line of execution, there is a call within the client thread whereby the server module provides a cancel request to the user interface, which request is cancelled by the client thread. See step (32), undrawn case.

In making the cancel request, the cancel request routine is passed a request ID, which ID was returned when the client originally requested the transfer.

(36) Locate Request in Queue

On the server side, the lock is enabled to preserve the server module states, and the outstanding request is located in the queue by its ID.

(37) If Request Not Found, Error Case

The request should of course be in the queue. However if this assertion check indicates otherwise, the lock is disabled and an error message generated to the log. The error could have resulted from a callback that was advised that the request had succeeded, but the state was not marked. At a later time the caller might try to delete the request, which request may have been long since deleted by the system.

(38) If Request Found, Check State of Request

In the normal course of events, the request should be found in the queue, whereupon the request state is checked with the lock still enabled.

If we are at inactive state A, e.g., in the queue but inactive, the request is deleted from the queue and server resources are released. The lock is disabled, and a cancellation "success" is returned. This is the case depicted in FIG. 8A, where the request never got around to start of processing.

If we are at active state B, then the server object on the server side is marked as "must be killed" the lock is disabled, and a cancellation "success" is returned. It should be noted that the server had not yet deleted the object, but when the server transitions from state B to state C, a check is made to see whether the request was still active. If the request must be killed, server resources may be safely released at this point and the system proceeds to process more requests.

If the request is uninterruptible, the lock is disabled, and a "fail" is returned. An uninterruptible server request represents the case where the server module cannot back-out of the process. An uninterruptible request may represent state C, or if the server process has commenced, the more critical state D.

To prevent deadlock, the server module unlocks its server module lock before calling the callback, because otherwise the client thread could enter and lock the server module. Thus in state D, the server must relinquish its lock when calling the client callback, and in fact it is this action of calling the client callback that transitions from state D to state E. However before unlocking the server module and calling back, the server thread marks the object called for as "uninterruptible". Thus, even if the server thread blocks on the client lock in the callback, the client thread will not alter the current request within the server module. When the server thread eventually proceeds with the callback, (after the client thread releases the client lock), the picture request completes, and the server moves on to any other pending requests.

Modifications and variations may be made to the disclosed embodiments without departing from the subject and spirit of the invention as defined by the following claims. For example, while the present invention has been described with reference to application with a video editor system, it will be appreciated that any application requiring retrieval and presentation of media will benefit from the present invention.

vfile.h      is the interface to the VFile server
vfile.c      is the C-language source code for the server.

segmentLib.h is the interface to the Segment librarian, which is just
             an abstraction layer between VFile and the application.

segmentLib.c is the C-language source code for the librarian.

vomem.h      is the interface to the Video Output Memory manager.
vomem.c      is the C-language source code for the
             Video Output Memory manager.

vwin.h       is the interface to the VideoWindow manager.
vwin.c       is the C-language source code for the VideoWindow manager.

markFile.h   is the interface to the MarkFile (Segment Librarian)
             application and user interface control.
markFile.c   is the C-language source code for the MarkFile
             (Segment Librarian) application and user
             interface control.

segList.h    is the interface to applications that use the
             Segment Librarian. It includes the Client
             Request Object - SegmentListElementSt.
             Note that we have an implicit mechanism
             for handling the "MustBeKilled" flag,
             which is why it does not appear explicitly
             in this structure. The functionality is
             equivalent, and the "teaching" is clearer.

cmd_sList.c  is the C-language source code for the user input
             handlers for Segment Librarian users, as well
             as some the application code for dealing with
             the Segment Librarian facilities.

APPENDIX I

```
/*
 *   segList.h   03/16/93
 *   Copyright (C) 1993 Accom Corporation
 */
#ifndef SEG_LIST_INC
define SEG_LIST_INC /*--- defines ---*/ typedef struct
{
    SegLibSegmentID    segmentID;
    VOMemBlockID       blockID;
    boolean            fPictRequested;
}SegmentListElementSt;

typedef struct
{
    SVLIST             segmentList;
    char      *        pListName;
    uint               iNumber;
}SegmentListSt;

typedef struct
{
    SegmentListSt      CurrentSegList;   /* Current Segment List           */
    SegmentListSt *    pCurrentSegList;  /* Ptr to Current Segment List    */
    SVLIST             queryElements;
    boolean            fAutoAdd;
}CurrentSegmentMgr;

/*--- function defs ---*/ enum ERC SegListNotifyOfNewSegment( SegLibSegmentID segmentID );

enum ERC SegListViewSegmentList( enum CMD_CODE iCmd, void * arg );

#endif
```

```
#ifndef BLAST_ID
static char file_id[] = "@(#) cmd_sList.c 1.20(#), 04/09/93, 22:39:11";
#endif
/*-
 *    Copyright (C) 1992 Axial Corporation
 *    cmd_sList.c - Contains code to handle commands for segment lists
 *                  which interface to mark files.
 */
/*--- includes ---*/
#include "ax_types.h"
include "ax_string.h"
#include "stdlib.h"
#include "error.h"
#include "kbd.h"
#include "cmd_code.h"
#include "user_cmd.h"
#include "user_def.h"
#include "vomem.h"
#include "video.h"
#include "vfile.h"
#include "segmentLib.h"
#include "segList.h"
#include "mutex.h"
#include "markFile.h"
#include "workspace.h"
#include "enode.h"
#include "clip.h"
#include "dataEntry.h"

/*--- defines ---*/
#define VIEW_SAME_SEG_LIST          0
define VIEW_NEW_SEG_LIST           1 define REEL_MODE_OFF               0
define REEL_MODE_ON                1
#define VIDEO_MODE_OFF              2
define VIDEO_MODE_ON               3 define SEG_LIST_ENTRY              "SEG_LIST_ENTRY"

/*--- data defines ---*/ static boolean              fModuleInit = FALSE;
static boolean              fVideoMode = TRUE;
static boolean              fReelMode = TRUE;
static CurrentSegmentMgr    SegListMgr;
static SegLibClientID       slSegClientID = SEG_LIB_CLIENT_ID_NONE;
static MUTEX_ID             mtxSegList;
static boolean              fGotNumber;
```

```
static uint                iEnteredMarkNum;
static uint                iStoredMarkNum;

#define CHECK_MODULE_INIT {if( !fModuleInit ) SegListInit();}
/*--- function defs ---*/

/*--- static functions ---*/

STATIC enum ERC
SegListSegLibCallback( SegLibClientID clientID, SegLibSegmentID
    segmentID, void * pClientData, TY_CALLBACK_ACTION tyAction )
{
    if( fVideoMode )
        CK_LOG( MarkfileSegLibCallback( clientID, segmentID,
            pClientData, tyAction ) );
    else
        LogError( E_NOT_IMPLEMENTED );

return E_OK;
} void SegListInit()
{
    if( !fModuleInit )
        {
        MutexTake( mtxSegList);
        if( slSegClientID == SEG_LIB_CLIENT_ID_NONE )
            {
            if( ( slSegClientID = SegLibClientCreate( "SegList",
                SegListSegLibCallback, NULL ) ) == SEG_LIB_CLIENT_ID_NONE )
                {
                MutexGive( mtxSegList);
                return;
                }
            }
        fModuleInit = TRUE;
        MutexGive( mtxSegList);
        }
} static enum ERC GetCurrentReelName( char * pFileName, uint iBuffLen,
    char * pcLSrc )
{
    enum ERC           erc;
    char               cLetter;
```

```
    I_ENODE             iClip;
    I_REV               iRevClip;
    WkspContext         pInfo       = NULL;
    SVLIST              list;
    uint                iWkspState = WkspGetMarkSetState();

if( iWkspState == SET_RECORD_TIMES )
        cLetter = 'R';
    else if( iWkspState == SET_BOTH_TIMES )
        return UserError( E_SOFT_S, "You must select a single Device." );
    else
        {
        CK_E( GetCurrentWorkspaceContext( &list ) );
        if( list.nItems != 1 )
            {
            CK_LOG( SVListFree( &list ));
            return UserError( E_SOFT_S, "You must select a single Device." );
            }
        if(( pInfo = (WkspContext)SVListGetItemPtr( &list, 0 )) == NULL)
            {
            erc = ReLogError();
            CK_LOG( SVListFree( &list ));
            return erc;
            }
        if( pInfo->tyLineSupp == TY_LINE_EDIT_MSTR )
            cLetter = 'R';
        else
            cLetter = pInfo->cLSrc;
        }
    CK_LOG( SVListFree( &list ));
    *pcLSrc = cLetter;

CK_E(LetterToClip( cLetter, I_REV_LATEST, &iClip, &iRevClip ));
    if(EnodeGetName( iClip, iRevClip, pFileName, iBuffLen) != NULL)
        {
        return E_OK;
        }
    return LogError(E_BAD_PTR);
}
```

```
STATIC enum ERC ClearCurrentSegList( )
{
    uint                       index;
    SEG_LIB_QUERY_ELEMENT * pQuery;

if( SegListMgr.pCurrentSegList->pListName != NULL )
        FreeString( SegListMgr.pCurrentSegList->pListName );
    CK_LOG( SVListFree( &SegListMgr.pCurrentSegList->segmentList ) );
    for( index = 0; index < SegListMgr.queryElements.nItems; index++ )
        {
        if( ( pQuery = (SEG_LIB_QUERY_ELEMENT *)SVListGetItemPtr(
            &SegListMgr.queryElements, index ) ) == NULL )
            {
            return ReLogError();
            }
        if( pQuery->tyQualifier == QUALIFIER_REEL_NAME )
            FreeString( pQuery->QueryQualifier.pReelName );
        }
    CK_LOG( SVListFree( &SegListMgr.queryElements ) );
    SegListMgr.pCurrentSegList = NULL;
    SegListMgr.fAutoAdd = FALSE;
    return E_OK;
} enum ERC SegListNotifyOfNewSegment( SegLibSegmentID segmentID )
{
    boolean                fStatus = FALSE;
    SegmentListElementSt   segListElement;

CHECK_MODULE_INIT

CK_LOG( SegLibQueryASegment( slSegClientID, &SegListMgr.queryElements,
        segmentID, &fStatus ) );
    if( fStatus )
        {
        segListElement.segmentID = segmentID;
        segListElement.blockID = VO_MEM_BLOCK_ID_NONE;
        segListElement.fPictRequested = FALSE;
        CK_LOG( SVListAdd( &SegListMgr.pCurrentSegList->segmentList,
            &segListElement ) );
        }
    return E_OK;
}

STATIC enum ERC GetReelModeQuery( SVLIST * psvQueryElements,
        SVLIST * psvSegItems )
{
```

```
    SEG_LIB_QUERY_ELEMENT    Query;
    enum ERC                 erc = E_OK;
    char                     acReelName[100];
    char                     cLSrc;

CK_LOG( SVListInit( psvQueryElements, NULL, NULL,
        sizeof( SEG_LIB_QUERY_ELEMENT ) ) );
    Query.Action = INCLUDE_QUALIFIER;
    Query.tyQualifier = QUALIFIER_REEL_NAME;
    CK_LOG( GetCurrentReelName( acReelName, 100, &cLSrc ) );
    Query.QueryQualifier.pReelName = DupString( acReelName );
    CK_LOG( SVListAdd( psvQueryElements, &Query ) );

Query.Action = CONSTRAIN_QUALIFIER;
    Query.tyQualifier = QUALIFIER_PICTURE_TYPE;
    Query.QueryQualifier.PictType.iPictSize = PICT_X4;
    Query.QueryQualifier.PictType.tyPicture = SEG_LIB_TY_PICUTRE_HEAD_PICTURE;
    CK_LOG( SVListAdd( psvQueryElements, &Query ) );

CK_E( SegLibQuerySegments( slSegClientID, psvQueryElements, psvSegItems,
        NULL ) );
    return E_OK;
}

STATIC enum ERC GetGlobalModeQuery( SVLIST * psvQueryElements,
        SVLIST * psvSegItems )
{
    SEG_LIB_QUERY_ELEMENT Query;
    enum ERC    erc = E_OK;

CK_LOG( SVListInit( psvQueryElements, NULL, NULL,
        sizeof( SEG_LIB_QUERY_ELEMENT ) ) );
    Query.Action = CONSTRAIN_QUALIFIER;
    Query.tyQualifier = QUALIFIER_PICTURE_TYPE;
    Query.QueryQualifier.PictType.iPictSize = PICT_X4;
    Query.QueryQualifier.PictType.tyPicture = SEG_LIB_TY_PICUTRE_HEAD_PICTURE;
    CK_LOG( SVListAdd( psvQueryElements, &Query ) );

CK_E( SegLibQuerySegments( slSegClientID, psvQueryElements, psvSegItems,
        NULL ) );
    return E_OK;
}

STATIC enum ERC GetCurrentSegList( )
{
    SVLIST              svSegItems;
    SEG_LIB_ITEM    *   pSegItem;
```

```
    SegmentListElementSt    segListElement;
    uint                    index;

MutexTake( mtxSegList );
    if( SegListMgr.pCurrentSegList != NULL )
        {
        CK_LOG( ClearCurrentSegList() );
        }
    SegListMgr.pCurrentSegList = &SegListMgr.CurrentSegList;
    CK_LOG( SVListInit( &SegListMgr.pCurrentSegList->segmentList, NULL, NULL,
            sizeof( SegmentListElementSt ) ) );
    SegListMgr.pCurrentSegList->pListName = DupString( "Head Segments" );

if( fReelMode )
        CK_LOG( GetReelModeQuery( &SegListMgr.queryElements, &svSegItems ) );
    else
        CK_LOG( GetGlobalModeQuery( &SegListMgr.queryElements, &svSegItems ) );
    for( index = 0; index < svSegItems.nItems; index++ )
        {
        if( ( pSegItem = (SEG_LIB_ITEM *)SVListGetItemPtr( &svSegItems,
            index ) ) == NULL )
            {
            ReLogError();
            goto Lerror;
            }
        if( pSegItem->segmentID == SEG_LIB_SEGMENT_ID_NONE )
            {
            LogError( E_SOFTWARE, "Illegal Segment ID returned from Query" );
            continue;
            }
        segListElement.segmentID =  pSegItem->segmentID;
        segListElement.blockID = VO_MEM_BLOCK_ID_NONE;
        segListElement.fPictRequested = FALSE;
        CK_LOG( SVListAdd( &SegListMgr.pCurrentSegList->segmentList,
            &segListElement ) );
        }

Lerror:

CK_LOG( SVListFree( &svSegItems) );
    MutexGive( mtxSegList );
    return E_OK;
}

/*-
 * MarkFileEntryReset()
 */
```

```
STATIC void
MarkFileEntryReset( void )
{
    iStoredMarkNum = 1;
    iEnteredMarkNum = 0;
    fGotNumber = FALSE;
}

/*- WIN USER
 * MarkFileNumericEntry()
 */
enum ERC
MarkFileNumericEntry( uint iEnteredNum, boolean fFirstTime )
{
    CHECK_MODULE_INIT if (fFirstTime)
        {
        fGotNumber = FALSE;
        UserPrompt("Retrieving mark[%d]:", iStoredMarkNum);
        }
    else
        {
        fGotNumber = TRUE;
        iEnteredMarkNum = (iEnteredMarkNum * 10) + iEnteredNum;
        UserPrompt("Retrieving mark: %d", iEnteredMarkNum);
        } return( E_OK );
}

/*- WIN USER
 * GetMarkFileItem()
 * Gets the mark item and slams it into the data entry area.
 */
enum ERC
GetMarkFileItem( void )
{
    enum ERC                    erc;
    char                        acErrorMsg[80];
    SegmentListElementSt *      pSegListElement;
    SEG_LIB_ITEM                SegItem;

CHECK_MODULE_INIT if( SegListMgr.pCurrentSegList == NULL )
        {
```

```
        iEnteredMarkNum = 0;
        return UserError(E_SOFT_S, "No mark file available.");
        }
    else if ( SegListMgr.pCurrentSegList->segmentList.nItems == 0)
        {
        iEnteredMarkNum = 0;
        return UserError(E_SOFT_S, "No marks in mark file.");
        }
    else if( !fGotNumber )
        iEnteredMarkNum = iStoredMarkNum;
    else if (iEnteredMarkNum > SegListMgr.pCurrentSegList->segmentList.nItems
           || iEnteredMarkNum <= 0 )
        {
        (void) StrNPrintf(acErrorMsg, 80, "Mark file item index %d is out of ran
ge (must be between %d and %d).",
                iEnteredMarkNum, 1,
                SegListMgr.pCurrentSegList->segmentList.nItems, TRUE);
        iEnteredMarkNum = 0;
        fGotNumber = FALSE;
        return UserError(E_SOFT_S, acErrorMsg );
        } if( ( pSegListElement = (SegmentListElementSt *)SVListGetItemPtr(
            &SegListMgr.pCurrentSegList->segmentList, iEnteredMarkNum - 1 ) )
            == NULL )
        {
        return ReLogError();
        }
    if( SegLibGetSegmentInfo( slSegClientID, pSegListElement->segmentID,
            &SegItem, NULL, 0 ) != E_OK )
        {
        return( LogError( E_SOFT_S_I_I,
            "Can't get Info for Picture %d Segment %d", iEnteredMarkNum - 1,
            pSegListElement->segmentID ) );
        }
    CK_E( DataEntryRecallTc( &SegItem.tcStart ) );

/* Update the stored number. */
    iStoredMarkNum = iEnteredMarkNum;
    iEnteredMarkNum = 0;
    return( E_OK );
}

/*--- global functions ---*/

/*-
 * CmdMarkFileActions -
```

```
 *  Returns:    Error code, E_OK on success.
 */
enum ERC CmdSegList( enum CMD_CODE iCmd, void * arg )
{
    enum ERC    erc = E_OK;

CHECK_MODULE_INIT switch (iCmd )
        {
        default:
            return LogError( E_BAD_INDEX, iCmd );
        case CMD_SEG_LIST:
            break;
        case CMD_SEG_LIST_SCAN:
            break;
        case CMD_SEG_LIST_VIEW_MODE:
            switch( (uint)arg )
                {
                case REEL_MODE_ON:
                    fReelMode = TRUE;
                    break;
                case REEL_MODE_OFF:
                    fReelMode = FALSE;
                    break;
                case VIDEO_MODE_ON:
                    fVideoMode = TRUE;
                    break;
                case VIDEO_MODE_OFF:
                    fVideoMode = FALSE;
                    break;
                }
            break;
        } return (erc);
}

/*-
 *  CmdMarkFileActions -
 *  Returns:    Error code, E_OK on success.
 */
enum ERC CmdSegListEffect( enum CMD_CODE iCmd, void * arg )
{
    enum ERC    erc = E_OK;

CHECK_MODULE_INIT switch (iCmd )
        {
```

```
            default:
                return LogError( E_BAD_INDEX, iCmd );
            case CMD_SEG_LIST_EFF_ADD:
                break;
            case CMD_SEG_LIST_EFF_IO_ADD:
                break;
            case CMD_SEG_LIST_EFF_CIOB_ADD:
                break;
            case CMD_SEG_LIST_EFF_IN:
                break;
            case CMD_SEG_LIST_EFF_OUT:
                break;
            case CMD_SEG_LIST_EFF_DUR:
                break;
            } return (erc);
}

/*-
 * CmdMarkFileEntry -
 * These commands are for retrieving mark file data, without popping
 * up the window.  Activated by CMD_MARK_FILE_ITEM_ENTRY.
 */
enum ERC CmdSegListEntry( enum CMD_CODE iCmd, void * arg )
{
    enum ERC        erc = E_OK;

CHECK_MODULE_INIT switch( iCmd )
        {
        default:
            return LogError( E_BAD_INDEX, iCmd );

case CMD_SEG_LIST_CONST:
            break;
        case CMD_SEG_LIST_ENTRY_NUM:
            CK_E( MarkFileNumericEntry( (uint) arg, FALSE ) );
            break;

case CMD_SEG_LIST_ENTRY_ENTER:
            CK_LOG( KeyGroupDeactivate(
                        KeyGroupFindByName( SEG_LIST_ENTRY ) ) );
            CK_E( GetMarkFileItem() );
            break;

case CMD_SEG_LIST_ENTRY_CANCEL:
            CK_LOG( KeyGroupDeactivate(
                        KeyGroupFindByName( SEG_LIST_ENTRY ) ) );
```

```
            UserPrompt("No marks retrieved.");
            break;
        } return( E_OK );
} enum ERC SegListViewSegmentList( enum CMD_CODE iCmd, void * arg )
{
    enum ERC    erc = E_OK;

CHECK_MODULE_INIT switch( (uint)arg )
        {
        case VIEW_SAME_SEG_LIST:
            if( SegListMgr.pCurrentSegList == NULL )
                CK_E( GetCurrentSegList() );
            break;
        case VIEW_NEW_SEG_LIST:
            CK_LOG( ClearCurrentSegList() );
            CK_E( GetCurrentSegList() );
            break;
        }
    MarkFileEntryReset();
    PopupVideoMarkFileWind( slSegClientID, SegListMgr.pCurrentSegList );
    return( E_OK );

}
```

```
/*
 * <@(#) vwin.c 1.21@(#), 04/13/93 13:09:34>
 * Copyright (C) 1992 Axial Corporation
 */

/*
     * INCOMPLETE
     * For now, we will ignore the timing constraints of the IC board.
     * We will simply write all the configuration in this thread,
     *   at call time.
     * Later, we must set up a request that specifies what we want the
     *   IC to do, and what we want the IV board to do (this comes out
     *   of the routine: SelectInput). We should probably also handle
     *   the VOTileBankReset at this level to ensure synchronous switches.
     * Much later we will also have requests to watch for particular
     *   times on a source and snag pictures for the Still DB Manager,
     *   and to perform "background" still transfers on unused channels.
     */ include "ax_types.h"
include "ax_string.h"
#include "error.h"
#include "vme.h"
#include "sync.h"
#include "video.h"
#include "axGraph.h"
#include "init.h"         /* for MemTest */
#include <vxWorks.h>
#include <sigLib.h>
#include "vxsig.h"
#include "vxmem.h"
#include "vxsem.h"
#include "vxproto.h"
#include "list.h"
#include "vwin.h"
#include "vmem.h"
#include "vwin_bdmgr.h"

#define DEBUG_VWIN        0x0001
define DEBUG_VWIN_XFER   0x0002 uint32  glDebugVWin = 0;

define NO_CH_ALLOCD      (-1)

#define IC_MEM_BASE       ((uint8 *) 0x80000000)
#define VO_MEM_BASE       ((uint8 *) 0x60000000)

#define GR_VERT_SYNC_LOCK    ((uint8 *) 0x50000002)
#define GR_FORCE_SYNC_LOCK   0x80
```

```c
define GR_VERT_SYNC_LOCK_MASK  0x80 typedef struct
    {
    NODE    node;
    boolean fCreatedLive;
    boolean fHidden;
    uint    pictSize;
    uint8   *pICBuf;
    uint8   *pVOBuf;
    sint    chAlloc;
    uint    xLoc;
    uint    yLoc;
    } VWinInfoRec, *VWinInfo;

typedef struct
    {
    NODE    node;
    uint16  xStart;             /* in blocks */
    uint16  xEnd;               /* in blocks */
    uint16  height;             /* tile height */
    uint8*  pVOBuf;
    uint16  memPitch;
    } VWinTileInfoRec, *VWinTileInfo;

static LIST VWinList;

static  VWinInfo    vwVChAOwner[N_PICT_SIZES] = { NULL, NULL, NULL, NULL };
static  VWinInfo    vwVChBOwner[N_PICT_SIZES] = { NULL, NULL, NULL, NULL };

static  uint    vChAInput = 0;
static  uint    vChBInput = 0;

static enum ERC VWinBuildTilemap();

define ROUND_UP_TO_EVEN_NUM( X ) (X) += (X) & 0x01 define CHECK_MODULE_INIT(r)    {if(!fModuleInitialized) \
                                    if(VWinInit() != E_OK) \
                                        {erc = ReLogError(); return (r);}} define VWIN_VERIFY(v)  {if(( (v) == NULL ) \
                            || ( lstFind( &VWinList, (NODE *)(v) ) < 0 )) \
                            return LogError( E_BAD_PTR );} static  boolean fModuleInitialized = FALSE;

extern boolean  gfHasVidOutDAC;
extern boolean  fCallDACInit;
```

```
SEM_ID aSemXfer[N_PICT_SIZES - 1] = {(SEM_ID)-1, (SEM_ID)-1, (SEM_ID)-1};

/**********************************************************************/
enum ERC VWinInit()
{
    uint    i;
    uint16  wDummy;
    uint8   bDummy;

lstInit( &VWinList );

for( i = 0 ; i < N_PICT_SIZES - 1 ; i++ )
        if( aSemXfer[i] == (SEM_ID)-1 )
        {
            aSemXfer[i] = semCreate();
            semGive( aSemXfer[i] );
        } if( vxMemProbe( (void *) AX_VRAM_BASE_ADDR, READ, 2, &wDummy ) != 0 )
    {
        gfVideoInstalled = 0;
        gfHasVidOutDAC   = 0;
        return LogError( E_CANT_FIND_S_S, "Graphics Board", "\0" );
    }
    /* If we have a graphics board, lock it to sync */
    bDummy = *GR_VERT_SYNC_LOCK;
    bDummy |= GR_FORCE_SYNC_LOCK;
    *GR_VERT_SYNC_LOCK = bDummy;

if( gfVideoInstalled )
    {
        bDummy = 0;
        gfHasVidOutDAC = 1;

if( vxMemProbe( (void *) (ADDR_INPUT_BD_BASE + CHAN_A_BASE),
                                  READ, 1, &bDummy ) != 0  )
        {
            gfVideoInstalled = 0;
            gfHasVidOutDAC   = 0;
            return LogError( E_CANT_FIND_S_S, "Video Input Board", "\0" );
        } if( vxMemProbe( (void *) IC_INIT_REG_ADDR, READ, 1, &bDummy ) != 0 )
        {
            gfVideoInstalled = 0;
            gfHasVidOutDAC   = 0;
            return LogError( E_CANT_FIND_S_S, "Image Cruncher Board", "\0" );
        } if( vxMemProbe( (void *) ADDR_OUTPUT_BD_BASE, READ, 2, &wDummy ) != 0 )
```

```
            {
            gfVideoInstalled    = 0;
            gfHasVidOutDAC      = 0;
            return LogError( E_CANT_FIND_S_S, "Video Output Board", "\0" );
            }

CursorGeneratorInit();
        InputInit();
        ImageCruncherInit();
        OutputInit();
        VOTileBankInit();
        }
    if( gfHasVidOutDAC )
        fCallDACInit = TRUE;

fModuleInitialized = TRUE;

return E_OK;
}

/*****************************************************************************/
static VWin VWinCreate(
    uint        pictSize,
    boolean     fCreatedLive,
    uint16      xLoc,
    uint16      yLoc,
    uint8 *     pICBuff,
    uint8 *     pVOBuff,
    boolean     fCreateHidden )
{
    VWinInfo    vwin;
    enum ERC    erc;

CHECK_MODULE_INIT(NULL);

if( pictSize >= N_PICT_SIZES )
        {
        LogError( E_BAD_INDEX, pictSize );
        return VWIN_NONE;
        } if(( vwin = WinMemAlloc( sizeof( VWinInfoRec ) ) ) == NULL )
        {
        ReLogError();
        return VWIN_NONE;
        } vwin->fCreatedLive  = fCreatedLive;
    vwin->fHidden       = fCreateHidden;
```

```
    vwin->pictSize     = pictSize;
    vwin->chAlloc      = NO_CH_ALLOCD;

vwin->pICBuf = pICBuff;
    vwin->pVOBuf = pVOBuff;

lstAdd( &VWinList, (NODE *) vwin );

return (VWin) vwin;
}

/*******************************************************************/
VWin VWinCreateLive(
    uint       pictSize,
    uint16     xLoc,
    uint16     yLoc,
    uint8 *    pICBuff,
    uint8 *    pVOBuff,
    boolean    fCreateHidden )
{
    VWinInfo   vwin;
    enum ERC   erc;
    enum ERC   ercBad;

if(( vwin = (VWinInfo)VWinCreate( pictSize, VWIN_CREATED_LIVE,
                        xLoc, yLoc, pICBuff, pVOBuff, fCreateHidden ))
            == VWIN_NONE )
        {
        ReLogError();
        return VWIN_NONE;
        } if( VWinSetLocation( (VWin)vwin, xLoc, yLoc ) != E_OK )
        {
        erc = ReLogError();
        lstDelete( &VWinList, (NODE *) vwin );
        CK_EBAD( WinMemFree( vwin ) );
        return VWIN_NONE;
        } return (VWin) vwin;
}

/*******************************************************************/
VWin VWinCreateStill(
    uint       pictSize,
    uint16     xLoc,
    uint16     yLoc,
    uint8 *    pVOBuff,
    boolean    fCreateHidden )
```

```c
{
    VWinInfo    vwin;
    enum ERC    erc;
    enum ERC    ercBad;

if(( vwin = (VWinInfo)VWinCreate( pictSize, VWIN_CREATED_STILL,
                            xLoc, yLoc, NULL, pVOBuff, fCreateHidden ))
            == VWIN_NONE )
        {
        ReLogError();
        return VWIN_NONE;
        } if( VWinSetLocation( (VWin)vwin, xLoc, yLoc ) != E_OK )
        {
        erc = ReLogError();
        lstDelete( &VWinList, (NODE *) vwin );
        CK_EBAD( WinMemFree( vwin ) );
        return VWIN_NONE;
        } return (VWin) vwin;
}
/*******************************************************************/
enum ERC VWinClose( VWin vwin )
{
    enum ERC    erc;
    CHECK_MODULE_INIT(erc);
    VWIN_VERIFY(vwin);

lstDelete( &VWinList, (NODE *) vwin );

CK_E( VWinBuildTilemap() );

VOTileBankReset();

return E_OK;
}

/*- VWIN
 * VWinHide hides a vwin. This just precludes the window from appearing
 * in the tile map, which will keep it offscreen.
 *
 * RETURNS errors for bad vwins.
 */
enum ERC VWinHide( VWin vwin )
{
    enum ERC    erc;
    CHECK_MODULE_INIT(erc);
```

```
    VWIN_VERIFY(vwin);

((VWinInfo)vwin)->fHidden = TRUE;

CK_E( VWinBuildTilemap() );

VOTileBankReset();

return E_OK;
}

/*- VWIN
 * VWinShow "un-hides" a vwin. This just assures that the window appears
 * in the tile map, which will put it offscreen.
 *
 * RETURNS errors for bad vwins.
 */
enum ERC VWinShow( VWin vwin )
{
    enum ERC    erc;
    CHECK_MODULE_INIT(erc);
    VWIN_VERIFY(vwin);

((VWinInfo)vwin)->fHidden = FALSE;

CK_E( VWinBuildTilemap() );

VOTileBankReset();

return E_OK;
}

/*- VWIN
 * VWinIsHidden returns TRUE if vwin exists but is hidden,
 * and returns FALSE if vwin exists and is not hidden.
 *
 * RETURNS errors for bad vwins.
 */
enum ERC VWinIsHidden( VWin vwin, boolean *pfIsHidden )
{
    enum ERC    erc;

CHECK_MODULE_INIT(erc);

VWIN_VERIFY(vwin);

if( pfIsHidden == NULL )
        return LogError( E_BAD_PTR );
```

```c
    *pfIsHidden = ( ((VWinInfo)vwin)->fHidden ) ? TRUE : FALSE;

return E_OK;
}

/***************************************************************/
enum ERC VWinIsLive( VWin vwin, boolean *pfIsLive )
{
    VWinInfo       vw = (VWinInfo) vwin;
    enum ERC       erc;

CHECK_MODULE_INIT(erc);

VWIN_VERIFY(vwin);

if( pfIsLive == NULL )
        return LogError( E_BAD_PTR );

*pfIsLive = ( vw->fCreatedLive == VWIN_CREATED_LIVE ) ? TRUE : FALSE;

return E_OK;
}

/***************************************************************/
enum ERC VWinGetSize( VWin vwin, uint *pPictSize )
{
    VWinInfo       vw = (VWinInfo) vwin;
    enum ERC       erc;

CHECK_MODULE_INIT(erc);

VWIN_VERIFY(vwin);

if( pPictSize == NULL )
        return LogError( E_BAD_PTR );

*pPictSize = vw->pictSize;

return E_OK;
}

/***************************************************************/
enum ERC VWinGetICBuffer( VWin vwin, uint8 **ppICBuffer )
{
    VWinInfo       vw = (VWinInfo) vwin;
    enum ERC       erc;
```

```
    CHECK_MODULE_INIT(erc);

VWIN_VERIFY(vwin);

if( ppICBuffer == NULL )
        return LogError( E_BAD_PTR );

*ppICBuffer = vw->pICBuf;

return E_OK;
}
/****************************************************************/
enum ERC VWinGetVOMemLocation( VWin vwin, uint8 **ppVOMem )
{
    VWinInfo        vw = (VWinInfo) vwin;
    enum ERC    erc;

CHECK_MODULE_INIT(erc);

VWIN_VERIFY(vwin);

if( ppVOMem == NULL )
        return LogError( E_BAD_PTR );

*ppVOMem = vw->pVOBuf;

return E_OK;
}
/****************************************************************/
enum ERC VWinEnableDisableVideoOutput( VWin vwin, boolean fEnable )
{
    VWinInfo        vw = (VWinInfo) vwin;
    enum ERC    erc;
    uint16      fSend;

CHECK_MODULE_INIT(erc);

VWIN_VERIFY(vwin);

if( fEnable )
        fSend = IC_VIDEO_OP_SEND;
    else
        fSend = IC_VIDEO_OP_NOOP;
    CK_E( SetupICVideoOp( vw->chAlloc, vw->pictSize, fSend, vw->pVOBuf ) );

return E_OK;
}
```

```
/****************************************************************/
enum ERC VWinHasVChannel( VWin vwin, boolean *pfIsLive )
{
    VWinInfo        vw = (VWinInfo) vwin;
    enum ERC        erc;

CHECK_MODULE_INIT(erc);

VWIN_VERIFY(vwin);

if( pfIsLive == NULL )
        return LogError( E_BAD_PTR );

*pfIsLive = ( vw->chAlloc != NO_CH_ALLOCD ) ? TRUE : FALSE;

return E_OK;
}

/****************************************************************/
enum ERC VWinLower( VWin vwin )
{
    enum ERC        erc;

CHECK_MODULE_INIT(erc);

VWIN_VERIFY(vwin);

lstDelete( &VWinList, (NODE *)vwin );
    lstInsert( &VWinList, NULL, (NODE *)vwin );
    CK_E( VWinBuildTilemap() );

VOTileBankReset();

return E_OK;
}

/****************************************************************/
/*
 * VWinMakeLive is used to set up the Live feed for a given channel into
 * into a certain window. Only one window of a given size is allowed
 * to own the video channel. No attemp is made to lock out a window
 * from resetting the info channel as used by another window, but
 * a warning will be generated.
 */
enum ERC VWinMakeLive( VWin vwin, boolean VCh_AorB, uint iSrcInput )
{
    enum ERC        erc;
    VWinInfo        vw = (VWinInfo) vwin;
    VWinInfo        *pvChOwner;
```

```
    CHECK_MODULE_INIT(erc);
    VWIN_VERIFY(vwin);

if(VCh_AorB == VIDEO_CHANNEL_A)
        {
        pvChOwner = &vwVChAOwner[vw->pictSize];
        if(( iSrcInput != 0 ) && ( vChAInput != 0 ) && (vChAInput != iSrcInput))
            LogMsg( "Warning: video channel A input override" );
        }
    else
        {
        pvChOwner = &vwVChBOwner[vw->pictSize];
        if(( iSrcInput != 0 ) && ( vChBInput != 0 ) && (vChBInput != iSrcInput))
            LogMsg( "Warning: video channel B input override" );
        } if(( *pvChOwner != NULL ) && ( *pvChOwner != vw ))
        return LogError( E_SOFTWARE, "Attempt to use allocated VChannel" );

vw->chAlloc = VCh_AorB;

*pvChOwner = vw;

/* The TrimClip Daemon will have to interact with this.
     * It must reset the memory table each field, for either the
     * A or B channel.
     */
    CK_E( SetupICMemOp( vw->chAlloc, vw->pictSize, IC_MEM_OP_WRITE,
                        vw->pICBuf ) );
    CK_E( SetupICVideoOp( vw->chAlloc, vw->pictSize, IC_VIDEO_OP_SEND,
                        vw->pVOBuf ) );

VOTileBankReset();

VServerRequestReloadICMemOpsTables();

VServerRequestUpdateVideoInput( vw->chAlloc, iSrcInput);

return E_OK;
}

/****************************************************************/
enum ERC VWinMakeStill( VWin vwin )
{
    VWinInfo      vw = (VWinInfo) vwin;
    VWinInfo      *pvChOwner;
    VWinInfo      *pvChOwnerBase;
    uint          *pvChInput;
```

```
    uint           index;
    boolean        fChStillAlloced = FALSE;
    enum ERC       erc;

CHECK_MODULE_INIT(erc);
    VWIN_VERIFY(vwin);

if( vw->chAlloc == NO_CH_ALLOCD )
        return E_OK;                    /* already a still */ if(vw->chAlloc == VIDEO_CHANNEL_A)
        {
        pvChOwner = &vwVChAOwner[vw->pictSize];
        pvChOwnerBase = &vwVChAOwner[0];
        pvChInput = &vChAInput;
        }
    else
        {
        pvChOwner = &vwVChBOwner[vw->pictSize];
        pvChOwnerBase = &vwVChBOwner[0];
        pvChInput = &vChBInput;
        } if( *pvChOwner != vw )
        return LogError( E_SOFTWARE, "vwin and Owner do not agree" );

CK_E( SetupICVideoOp( vw->chAlloc, vw->pictSize, IC_VIDEO_OP_NOOP, NULL ));

VServerRequestReloadICMemOpsTables();

*pvChOwner = NULL;
    vw->chAlloc = NO_CH_ALLOCD;

for( index = 0; index < N_PICT_SIZES ; index++ )
        {
        if( *pvChOwnerBase != NULL )
            {
            fChStillAlloced = TRUE;
            break;
            }
        pvChOwnerBase++;
        } if( !fChStillAlloced )
        *pvChInput = 0;

return E_OK;
}
```

```
/****************************************************************/
enum ERC VWinRaise( VWin vwin )
{
    enum ERC        erc;

CHECK_MODULE_INIT(erc);
    VWIN_VERIFY(vwin);

lstDelete( &VWinList, (NODE *)vwin );
    lstAdd( &VWinList, (NODE *)vwin );
    CK_E( VWinBuildTilemap() );

VOTileBankReset();

return E_OK;
}

/****************************************************************/
enum ERC VWinResetStill( VWin vwin, uint8 * pVOBuff, boolean fUpdateScreen )
{
    enum ERC        erc;

CHECK_MODULE_INIT(erc);
    VWIN_VERIFY(vwin);

((VWinInfo)vwin)->pVOBuf = pVOBuff;

if( fUpdateScreen )
        {
        CK_E( VWinBuildTilemap() );
        VOTileBankReset();
        }
    return E_OK;
}

/****************************************************************/
enum ERC VWinLoadStill( VWin vwin, uint8 * pMemBuff )
{
    enum ERC        erc;

CHECK_MODULE_INIT(erc);

CK_E( VidOutPictLoadStill( ((VWinInfo)vwin)->pVOBuf, pMemBuff,
                                ((VWinInfo)vwin)->pictSize ));

return E_OK;
}
```

```
/*- VWIN
 * VidOutPictLoadStill requests that the passed Mem buffer be converted to
 * the passed VO buffer, passing through
 * the transfer channel for the passed size.
 *
 * NOTE: This will block until the channel is available for transfer.
 *
 * RETURNS errors for bad vwins. Error if vwin has an allocated channel.
 */
enum ERC VidOutPictLoadStill(
        uint8 *      pVOBuff,
        uint8 *      pMemBuff,
        uint         pictSize)
{
        uint8 *      pICBuff;
        uint8 *      pICTemp;
        uint         iRow;
        uint         nRows;
        uint         nBytesPerRow;
        enum ERC     erc;

CHECK_MODULE_INIT(erc);

switch( pictSize )
            {
            default:
                return LogError( E_BAD_INDEX, pictSize );
            case PICT_X4:
                pICBuff = (uint8*)X4_IC_TRANSFER_LOC;
                break;
            case PICT_X2:
                /* INCOMPLETE - we assume only the A channel available for Xfer */
                pICBuff = (uint8*)X2_IC_TRANSFER_LOC1;
                break;
            case PICT_X1:
                /* INCOMPLETE - we assume only the A channel available for Xfer */
                pICBuff = (uint8*)X1_IC_TRANSFER_LOC1;
                break;
            }
        /* Add in the VME board address */
        pICBuff += IC_PICT_MEMORY_BASE_ADDR;
        /* Allow for blanking at 2 bytes per pix */
        pICTemp = pICBuff + ( BLANKING_OFFSET( pictSize ) * 2 );

/* Block until the xfer channel is available */
        semTake( aSemXfer[(pictSize - 1)] );

if( SystemIsNtsc() )
            {
            nBytesPerRow = viewWidthAndHeightNTSC[pictSize][0] << 1;
```

```
            nRows = viewWidthAndHeightNTSC[pictSize][1];
        }
    else
        {
        nBytesPerRow = viewWidthAndHeightPAL[pictSize][0] << 1;
        nRows = viewWidthAndHeightPAL[pictSize][1];
        }

/*
     * Now we transfer the bytes into the IC memory slot.
     * We assume:
     *      All pictures are a multiple of 2 pixels wide.
     *      All buffers are long word aligned.
     */
    if( glDebugVWin & DEBUG_VWIN_XFER )
        LogMsg( "Copying %d rows of %d bytes from 0x%X to 0x%X",
                            nRows, nBytesPerRow, pMemBuff, pICTemp );
    for( iRow = 0 ; iRow < nRows ; iRow++ )
        {
        bcopy( pMemBuff, pICTemp, nBytesPerRow );
        pMemBuff += nBytesPerRow;
        pICTemp += pwrOf2PixPerRow[pictSize] * 2;
        }

/* INCOMPLETE - we assume only the A channel available for Xfer */

ControlTrimClipsGathering( TC_GATHER_DISABLE );
    CK_E( SetupICMemOp(VIDEO_CHANNEL_A, pictSize, IC_MEM_OP_READ, pICBuff ));
    CK_E( SetupICVideoOp(VIDEO_CHANNEL_A, pictSize, IC_VIDEO_OP_SEND, pVOBuff));

VServerRequestPictureXfer( pictSize );

return E_OK;
}

/*- VO, PICT_MGR
 * enum ERC VWinSetLocation
 *
 * This sets up a vwin for display at the specified location.
 *
 * It calls VWinBuildTileMap, but not VOTileMapReset.
 *
 * If either the x or y position is not on a 16 pixel boundary,
 * an erc is returned.
 *
 *********************************************************************/ enum ERC VWinSetLocation(
```

```
        VWin     vwin,
        uint16   xDest,                                 /* left edge on display    */
        uint16   yDest )                                /* top edge on display     */
{
        enum ERC    erc;
        VWinInfo    vw = (VWinInfo)vwin;

CHECK_MODULE_INIT(erc);
        VWIN_VERIFY(vwin);

/* 16-pix alignment, & only 7 bits of down-shifted x position allowed */
        if( xDest & ((~TILE_XSTART_MASK) << 4) )
            return LogError( E_BAD_VWIN_X, xDest );

/* yDest/16 = #strips; 0-63 are legal strip offsets     */
        if( yDest & ~(TILE_YSTART_MASK << 4) ) .
            return LogError( E_BAD_VWIN_Y, yDest );

vw->xLoc = xDest;
        vw->yLoc = yDest;

CK_E( VWinBuildTilemap() );

VOTileBankReset();

return E_OK;
}

/*- VO, PICT_MGR
 * VWinBuildTilemap
 *
 * This builds a tilemap for the current list of windows.
 * The windows are ordered from bottom to top in the list.
 * The method is simple: start adding windows from the top,
 * and disallow an overlap as we move down. Fully occluded
 * windows are ignored.
 *
 * This implementation assumes that no picture packing has been
 * done: the address increment is set to match the memory usage
 * of the IC, even though the VO can more tightly pack pictures.
 * There may eventually be need for an additional boolean argument
 * that indicates whether a picture-sized memory block should be
 * assumed, or an ImageCruncher sized memory block.
 *
 ********************************************************************/
static enum ERC VWinBuildTilemap()
{
        enum ERC    erc = E_OK;
        enum ERC    ercBad = E_OK;
```

```
    enum ERC    ercRet;
    uint16      tileWord0;
    uint16      tileWord0Last;
    uint16      tileWord1;
    uint16      addrIncr;
    uint8   *   pVOBuf;
    int         nStrips;
    uint16  *   pTileMap;
    uint16  *   pWords;
    uint        pictSize;
    uint        iStrip;
    uint16      xStart, xEnd,  yStart;
    VWinInfo    vw;
    LIST        TileLists[N_STRIPS];
    VWinTileInfo pTile;
    VWinTileInfo pTilePrev;
    VWinTileInfo pTileNext;

CHECK_MODULE_INIT(erc);

/* Initialize all of the strip lists */ for( iStrip = 0; iStrip < N_STRIPS ; iStrip++ )
        lstInit(. &TileLists[iStrip] );

for( vw = (VWinInfo)lstLast( &VWinList ) ;
            vw != NULL ;
                vw = (VWinInfo)lstPrevious( (NODE *)vw ) )
        {
        if( vw->fHidden )                       /* Ignore the hidden windows */
            {
            if( glDebugVWin & DEBUG_VWIN )
                LogMsg( "Ignoring hidden pic: size %d at %d, %d",
                                            vw->pictSize, vw->xLoc, vw->yLoc );
            continue;
            } if( ( pictSize = vw->pictSize ) > N_PICT_SIZES )
            {
            erc = LogError( E_BAD_INDEX, pictSize );
            goto Lerror;
            } if( glDebugVWin & DEBUG_VWIN )
            LogMsg( "Building tile for pic size %d at %d, %d",
                                            pictSize, vw->xLoc, vw->yLoc );

/* These are both checked by VWinSetLocation   */
        xStart = (vw->xLoc >> 4) & TILE_XSTART_MASK;
        yStart = (vw->yLoc >> 4) & TILE_YSTART_MASK;
```

```
        if( SystemIsNtsc() )
            {
            tileWord0 = widthAndHeightNTSC[pictSize];
            xEnd = xStart + ((tileWord0 & TILE_WIDTH_MASK) >> 8);
            tileWord0Last = lastWidthAndHeightNTSC[pictSize];
            nStrips = nStripsNTSC[pictSize];
            }
        else
            {
            tileWord0 = widthAndHeightPAL[pictSize];
            xEnd = xStart + ((tileWord0 & TILE_WIDTH_MASK) >> 8);
            tileWord0Last = lastWidthAndHeightPAL[pictSize];
            nStrips = nStripsPAL[pictSize];
            }

/*
         * The address is aligned to 32 bytes and shifted down 3 bits.
         */
        if( (uint32)vw->pVOBuf & 0x1f )
            {
            erc = LogError( E_BAD_PTR );
            goto Lerror;
            }

/*
         * Allow for the top 7% or so of the picture to be blanking.
         * We add an offset to the VO Buffer to start drawing from
         * the first real lines.
         */
#if 1
        pVOBuf = (uint8 *)(((((uint32)(vw->pVOBuf))
                        + (BLANKING_OFFSET(pictSize))) / 4) >> 3);
#else
        switch( pictSize )
            {
            case PICT_X8:
                pVOBuf = (uint8 *)(((((uint32)(vw->pVOBuf))
                        + (X8_N_BLANKING_LINES * 512)) / 4) >> 3);
                break;
            case PICT_X4:
                pVOBuf = (uint8 *)(((((uint32)(vw->pVOBuf))
                        + (X4_N_BLANKING_LINES * 256)) / 4) >> 3);
                break;
            case PICT_X2:
                pVOBuf = (uint8 *)(((((uint32)(vw->pVOBuf))
                        + (X2_N_BLANKING_LINES * 128)) / 4) >> 3);
                break;
            case PICT_X1:
                pVOBuf = (uint8 *)(((((uint32)(vw->pVOBuf))
```

```
                                  + (X1_N_BLANKING_LINES * 64)) / 4) >> 3);
                    break;
              }
endif
        /* Now we sort this tile into each strip */
        /*
         * We do not attempt to handle the more obscure cases of
         *   several little windows in a row on top of a big window, with
         * ‾pieces of the big window showing through between the little ones.
         */ if( glDebugVWin & DEBUG_VWIN )
              LogMsg( "Checking pic from %d to %d", xStart, xEnd );

addrIncr = VO_AddrIncrement[pictSize];

for( iStrip = yStart ; --nStrips >= 0 ; iStrip++ )
              {
              if( glDebugVWin & DEBUG_VWIN )
                    LogMsg( "Checking strip %d", iStrip );
              if( nStrips == 0 )
                    tileWord0 = tileWord0Last;
              if(( pTile = (VWinTileInfo)ShortTermMemAlloc(
                                              sizeof( VWinTileInfoRec ) ) )
                           == NULL )
                    {
                    erc = ReLogError();
                    goto Lerror;
                    }
              pTile->xStart = xStart;
              pTile->xEnd = xEnd;
              pTile->height = tileWord0 & TILE_HEIGHT_MASK;
              pTile->memPitch = memoryPitch[pictSize];
              pTile->pVOBuf = pVOBuf + (( iStrip - yStart ) * addrIncr );

if(( pTilePrev = (VWinTileInfo)lstFirst( &TileLists[iStrip] ))
                           == NULL )
                    {
                    lstAdd( &TileLists[iStrip], (NODE *)pTile );
                    if( glDebugVWin & DEBUG_VWIN )
                          LogMsg( "Appending Full tile to empty list" );
                    continue;
                    }
              /* look for a tile that overlaps the start.
               * All of the + 1 you see in the below code are to take care of
               * the hardware timing problem where you must allow at least
               * 1 Tile switching time between tiles from different pictures
               * for the VO Mem.
               */
```

```
while( pTilePrev->xEnd + 1 < xStart )
    if(( pTilePrev = (VWinTileInfo)lstNext( (NODE *)pTilePrev ))
            == NULL )
        break;
if( pTilePrev == NULL )
{
    lstAdd( &TileLists[iStrip], (NODE *)pTile );
    if( glDebugVWin & DEBUG_VWIN )
        LogMsg( "Appending Full tile" );
    continue;
}
/* if this one is completely beyond us, just insert and loop */
if( pTilePrev->xStart >= xEnd + 1 )
{
    lstInsert( &TileLists[iStrip], NULL, (NODE *)pTile );
    if( glDebugVWin & DEBUG_VWIN )
        LogMsg( "Inserting Full tile" );
    continue;
}
if( pTilePrev->xStart > xStart + 1 )
{
    pTileNext = pTilePrev;
    /* Reset pTilePrev for the insert (NULL result OK)  */
    pTilePrev = (VWinTileInfo)lstPrevious( (NODE *)pTilePrev );
}
else
{
    pTileNext = (VWinTileInfo)lstNext( (NODE *)pTilePrev );
    pTile->xStart = pTilePrev->xEnd + 1;
    /* The Tile Start must be rounded to an even number because
     * the VOMem must be on a 32 bit boundary, and we are
     * converting to VOMem Space from Screen Space.
     */
    ROUND_UP_TO_EVEN_NUM( pTile->xStart );
    pTile->pVOBuf += (pTile->xStart - xStart) / 2;
}
if(( pTileNext != NULL )
    && ( pTileNext->xStart < xEnd + 1 ))
{
    pTile->xEnd = pTileNext->xStart;
    /* Allow for hardware timing space
     */
    if( pTile->xEnd > 0 )
        pTile->xEnd--;
}

/* are we occluded? */
if( pTile->xStart >= pTile->xEnd )
{
    CK_LE( ShortTermMemFree( pTile ));
```

```
                    if( glDebugVWin & DEBUG_VWIN )
                        LogMsg( "Tile Occluded" );
                    continue;
                }
                if( glDebugVWin & DEBUG_VWIN )
                    LogMsg( "Adding tile from %d to %d",
                                    pTile->xStart, pTile->xEnd );
                lstAppend( &TileLists[iStrip],
                                    (NODE *)pTilePrev, (NODE *)pTile );
            }
        }

/* Everything is okay; we contruct tiles from the lists */ if( gfVideoInstalled )
        {
            pTileMap = VOTileBankGetTable();

for( iStrip = 0 ; iStrip < N_STRIPS ; iStrip++ )
            {
                pWords = pTileMap;
                pTileMap += S_STRIP_DESCRIPTION;
                for( pTile = (VWinTileInfo)lstFirst( &TileLists[iStrip] ) ;
                        pTile != NULL ;
                            pTile = (VWinTileInfo)lstNext( (NODE *)pTile ) )
                {
                    tileWord1 = ( pTile->memPitch | (uint16)pTile->pVOBuf);
                    tileWord0 = ( pTile->height
                                    | (pTile->xStart & TILE_XSTART_MASK)
                                    | (((pTile->xEnd - pTile->xStart) << 8)
                                        & TILE_WIDTH_MASK));
                    *pWords++ = tileWord1;    /* write low word, high word */
                    *pWords++ = tileWord0;
                }
                /* Terminate the row */
                *pWords++ = 0x0000;            /* MSB - dontcare here    */
                *pWords   = TILE_X_OFFSCREEN;
            }
        }

Lerror:
    /* If there has been any error, let's clear off the video. */
    if(( ercRet = erc ) != E_OK )
        VOTileBankClear();

/* Free up all of the tiles */
    for( iStrip = 0; iStrip < N_STRIPS ; iStrip++ )
    {
        while((pTile = (VWinTileInfo)lstGet( &TileLists[iStrip] )) != NULL)
            CK_EBAD( ShortTermMemFree( pTile ) );
```

```
        lstInit( &TileLists[iStrip] );
        } return ercRet;
}
```

```
#ifndef BLAST_ID
static char file_id[] = "@(#) vomem.c 1.4@(#), 04/09/93, 22:43:18";
#endif
/*
 * Copyright (C) 1993 Axial Corporation
 *
 * This file contains functions for the video output memory manager.
 *
 */ include "ax_types.h"
include "ax_string.h"
#include "error.h"
#include "stdlib.h"
#include "svlist.h"
#include "video.h"
#include <vxWorks.h>
#include "vxmem.h"
#include "vmem.h"
#include "vomem.h"
#include "list.h"
#include "mutex.h"

/*
 * Video Output Memory Manager:
 * The VOMM manages the video output memory by dividing the memory into
 * fixed size chunks called blocks. A block can be 1 of 4 sizes, corresponding
 * to the 4 picture sizes. Each block is defined by a block descriptor.
 * Upon initialization, the entire video output memory is divided into
 * blocks, and descriptors for those blocks are placed into a Free list.
 * As memory is needed, blocks are allocated, and the descriptor is moved to
 * the Locked list. Once locked, a descriptor can be moved to the
 * UnLocked list which signifies that the memory is still being used, but
 * the VOMM may re-allocate this block if needed. If the VOMM cannot find
 * a block of the correct size in the Free list it will try to find a block
 * that is 1 size bigger to divide into 4 blocks of the needed size.
 * If this fails, it will  try to find 4 blocks that are contiguous in the
 * free list, and are 1 size smaller so that it may combine them into 1
 * block of the correct size. If all this fails, it will try the same thing,
 * search, attempt to divide, attempt to combine, on the UnLocked list.
 * If this fails, the attempt to allocate will fail.
 * There are several optimizations that are currently not implemented.
 * The divide algoritm only looks for blocks of 1 size bigger instead of any
 * size bigger. The combine algorithm only attempts to combine blocks
 * from 1 list at a time instead of looking to combine blocks from both the
 * Free and UnLocked list at the same time.
 * After allocation blocks may be Unlocked, Relocked, Freed, etc. Also,
 * inquiries about data associated with the block, Video Memory Address,
 * locked state, etc., may be gotten through the various query functions.
```

```
*/ define X8_PICT_VO_SIZE  SRC_VO_BASE
define VO_MEM_BASE      PGM_PICT_VO_BASE define DEBUG_VIDEO_MEM_MGR    0x01

/********** TEST **********************/

/*
#define X8_PICT_VO_SIZE    128
#define X4_PICT_VO_SIZE    32
#define X2_PICT_VO_SIZE    8
#define X1_PICT_VO_SIZE    2
#define VO_MEM_BASE        0
#define VO_MEM_MAX         256
*/

/********** TEST **********************/ typedef struct
{
    VOMemClientID       clientID;
    char *              pClientName;
    pfnVOMemMgrCallback pfnCallback;
    void *              pClientState;
}VIDEO_CLIENT;

typedef struct
{
    NODE             node;          /* 8 bytes */
    VOMemClientID    clientID;
    VOMemBlockID     blockID;
    uint8 *          pVOMem;
    LIST *           pParentList;
    uint16           iPictSize;
    uint16           iRefCount;
}VIDEO_MEM_DESCRIPTOR;

typedef struct
{
    pfnVOMemMgrCallback pfnCallback;
    VOMemBlockID        blockID;
    void *              pClientState;
}CALLBACK_QUEUE_ELEMENT;

#define GET_BLOCK_ID( addr ) (VOMemBlockID)( addr )
```

```
#define GET_BLOCK_PTR( ID )  (VIDEO_MEM_DESCRIPTOR *)( ID )
define BLOCK_DIVISOR        4 define BIGGER_SIZE( iSize )  (iSize == PICT_X8) ? N_PICT_SIZES : iSize - 1 define SMALLER_SIZE( iSize ) (iSize == PICT_X1) ? N_PICT_SIZES : iSize + 1

STATIC SVLIST       svCallbackQueue;
STATIC SVLIST       svClientList;
STATIC LIST         FreeList;
STATIC LIST         LockedList;
STATIC LIST         UnLockedList;
static boolean      fModuleInit = FALSE;
static MUTEX_ID     mtxVOMemAccess;
STATIC uint         iClientMax = 0;
uint32              glDebugVideoMemMgr = 0;

#define CHECK_MODULE_INIT {if( !fModuleInit ) VOMemInit();}

STATIC enum ERC ClientCmp( void * vc1, void * vc2, sint * cmpResult )
{
    if( (uint32)( (VIDEO_CLIENT *)vc1 )->clientID >
            (uint32)( (VIDEO_CLIENT *)vc2 )->clientID )
        *cmpResult = CMP_GREATER;
    else if( (uint32)( (VIDEO_CLIENT *)vc1 )->clientID <
            (uint32)( (VIDEO_CLIENT *)vc2 )->clientID )
        *cmpResult = CMP_GREATER;
    else
        *cmpResult = CMP_EQUAL;
    return E_OK;
}

STATIC enum ERC ClientSearch( void * iKey, void * vc2, sint * cmpResult )
{
    if( (uint32)iKey > (uint32)( (VIDEO_CLIENT *)vc2 )->clientID )
        *cmpResult = CMP_GREATER;
    else if( (uint32)iKey < (uint32)( (VIDEO_CLIENT *)vc2 )->clientID )
        *cmpResult = CMP_GREATER;
    else
        *cmpResult = CMP_EQUAL;
    return E_OK;
}

STATIC VOMemClientID GetNextClientID()
{
    return( (VOMemClientID)++iClientMax );
}

STATIC VIDEO_CLIENT * GetClientPtr( VOMemClientID clientID )
{
```

```
    VIDEO_CLIENT *  pvcClient;

if( SVListSearch( &svClientList, (void *)clientID,
            (void **)&pvcClient ) != E_OK )
        return NULL;
    else
        return( pvcClient );
}

STATIC VIDEO_MEM_DESCRIPTOR * GetBlockPtr( VOMemBlockID blockID )
{
    VIDEO_MEM_DESCRIPTOR *  pDesc;

if( blockID == VO_MEM_BLOCK_ID_NONE )
        {
        SetupError( E_SOFT_S_I, "Null Block.ID Passed In", blockID );
        return NULL;
        }
    pDesc = GET_BLOCK_PTR( blockID );
    if( pDesc->blockID != blockID )
        {
        SetupError( E_SOFT_S_I, "Illegal, or Old Block ID", blockID );
        return NULL;
        }
    return( pDesc );
}

STATIC uint32  GetPictSize( uint iPictSize )
{
    uint32  pictSize;

switch( iPictSize )
        {
        case PICT_X8 :
        default :
            pictSize = X8_PICT_VO_SIZE;
            break;
        case PICT_X4 :
            pictSize = X4_PICT_VO_SIZE;
            break;
        case PICT_X2 :
            pictSize = X2_PICT_VO_SIZE;
            break;
        case PICT_X1 :
            pictSize = X1_PICT_VO_SIZE;
            break;
        }
    return pictSize;
}
```

```
STATIC enum ERC CallCallbacks( )
{
    CALLBACK_QUEUE_ELEMENT *    pElement;
    pfnVOMemMgrCallback         pfnCallback;
    VOMemBlockID                blockID;
    void *                      pClientState;

while( svCallbackQueue.nItems > 0 )
        {
        if( ( pElement = (CALLBACK_QUEUE_ELEMENT *)SVListGetItemPtr
            ( &svCallbackQueue, 0 ) ) == NULL )
            {
            return ReLogError();
            }
        pfnCallback = pElement->pfnCallback;
        blockID = pElement->blockID;
        pClientState = pElement->pClientState;
        CK_LOG( SVListDelete( &svCallbackQueue, 0 ) );

MutexGive( mtxVOMemAccess );
        CK_LOG( pfnCallback( blockID, pClientState ) );
        MutexTake( mtxVOMemAccess );
        }
    return E_OK;
}

STATIC enum ERC SetCallback( pfnVOMemMgrCallback pfnCallback,
    VOMemBlockID blockID, void * pClientState )
{
    CALLBACK_QUEUE_ELEMENT  cbElement;

if( pfnCallback == NULL )
        return E_OK;
    cbElement.pfnCallback = pfnCallback;
    cbElement.blockID = blockID;
    cbElement.pClientState = pClientState;
    CK_LOG( SVListAdd( &svCallbackQueue, &cbElement) );
    return E_OK;
}

STATIC VIDEO_MEM_DESCRIPTOR * AllocateDescriptor( void )
{
    VIDEO_MEM_DESCRIPTOR *  pTemp;

pTemp = ( VIDEO_MEM_DESCRIPTOR * )
        DevMemAlloc( sizeof( VIDEO_MEM_DESCRIPTOR ) );

if( pTemp == NULL )
        SetupError( E_MALLOC, sizeof( VIDEO_MEM_DESCRIPTOR ) );
```

```
    pTemp->blockID = GET_BLOCK_ID( pTemp );
    pTemp->iRefCount = 0;
    return( pTemp );
}

STATIC void DeAllocateDescriptor( VIDEO_MEM_DESCRIPTOR * pDesc )
{
    /* Just for safety cleary out blockID */
    pDesc->blockID = 0;
    DevMemFree( pDesc );
    return;
}

STATIC void AddDescriptorToList( LIST *pList,
    VIDEO_MEM_DESCRIPTOR * pDescriptor )
{
    VIDEO_MEM_DESCRIPTOR *  pPrev;
    VIDEO_MEM_DESCRIPTOR *  pTemp;

pDescriptor->pParentList = pList;
    pPrev = NULL;
    for( pTemp = (VIDEO_MEM_DESCRIPTOR *)lstFirst( pList );
        pTemp != NULL; pTemp = (VIDEO_MEM_DESCRIPTOR *)
        lstNext( (NODE *)pTemp ) )
        {
        if( pDescriptor->pVOMem < pTemp->pVOMem )
            {
            break;
            }
        pPrev = pTemp;
        }
    if( glDebugVideoMemMgr & DEBUG_VIDEO_MEM_MGR )
        LogMsg("Descriptor %d of size %d Added to List %d",
            pDescriptor->blockID, pDescriptor->iPictSize, pList );
    lstAppend( pList, (NODE *)pPrev, (NODE *)pDescriptor );
}

STATIC VIDEO_MEM_DESCRIPTOR * FindFirstBlockOfSize( LIST * pList,
    uint iPictSize )
{
    VIDEO_MEM_DESCRIPTOR *  pDescriptor;

if( glDebugVideoMemMgr & DEBUG_VIDEO_MEM_MGR )
        LogMsg("Looking for block of size %d in List %d", iPictSize, pList );
    for( pDescriptor = (VIDEO_MEM_DESCRIPTOR *)lstFirst( pList );
        pDescriptor != NULL; pDescriptor = (VIDEO_MEM_DESCRIPTOR *)
        lstNext( (NODE *)pDescriptor ) )
        {
        if( pDescriptor->iPictSize == iPictSize )
            {
```

```c
            if( glDebugVideoMemMgr & DEBUG_VIDEO_MEM_MGR )
                LogMsg("Found Block %d", pDescriptor->blockID );
            return( pDescriptor );
            }
        }
    return NULL;
    }

STATIC VIDEO_MEM_DESCRIPTOR * FindBlockInList( LIST * pList,
    VOMemBlockID    blockID)
{
    VIDEO_MEM_DESCRIPTOR *  pDescriptor;

for( pDescriptor = (VIDEO_MEM_DESCRIPTOR *)lstFirst( pList );
        pDescriptor != NULL; pDescriptor = (VIDEO_MEM_DESCRIPTOR *)
        lstNext( (NODE *)pDescriptor ) )
        {
        if( pDescriptor->blockID == blockID )
            {
            return( pDescriptor );
            }
        }
    return NULL;
}

/* DivideABlock - This function only divides a block into 4. In the future,
 *  it may be necessary to divide a block repeatedly by either expanding
 *  this function, or calling it recursively.
 */
STATIC VIDEO_MEM_DESCRIPTOR * DivideABlock( LIST * pList,
        VIDEO_MEM_DESCRIPTOR * pDescriptor )
{
    uint32                  pictSize;
    uint                    iIndex;
    uint8 *                 pVOMem;
    VIDEO_MEM_DESCRIPTOR *  pTemp;

lstDelete( pList, (NODE *)pDescriptor );
    pDescriptor->iPictSize = SMALLER_SIZE( pDescriptor->iPictSize );
    pDescriptor->iRefCount = 0;

pictSize = GetPictSize( pDescriptor->iPictSize );
    for( iIndex = 1; iIndex < BLOCK_DIVISOR ; iIndex++ )
        {
        pVOMem = pDescriptor->pVOMem + ( pictSize * iIndex );
        if( ( pTemp = AllocateDescriptor( ) ) == NULL )
            return( NULL );
        pTemp->clientID = VO_MEM_CLIENT_ID_NONE;
        pTemp->iPictSize = pDescriptor->iPictSize;
        pTemp->pVOMem = pVOMem;
```

```
        AddDescriptorToList( &FreeList, pTemp );
        }
    return( pDescriptor );
}
/* CombineBlocks - This function attempts to find 4 adjacent blocks of
 * the same size in the same list, and combine them into 1 bigger block.
 * This algorithm does not take into consideration the fact that 4 adjacent
 * blocks fo the same size might exist between 2 lists.
 */
STATIC VIDEO_MEM_DESCRIPTOR * CombineBlocks( LIST * pList, uint iPictSize,
        VIDEO_CLIENT * pvcClient )
{
    VIDEO_MEM_DESCRIPTOR *  pDesc;
    VIDEO_MEM_DESCRIPTOR *  pPrev;
    VIDEO_MEM_DESCRIPTOR *  pFirstOne = NULL;
    uint                    iNumAlike;

if( glDebugVideoMemMgr & DEBUG_VIDEO_MEM_MGR )
        LogMsg("Attempting to Combining Blocks");
    pPrev = NULL;
    for( pDesc = (VIDEO_MEM_DESCRIPTOR *)lstFirst( pList ),
        iNumAlike = 0; pDesc != NULL && iNumAlike < BLOCK_DIVISOR;
        pDesc = (VIDEO_MEM_DESCRIPTOR *)lstNext( (NODE *)pDesc ) )
        {
        if( pDesc->iPictSize != iPictSize )
            {
            pPrev = NULL;
            iNumAlike = 0;
            }
        else if( ( pPrev != NULL ) && ( ( pPrev->pVOMem +
                GetPictSize( pPrev->iPictSize ) ) != pDesc->pVOMem ) )
            {
            pPrev = pDesc;
            iNumAlike = 1;
            }
        else
            {
            pPrev = pDesc;
            iNumAlike++;
            }
        if( iNumAlike == 1 )
            pFirstOne = pDesc;
        if( glDebugVideoMemMgr & DEBUG_VIDEO_MEM_MGR )
            LogMsg("Checking block %d alike %d", pDesc->blockID, iNumAlike);
        }
    if( iNumAlike == BLOCK_DIVISOR )
        {
        uint            iIndex;
```

```
        for( pDesc = (VIDEO_MEM_DESCRIPTOR *)lstNext( (NODE *)pFirstOne ),
            iIndex = 0; pDesc != NULL && ( iIndex < BLOCK_DIVISOR - 1 );
            pDesc = (VIDEO_MEM_DESCRIPTOR *)lstNext( (NODE *)pFirstOne),
            iIndex++ )
            {
            if( glDebugVideoMemMgr & DEBUG_VIDEO_MEM_MGR )
                LogMsg("Deleteing %d", pDesc->blockID );
            /* Execute Callback to notify client of change of state.
             */
            if( pvcClient != NULL )
                CK_LOG( SetCallback( pvcClient->pfnCallback, pDesc->blockID,
                    pvcClient->pClientState ) );
            lstDelete( pList, (NODE *)pDesc );
            DeAllocateDescriptor( pDesc );
            }
        /* Execute Callback to notify client of change of state.
         */
        if( pvcClient != NULL )
            CK_LOG( SetCallback( pvcClient->pfnCallback, pFirstOne->blockID,
                pvcClient->pClientState ) );
        lstDelete( pList, (NODE *)pFirstOne );
        pFirstOne->iPictSize = BIGGER_SIZE( pFirstOne->iPictSize );
        pFirstOne->iRefCount = 0;
        if( glDebugVideoMemMgr & DEBUG_VIDEO_MEM_MGR )
            LogMsg("Combined blocks at %d", pFirstOne->blockID );
        return( pFirstOne );
        }
    return( NULL );
}

STATIC void InitializeFreeList()
{
    uint                    iPictSize;
    VIDEO_MEM_DESCRIPTOR *  pTemp;
    uint8 *                 pVOMem = VO_MEM_BASE;
    uint8 *                 pVOMemEnd = (uint8 *)( (uint32)VO_MEM_BASE +
                                (uint32)VO_MEM_MAX );

for( iPictSize = PICT_X8; iPictSize < N_PICT_SIZES; iPictSize++ )
        {
        while( ( pVOMem + GetPictSize( iPictSize ) - 1 ) < pVOMemEnd )
            {
            if( ( pTemp = AllocateDescriptor( ) ) == NULL )
                return;
            pTemp->pVOMem = pVOMem;
            pTemp->iPictSize = iPictSize;
            pTemp->clientID = VO_MEM_CLIENT_ID_NONE;
            AddDescriptorToList( &FreeList, pTemp );
            pVOMem += GetPictSize( iPictSize );
```

```
            }
        }
}

STATIC void VOMemInit()
{
    if( !fModuleInit )
    {
        if(- ( mtxVOMemAccess = MutexCreate() ) == 0 )
        {
            LogError( errnoGet() );
            return;
        }
        MutexTake( mtxVOMemAccess );
        CK_LOG( SVListInit( &svClientList, ClientCmp, ClientSearch,
            sizeof( VIDEO_CLIENT ) ) );
        CK_LOG( SVListInit( &svCallbackQueue, NULL, NULL,
            sizeof( CALLBACK_QUEUE_ELEMENT ) ) );
        lstInit( &FreeList );
        lstInit( &LockedList );
        lstInit( &UnLockedList );
        fModuleInit = TRUE;
        InitializeFreeList();
        MutexGive( mtxVOMemAccess );
        if( glDebugVideoMemMgr & DEBUG_VIDEO_MEM_MGR )
            LogMsg("Video Output Memory Manager Initialized");
    }
}

STATIC VIDEO_MEM_DESCRIPTOR * FindSplitOrCombineDescriptor( LIST * pList,
        uint iPictSize, VIDEO_CLIENT * pvcClient )
{
    VIDEO_MEM_DESCRIPTOR *  pDesc;

/* Try to find block of right size */
    if( ( pDesc = FindFirstBlockOfSize( pList, iPictSize ) ) != NULL )
    {
        if( glDebugVideoMemMgr & DEBUG_VIDEO_MEM_MGR )
            LogMsg("Found Block of right size %d", pDesc->blockID );
        /* Execute Callback to notify client of change of state.
         */
        if( pvcClient != NULL )
            CK_LOG( SetCallback( pvcClient->pfnCallback, pDesc->blockID,
                pvcClient->pClientState ) );
        lstDelete( pList, (NODE *)pDesc );
        return( pDesc );
    }
    /* Look for a Bigger Block */
    if( iPictSize != PICT_X8 )
```

```
        {
        if( ( pDesc = FindFirstBlockOfSize( pList,
                BIGGER_SIZE( iPictSize) ) ) != NULL )
            {
            if( glDebugVideoMemMgr & DEBUG_VIDEO_MEM_MGR )
                LogMsg("Divided block %d", pDesc->blockID );
            /* Execute Callback to notify client of change of state.
             */
            if( pvcClient != NULL )
                CK_LOG( SetCallback( pvcClient->pfnCallback, pDesc->blockID,
                    pvcClient->pClientState ) );
            /* Split Block Into 4 */
            return( DivideABlock( pList, pDesc ) );
            }
        }
    /* Look for smaller blocks to combine */
    if( iPictSize != PICT_X1 )
        {
        return( CombineBlocks( pList, SMALLER_SIZE( iPictSize), pvcClient ) );
        }
    return NULL;
}

/* End of Static Functions */

/*- VOMEM
 * VOMemClientCreate() Registers the named client to the Video Output
 *   Memory Manager Server.
 *
 * RETURNS The ID of the new Client.
 */
VOMemClientID VOMemClientCreate( char * pClientName,
                                 pfnVOMemMgrCallback pfnCallback,
                                 void * pClientState                )
{
    VIDEO_CLIENT        vcClient;

CHECK_MODULE_INIT
    MutexTake( mtxVOMemAccess );

vcClient.pClientName = DupString( pClientName );
    vcClient.clientID = GetNextClientID();
    vcClient.pfnCallback = pfnCallback;
    vcClient.pClientState = pClientState;
    if( glDebugVideoMemMgr & DEBUG_VIDEO_MEM_MGR )
        LogMsg("Client %d Added", vcClient.clientID );
    CK_LOG( SVListAdd( &svClientList, &vcClient ) );
    MutexGive( mtxVOMemAccess );
    return( vcClient.clientID );
}
```

```
/*- VOMEM
 * VOMemDiscardClient() Un-Registers the indicated client from the Video Output
 * Memory Manager Server.
 *
 * RETURNS Error if it cannot find client.
 */
enum ERC     VOMemDiscardClient( VOMemClientID clientID )
{
    VIDEO_CLIENT *       pvcClient;
    uint                 iIndex;
    VIDEO_MEM_DESCRIPTOR * pDesc;
    VIDEO_MEM_DESCRIPTOR * pNext = NULL;

CHECK_MODULE_INIT

MutexTake( mtxVOMemAccess );
    if( ( pvcClient = GetClientPtr( clientID ) ) == NULL )
        {
        MutexGive( mtxVOMemAccess );
        return ReLogError();
        }
    CK_LOG( FreeString( pvcClient->pClientName ) );
    iIndex = I_SVLIST_PTR( &svClientList, pvcClient );
    CK_LOG( SVListDelete( &svClientList, iIndex ) );

/* Remove all descriptors belonging to this client from the
     * UnLocked, and Locked lists and put into Free list.
     */
    for( pDesc = (VIDEO_MEM_DESCRIPTOR *)
            lstFirst( &UnLockedList ); pDesc != NULL; pDesc = pNext )
            {
            pNext = (VIDEO_MEM_DESCRIPTOR *)lstNext( (NODE *)pDesc );
            if( pDesc->clientID == clientID )
                {
                lstDelete( &UnLockedList, (NODE *)pDesc );
                pDesc->clientID = VO_MEM_CLIENT_ID_NONE;
                AddDescriptorToList( &FreeList, pDesc );
                }
            }
    for( pDesc = (VIDEO_MEM_DESCRIPTOR *)
            lstFirst( &LockedList ); pDesc != NULL; pDesc = pNext )
            {
            pNext = (VIDEO_MEM_DESCRIPTOR *)lstNext( (NODE *)pDesc );
            if( pDesc->clientID == clientID )
                {
                lstDelete( &LockedList, (NODE *)pDesc );
                pDesc->clientID = VO_MEM_CLIENT_ID_NONE;
                AddDescriptorToList( &FreeList, pDesc );
                }
            }
```

```
        MutexGive( mtxVOMemAccess );
        return E_OK;
}

/*- VOMEM
 * VOMemAlloc() Allocates a portion of Video Output Memory to fit the
 * needed picture size.
 *
 * RETURNS Block ID, or VO_MEM_BLOCK_ID_NONE if no memory available.
 */
VOMemBlockID VOMemAlloc(  VOMemClientID clientID, uint iPictSize,
        uint8 ** ppVOMem )
{
    VOMemBlockID              blockID;
    VIDEO_MEM_DESCRIPTOR *    pDesc;
    VIDEO_CLIENT         *    pvcClient;

CHECK_MODULE_INIT blockID = VO_MEM_BLOCK_ID_NONE;
    MutexTake( mtxVOMemAccess );
    if( ( pvcClient = GetClientPtr( clientID ) ) == NULL )
        {
        MutexGive( mtxVOMemAccess );
        SetupError( E_SOFT_S_I, "Illegal VOM Client ID", clientID );
        return( VO_MEM_BLOCK_ID_NONE );
        }
    if( ( pDesc = FindSplitOrCombineDescriptor( &FreeList, iPictSize,
            NULL ) ) != NULL )
        {
        blockID = pDesc->blockID;
        pDesc->clientID = clientID;
        ++pDesc->iRefCount;
        AddDescriptorToList( &LockedList, pDesc );
        *ppVOMem = pDesc->pVOMem;
        CK_LOG( CallCallbacks() );
        MutexGive( mtxVOMemAccess );
        return blockID;
        } if( ( pDesc = FindSplitOrCombineDescriptor( &UnLockedList, iPictSize,
            pvcClient ) ) != NULL )
        {
        blockID = pDesc->blockID;
        pDesc->clientID = clientID;
        ++pDesc->iRefCount;
        AddDescriptorToList( &LockedList, pDesc );
        *ppVOMem = pDesc->pVOMem;
        CK_LOG( CallCallbacks() );
        MutexGive( mtxVOMemAccess );
```

```
            return blockID;
        }

CK_LOG( CallCallbacks() );/* Queue should be empty, but just in case.. */
    MutexGive( mtxVOMemAccess );
    SetupError( E_SOFTWARE, "No Video Memory Left" );
    return( VO_MEM_BLOCK_ID_NONE );
}

/*- VOMEM
 * VOMemFree() Frees the indicated block of Video Output Memory.
 *
 * RETURNS E_OK unless it cannot find the indicated Block.
 */
enum ERC    VOMemFree(  VOMemClientID clientID, VOMemBlockID blockID  )
{
    VIDEO_MEM_DESCRIPTOR *   pDesc;
    VIDEO_CLIENT       *     pvcClient;

CHECK_MODULE_INIT

MutexTake( mtxVOMemAccess );
    if( ( pvcClient = GetClientPtr( clientID ) ) == NULL )
        {
        MutexGive( mtxVOMemAccess );
        return LogError( E_CANT_FIND_S_I, "Video Client", clientID );
        } if( ( pDesc = GetBlockPtr( blockID ) ) == NULL )
        {
        MutexGive( mtxVOMemAccess );
        return ReLogError();
        }
    if( pDesc->clientID != clientID )
        {
        MutexGive( mtxVOMemAccess );
        return LogError( E_SOFT_S_I, "Client Not Owner", clientID );
        }
    lstDelete( pDesc->pParentList, (NODE *)pDesc );
    pDesc->clientID = VO_MEM_CLIENT_ID_NONE;
    pDesc->iRefCount = 0;
    AddDescriptorToList( &FreeList, pDesc );
    MutexGive( mtxVOMemAccess );
    return E_OK;
}

/*- VOMEM
 * VOMemUnlock() Moves the indicated block from the locked to the unlocked
 * list.
```

```
 *
 * RETURNS E_OK unless it cannot find the indicated Block.
 */
enum ERC    VOMemUnlock( VOMemClientID clientID, VOMemBlockID blockID  )
{
    VIDEO_CLIENT        *       pvcClient;
    VIDEO_MEM_DESCRIPTOR *      pDesc;

CHECK_MODULE_INIT

MutexTake( mtxVOMemAccess );
    if( ( pvcClient = GetClientPtr( clientID ) ) == NULL )
        {
        MutexGive( mtxVOMemAccess );
        return LogError( E_CANT_FIND_S_I, "Video Client", clientID );
        }
    if( ( pDesc = GetBlockPtr( blockID ) ) == NULL )
        {
        MutexGive( mtxVOMemAccess );
        return ReLogError();
        }
    if( pDesc->pParentList != &LockedList )
        {
        MutexGive( mtxVOMemAccess );
        return LogError( E_SOFT_S_I, "Block not Locked", blockID );
        }
    if( pDesc->clientID != clientID )
        {
        MutexGive( mtxVOMemAccess );
        return LogError( E_SOFT_S_I, "Client Not Owner", clientID );
        }
    lstDelete( pDesc->pParentList, (NODE *)pDesc );
    AddDescriptorToList( &UnLockedList, pDesc );
    MutexGive( mtxVOMemAccess );
    return E_OK;
}

/*- VOMEM
 * VOMemRelock() Moves the indicated block from the unlocked to the locked
 *   list.
 *
 * RETURNS E_OK unless it cannot find the indicated Block, status of attempt
 *      to relock in pfReLocked.
 */
enum ERC    VOMemRelock( VOMemClientID clientID, VOMemBlockID blockID,
                            boolean * pfReLocked )
{
    VIDEO_CLIENT        *       pvcClient;
    VIDEO_MEM_DESCRIPTOR *      pDesc;

CHECK_MODULE_INIT
```

```
    *pfReLocked = FALSE;
    MutexTake( mtxVOMemAccess );
    if( ( pvcClient = GetClientPtr( clientID ) ) == NULL )
        {
        MutexGive( mtxVOMemAccess );
        return LogError( E_CANT_FIND_S_I, "Video Client", clientID );
        }
    if( ( pDesc = GetBlockPtr( blockID ) ) == NULL )
        {
        MutexGive( mtxVOMemAccess );
        return ReLogError();
        }
    if( pDesc->pParentList != &UnLockedList )
        {
        MutexGive( mtxVOMemAccess );
        return LogError( E_SOFT_S_I, "Block not UnLocked", blockID );
        }
    if( pDesc->clientID != clientID )
        {
        MutexGive( mtxVOMemAccess );
        return LogError( E_SOFT_S_I, "Client Not Owner", clientID );
        }
    lstDelete( pDesc->pParentList, (NODE *)pDesc );
    AddDescriptorToList( &LockedList, pDesc );
    MutexGive( mtxVOMemAccess );
    *pfReLocked = TRUE;
    return E_OK;
}

/*- VOMEM
 * VOMemTouch() Increments the reference count of the indicated block.
 *
 * RETURNS E_OK unless it cannot find the indicated Block.
 */
enum ERC VOMemTouch( VOMemClientID clientID, VOMemBlockID blockID          )
{
    VIDEO_CLIENT      *     pvcClient;
    VIDEO_MEM_DESCRIPTOR *  pDesc;

CHECK_MODULE_INIT

MutexTake( mtxVOMemAccess );
    if( ( pvcClient = GetClientPtr( clientID ) ) == NULL )
        {
        MutexGive( mtxVOMemAccess );
        return LogError( E_CANT_FIND_S_I, "Video Client", clientID );
        }
    if( ( pDesc = GetBlockPtr( blockID ) ) == NULL )
```

```
        {
        MutexGive( mtxVOMemAccess );
        return ReLogError();
        }
    if( pDesc->pParentList == &FreeList )
        {
        MutexGive( mtxVOMemAccess );
        return LogError( E_SOFT_S_I, "Block Not Available", blockID );
        }
    if( pDesc->clientID != clientID )
        {
        MutexGive( mtxVOMemAccess );
        return LogError( E_SOFT_S_I, "Client Not Owner", clientID );
        }
    ++pDesc->iRefCount;
    MutexGive( mtxVOMemAccess );
    return E_OK;
}

/*- VOMEM
 * VOMemGetPtr() Returns a pointer to the video output memory for this
 * block in ppVOMem.
 *
 * RETURNS E_OK unless it cannot find the indicated Block, memory pointer
 *      in ppVOMem.
 */
enum ERC VOMemGetPtr(  VOMemClientID clientID, VOMemBlockID blockID,
                       uint8 ** ppVOMem                                  )
{
    VIDEO_CLIENT         *       pvcClient;
    VIDEO_MEM_DESCRIPTOR *       pDesc;

CHECK_MODULE_INIT

*ppVOMem = NULL;
    MutexTake( mtxVOMemAccess );
    if( ( pvcClient = GetClientPtr( clientID ) ) == NULL )
        {
        MutexGive( mtxVOMemAccess );
        return LogError( E_CANT_FIND_S_I, "Video Client", clientID );
        }
    if( ( pDesc = GetBlockPtr( blockID ) ) == NULL )
        {
        MutexGive( mtxVOMemAccess );
        return ReLogError();
        }
    if( pDesc->pParentList != &LockedList )
        {
        MutexGive( mtxVOMemAccess );
        return LogError( E_SOFT_S_I, "Block Not Available", blockID );
```

```
        }
    if( pDesc->clientID != clientID )
        {
        MutexGive( mtxVOMemAccess );
        return LogError( E_SOFT_S_I, "Client Not Owner", clientID );
        }
    *ppVOMem = pDesc->pVOMem;
    MutexGive( mtxVOMemAccess );
    return E_OK;
}

/*- VOMEM
 * VOMemIsLocked() Returns the locked state of the indicated block in the
 * boolean pfLocked.
 *
 * RETURNS E_OK unless invalid client, locked state in pfLocked.
 */
enum ERC VOMemIsLocked( VOMemClientID clientID, VOMemBlockID blockID,
                        boolean * pfLocked                            )
{
    VIDEO_CLIENT        *       pvcClient;
    VIDEO_MEM_DESCRIPTOR *      pDesc;

CHECK_MODULE_INIT

*pfLocked = FALSE;
    MutexTake( mtxVOMemAccess );
    if( ( pvcClient = GetClientPtr( clientID ) ) == NULL )
        {
        MutexGive( mtxVOMemAccess );
        return LogError( E_CANT_FIND_S_I, "Video Client", clientID );
        }
    if( ( pDesc = GetBlockPtr( blockID ) ) == NULL )
        {
        MutexGive( mtxVOMemAccess );
        return ReLogError();
        }
    if( pDesc->clientID != clientID )
        {
        MutexGive( mtxVOMemAccess );
        return LogError( E_SOFT_S_I, "Client Not Owner", clientID );
        }
    if( pDesc->pParentList == &LockedList )
        {
        *pfLocked = TRUE;
        }
    MutexGive( mtxVOMemAccess );
    return E_OK;
}
```

```
void VOShow( )
{
    VIDEO_MEM_DESCRIPTOR *  pTemp;

printf("       Video Output Memory Manager Show\n");
    printf("------------------------------------------------\n");

printf("       Free List\n");
    printf("------------------------------------------------\n");
    printf("Block ID  Pict Size    VOMem      ClientID   Ref\n");
    for( pTemp = (VIDEO_MEM_DESCRIPTOR *)lstFirst( &FreeList );
        pTemp != NULL; pTemp = (VIDEO_MEM_DESCRIPTOR *)
        lstNext( (NODE *)pTemp ) )
        {
        printf("%08d     %02d       %08d    %04d    %3d\n", pTemp->blockID,
            pTemp->iPictSize, pTemp->pVOMem, pTemp->clientID,
            pTemp->iRefCount );
        } printf("       UnLocked List\n");
    printf("------------------------------------------------\n");
    printf("Block ID  Pict Size    VOMem      ClientID   Ref\n");
    for( pTemp = (VIDEO_MEM_DESCRIPTOR *)lstFirst( &UnLockedList );
        pTemp != NULL; pTemp = (VIDEO_MEM_DESCRIPTOR *)
        lstNext( (NODE *)pTemp ) )
        {
        printf("%08d     %02d       %08d    %04d    %3d\n", pTemp->blockID,
            pTemp->iPictSize, pTemp->pVOMem, pTemp->clientID,
            pTemp->iRefCount );
        } printf("       Locked List\n");
    printf("------------------------------------------------\n");
    printf("Block ID  Pict Size    VOMem      ClientID   Ref\n");
    for( pTemp = (VIDEO_MEM_DESCRIPTOR *)lstFirst( &LockedList );
        pTemp != NULL; pTemp = (VIDEO_MEM_DESCRIPTOR *)
        lstNext( (NODE *)pTemp ) )
        {
        printf("%08d     %02d       %08d    %04d    %3d\n", pTemp->blockID,
            pTemp->iPictSize, pTemp->pVOMem, pTemp->clientID,
            pTemp->iRefCount );
        }

}
```

```
#ifndef BLAST_ID
static char file_id[] = "@(#) segmentLib.c 1.4@(#), 04/13/93, 22:41:16";
#endif
/*
 * Copyright (C) 1993 Axial Corporation
 *
 * This file contains the following functions:
 *   - SegLibClientCreate()
 *   - SegLibDiscardClient()
 *   - SegLibGetSegmentInfo()
 *   - SegLibAddNewSegment()
 *   - SegLibRedefineSegment()
 *   - SegLibGetPictureForSegment()
 *   - SegLibCancelPictureForSegment()
 *   - SegLibQueryASegment()
 *   - SegLibQuerySegments()
 *   - SegLibAddFileToSegDBase()
 *   - SegLibGetVFiles()
 *   - SegLibShow()
 */
include "ax_types.h"
#include "stdlib.h"
#include "error.h"
#include "ax_string.h"
#include "timecode.h"
#include "media.h"
#include "find.h"
#include "clip.h"
#include "vxmem.h"
#include "mutex.h"
#include "svlist.h"
#include "video.h"
#include "vfile.h"
#include "session.h"
#include "segmentLib.h"
#include "speed.h"

#include "id.h"
#include "segment.h"
#include "enode.h"
#include "time.h"
#include "channel.h"

#define MUST_HAVE       0
#define MUST_NOT_HAVE   1
define DONT_CARE       2 define DEBUG_SEG_LIB_ADD 0x1
```

```
typedef struct
{
    VFile           pHandle;
    boolean         fComments;
    boolean         fVideo;
    uint16          iPictureSize;
    boolean         fFull;
}SEG_LIB_VFILE;

typedef struct {
    VFile           pHandle;
    uint            iSlotNumber;
}SEG_LIB_PICTURE;

typedef struct {
    SegLibClientID      clientID;
    char *              pClientName;
    pfnSegLibSegChanged pfnCallback;
    void *              pClientData;
}SEG_LIB_CLIENT;

typedef struct {
    SegLibSegmentID     segmentID;
    struct TIMECODE     tcStart;
    struct TIMECODE     tcEnd;
    uint32              lChMask;
    uint32              tySegment;
    char *              pReelName;
    I_ENODE             iEnode;
    I_REV               iRev;
    char    *           pComments;
    SEG_LIB_PICTURE     aHeadPictures[ N_PICT_SIZES ];
    SEG_LIB_PICTURE     aTailPictures[ N_PICT_SIZES ];
}SEG_LIB_SEGMENT;

VFILE_PICTURE_TYPE   SegLibToVFilePictureType[ SEG_LIB_PICTURE_TYPE_MAX ] =
    {
        VFILE_TY_PICTURE_HEAD,      /* SEG_LIB_TY_PICUTRE_HEAD_PICTURE     */
        VFILE_TY_PICTURE_TAIL,      /* SEG_LIB_TY_PICUTRE_TAIL_PICTURE     */
        VFILE_TY_PICTURE_ICON,      /* SEG_LIB_TY_PICUTRE_ICON_PICTURE     */
        VFILE_TY_PICTURE_ICON,      /* SEG_LIB_TY_PICUTRE_SEQUENCE_PICTURE */
    };

/*
 * STATIC variables
 */
STATIC SVLIST   svSegLibVFiles;
STATIC SVLIST   svSegLibClients;
```

```
STATIC  SVLIST     svSegLibSegments;
STATIC  MUTEX_ID   mtxSegLibClients;
STATIC  MUTEX_ID   mtxSegLibSegments;
static  uint32     iClientMax = 0;
static  uint32     iSegmentMax = 0;
static  boolean    fModuleInit = FALSE;
uint32             glDebugSegLib = 0;

static uint16   SegTypeMask[SEG_LIB_SEGMENT_TYPE_MAX] =
    {   VFILE_TY_SEGMENT_MATTE,
        VFILE_TY_SEGMENT_FILL,
        VFILE_TY_SEGMENT_BACKGROUND,
        VFILE_TY_SEGMENT_WIDE,
        VFILE_TY_SEGMENT_CLOSEUP,
        VFILE_TY_SEGMENT_HEADSHOT,
        VFILE_TY_SEGMENT_BEAUTY
    };

#define CHECK_MODULE_INIT    (if( !fModuleInit ) SegLibInit();)

enum ERC SegLibTransferComplete( VFile pHandle, SLOT_NUMBER iSlotNumber,
    VFILE_TY_REQUEST tyRequest, void * pClientNumber, void * pClientID,
    void * pClientInfo )
{
    SEG_LIB_CLIENT *    pClient;
    TY_CALLBACK_ACTION  tyAction;
    pfnSegLibSegChanged pfnCallback;
    SegLibClientID      clientID;
    SegLibSegmentID     segmentID;
    void *              clientData;

MutexTake( mtxSegLibClients );
    if( SVListSearch( &svSegLibClients, pClientID, (void **)&pClient )
            != E_OK )
        {
        MutexGive( mtxSegLibClients );
        return( SetupError( E_CANT_FIND_S_I, "Client", pClientID ) );
        }
    pfnCallback = pClient->pfnCallback;
    clientID    = pClient->clientID;
    clientData  = pClient->pClientData;
    MutexGive( mtxSegLibClients );

segmentID = (SegLibSegmentID)pClientInfo;
    switch( tyRequest )
        {
        default :
        case TY_REQUEST_GET_PICT :
            tyAction = ACTION_TRANSFER_COMPLETE;
```

```
                break;
        }
    if( pfnCallback != NULL )
        CK_LOG( pfnCallback( clientID, segmentID, clientData, tyAction ) );

return E_OK;
} enum ERC SegLibTransferCmp( void * pClientNumber1, void * pClientData1,
    void * pClientNumber2, void * pClientData2, sint * cmpResult )
{
    if( pClientNumber1 ==.pClientNumber2 &&
            pClientData2 == pClientData2 )
        *cmpResult = CMP_EQUAL;
    else
        *cmpResult = CMP_GREATER;
    return E_OK;
} enum ERC GetNextVFileSlot( uint iComments, uint iVideo,
    uint16 iPictureSize, VFile *pHandle, SLOT_NUMBER * piSlotNumber )
{
    SEG_LIB_VFILE   *   pVFile;
    uint                i;

*pHandle = VFILE_NONE;
    for( i=0; i < svSegLibVFiles.nItems; i++ )
        {
        if( ( pVFile = (SEG_LIB_VFILE *)SVListGetItemPtr( &svSegLibVFiles, i ) )
            == NULL )
            {
            return ReLogError();
            }
        if( !pVFile->fFull && pVFile->iPictureSize == iPictureSize )
            {
            if( ( ( iVideo == MUST_NOT_HAVE ) && pVFile->fVideo ) ||
                    ( ( iVideo == MUST_HAVE ) && !pVFile->fVideo ) )
                continue;

if( ( ( iComments == MUST_NOT_HAVE ) && pVFile->fComments ) ||
                    ( ( iComments == MUST_HAVE ) && !pVFile->fComments ) )
                continue;
            if( VFileGetEmptySlot( pVFile->pHandle, piSlotNumber ) != E_OK )
                {
                pVFile->fFull = TRUE;
                }
            else
                {
                *pHandle = pVFile->pHandle;
```

```c
            return E_OK;
            }
        }
    }
    return E_OK;
} static boolean FileExists( char * pFileName )
{
    int fd;

if( ( fd = open( pFileName, O_RDONLY, 0 ) ) < 0 )
        return( FALSE );
    close( fd );
    return( TRUE );
} char * GetNewVFileName( char * pBuff, uint sBuff )
{
    uint    iFileNum;

for( iFileNum = 0; iFileNum < 100; iFileNum++ )
        {
        StrNPrintf( pBuff, sBuff, "/sys/markfile/%s%d%s",
            SEG_LIB_VFILE_ROOT_NAME, iFileNum, VFILE_EXTENSION );
        if( !FileExists( pBuff ) )
            return( pBuff );
        }
    LogError( E_SOFTWARE, "Unable to find VFile Filename" );
    return( NULL );
} enum ERC OpenNewVFile( uint8 iPictureSize, uint16 iMaxNumberOfPictures,
    boolean fComments, boolean fVideo, VFile * pHandle,
    SLOT_NUMBER * piSlotNumber )
{
    SEG_LIB_VFILE   newVFile;
    char            acTemp[VFILE_SESSION_NAME_LENGTH];
    char            acTemp1[ 100 ];

SessionGetCurrentName( acTemp, VFILE_SESSION_NAME_LENGTH );

if( GetNewVFileName( acTemp1, 100 ) == NULL )
        return ReLogError();
    if( ( newVFile.pHandle = VFileCreate( iPictureSize, iMaxNumberOfPictures,
        acTemp, acTemp1, fVideo, fComments ) ) == VFILE_NONE )
        {
        return ReLogError();
        }
    newVFile.fFull = FALSE;
```

```
        newVFile.fVideo = fVideo;
        newVFile.fComments= fComments;
        newVFile.iPictureSize = iPictureSize;
        CK_LOG( SVListAdd( &svSegLibVFiles, &newVFile ) );
        *pHandle = newVFile.pHandle;
        if( VFileGetEmptySlot( newVFile.pHandle, piSlotNumber ) != E_OK )
            {
            return LogError( E_SOFTWARE, "What the Fuck" );
            }
        return E_OK;
    } enum ERC FillVFileInfoSt( VFILE_SEG_INFO * pvfInfo, SEG_LIB_ITEM * pSegItem,
        SEG_LIB_PICTURE_TYPE tyPicture, uint iPictSize, boolean fPictureExists )
    {
        pvfInfo->Time1.Time.tcPicture = pSegItem->tcStart;
        pvfInfo->Time1.tyTime = TIME_TYPE_TIMECODE;
        pvfInfo->Time2.Time.tcPicture = pSegItem->tcEnd;
        pvfInfo->Time2.tyTime = TIME_TYPE_TIMECODE;
        CK_LOG( TcSubTc( &pSegItem->tcEnd, &pSegItem->tcStart,
            &((sint32)pvfInfo->lnFields) ) );
        pvfInfo->lSpeed = SPEED_FULL;
        pvfInfo->lChMask = pSegItem->lChMask;
        pvfInfo->tyPicture = SegLibToVFilePictureType[ tyPicture ];
        pvfInfo->tySegment = pSegItem->tySegment;
        pvfInfo->fPictureExists =  fPictureExists;
        pvfInfo->iPictureSize = iPictSize;
        StrNCopy( pvfInfo->acReelName, pSegItem->acReelName,
            SEG_LIB_REEL_NAME_LENGTH, TERMINATE );
        return E_OK;
    } enum ERC FillSegLibItem( SEG_LIB_ITEM * pSegItem, SEG_LIB_SEGMENT * pSegment )
    {
        uint i;

pSegItem->segmentID = pSegment->segmentID;
        pSegItem->tcStart = pSegment->tcStart;
        pSegItem->tcEnd = pSegment->tcEnd;
        pSegItem->lChMask = pSegment->lChMask;
        pSegItem->tySegment = pSegment->tySegment;
        pSegItem->iEnode = pSegment->iEnode;
        pSegItem->iRev = pSegment->iRev;
        StrNCopy( pSegItem->acReelName, pSegment->pReelName,
            SEG_LIB_REEL_NAME_LENGTH, TERMINATE );
        for( i = 0; i < N_PICT_SIZES; i++ )
            {
            if( pSegment->aHeadPictures[i].pHandle == VFILE_NONE )
                pSegItem->HeadPictures[i] = FALSE;
```

```
            else
                pSegItem->HeadPictures[i] = TRUE;

if( pSegment->aTailPictures[i].pHandle == VFILE_NONE )
                pSegItem->TailPictures[i] = FALSE;
            else
                pSegItem->TailPictures[i] = TRUE;
            }
        return E_OK;
}
enum ERC GetAnEmptySlotInAVFile( uint iComments, uint iVideo, uint iPictSize,
        VFile * pHandle, SLOT_NUMBER * piSlotNumber )
{
    enum ERC    erc = E_OK;

*pHandle = VFILE_NONE;
    CK_E( GetNextVFileSlot( iComments, iVideo, iPictSize,
        pHandle, piSlotNumber ) );
    if( *pHandle == VFILE_NONE )
        {
        uint    iMaxNumberOfPictures;

/* Create a New VFile */
        if( iVideo != MUST_HAVE )
            iMaxNumberOfPictures = SEG_LIB_TEXTVF_SIZE;
        else
            iMaxNumberOfPictures = SEG_LIB_VIDEOVF_SIZE;
        CK_E( OpenNewVFile( iPictSize, iMaxNumberOfPictures,
            ( iComments == MUST_HAVE ), ( iVideo == MUST_HAVE ), pHandle,
            piSlotNumber ) );
        }
    return E_OK;
}

/* Clients in the svSegLibClients are sorted by their SegLibClientID values.
 */
STATIC enum ERC ClientIDCmp( void * client1, void * client2,
        sint * cmpResult )
{
    if( (uint32)( (SEG_LIB_CLIENT *)client1 )->clientID >
            (uint32)( (SEG_LIB_CLIENT *)client2 )->clientID )
        *cmpResult = CMP_GREATER;
    else if( (uint32)( (SEG_LIB_CLIENT *)client1 )->clientID <
            (uint32)( ( SEG_LIB_CLIENT *)client2 )->clientID )
        *cmpResult = CMP_LESS;
    else
        *cmpResult = CMP_EQUAL;
```

```
        return E_OK;
}

/* Clients in the svSegLibClients are sorted by their SegLibClientID values.
 */
STATIC enum ERC ClientIDSearch( void * iKeyClient, void * client2,
        sint * cmpResult )
{
    if( (uint32)iKeyClient >
                (uint32)( (SEG_LIB_CLIENT *)client2 )->clientID )
        *cmpResult = CMP_GREATER;
    else if( (uint32)iKeyClient <
                (uint32)( ( SEG_LIB_CLIENT *)client2 )->clientID )
        *cmpResult = CMP_LESS;
    else
        *cmpResult = CMP_EQUAL;

return E_OK;
}

/* Clients in the svSegLibSegmentsare sorted by their SegLibClientID values.
 */
STATIC enum ERC SegmentIDCmp( void * segment1, void * segment2,
        sint * cmpResult )
{
    if( (uint32)( (SEG_LIB_SEGMENT *)segment1 )->segmentID >
            (uint32)( (SEG_LIB_SEGMENT *)segment2 )->segmentID )
        *cmpResult = CMP_GREATER;
    else if( (uint32)( (SEG_LIB_SEGMENT *)segment1 )->segmentID <
            (uint32)( ( SEG_LIB_SEGMENT *)segment2 )->segmentID )
        *cmpResult = CMP_LESS;
    else
        *cmpResult = CMP_EQUAL;

return E_OK;
}

/* Clients in the svSegLibSegments are sorted by their SegLibClientID values.
 */
STATIC enum ERC SegmentIDSearch( void * iKeySegment, void * segment2,
        sint * cmpResult )
{
    if( (uint32)iKeySegment >
                (uint32)( (SEG_LIB_SEGMENT *)segment2 )->segmentID )
        *cmpResult = CMP_GREATER;
    else if( (uint32)iKeySegment <
                (uint32)( ( SEG_LIB_SEGMENT *)segment2 )->segmentID )
        *cmpResult = CMP_LESS;
    else
```

```
            *cmpResult = CMP_EQUAL;

return E_OK;
} static SegLibClientID GetNextClientID()
{
    return( (SegLibClientID)++iClientMax );
} static SegLibSegmentID GetNextSegmentID()
{
    return( (SegLibSegmentID)++iSegmentMax );
}

STATIC enum ERC VerifyClientID( SegLibClientID clientID )
{
    MutexTake( mtxSegLibClients );
    if( SVListSearch( &svSegLibClients, (void *)clientID,
        NULL ) != E_OK )
        {
        MutexGive( mtxSegLibClients );
        return( SetupError( E_CANT_FIND_S_I, "Client", clientID ) );
        }
    MutexGive( mtxSegLibClients );
    return E_OK;
}

STATIC enum ERC NotifyCallbacks( SegLibSegmentID segmentID, TY_CALLBACK_ACTION
    tyAction )
{
    uint            i;
    SEG_LIB_CLIENT *  pClient;

MutexTake( mtxSegLibClients );
    for( i = 0; i < svSegLibClients.nItems; i++ )
        {
        if( ( pClient = (SEG_LIB_CLIENT *)SVListGetItemPtr( &svSegLibClients,
            i ) ) == NULL )
            {
            MutexGive( mtxSegLibClients );
            return ReLogError();
            }
        if( pClient->pfnCallback != NULL )
            CK_LOG( pClient->pfnCallback( pClient->clientID, segmentID,
                pClient->pClientData, tyAction ) );
        }
    MutexGive( mtxSegLibClients );
    return E_OK;
}
```

```
STATIC boolean QualifierMatch( SEG_LIB_QUERY_ELEMENT * pQueryElement,
    SEG_LIB_SEGMENT * pSegment )
{
    sint    cmpResult;

switch( pQueryElement->tyQualifier )
        {
        case QUALIFIER_REEL_NAME:
            .return( strcmp( pQueryElement->QueryQualifier.pReelName,
                pSegment->pReelName ) == 0 );
            break;
        case QUALIFIER_START_TC:
            if( pQueryElement->QueryQualifier.tcStart.fUndef == TC_UNDEF )
                return( TRUE );
            CK_LOG( TcCmp( &pQueryElement->QueryQualifier.tcStart,
                &pSegment->tcStart, &cmpResult ) );
            return( cmpResult == CMP_EQUAL );
            break;
        case QUALIFIER_END_TC:
            if( pQueryElement->QueryQualifier.tcEnd.fUndef == TC_UNDEF )
                return( TRUE );
            CK_LOG( TcCmp( &pQueryElement->QueryQualifier.tcEnd,
                &pSegment->tcEnd, &cmpResult ) );
            return( cmpResult == CMP_EQUAL );
            break;
        case QUALIFIER_ENCLOSING_TC:
            if( pQueryElement->QueryQualifier.tcEnclosing.fUndef == TC_UNDEF )
                return( TRUE );
            CK_LOG( TcCmp( &pQueryElement->QueryQualifier.tcEnclosing,
                &pSegment->tcStart, &cmpResult ) );
            if( cmpResult == CMP_LESS )
                return( FALSE );
            CK_LOG( TcCmp( &pQueryElement->QueryQualifier.tcEnclosing,
                &pSegment->tcEnd, &cmpResult ) );
            return( cmpResult != CMP_GREATER );
            break;
        case QUALIFIER_CH_MASK:
            return( pQueryElement->QueryQualifier.lChMask ==
                pSegment->lChMask );
            break;
        case QUALIFIER_KEYWD:
            return( FALSE );
            break;
        case QUALIFIER_PICTURE_TYPE:
            switch( pQueryElement->QueryQualifier.PictType.tyPicture )
                {
                default:
                case SEG_LIB_TY_PICUTRE_HEAD_PICTURE:
                    return( pSegment->aHeadPictures[ pQueryElement->
```

```
                            QueryQualifier.PictType.iPictSize].pHandle
                            != VFILE_NONE );
                    break;
                }
            break;
            case QUALIFIER_SEGMENT_TYPE:
                return( ( pQueryElement->QueryQualifier.tySegment &
                    pSegment->tySegment ) ==
                    pQueryElement->QueryQualifier.tySegment );
                -break;
            default:
                break;
            }
        return( FALSE );
    }

STATIC boolean QueryASegment( SVLIST * psvQueryElements,
            SEG_LIB_SEGMENT * pSegment )
    {
        SEG_LIB_QUERY_ELEMENT * pQuery;
        boolean                 fStatus;
        boolean                 fMatched;
        uint                    iQuery;

fMatched = FALSE;
        fStatus = FALSE;
        for( iQuery = 0; iQuery < psvQueryElements->nItems; iQuery++ )
            {
            fStatus = FALSE;
            if( ( pQuery = (SEG_LIB_QUERY_ELEMENT *)SVListGetItemPtr(
                psvQueryElements, iQuery ) ) == NULL )
                {
                ReLogError();
                return( FALSE );
                }
            if( QualifierMatch( pQuery, pSegment ) )
                fMatched = TRUE;
            if( pQuery->Action == CONSTRAIN_QUALIFIER )
                {
                if( !fMatched )
                    break;
                else
                    {
                    fStatus = TRUE;
                    fMatched = FALSE;
                    }
                }
            }
        return( fStatus );
    }
```

```
STATIC void SegLibInit()
{
    if( !fModuleInit )
    {
        CK_LOG( SVListInit( &svSegLibClients, ClientIDCmp,
            ClientIDSearch, sizeof( SEG_LIB_CLIENT ) ) );

CK_LOG( SVListInit( &svSegLibSegments, SegmentIDCmp,
            SegmentIDSearch, sizeof( SEG_LIB_SEGMENT ) ) );

CK_LOG( SVListInit( &svSegLibVFiles, NULL,
            NULL, sizeof( SEG_LIB_VFILE ) ) );

if( ( mtxSegLibClients = MutexCreate() ) == 0 )
            LogError( errnoGet() );
        if( ( mtxSegLibSegments = MutexCreate() ) == 0 )
            LogError( errnoGet() );

fModuleInit = TRUE;

CK_LOG( SegLibGetVFiles() );

}
}

/*- VIDEO
 * SegLibAddFileToSegDBase()
 * Upon initialization, the Segment Librarian will attempt to open all
 * VFiles it thinks it needs for the current session. Once the session is
 * running, if another application creates a new VFile, and wants to
 * notify the Librarian of its existance, it must call this function,
 * otherwise the Librarian will not see the file.
 * Returns:    Error code, E_OK on success.
 */
enum ERC SegLibAddFileToSegDBase( char * pFileName )
{
    SEG_LIB_VFILE     newVFile;
    SEG_LIB_SEGMENT   Segment;
    SEG_LIB_SEGMENT   *pSegment;
    VFILE_SEG_INFO    vfInfo;
    char              acComments[SEG_LIB_COMMENT_SIZE];
    uint16            iMaxNumberOfPictures;
    uint              iSlot;
    uint              iSeg;
    sint              cmpResult;
    uint              i;
```

```
if( glDebugSegLib & DEBUG_SEG_LIB_ADD )
    LogMsg("Adding File %s to Segment Library", pFileName );
if( ( newVFile.pHandle = VFileOpen( pFileName ) ) == VFILE_NONE )
    return E_OK;
newVFile.fFull = FALSE;
CK_LOG( VFileGetInfo( newVFile.pHandle, &newVFile.iPictureSize,
    &iMaxNumberOfPictures, &newVFile.fComments, &newVFile.fVideo,
    NULL, 0, NULL, 0 ) );
CK_LOG( SVListAdd( &svSegLibVFiles, &newVFile ) );
/* Add all the slots for this file to segment database */
MutexTake( mtxSegLibSegments );
for( iSlot = 0; iSlot < iMaxNumberOfPictures; iSlot++ )
{
    if( VFileGetSlotInfo( newVFile.pHandle, iSlot, &vfInfo,
            acComments, SEG_LIB_COMMENT_SIZE ) != E_OK )
    {
        continue;
    }
    if( vfInfo.Time1.tyTime == TIME_TYPE_EMPTY )
        continue;
    if( vfInfo.Time1.Time.tcPicture.fUndef == TC_UNDEF )
        continue;
    /* Check to see if segment already exists */
    for( iSeg = 0; iSeg < svSegLibSegments.nItems; iSeg++ )
    {
        if( ( pSegment = (SEG_LIB_SEGMENT *)SVListGetItemPtr(
                &svSegLibSegments, iSeg ) ) == NULL )
        {
            MutexGive( mtxSegLibSegments );
            return ReLogError();
        }
        if( strcmp( vfInfo.acReelName, pSegment->pReelName ) != 0 )
            continue;
        if( vfInfo.Time1.tyTime != TIME_TYPE_TIMECODE )
            continue;
        CK_LOG( TcCmp( &vfInfo.Time1.Time.tcPicture, &pSegment->tcStart,
            &cmpResult ) );
        if( cmpResult != CMP_EQUAL )
            continue;
        if( vfInfo.tyPicture == VFILE_TY_PICTURE_HEAD)
        {
            pSegment->aHeadPictures[vfInfo.iPictureSize].pHandle
                = newVFile.pHandle;
            pSegment->aHeadPictures[vfInfo.iPictureSize].iSlotNumber
                = iSlot;
            if( glDebugSegLib & DEBUG_SEG_LIB_ADD )
                LogMsg("Adding Head Picture Size %d for segment %d",
                    vfInfo.iPictureSize, pSegment->segmentID );
        }
        if( vfInfo.tyPicture == VFILE_TY_PICTURE_TAIL )
```

```
            {
            pSegment->aTailPictures[vfInfo.iPictureSize].pHandle
                = newVFile.pHandle;
            pSegment->aTailPictures[vfInfo.iPictureSize].iSlotNumber
                = iSlot;
            if( glDebugSegLib & DEBUG_SEG_LIB_ADD )
                LogMsg("Adding Tail Picture Size %d for segment %d",
                    vfInfo.iPictureSize, pSegment->segmentID );
            }
        MutexGive( mtxSegLibSegments );
        return E_OK;
        }
    if( iSeg < svSegLibSegments.nItems )
        continue;
    /* Segment not found, this must be a new one */
    Segment.segmentID = GetNextSegmentID();
    Segment.tcStart = vfInfo.Time1.Time.tcPicture;
    Segment.tcEnd = vfInfo.Time2.Time.tcPicture;
    CK_LOG( TcAddLong( &vfInfo.Time1.Time.tcPicture,
        (sint32)vfInfo.lnFields, &Segment.tcEnd ) );
    Segment.lChMask = vfInfo.lChMask;
    Segment.tySegment = vfInfo.tySegment;
    if( vfInfo.acReelName[0] == '\0' )
        Segment.pReelName = NULL;
    else
        Segment.pReelName = DupString( vfInfo.acReelName );
    Segment.iEnode = I_ENODE_NONE;
    Segment.iRev = I_REV_NONE;
    if( acComments[0] == '\0' )
        Segment.pComments = NULL;
    else
        Segment.pComments = DupString( acComments );

for( i = 0; i < N_PICT_SIZES; i++ )
        {
        Segment.aHeadPictures[i].pHandle = VFILE_NONE;
        Segment.aTailPictures[i].pHandle = VFILE_NONE;
        }
    if( vfInfo.tyPicture == VFILE_TY_PICTURE_HEAD )
        {
        Segment.aHeadPictures[vfInfo.iPictureSize].pHandle
            = newVFile.pHandle;
        Segment.aHeadPictures[vfInfo.iPictureSize].iSlotNumber
            = iSlot;
        }
    if( vfInfo.tyPicture == VFILE_TY_PICTURE_TAIL )
        {
        Segment.aTailPictures[vfInfo.iPictureSize].pHandle
            = newVFile.pHandle;
        Segment.aTailPictures[vfInfo.iPictureSize].iSlotNumber
```

```
                        = iSlot;
                }
            if( glDebugSegLib & DEBUG_SEG_LIB_ADD )
                LogMsg("Adding New Segment %d", Segment.segmentID );
            CK_LOG( SVListAdd( &svSegLibSegments, &Segment ) );
            }
        MutexGive( mtxSegLibSegments );
        return E_OK;
} enum ERC SegLibShow()
{
    uint             iSeg;
    SEG_LIB_SEGMENT  *pSegment;
    char             acTemp[120];
    uint             i;

printf( "SegID    TcStart        TcEnd        ReelName Comments\n" );
    printf( "---------------------------------------------------------\n" );
    for( iSeg = 0; iSeg < svSegLibSegments.nItems; iSeg++ )
        {
        if( ( pSegment = (SEG_LIB_SEGMENT *)SVListGetItemPtr(
            &svSegLibSegments, iSeg ) ) == NULL )
            {
            return ReLogError();
            }
        StrNPrintf( acTemp, 120,
            " %03d    %0t    %0t    %s    %s", pSegment->segmentID,
            &pSegment->tcStart, &pSegment->tcEnd, pSegment->pReelName,
            pSegment->pComments );
        printf( "%s\n", acTemp );
        for( i = 0; i < N_PICT_SIZES; i++ )
            {
            if( pSegment->aHeadPictures[i].pHandle != VFILE_NONE )
                printf( "        Size %d %d %d\n", i,
                    pSegment->aHeadPictures[i].pHandle,
                    pSegment->aHeadPictures[i].iSlotNumber );
            }
        for( i = 0; i < N_PICT_SIZES; i++ )
            {
            if( pSegment->aTailPictures[i].pHandle != VFILE_NONE )
                printf( "        Size %d %d %d\n", i,
                    pSegment->aTailPictures[i].pHandle,
                    pSegment->aTailPictures[i].iSlotNumber );
            }
        } return E_OK;
}
```

```
enum ERC SegLibGetVFiles()
{
    SVLIST         svListOfNames;
    uint           i;
    char *         pName;

#if 0
    CHECK_MODULE_INIT
#endif

CK_LOG( VFileGetListOfAllVFiles( "/sys/markfile", &svListOfNames ) );
    for( i = 0; i < svListOfNames.nItems; i++ )
        {
        if( ( pName = (char *)SVListGetItemPtr( &svListOfNames, i ) ) == NULL )
            {
            continue;
            }
        CK_LOG( SegLibAddFileToSegDBase( pName ) );
        }
    return E_OK;
}

/*- VIDEO
 * SegLibClientCreate()
 * This function will register the named client with the Segment Librarian.
 * The supplied call-back, with client data, will be called whenever
 * a segment changes.
 * Returns:   The client ID.
 */
SegLibClientID SegLibClientCreate( char * pClientName,
    pfnSegLibSegChanged pfnCallback, void * pClientData )
{
    SEG_LIB_CLIENT  Client;

CHECK_MODULE_INIT

Client.pClientName = DupString( pClientName );
    Client.clientID = GetNextClientID();
    Client.pfnCallback = pfnCallback;
    Client.pClientData = pClientData;

if( glDebugSegLib & DEBUG_SEG_LIB_ADD )
        LogMsg("Client %d Added", Client.clientID );
    MutexTake( mtxSegLibClients );
    CK_LOG( SVListAdd( &svSegLibClients, &Client ) );
    MutexGive( mtxSegLibClients );

return( Client.clientID );
}
```

```c
/*- VIDEO
 * SegLibDiscardClient()
 * This function will remove this client from the list of clients. Any
 * picture transfers pending upon this client will be canceled.
 * Returns:   Error code, E_OK on success.
 */
enum ERC SegLibDiscardClient( SegLibClientID clientID )
{
    CHECK_MODULE_INIT return E_NOT_IMPLEMENTED;
}

/*- VIDEO
 * SegLibGetSegmentInfo()
 * This function will return information about the indicated segment in
 * the user supplied SEG_LIB_ITEM structure. pSegItem must be non-NULL.
 * Returns:   Error code, E_OK on success, and pSegItem.
 */
enum ERC SegLibGetSegmentInfo( SegLibClientID clientID,
    SegLibSegmentID segmentID, SEG_LIB_ITEM * pSegItem, char * pCommentBuff,
    uint sCommentBuff )
{
    SEG_LIB_SEGMENT *   pSegment;
    enum ERC            erc;

CHECK_MODULE_INIT

CK_E( VerifyClientID( clientID ) );
    if( glDebugSegLib & DEBUG_SEG_LIB_ADD )
        LogMsg("Getting Segment Info for %d", segmentID );
    MutexTake( mtxSegLibSegments );
    if( SVListSearch( &svSegLibSegments, (void *)segmentID,
            (void **)&pSegment ) != E_OK )
    {
        MutexGive( mtxSegLibSegments );
        return ReLogError();
    }
    if( pCommentBuff != NULL )
    {
        StrNCopy( pCommentBuff, pSegment->pComments, sCommentBuff,
            TERMINATE );
    }
    if( pSegItem != NULL )
        CK_LOG( FillSegLibItem( pSegItem, pSegment ) );
    MutexGive( mtxSegLibSegments );
    return E_OK;
```

}
```
/*- VIDEO
 * SegLibAddNewSegment( )
 * This function will add a new segment to the segment database using the
 * SEG_LIB_ITEM structure. If pMem is non NULL, then the picture pointed
 * to by pMem will be added to the segment under the appropriate size
 * and type specified by iPictSize, and tyPicture. For now we will say
 * that tyPicture, and iPictSize must be defined, later this restriction
 * may be relaxed.
 * Returns:    Error code, E_OK on success, and psegmentID
 */
enum ERC SegLibAddNewSegment( SegLibClientID clientID,
    SegLibSegmentID * psegmentID, SEG_LIB_ITEM * pSegItem, uint8 * pMem,
    SEG_LIB_PICTURE_TYPE tyPicture, uint iPictSize,  char * pComments )
{
    SEG_LIB_SEGMENT     Segment;
    enum ERC            erc;
    SLOT_NUMBER         iSlotNumber;
    VFile               pHandle;
    VFILE_SEG_INFO      vfInfo;
    uint                i;

CHECK_MODULE_INIT

CK_E( VerifyClientID( clientID ) );

if( pSegItem == NULL )
        return LogError( E_BAD_PTR );
    if( pSegItem->tcStart.fUndef == TC_UNDEF )
        return LogError( E_TC_UNDEF );

/* Find an Empty Slot in a VFile */
    CK_E( GetAnEmptySlotInAVFile( MUST_HAVE, MUST_HAVE, iPictSize,
            &pHandle, &iSlotNumber ) );
    CK_LOG( FillVFileInfoSt( &vfInfo, pSegItem, tyPicture, iPictSize,
            ( pMem != NULL) ) );
    CK_E( VFileWriteSlot( pHandle, iSlotNumber, pMem, iPictSize, &vfInfo,
            pComments ) );

/* Now add segment to list of segments */
    Segment.segmentID = GetNextSegmentID();
    Segment.tcStart = pSegItem->tcStart;
    Segment.tcEnd = pSegItem->tcEnd;
    Segment.lChMask = pSegItem->lChMask;
    Segment.tySegment = pSegItem->tySegment;
    Segment.pReelName = DupString( pSegItem->acReelName );
    Segment.iEnode = pSegItem->iEnode;
    Segment.iRev = pSegItem->iRev;
    if( pComments != NULL )
```

```
        Segment.pComments = DupString( pComments );
    else
        Segment.pComments = NULL;

for( i = 0; i < N_PICT_SIZES; i++ )
    {
        Segment.aHeadPictures[i].pHandle = VFILE_NONE;
        Segment.aTailPictures[i].pHandle = VFILE_NONE;
    } if( tyPicture == SEG_LIB_TY_PICUTRE_HEAD_PICTURE )
    {
        Segment.aHeadPictures[iPictSize].pHandle = pHandle;
        Segment.aHeadPictures[iPictSize].iSlotNumber = iSlotNumber;
    }
    else if( tyPicture == SEG_LIB_TY_PICUTRE_TAIL_PICTURE )
    {
        Segment.aTailPictures[iPictSize].pHandle = pHandle;
        Segment.aTailPictures[iPictSize].iSlotNumber = iSlotNumber;
    }

MutexTake( mtxSegLibSegments );
    if( SVListAdd( &svSegLibSegments, (void *)&Segment ) != E_OK )
    {
        MutexGive( mtxSegLibSegments );
        return ReLogError();
    }
    *psegmentID = Segment.segmentID;
    MutexGive( mtxSegLibSegments );
    if( glDebugSegLib & DEBUG_SEG_LIB_ADD )
        LogMsg("Adding New Segment %d", Segment.segmentID );
    CK_LOG( NotifyCallbacks( Segment.segmentID, ACTION_SEGMENT_ADDED ) );
    return E_OK;
}

/*- VIDEO
 * SegLibRedefineSegment()
 * This function will be used to overwrite information of an existing
 * segment. Any of the pointers may be NULL, thus signifying no change
 * to that part of the segment.If pSegItem is non-NULL, it will be
 * used to overwrite the segment data, except the SegLibSegmentID field within
 * the structure will be ignored. If pMem is non NULL, then the picture
 * pointed to by pMem will be added to the segment under the appropriate
 * size and type specified by iPictSize, and tyPicture. Clients will
 * be notified of this change through their pfnSegLibSegChanged callbacks.
 * Returns:   Error code, E_OK on success.
 */
enum ERC SegLibRedefineSegment( SegLibClientID clientID,
    SegLibSegmentID segmentID, SEG_LIB_ITEM * pSegItem, uint8 * pMem,
```

```
                    SEG_LIB_PICTURE_TYPE typPicture, uint iPictSize, char * pComments )
{
    VFILE_SEG_INFO        vfInfo;
    SEG_LIB_SEGMENT *     pSegment;
    enum ERC              erc;
    uint                  i;

CHECK_MODULE_INIT

CK_E( VerifyClientID( clientID ) );
    if( glDebugSegLib & DEBUG_SEG_LIB_ADD )
        LogMsg("Modifying Segment %d", segmentID );

if( pSegItem != NULL && pSegItem->tcStart.fUndef == TC_UNDEF )
        return LogError( E_TC_UNDEF );
    MutexTake( mtxSegLibSegments );
    /* Since we are re-defineing, we must be able to find the
     * segment.
     */
    if( SVListSearch( &svSegLibSegments, (void *)segmentID,
            (void **)&pSegment ) != E_OK )
        {
        MutexGive( mtxSegLibSegments );
        return ReLogError();
        }
    if( pMem != NULL )
        {
        /* If a slot for this picture doesen't currently exist,
         * make one. Then overwrite the picture.
         */
        if( typPicture == SEG_LIB_TY_PICUTRE_HEAD_PICTURE )
            {
            if( pSegment->aHeadPictures[iPictSize].pHandle == VFILE_NONE )
                {
                if( GetAnEmptySlotInAVFile( MUST_HAVE, MUST_HAVE, iPictSize,
                        &pSegment->aHeadPictures[iPictSize].pHandle,
                        &pSegment->aHeadPictures[iPictSize].iSlotNumber ) != E_OK )
                    {
                    MutexGive( mtxSegLibSegments );
                    return ReLogError();
                    }
                }
            if( VFileGetSlotInfo( pSegment->aHeadPictures[iPictSize].pHandle,
                    pSegment->aHeadPictures[iPictSize].iSlotNumber, &vfInfo,
                    NULL, 0 ) != E_OK )
                {
                MutexGive( mtxSegLibSegments );
                return ReLogError();
                }
            vfInfo.fPictureExists = TRUE;
```

```
            if( VFileWriteSlot(
                    pSegment->aHeadPictures[iPictSize].pHandle,
                    pSegment->aHeadPictures[iPictSize].iSlotNumber,
                    pMem, iPictSize, &vfInfo, NULL ) != E_OK )
            {
                MutexGive( mtxSegLibSegments );
                return ReLogError();
            }
        }
        if( tyPicture == SEG_LIB_TY_PICUTRE_TAIL_PICTURE )
        {
            if( pSegment->aTailPictures[iPictSize].pHandle == VFILE_NONE )
            {
                if( GetAnEmptySlotInAVFile( MUST_HAVE, MUST_HAVE, iPictSize,
                    &pSegment->aTailPictures[iPictSize].pHandle,
                    &pSegment->aTailPictures[iPictSize].iSlotNumber ) != E_OK )
                {
                    MutexGive( mtxSegLibSegments );
                    return ReLogError();
                }
            }
            if( VFileGetSlotInfo( pSegment->aHeadPictures[iPictSize].pHandle,
                pSegment->aHeadPictures[iPictSize].iSlotNumber, &vfInfo,
                NULL, 0 ) != E_OK )
            {
                MutexGive( mtxSegLibSegments );
                return ReLogError();
            }
            vfInfo.fPictureExists = TRUE;
            if( VFileWriteSlot(
                    pSegment->aTailPictures[iPictSize].pHandle,
                    pSegment->aTailPictures[iPictSize].iSlotNumber,
                    pMem, iPictSize, NULL, NULL ) != E_OK )
            {
                MutexGive( mtxSegLibSegments );
                return ReLogError();
            }
        }
    }
    if( pSegItem != NULL || pComments != NULL )
    {
        for( i = 0; i < N_PICT_SIZES; i++ )
        {
            if( pSegment->aHeadPictures[i].pHandle != VFILE_NONE )
            {
                if( pSegItem != NULL )
                {
                    if( VFileGetSlotInfo( pSegment->aHeadPictures[i].pHandle,
                        pSegment->aHeadPictures[i].iSlotNumber, &vfInfo,
                        NULL, 0 ) != E_OK )
```

```
                        {
                        MutexGive( mtxSegLibSegments );
                        return ReLogError();
                        }
                    CK_LOG( FillVFileInfoSt( &vfInfo, pSegItem,
                        SEG_LIB_TY_PICUTRE_HEAD_PICTURE, i,
                        vfInfo.fPictureExists ) );
                    }
                if( VFileWriteSlot( pSegment->aHeadPictures[i].pHandle,
                    pSegment->aHeadPictures[i].iSlotNumber, NULL, i,
                    ( pSegItem == NULL ? NULL : &vfInfo ), pComments ) != E_OK )
                    {
                    MutexGive( mtxSegLibSegments );
                    return ReLogError();
                    }
                }
            if( pSegment->aTailPictures[i].pHandle != VFILE_NONE )
                {
                if( pSegItem != NULL )
                    {
                    if( VFileGetSlotInfo( pSegment->aTailPictures[i].pHandle,
                        pSegment->aTailPictures[i].iSlotNumber, &vfInfo,
                        NULL, 0 ) != E_OK )
                        {
                        MutexGive( mtxSegLibSegments );
                        return ReLogError();
                        }
                    CK_LOG( FillVFileInfoSt( &vfInfo, pSegItem,
                        SEG_LIB_TY_PICUTRE_TAIL_PICTURE, i,
                        vfInfo.fPictureExists ) );
                    }
                if( VFileWriteSlot( pSegment->aTailPictures[i].pHandle,
                    pSegment->aTailPictures[i].iSlotNumber, NULL, i,
                    ( pSegItem == NULL ? NULL : &vfInfo ), pComments ) != E_OK )
                    {
                    MutexGive( mtxSegLibSegments );
                    return ReLogError();
                    }
                }
            }
        }
/* Now Modify segment */
if( pSegItem != NULL )
    {
    pSegment->tcStart = pSegItem->tcStart;
    pSegment->tcEnd = pSegItem->tcEnd;
    pSegment->lChMask = pSegItem->lChMask;
    pSegment->tySegment = pSegItem->tySegment;
    if( pSegment->pReelName != NULL )
        FreeString( pSegment->pReelName );
```

```
        pSegment->pReelName = DupString( pSegItem->acReelName );
        pSegment->iEnode = pSegItem->iEnode;
        pSegment->iRev = pSegItem->iRev;
        }
    if( pComments != NULL )
        {
        if( pSegment->pComments != NULL )
            FreeString( pSegment->pComments );
        pSegment->pComments = DupString( pComments );
        }
    MutexGive( mtxSegLibSegments );
    CK_LOG( NotifyCallbacks( segmentID, ACTION_SEGMENT_MODIFIED ) );
    return E_OK;
}

/*- VIDEO
 * SegLibGetPictureForSegment()
 * This function will transfer the video picture for the indicated segment
 * to video output memory. If a picture of the right size and type
 * for the segment does not exist this function will return an error.
 * Because of limited picture transfer bandwidth, requests will be placed in
 * a queue at the VFile Module level, and handled in order by the VFile Task.
 * When it is determined the picture has finally reached video output
 * memory, the VFile Module will notify the Librarian, and only the client
 * that requested the transfer will be notified through his
 * pfnSegLibSegChanged callback.
 * Returns:    Error code, E_OK on success.
 */
enum ERC SegLibGetPictureForSegment( SegLibClientID clientID,
    SegLibSegmentID segmentID, SEG_LIB_PICTURE_TYPE tyPicture, uint iPictSize,
    uint8 * pVOMem )
{
    SEG_LIB_SEGMENT *    pSegment;
    enum ERC             erc;

CHECK_MODULE_INIT

CK_E( VerifyClientID( clientID ) );
    if( glDebugSegLib & DEBUG_SEG_LIB_ADD )
        LogMsg("Requesting picture for Segment %d", segmentID );
    MutexTake( mtxSegLibSegments );
    if( SVListSearch( &svSegLibSegments, (void *)segmentID,
            (void **)&pSegment ) != E_OK )
        {
        MutexGive( mtxSegLibSegments );
        return ReLogError();
        }
    if( tyPicture == SEG_LIB_TY_PICUTRE_HEAD_PICTURE )
        {
```

```
            if( pSegment->aHeadPictures[iPictSize].pHandle == VFILE_NONE )
            {
                MutexGive( mtxSegLibSegments );
                return LogError( E_SOFTWARE, "Picture Not Available" );
            }
            if( VFileRequestTransfer( pSegment->aHeadPictures[iPictSize].pHandle,
                pSegment->aHeadPictures[iPictSize].iSlotNumber,
                pVOMem, SegLibTransferComplete,
                (void *)VFILE_CLIENT_LIBRARIAN, (void *)clientID,
                (void *)segmentID ) != E_OK )
            {
                MutexGive( mtxSegLibSegments );
                return ReLogError();
            }
        }
        else if( tyPicture == SEG_LIB_TY_PICUTRE_TAIL_PICTURE )
        {
            if( pSegment->aTailPictures[iPictSize].pHandle == VFILE_NONE )
            {
                MutexGive( mtxSegLibSegments );
                return LogError( E_SOFTWARE, "Picture Not Available" );
            }
            if( VFileRequestTransfer( pSegment->aTailPictures[iPictSize].pHandle,
                pSegment->aTailPictures[iPictSize].iSlotNumber,
                pVOMem, SegLibTransferComplete,
                (void *)VFILE_CLIENT_LIBRARIAN, (void *)clientID,
                (void *)segmentID ) != E_OK )
            {
                MutexGive( mtxSegLibSegments );
                return ReLogError();
            }
        }
        else
        {
            MutexGive( mtxSegLibSegments );
            return LogError( E_SOFTWARE, "Picture Not Available" );
        }

MutexGive( mtxSegLibSegments );
        return E_OK;
    }
    /*- VIDEO
     * SegLibCancelPictureForSegment()
     * This function will attempt to cancel the transfer request associated with
     * a SegLibGetPictureForSegment call. Since the transfer requests are pending
     * in a VFile Module queue it is possible to cancel them up to a certain
     * point. If the cancel is unsuccessful, fSuccess will be FALSE, and the
     * caller will be notified when the tranfer is complete through his
     * pfnSegLibSegChanged callback.
```

```
 *  Returns:    Error code, E_OK on success, fSuccess has state of cancel.
 */
enum ERC SegLibCancelPictureForSegment( SegLibClientID clientID,
    SegLibSegmentID segmentID, SEG_LIB_PICTURE_TYPE tyPicture, uint iPictSize,
    boolean * pfSuccess )
{
    SEG_LIB_SEGMENT *   pSegment;
    enum ERC            erc;

CHECK_MODULE_INIT

*pfSuccess = FALSE;
    CK_E( VerifyClientID( clientID ) );
    if( glDebugSegLib & DEBUG_SEG_LIB_ADD )
        LogMsg("Canceling picture request for Segment %d", segmentID );
    MutexTake( mtxSegLibSegments );
    if( SVListSearch( &svSegLibSegments, (void *)segmentID,
            (void **)&pSegment ) != E_OK )
        {
        MutexGive( mtxSegLibSegments );
        return ReLogError();
        }
    if( tyPicture == SEG_LIB_TY_PICUTRE_HEAD_PICTURE )
        {
        if( pSegment->aHeadPictures[iPictSize].pHandle == VFILE_NONE )
            {
            MutexGive( mtxSegLibSegments );
            return LogError( E_SOFTWARE, "Picture Not Available" );
            }
        CK_LOG( VFileCancelFromTransferQueue(
            pSegment->aHeadPictures[iPictSize].pHandle,
            pSegment->aHeadPictures[iPictSize].iSlotNumber,
            SegLibTransferCmp, (void *)VFILE_CLIENT_LIBRARIAN,
            (void *)clientID, pfSuccess ) );
        } if( tyPicture == SEG_LIB_TY_PICUTRE_TAIL_PICTURE )
        {
        if( pSegment->aTailPictures[iPictSize].pHandle == VFILE_NONE )
            {
            MutexGive( mtxSegLibSegments );
            return LogError( E_SOFTWARE, "Picture Not Available" );
            }
        CK_LOG( VFileCancelFromTransferQueue(
            pSegment->aTailPictures[iPictSize].pHandle,
            pSegment->aTailPictures[iPictSize].iSlotNumber,
            SegLibTransferCmp, (void *)VFILE_CLIENT_LIBRARIAN,
            (void *)clientID, pfSuccess ) );
        }
```

```
        MutexGive( mtxSegLibSegments );
        return E_OK;
}

/*- VIDEO
 * SegLibQuerySegments()
 * This function will see if the given segment matches the given
 * segment query criteria.
 * Returns:    Error code, E_OK on success, status of query in fStatus.
 */
enum ERC SegLibQueryASegment( SegLibClientID clientID,
     SVLIST * psvQueryElements, SegLibSegmentID segmentID, boolean * fStatus )
{
        enum ERC                erc;
        SEG_LIB_SEGMENT *       pSegment;

CHECK_MODULE_INIT

*fStatus = FALSE;
        CK_E( VerifyClientID( clientID ) );
        if( glDebugSegLib & DEBUG_SEG_LIB_ADD )
            LogMsg("Querying A Segment %d", segmentID );

MutexTake( mtxSegLibSegments );
        if( SVListSearch( &svSegLibSegments, (void *)segmentID,
                (void **)&pSegment ) != E_OK )
        {
            MutexGive( mtxSegLibSegments );
            return ReLogError();
        }
        *fStatus = QueryASegment( psvQueryElements, pSegment );
        MutexGive( mtxSegLibSegments );
        return E_OK;
}

/*- VIDEO
 * SegLibQuerySegments()
 * This function will query the database of segments managed by the Librarian,
 * and check for ones that match this query. The caller assembles an SVLIST
 * of SEG_LIB_QUERY_ELEMENT structures. Each element of the list defines
 * a search criteria in the QUALIFIER field. The QUALIFIER_TYPE field
 * indicates if the qualifier should be used to constrain the current set
 * or whether this qualifier should be included with the one that came
 * before it. The matching segment data will be returned in an svlist
 * of SEG_LIB_ITEM structures, and the comments associated with the data
 * may optionally be returned in an svlist of char arrays.
 * Returns:    Error code, E_OK on success, and list of matching segments
 *             in pSegItem.
 */
```

```
enum ERC SegLibQuerySegments( SegLibClientID clientID,
    SVLIST * psvQueryElements, SVLIST * psvSegItems, SVLIST * psvComments )
{
    SEG_LIB_SEGMENT *       pSegment;
    SEG_LIB_ITEM            SegItem;
    enum ERC                erc;
    uint                    iSeg;
    char                    acComments[SEG_LIB_COMMENT_SIZE];

CHECK_MODULE_INIT

CK_E( VerifyClientID( clientID ) );
    if( glDebugSegLib & DEBUG_SEG_LIB_ADD )
        LogMsg("Querying Segments " );
    CK_LOG( SVListInit( psvSegItems, NULL, NULL, sizeof( SEG_LIB_ITEM ) ) );
    if( psvComments != NULL )
        CK_LOG( SVListInit( psvComments, NULL, NULL, sizeof( acComments ) ) );
    MutexTake( mtxSegLibSegments );

for( iSeg = 0; iSeg < svSegLibSegments.nItems; iSeg++ )
    {
        if( ( pSegment = (SEG_LIB_SEGMENT *)SVListGetItemPtr(
            &svSegLibSegments, iSeg ) ) == NULL )
        {
            MutexGive( mtxSegLibSegments );
            return ReLogError();
        }
        if( QueryASegment( psvQueryElements,  pSegment ) )
        {
            if( psvComments != NULL )
            {
                if( pSegment->pComments == NULL )
                    acComments[0] = '\0';
                else
                    StrNCopy( acComments, pSegment->pComments,
                        SEG_LIB_COMMENT_SIZE, TERMINATE );
                CK_LOG( SVListAdd( psvComments, acComments ) );
            }
            CK_LOG( FillSegLibItem( &SegItem, pSegment ) );
            CK_LOG( SVListAdd( psvSegItems, &SegItem ) );
        }
    }
    MutexGive( mtxSegLibSegments );
    return E_OK;
} enum ERC SegLibGetSegmentsbyEditSeg( SegLibClientID clientID,
    I_ENODE iEnode, I_REV iRev, SVLIST * psvSegItems, SVLIST * psvComments )
{
```

```
    enum ERC                    erc = E_OK;
    I_ENODE                     iClip;
    I_REV                       iRevClip;
    SVLIST                      svQuery;
    SEG_LIB_QUERY_ELEMENT       Query;
    char                        acClipName[ SEG_LIB_REEL_NAME_LENGTH ];

CK_LOG( SVListInit( &svQuery, NULL, NULL,
            sizeof( SEG_LIB_QUERY_ELEMENT ) ) );

CK_E( EditSegGetSrc( iEnode, iRev, &iClip, &iRevClip ) );
    if( EnodeGetName( iClip, iRevClip, acClipName, SEG_LIB_REEL_NAME_LENGTH )
        == NULL )
        return ReLogError();
    Query.QueryQualifier.pReelName = DupString( acClipName );
    Query.Action = CONSTRAIN_QUALIFIER;
    Query.tyQualifier = QUALIFIER_REEL_NAME;
    CK_LOG( SVListAdd( &svQuery, &Query ) );

CK_E( EnodeGetSrcEntry( iEnode, iRev, iClip, iRevClip, CH_ANY,
            &Query.QueryQualifier.tcEnclosing, NULL, NULL ) );
    Query.Action = CONSTRAIN_QUALIFIER;
    Query.tyQualifier = QUALIFIER_ENCLOSING_TC;
    CK_LOG( SVListAdd( &svQuery, &Query ) );

CK_E( EnodeGetSrcExit( iEnode, iRev, iClip, iRevClip, CH_ANY,
            &Query.QueryQualifier.tcEnclosing, NULL, NULL, NULL ) );
    Query.Action = CONSTRAIN_QUALIFIER;
    Query.tyQualifier = QUALIFIER_ENCLOSING_TC;
    CK_LOG( SVListAdd( &svQuery, &Query ) );

CK_E( SegLibQuerySegments( clientID, &svQuery, psvSegItems,
            psvComments ) );

return E_OK;
} enum ERC SegLibSetTySegmentMask( uint32 * tySegment,
        SEG_LIB_SEGMENT_TYPE iType, boolean fSetOn )
{
    uint16                      iMask;

if( iType > SEG_LIB_SEGMENT_TYPE_MAX )
        return LogError(E_SOFT_S_I, "Illegal Segment Type Value", iType );
    iMask = SegTypeMask[iType];
    if( fSetOn )
        *tySegment |= iMask;
    else
        *tySegment &= ~iMask;
```

```
        return E_OK;
} enum ERC SegLibQueryTySegmentMask( uint32 tySegment,
        SEG_LIB_SEGMENT_TYPE iType, boolean * fIsOn )
{
    uint16              iMask;

if( iType > SEG_LIB_SEGMENT_TYPE_MAX )
        return LogError(E_SOFT_S_I, "Illegal Segment Type Value", iType );
    iMask = SegTypeMask[iType];

if( ( tySegment & iMask ) == iMask )
        *fIsOn = TRUE;
    else
        *fIsOn = FALSE;

return E_OK;
}
```

```
/*
 * <@(#) vwin.c 1.15@(#), 05/27/92 11:54:26>
 * Copyright (C) 1992 Axial Corporation
 */ include "ax_types.h"
include "attrib.h"
#include "error.h"
#include "stdlib.h"
#include "video.h"
#include "vxproto.h"
#include "filesFn.h"
#include "task.h"
#include "pipe.h"
#include "vxsem.h"
#include "vmem.h"
#include "mutex.h"
#include "ax_string.h"
#include "qfile.h"
#include "timecode.h"
#include "svlist.h"
#include "vfile.h"
#include "debug_pipe.h"
#include "session.h"
#include "speed.h"
#include "vwin.h"
#include "vwin_bdmgr.h"
#include "vomem.h"

#include "../scsi/sys/drvformat.h"

define MAX_FILENAME_SIZE    80 define VFILE_VERIFY( vf )  (if( (vf) == VFILE_NONE ) \
                                return LogError( E_BAD_PTR );)

#define VFILE_PICTURE_SIZE_IN_BYTES(size, type) (( type == NTSC_VIDEO ) ?\
    (2 * viewWidthAndHeightNTSC[size][0] * viewWidthAndHeightNTSC[size][1]) :\
    (2 * viewWidthAndHeightPAL[size][0] * viewWidthAndHeightPAL[size][1]))

#define NO_COMMENT       -1
define NO_VIDEO         -1 define    DEBUG_VFILE_TASK    0x0001 typedef struct
{
    PICTURE_TIME    Time;
```

```
    PICTURE_TIME    RefTime;
    uint8           tyTime;
    uint8           tyRefTime;
    uint8           fPictureExists;
    char            acReelName[VFILE_REEL_NAME_LENGTH];
    uint32          lnFields;
    sint32          lSpeed;
    uint32          lChMask;
    uint8           tyClip;
    uint8           iReserved1;
    uint16          tySegment;
    uint32          iRunLength;
    uint32          iFileOffset;
    uint32          iReserved;
}VFILE_HEADER_ITEM;

/************** Stored in the SVList **************/
typedef struct
{
    VFILE_HEADER_ITEM   Header;
    uint32              iSlotNumber;
    char                *pComments;
}VFILE_HEADER;

typedef struct
{
    uint8   iPictureSize;       /* X8 X4 X2 X1 */
    uint8   iPictureType;       /* PAL or NTSC */
    uint16  iNumberOfPictures;
    sint32  iCommentOffset;
    sint32  iVideoOffset;
    uint32  iReserved;
    char    acSessionName[VFILE_SESSION_NAME_LENGTH];
}VFILE_CONTROL_BLOCK;

typedef struct
{
    VFILE_CONTROL_BLOCK     ControlBlock;
    SVLIST                  *psvList;  /* SVLIST of VFILE_HEADER */
    struct QFILE *          pQFile;
    MUTEX_ID                mtxAccess;
    boolean                 fEmpty[VFILE_NUMBER_OF_PICTURES];
}VFILE_FD;

#define VFILE_HEADER_OFFSET( NumPicts ) (sizeof(VFILE_CONTROL_BLOCK) +\
    (sizeof(VFILE_HEADER_ITEM) * NumPicts ))
```

```
/*
 * VFILE QUEUE ELEMENT Description.
 */ typedef struct
{
    VFILE_TY_REQUEST    tyRequest;
    boolean             fCancel;
    VFile               pHandle;
    SLOT_NUMBER         iSlotNumber;
    pfnVFileCallback    pfnActionComplete;
    void    *           pClientNumber;
    void    *           pClientID;
    void    *           pClientInfo;
}BASE_ELEMENT;

typedef struct
{
    BASE_ELEMENT        base;
    uint32              iRunLength;
    uint32              iFileOffset;
    uint8   *           pVOMem;
}GET_PICT_ELEMENT;

typedef struct
{
    BASE_ELEMENT        base;
    uint32              iRunLength;
    uint32              iFileOffset;
    uint8   *           pMem;
}PUT_PICT_ELEMENT;

typedef struct
{
    BASE_ELEMENT        base;
}FLUSH_ELEMENT;

typedef union
{
    BASE_ELEMENT        Base;
    FLUSH_ELEMENT       Flush;
    GET_PICT_ELEMENT    GetPict;
    PUT_PICT_ELEMENT    PutPict;
}VFILE_QUEUE_ELEMENT;

typedef enum
{
```

```
    QUEUE_STATE_IDLE,
    QUEUE_STATE_IN_PROGRESS,
    QUEUE_STATE_LOCKED
}VFILE_QUEUE_STATE;

typedef struct
{
    SVLIST                  svQueue;
    SEM_ID                  semQueueSync;
    MUTEX_ID                mtxQueueAccess;
    VFILE_QUEUE_STATE       QueueState;
    VFILE_QUEUE_ELEMENT     CurrentElement;
}VFILE_QUEUE_CONTROL;

STATIC uint     iTaskVFile;
uint32          glDebugVFile = 0;
extern void     BusErrorInit( void );
extern boolean  fHandleBusError;

extern uint8 * MarkfileGetVOAddress( uint iPicture );
VFILE_QUEUE_CONTROL VFileQueue;

extern sint ListDirectory();

#define CONVERT_TO_IC_MEM_SPACE( pMem ) (uint8 *)( ((uint32)pMem &  0x003fffff)\
        | IC_PICT_MEMORY_BASE_ADDR)

/* Ones that have been checked */

STATIC void GetPictureFromDiskToVO( GET_PICT_ELEMENT * pGetPict );

VFile VFileOpen( char * pFileName );

enum ERC VFileClose( VFile pHandle );

/* Foreward Function Declarations */

STATIC enum ERC VFileReadCommentsFromDisk( VFILE_FD *vfd);

STATIC VFILE_HEADER * FindHeader( VFILE_FD *vfd,  PICTURE_TIME * pTime,
        uint8 tyTime, char *pReelName);

STATIC enum ERC WriteComment(VFILE_FD * vfd, VFILE_HEADER *pHeader);
```

```
STATIC enum ERC VFCmp(void * pArg1, void * pArg2, sint * plResultRet );

STATIC enum ERC VFSearch(void * pArg1, void * pArg2, sint * plResultRet );

STATIC enum ERC FlushVFileHeader( VFILE_FD *vfd);

STATIC enum ERC GetPictureFromMemToDisk(VFILE_FD * vfd, VFILE_HEADER * pHeader,
        uint8 * pPictureSrc);

STATIC enum ERC   SendVFileRequest( uint iTask, union REQUEST * pRequest );

STATIC enum ERC   SendVFileRequestWait( uint iTask, union REQUEST * pRequest,
        uint iTaskReply);

STATIC VFILE_FD * CheckVFileCBOpen( char * pFileName );

STATIC enum ERC CheckVFileCBClose( char * pFileName, boolean fDestroySVList );

STATIC  enum ERC VFileHandleReq( union REQUEST * pRequest );

/************JUNK**************/
#if 0
/*- VFILE
 * CheckVFileCBOpen()
 * This function check to see if a current video file is open with the given
 * name. If it not, it opens the correct file. Currently there can be
 * only 1 open video file in the system. When a VFile server is written,
 * this function will map the vfd to the correct video file.
 */
STATIC VFILE_FD * CheckVFileCBOpen( char * pFileName )
{
    if(glDebugVFile & DEBUG_VFILE_TASK)
        LogMsg("Request for Services From Video File %s", pFileName);
    if(VFileRequestCB.pFileName == NULL)
        {
        if((VFileRequestCB.VFD = VFileOpen( pFileName )) == NULL)
            {
            LogError( E_FILE_CANT_OPEN, pFileName);
            return VFD_NULL;
            }
        VFileRequestCB.pFileName = DupString(pFileName);
        if(glDebugVFile & DEBUG_VFILE_TASK)
            LogMsg("Video File %s Opened", pFileName);
        }
    else if(strcmp(VFileRequestCB.pFileName, pFileName) != 0)
        {
        LogError(E_SOFTWARE, "Too many Open Video Files");
```

```
        return VFD_NULL;
        }
    VFileRequestCB.iClients++;

return VFileRequestCB.VFD;
}

/*- VFILE
 * CheckVFileCBClose()
 * This function will check to see if anyone else is using the video file,
 * and if no one else is using it, close it out.
 */
STATIC enum ERC CheckVFileCBClose( char * pFileName, boolean fDestroySVList )
{
    if(glDebugVFile & DEBUG_VFILE_TASK)
        LogMsg("Request for Termination of Services From Video File %s",
            pFileName);
    if(strcmp(VFileRequestCB.pFileName, pFileName) != 0)
        {
        return(LogError(E_SOFT_S_S, "Video File requested not open",
            pFileName));
        }
    if(glDebugVFile & DEBUG_VFILE_TASK)
        LogMsg("Currently %d clients",  VFileRequestCB.iClients);
    VFileRequestCB.iClients--;
    if(glDebugVFile & DEBUG_VFILE_TASK)
        LogMsg("Video File %s Closed", pFileName);
    CK_LOG(VFileClose(VFileRequestCB.VFD, fDestroySVList));
    VFileRequestCB.pFileName = NULL;
    VFileRequestCB.VFD = NULL;
    return E_OK;
}

/* Request Functions */ void RequestGetAllPictures( VFILE_SVC_DATA * pData,
    union REQUEST * pRequest )
{
    uint                index;
    VFILE_HEADER        *pHeader;
    uint8               *pVOmem;
    VFILE_FD        *   vfd;
    VFILE_SVC_DATA_GET_ALL_PICTURES * pVSData =
        (VFILE_SVC_DATA_GET_ALL_PICTURES *)pData;

if((vfd = CheckVFileCBOpen( pVSData->pFileName )) == VFD_NULL)
        goto Lerror;

pVSData->svList = vfd->psvList;
```

```
if(glDebugVFile & DEBUG_VFILE_TASK)
    LogMsg("Received Request to Get All Pictures for %s",
        pVSData->pFileName);

if ( pRequest->reqAny.fdReply != FD_REPLY_NONE )
    {
    SendReply( pRequest );
    if(glDebugVFile & DEBUG_VFILE_TASK)
        LogMsg("Sending Reply to Request");
    }

/* Start with the First Picture, and go to the end of VO memory */
for(index = pVSData->iFirstPicture; index < vfd->psvList->nItems; index++)
    {
    if( ( pVOmem = MarkfileGetVOAddress( index ) ) == NULL )
        {
        ReLogError();
        goto Lerror;
        }
    if( (pHeader = (VFILE_HEADER *)SVListGetItemPtr
        (vfd->psvList, index)) == NULL)
        {
        ReLogError();
        goto Lerror;
        }

/* Build Request, and send it */
    if(pHeader->Header.fPictureExists)
        CK_LOG(GetPictureFromDiskToVO(vfd, pHeader, pVOmem));
    }

/* Now do from the begining of VO memory up to the First Picture */
for(index = 0; index < pVSData->iFirstPicture &&
        index < vfd->psvList->nItems; index++)
    {
    if( ( pVOmem = MarkfileGetVOAddress( index ) ) == NULL )
        {
        ReLogError();
        goto Lerror;
        }
    if( (pHeader = (VFILE_HEADER *)SVListGetItemPtr
        (vfd->psvList, index)) == NULL)
        {
        ReLogError();
        goto Lerror;
        }

/* Build Request, and send it */
    if(pHeader->Header.fPictureExists)
        CK_LOG(GetPictureFromDiskToVO(vfd, pHeader, pVOmem));
```

```
        }
Lerror :
    CK_LOG(FreeString( pVSData->pFileName));

} void RequestGetOnePicture( VFILE_SVC_DATA * pData,
    union REQUEST * pRequest )
{
    VFILE_FD            *    vfd;
    VFILE_SVC_DATA_GET_ONE_PICTURE * pVSData =
        (VFILE_SVC_DATA_GET_ONE_PICTURE *)pData;

if((vfd = CheckVFileCBOpen( pVSData->pFileName )) == VFD_NULL)
        goto Lerror;
    return;
Lerror :
    return;
} void RequestPutOnePicture( VFILE_SVC_DATA * pData,
    union REQUEST * pRequest )
{
    VFILE_SVC_DATA_PUT_ONE_PICTURE * pVSData =
        (VFILE_SVC_DATA_PUT_ONE_PICTURE *)pData;
    VFILE_HEADER            Header;
    VFILE_HEADER        *   pHeader;
    VFILE_HEADER_ITEM   *   pHTemp;
    uint                    index;
    boolean                 fFound;
    VFILE_FD            *   vfd;

pHTemp =  pVSData->pHeader;

if((vfd = CheckVFileCBOpen( pVSData->pFileName )) == VFD_NULL)
        goto Lerror;

fFound = TRUE;
    if((pHeader= FindHeader(vfd, &pHTemp->Time,
        pHTemp->tyTime, pHTemp->acReelName)) == NULL)
        {                          /* Get an empty Slot */
        pHeader = &Header;
        for(index = 0;
            index < vfd->ControlBlock.iNumberOfPictures; index++)
            {
            if(vfd->fEmpty[index] == TRUE)
                break;
```

```
            }
        if(index == vfd->ControlBlock.iNumberOfPictures)
            {
            /* File Full */
            LogError( E_SOFT_S_S, "Video File Full",
                vfd->pQFile->pFileName);
            goto Lerror;

}
        if(glDebugVFile & DEBUG_VFILE_TASK)
            LogMsg("Empty Slot # %d filled with picture", index);
        vfd->fEmpty[index] = FALSE;
        pHeader->iSlotNumber = index;
        pHeader->pComments = NULL;
        fFound = FALSE;

}
else        /* Re-Write over an old one */
        {
        if(!pVSData->fRedefine)
            goto Lerror;
        if(pHeader->pComments != NULL &&  pVSData->pComments != NULL)
            CK_LOG(FreeString(pHeader->pComments));
        if(glDebugVFile & DEBUG_VFILE_TASK)
            LogMsg("Re-Writing over slot # %d", pHeader->iSlotNumber);
        if( pHeader->Header.fPictureExists &&
            !pVSData->pHeader->fPictureExists)
            {
            pVSData->pHeader->fPictureExists = TRUE;
            }
        } pHeader->Header = *pVSData->pHeader;
pHeader->Header.iRunLength =  VFILE_PICTURE_SIZE_IN_BYTES
    (vfd->ControlBlock.iPictureSize,
    vfd->ControlBlock.iPictureType);
pHeader->Header.iFileOffset = vfd->ControlBlock.iVideoOffset
    + (pHeader->iSlotNumber * pHeader->Header.iRunLength);

if(vfd->ControlBlock.iCommentOffset != NO_COMMENT )
    {
    if(pVSData->pComments != NULL)
        if(*(pVSData->pComments) == EOS)
            {
            CK_LOG(FreeString(pVSData->pComments));
            pHeader->pComments = NULL;
            }
        else
            pHeader->pComments = pVSData->pComments;
    }
```

```
    if(fFound == FALSE)
        CK_LOG(SVListAdd( vfd->psvList, pHeader));
    if(glDebugVFile & DEBUG_VFILE_TASK)
        {
        switch(pHeader->Header.tyTime)
            {
            case TIME_TYPE_TIMECODE :
                LogMsg("Time %0t, Ref Time %0t",
                    &pHeader->Header.Time.tcPicture,
                    &pHeader->Header.RefTime.tcPicture);
                break;
            case TIME_TYPE_INDEX :
                LogMsg("Index %d, Ref Index %d",
                    &pHeader->Header.Time.iPicture,
                    &pHeader->Header.RefTime.iPicture);
                break;
            default :
                break;
            }
        LogMsg("Reel Name %s",pHeader->Header.acReelName);
        }

CK_LOG(WriteComment(vfd, pHeader));
    if( pVSData->pICmem != NULL)
        GetPictureFromICToDisk(vfd , pHeader, pVSData->pICmem);
    FlushVFileHeader( vfd );

Lerror :
    ShortTermMemFree(pHTemp);
    CK_LOG(FreeString( pVSData->pFileName));
} void RequestCloseoutVFile( VFILE_SVC_DATA * pData,
    union REQUEST * pRequest )
{
    VFILE_SVC_DATA_CLOSEOUT_VFILE * pVSData =
        (VFILE_SVC_DATA_CLOSEOUT_VFILE *)pData;

CK_LOG(CheckVFileCBClose( pVSData->pFileName, pVSData->fDestroySVList ));
    CK_LOG(FreeString( pVSData->pFileName));
}

STATIC enum ERC VFileHandleReq( union REQUEST * pRequest )
{
    errnoSet( (int) E_OK );
```

```
    switch( pRequest->reqAny.tyReq)
        {
        case TY_REQ_VFILE_SERVICE :
            if(( pRequest->reqVFileService.vfileService >=
                    VFILE_SVC_N_SERVICES ) ||
                    ( serviceFuncs[pRequest->reqVFileService.vfileService]
                    == NULL ))
                {
                LogError( E_BAD_WIN_SVC,
                        pRequest->reqVFileService.vfileService );
                break;
                }
            serviceFuncs[pRequest->reqVFileService.vfileService]
                ( (VFILE_SVC_DATA *)pRequest->reqVFileService.abData, pRequest);
            break;
        default:
            LogError( E_BAD_REQ, pRequest->reqListIO.iFunc,
                gaTaskData[iTaskVFile].pstrName );
            break;
        } return( (enum ERC) errnoGet() );
}
STATIC enum ERC GetPictureFromICToBuffer( void * pPictureSrc, uint iPictSize,
        uint8 * pBuff)
{ uint8           *pICmemptr;
    uint32          iActualWidth;
    uint32          iICWidth;
    uint32          iActualHeight;
    uint            index;

iActualWidth =  2* ( (SystemIsNtsc()) ?
        viewWidthAndHeightNTSC[iPictSize][0] :
        viewWidthAndHeightPAL[iPictSize][0]);

iActualHeight =  ( (SystemIsNtsc()) ?
        viewWidthAndHeightNTSC[iPictSize][1] :
        viewWidthAndHeightPAL[iPictSize][1]);

iICWidth = 2* pwrOf2PixPerRow[iPictSize];

/* Convert to Image Cruncher Address, and Skip the blanking lines */
    pICmemptr = CONVERT_TO_IC_MEM_SPACE(pPictureSrc) +
            BLANKING_OFFSET(iPictSize) * 2;

for(index = 0; index < iActualHeight; index++)
```

```
            {
            bcopy( pICmemptr, pBuff, iActualWidth);
            pICmemptr += iICWidth;
            pBuff += iActualWidth;
            } return E_OK;
    }

/*- VFILE
 * FindHeader()
 * Finds a pointer to the Video File Header for the picture with the
 * given time.
 */
STATIC VFILE_HEADER * FindHeader( VFILE_FD *vfd, PICTURE_TIME * pTime,
        uint8 tyTime, char *pReelName)
{
    VFILE_HEADER          *pHeader;

uint            index;
    sint            lResultRet;

for(index = 0; index < vfd->psvList->nItems; index++)
        {
        if( (pHeader = (VFILE_HEADER *)SVListGetItemPtr(vfd->psvList,
            index)) == NULL)
            {
            ReLogError();
            return(NULL);
            }
        if(strcmp(pReelName, pHeader->Header.acReelName) == 0)
            {
            switch(tyTime)
                {
                case TIME_TYPE_TIMECODE :
                    TcCmp( (struct TIMECODE *)pTime, (struct TIMECODE *)
                        &pHeader->Header.Time, &lResultRet );
                    if(lResultRet == CMP_EQUAL)
                        return(pHeader);
                    break;
                case TIME_TYPE_INDEX :
                    if( pTime->iPicture == pHeader->Header.Time.iPicture )
                        return(pHeader);
                    break;
                default:
                    LogError( E_SOFT_S, "Bad VFile Header" );
                    return (NULL);
                    break;
                }
            }
```

```
    }
    return(NULL);
} endif

/****************STATIC FUNCTIONS******************/

STATIC boolean QueueElementCmp( VFile pHandle, SLOT_NUMBER iSlotNumber,
    VFILE_TY_REQUEST tyRequest, pfnVFileClientCmp pfnCompare,
    void * pClientNumber, void * pClientID, VFILE_QUEUE_ELEMENT * pElement )
{
    sint    cmpResult;

if( pElement->Base.pHandle != pHandle )
        return( FALSE );
    if( pElement->Base.tyRequest != tyRequest )
        return( FALSE );
    if( pElement->Base.iSlotNumber != iSlotNumber )
        return( FALSE );
    if( pfnCompare != NULL )
    {
        CK_LOG( (*pfnCompare)( pClientNumber, pClientID,
            pElement->Base.pClientNumber, pElement->Base.pClientID,
                &cmpResult ) );
        if( cmpResult != CMP_EQUAL )
            return( FALSE );
    }
    return( TRUE );
} enum ERC VFileSVListFree(SVLIST * svList)
{
    uint            index;
    VFILE_HEADER *  pHeader;

if( svList == NULL )
        return E_BAD_PTR;
    if(glDebugVFile & DEBUG_VFILE_TASK)
        LogMsg("Freeing SV List for Video File");
    for(index = 0; index < svList->nItems; index++)
    {
        if( (pHeader = (VFILE_HEADER *)SVListGetItemPtr( svList, index ) )
                == NULL)
            ReLogError();
        else
            if(pHeader->pComments != NULL)
                CK_LOG(FreeString(pHeader->pComments));
    }
    CK_LOG( SVListFree( svList ) );
```

```
    CK_LOG( WinMemFree( svList ));

return E_OK;
}

/*- VFILE
 * VFileReadCommentsFromDisk()
 * Read the comments for this video file from the disk, and place into
 * the video file descriptor structure.
 */
STATIC enum ERC VFileReadCommentsFromDisk( VFILE_FD *vfd)
{
    uint        index;
    uint32      iCommentBlockSize;
    char    *   pComments;
    VFILE_HEADER * pHeader;

if(vfd->ControlBlock.iCommentOffset == NO_COMMENT )
        return E_OK;

iCommentBlockSize = vfd->ControlBlock.iNumberOfPictures
            * VFILE_COMMENT_SIZE;
    if((pComments = ShortTermMemAlloc(iCommentBlockSize)) == NULL)
        return ReLogError();

if ( QSeek( vfd->pQFile, vfd->ControlBlock.iCommentOffset,
        TY_SEEK_ABS) != 0 )
        {
        CK_LOG(ShortTermMemFree(pComments));
        return LogError( E_FILE_CANT_OPEN, vfd->pQFile->pFileName);
        } if ( QRead( vfd->pQFile, iCommentBlockSize, (char *)pComments)
            < iCommentBlockSize)
        {
        CK_LOG(ShortTermMemFree(pComments));
        return LogError( E_SOFT_S_S, "Error reading video file %s",
            vfd->pQFile->pFileName);
        } for(index = 0; index < vfd->psvList->nItems; index++)
        {
        if( (pHeader = (VFILE_HEADER *)SVListGetItemPtr(vfd->psvList,
            index)) == NULL)
            {
            CK_LOG(ShortTermMemFree(pComments));
            return( ReLogError());
            }
        if(pComments[pHeader->iSlotNumber * VFILE_COMMENT_SIZE] == EOS)
```

```
                pHeader->pComments = NULL;
        else
            {
            pHeader->pComments = DupString(&pComments[pHeader->iSlotNumber
                * VFILE_COMMENT_SIZE]);
            }
        }
    CK_LOG(ShortTermMemFree(pComments));
    return E_OK;
}

STATIC enum ERC WriteComment(VFILE_FD * vfd, VFILE_HEADER *pHeader)
{
    if(vfd->ControlBlock.iCommentOffset == NO_COMMENT )
        return E_OK;

if(glDebugVFile & DEBUG_VFILE_TASK)
        LogMsg("Writing comment %s", pHeader->pComments);

if ( QSeek( vfd->pQFile,vfd->ControlBlock.iCommentOffset +
            (pHeader->iSlotNumber * VFILE_COMMENT_SIZE),TY_SEEK_ABS ) != 0)
        {
        return(LogError( E_FILE_CANT_OPEN, vfd->pQFile->pFileName));
        }
    /********** Should Blank out The whole Comment Field */
    if(pHeader->pComments == NULL)
        {
        char    actemp[VFILE_COMMENT_SIZE];
        int     i;

for(i=0; i< VFILE_COMMENT_SIZE; i++)
            actemp[i] = EOS;
        if ( QWrite( vfd->pQFile, VFILE_COMMENT_SIZE, actemp) <
                VFILE_COMMENT_SIZE)
            LogError( E_SOFT_S_S, "Error writing video file %s",
                vfd->pQFile->pFileName);
        }
    else
        {
        if ( QWrite( vfd->pQFile, strlen(pHeader->pComments) + 1 ,
                pHeader->pComments) < (strlen(pHeader->pComments) + 1))
            LogError( E_SOFT_S_S, "Error writing video file %s",
                vfd->pQFile->pFileName);
        }
    if( QFlushBuff( vfd->pQFile ) != 0 )
        LogError( E_SOFT_S_S, "Error in Flushing video file %s",
            vfd->pQFile->pFileName);
    return E_OK;
```

```
}

STATIC enum ERC WriteHeaderItem(VFILE_FD * vfd, VFILE_HEADER *pHeader)
{
    if(glDebugVFile & DEBUG_VFILE_TASK)
        LogMsg("Writing Header for slot %d", pHeader->iSlotNumber );

if ( QSeek( vfd->pQFile, VFILE_HEADER_OFFSET( pHeader->iSlotNumber ),
            TY_SEEK_ABS ) != 0)
        {
        return(LogError( E_FILE_CANT_OPEN, vfd->pQFile->pFileName));
        }
    if ( QWrite( vfd->pQFile, sizeof( VFILE_HEADER_ITEM ),
            (char *)&pHeader->Header ) < sizeof( VFILE_HEADER_ITEM ) )
        LogError( E_SOFT_S_S, "Error writing video file %s",
            vfd->pQFile->pFileName);
    if( QFlushBuff( vfd->pQFile ) != 0 )
        LogError( E_SOFT_S_S, "Error in Flushing video file %s",
            vfd->pQFile->pFileName);
    return E_OK;
}

STATIC enum ERC VFCmp(void * pArg1, void * pArg2, sint * plResultRet )
{
    VFILE_HEADER    *   pHeader1;
    VFILE_HEADER    *   pHeader2;

if ( pArg1 == NULL )
        return LogError( E_BAD_PTR );
    if ( pArg2 == NULL )
        return LogError( E_BAD_PTR );
    pHeader1 = (VFILE_HEADER *)pArg1;
    pHeader2 = (VFILE_HEADER *)pArg2;

*plResultRet = CMP_EQUAL;
    if( pHeader1->iSlotNumber > pHeader2->iSlotNumber )
        {
        *plResultRet = CMP_GREATER;
        }
    else if( pHeader1->iSlotNumber < pHeader2->iSlotNumber )
        {
        *plResultRet = CMP_LESS;
        }
    return E_OK;
}

STATIC enum ERC VFSearch(void * pArg1, void * pArg2, sint * plResultRet )
{
    VFILE_HEADER    *   pHeader2;
```

```
    if ( pArg2 == NULL )
        return LogError( E_BAD_PTR );
    pHeader2 = (VFILE_HEADER *)pArg2;

*plResultRet = CMP_EQUAL;
    if( (SLOT_NUMBER)pArg1 > pHeader2->iSlotNumber )
    {
        *plResultRet = CMP_GREATER;
    }
    else if( (SLOT_NUMBER)pArg1 < pHeader2->iSlotNumber )
    {
        *plResultRet = CMP_LESS;
    }
    return E_OK;
}

/*- VFILE
 * FlushVFileHeader()
 * Writes the Video File Control Block, and all of the Headers for all pictures
 * to the Disk.
 */
STATIC enum ERC FlushVFileHeader( VFILE_FD *vfd)
{
    VFILE_HEADER       *    pHeader;
    VFILE_HEADER_ITEM      Header;
    uint                   index;
    SLOT_NUMBER            iSlotNumber;

/* Write to Disk All of the empty Entries */
    Header.tyTime = TIME_TYPE_EMPTY;

/* Write Out Header Control Block */
    if ( QSeek( vfd->pQFile, 0, TY_SEEK_ABS ) != 0)
    {
        return( LogError( E_SOFT_S_S, "Error writing ",
            vfd->pQFile->pFileName));
    }
    if ( QWrite( vfd->pQFile, sizeof(VFILE_CONTROL_BLOCK),
            (char *)&vfd->ControlBlock) < sizeof(VFILE_CONTROL_BLOCK))
    {
        return( LogError( E_SOFT_S_S, "Error writing ",
            vfd->pQFile->pFileName));
    }
    iSlotNumber = FIRST_SLOT;
    for(index = 0; index < vfd->psvList->nItems; index++)
    {
        if( (pHeader = (VFILE_HEADER *)SVListGetItemPtr(vfd->psvList,
```

```
                  index)) == NULL)
                  {
                      return( ReLogError());
                  }
              while( iSlotNumber < pHeader->iSlotNumber )
                  {
                      if ( QWrite( vfd->pQFile, sizeof(Header), (char *)&Header)
                              < sizeof(Header))
                          {
                              return( LogError( E_SOFT_S_S, "Error writing ",
                                  vfd->pQFile->pFileName));
                          }
                      iSlotNumber++;
                  }
              iSlotNumber++;
              if ( QWrite( vfd->pQFile, sizeof(VFILE_HEADER_ITEM),
                      (char *)&pHeader->Header) < sizeof(VFILE_HEADER_ITEM))
                  {
                      return( LogError( E_SOFT_S_S, "Error writing ",
                          vfd->pQFile->pFileName));
                  }
          }
      while( iSlotNumber < vfd->ControlBlock.iNumberOfPictures )
          {
              if ( QWrite( vfd->pQFile, sizeof(Header), (char *)&Header)
                      < sizeof(Header))
                  {
                      return( LogError( E_SOFT_S_S, "Error writing ",
                          vfd->pQFile->pFileName));
                  }
              iSlotNumber++;
          } if(glDebugVFile & DEBUG_VFILE_TASK)
          LogMsg("Header flushed with %d entries", vfd->psvList->nItems);
      return E_OK;
}

STATIC void GetPictureFromDiskToVO( GET_PICT_ELEMENT * pGetPict )
{
      uint8      *pMem;
      VFILE_FD   *pVFileFD;

pVFileFD = (VFILE_FD *)pGetPict->base.pHandle;

if((pMem = (uint8 *)malloc(pGetPict->iRunLength)) == NULL)
          {
              LogError(E_MALLOC, pGetPict->iRunLength);
```

```
                    < sizeof(Header))

return( LogError( E_SOFT_S_S, "Error writing ",
                vfd->pQFile->pFileName));

iSlotNumber++;
        }
    iSlotNumber++;
    if ( QWrite( vfd->pQFile, sizeof(VFILE_HEADER_:
            (char *)&pHeader->Header) < sizeof(VFI          TEM))
        {
        return( LogError( E_SOFT_S_S, "Error writing ",
            vfd->pQFile->pFileName));
        }
    }
```

```
            return( LogError( E_SOFT_S_S, "Error writing ",
                vfd->pQFile->pFileName));
            }
        iSlotNumber++;
        } if(glDebugVFile & DEBUG_VFILE_TASK)
        LogMsg("Header flushed with %d entries", vfd->psvList->nItems);
    return E_OK;
}

STATIC void GetPictureFromDiskToVO( GET_PICT_ELEMENT * pGetPict )
{
    uint8       *pMem;
    VFILE_FD    *pVFileFD;

pVFileFD = (VFILE_FD *)pGetPict->base.pHandle;

if((pMem = (uint8 *)malloc(pGetPict->iRunLength)) == NULL)
        {
        LogError(E_MALLOC, pGetPict->iRunLength);
```

```
enum ERC CopyFromICtoMem( uint8 * pICMem, uint8 * pMem, uint iPictureSize )
{
    uint32          iActualWidth;
    uint32          iICWidth;
    uint32          iActualHeight;
    uint            index;

iActualWidth =  2* ( (SystemIsNtsc()) ?
        viewWidthAndHeightNTSC[iPictureSize][0] :
        viewWidthAndHeightPAL[iPictureSize][0]);

iActualHeight =  ( (SystemIsNtsc()) ?
        viewWidthAndHeightNTSC[iPictureSize][1] :
        viewWidthAndHeightPAL[iPictureSize][1]);

iICWidth = 2* pwrOf2PixPerRow[iPictureSize];

/* We will use IC Mem address for Now */ pICMem = ConvertICToMemAddr( pICMem, iPictureSize );

for( index = 0; index < iActualHeight; index++ )
        {
        bcopy( pICMem, pMem, iActualWidth );
        pMem += iActualWidth;
        pICMem += iICWidth;
        }
    if(glDebugVFile & DEBUG_VFILE_TASK)
        LogMsg("Picture at IC Mem 0x%X copied to mem 0x%X", pICMem, pMem );
    return E_OK;
} uint32 GetSizeOfPicture( uint iPictureSize )
{
    return( 2 * ( (SystemIsNtsc()) ?
        ( viewWidthAndHeightNTSC[iPictureSize][0] *
        viewWidthAndHeightNTSC[iPictureSize][1] ) :
        ( viewWidthAndHeightPAL[iPictureSize][0] *
        viewWidthAndHeightPAL[iPictureSize][1] ) ) );
}

STATIC enum ERC GetPictureFromMemToDisk(VFILE_FD * vfd, VFILE_HEADER * pHeader,
        uint8 * pPictureSrc)
{
    uint32              iSize;

iSize = GetSizeOfPicture( vfd->ControlBlock.iPictureSize );
```

```
    /* Seek to absolute position from begin of file */
    if ( QSeek( vfd->pQFile,pHeader->Header.iFileOffset ,TY_SEEK_ABS ) != 0)
        {
        LogError( E_FILE_CANT_OPEN, vfd->pQFile->pFileName);
        goto Lerror;
        }
    if ( QWrite( vfd->pQFile, iSize, (char *)pPictureSrc ) <
        iSize )
        LogError( E_SOFT_S_S, "Error writing video file %s",
            vfd->pQFile->pFileName);
    if( QFlushBuff( vfd->pQFile ) != 0 )
        LogError( E_SOFT_S_S, "Error in Flushing video file %s",
            vfd->pQFile->pFileName);
    if(glDebugVFile & DEBUG_VFILE_TASK)
        LogMsg("Picture # %d filled with data from mem address 0x%X",
            pHeader->iSlotNumber, pPictureSrc );

Lerror:
    return E_OK;
} enum ERC VFileTaskInit()
{
    enum ERC     erc;

VFileQueue.QueueState = QUEUE_STATE_IDLE;
    CK_E( SVListInit( &VFileQueue.svQueue, NULL, NULL,
        sizeof( VFILE_QUEUE_ELEMENT ) ) );
    if( ( VFileQueue.mtxQueueAccess = MutexCreate() ) == 0 )
        return LogError( errnoGet() );
    VFileQueue.semQueueSync = semCreate();

return E_OK;
}

STATIC uint VFileTaskLoop( uint iTask )
{
    VFILE_QUEUE_ELEMENT *   pElement;

while( TRUE )
        {
        MutexTake( VFileQueue.mtxQueueAccess );
        VFileQueue.QueueState = QUEUE_STATE_IDLE;
        MutexGive( VFileQueue.mtxQueueAccess );

/* Block for element in Queue */
```

```
semTake( VFileQueue.semQueueSync );
/* Untill there are no requests left, process requests. */
while( TRUE )
    {
    MutexTake( VFileQueue.mtxQueueAccess );
    if( VFileQueue.svQueue.nItems == 0 )
        {
        /* Queue Empty, exit */
        MutexGive( VFileQueue.mtxQueueAccess );
        break;
        }
    /* Get Queue Element */
    if( ( pElement = (VFILE_QUEUE_ELEMENT *)
        SVListGetItemPtr(&VFileQueue.svQueue, 0 ) ) == NULL )
        {
        ReLogError();
        MutexGive( VFileQueue.mtxQueueAccess );
        break;
        }
    VFileQueue.CurrentElement = *pElement;

/* Remove Queue Element */
    CK_LOG( SVListDelete( &VFileQueue.svQueue, 0 ) );
    VFileQueue.QueueState = QUEUE_STATE_IN_PROGRESS;

MutexGive( VFileQueue.mtxQueueAccess );
    /* Process Queue Element */
    switch( VFileQueue.CurrentElement.Base.tyRequest )
        {
        case TY_REQUEST_GET_PICT :
            GetPictureFromDiskToVO(
                &VFileQueue.CurrentElement.GetPict );
            break;
        default :
            break;
        }
    MutexTake( VFileQueue.mtxQueueAccess );
    VFileQueue.QueueState = QUEUE_STATE_LOCKED;
    if( !VFileQueue.CurrentElement.Base.fCancel )
        {
        MutexGive( VFileQueue.mtxQueueAccess );
        /* Call the Callback */
        if( VFileQueue.CurrentElement.Base.pfnActionComplete
            != NULL )
            CK_LOG( (*VFileQueue.CurrentElement.Base.pfnActionComplete)(
                VFileQueue.CurrentElement.Base.pHandle,
                VFileQueue.CurrentElement.Base.iSlotNumber,
                VFileQueue.CurrentElement.Base.tyRequest,
                VFileQueue.CurrentElement.Base.pClientNumber,
                VFileQueue.CurrentElement.Base.pClientID,
```

```
                    VFileQueue.CurrentElement.Base.pClientInfo ) );
                MutexTake( VFileQueue.mtxQueueAccess );
            }
            VFileQueue.QueueState = QUEUE_STATE_IDLE;
            MutexGive( VFileQueue.mtxQueueAccess );
        }
    }
} uint32 VFileTask( uint iTask )
{
    iTaskVFile = iTask;
    if ( glDebugPipe & DEBUG_PIPE_TASK )
        LogMsg( "Task %s spawned", gaTaskData[iTask].pstrName );

if ( fHandleBusError )
        BusErrorInit();

if( VFileTaskInit() != E_OK )
        return( (uint32) errnoGet() );
    VFileTaskLoop( iTask );
    return( (uint32) errnoGet() );
}

STATIC void InitAHeader( VFILE_HEADER_ITEM * pHeader )
{
    uint    index;

pHeader->tyTime = TIME_TYPE_EMPTY;
    pHeader->fPictureExists = FALSE;
    for(index = 0; index < VFILE_REEL_NAME_LENGTH; index++)
        pHeader->acReelName[index] = EOS;
}

/*- VIDEO
 * VFileCreate()
 * This function will create a blank VFile from the information passed in.
 * After the file is created, it will be opened, and a VFile handle will
 * be returned for use by the client.
 * Returns:    VFile handle, or NULL.
 */
VFile VFileCreate( uint16 iPictureSize, uint16 iMaxNumberOfPictures,
        char * pSessionName, char * pFileName, boolean fComments, boolean fVideo )
{
    uint                    index;
    VFILE_FD                vfdTemp;
    VFILE_CONTROL_BLOCK     cbControl;
```

```
VFILE_HEADER_ITEM       vfHeader;
char                    acComment[VFILE_COMMENT_SIZE];
uint16                  iPictureType;
uint                    iCommentSize;
uint                    iVideoSize;

iPictureType = SystemIsNtsc() ? NTSC_VIDEO : PAL_VIDEO;

iCommentSize = fComments ? VFILE_COMMENT_SIZE : 0;
iVideoSize = fVideo ?
    VFILE_PICTURE_SIZE_IN_BYTES(iPictureSize, iPictureType) : 0;

/*
 * Open and truncate a video file
 */
if ( (vfdTemp.pQFile = QOpen( pFileName, "w+" )) == NULL )
    {
    LogError( E_FILE_CANT_OPEN, pFileName);
    goto Lerror;
    }
/*
 * Force a set file size for the video file so RT-11 can open other
 * files.
 */
if ( QSeek( vfdTemp.pQFile, ( ( iCommentSize + iVideoSize ) *
    iMaxNumberOfPictures ) + VFILE_HEADER_OFFSET( iMaxNumberOfPictures ),
    0 ) != 0 )
    {
    LogError( E_FILE_CANT_OPEN, pFileName);
    goto Lerror;
    }
if ( QClose( vfdTemp.pQFile ) < 0 )
    {
    LogError( E_FILE_CANT_OPEN, pFileName);
    goto Lerror;
    }
if ( (vfdTemp.pQFile = QOpen( pFileName, "r+" )) == NULL )
    {
    LogError( E_FILE_CANT_OPEN, pFileName);
    goto Lerror;
    }

/* Initialize Control Block, and Write it Out */
cbControl.iPictureSize = iPictureSize;
cbControl.iPictureType = iPictureType;
cbControl.iNumberOfPictures = iMaxNumberOfPictures;
cbControl.iCommentOffset = fComments ?
        VFILE_HEADER_OFFSET( iMaxNumberOfPictures ) : NO_COMMENT ;
cbControl.iVideoOffset = fVideo ? VFILE_HEADER_OFFSET( iMaxNumberOfPictures )
    + ( iCommentSize * iMaxNumberOfPictures) : NO_VIDEO ;
```

```
    StrNCopy(&cbControl.acSessionName[0], pSessionName,
        VFILE_SESSION_NAME_LENGTH, TRUE);
    if ( QWrite( vfdTemp.pQFile, sizeof(cbControl), (char *)&cbControl)
            < sizeof(cbControl))
        {
        LogError( E_SOFT_S_S, "Error writing ", pFileName);
        goto Lerror;
        }

/* Initialize a Blank Header, and Write it out */
    InitAHeader( &vfHeader );
    vfHeader.iRunLength = iVideoSize;
    vfHeader.iFileOffset = 0;
    for(index = 0; index < iMaxNumberOfPictures; index++)
        {
        if( cbControl.iVideoOffset != NO_VIDEO )
            vfHeader.iFileOffset = cbControl.iVideoOffset +
                ( index * iVideoSize );
        if ( QWrite( vfdTemp.pQFile, sizeof(vfHeader), (char *)&vfHeader)
                < sizeof(vfHeader))
            {
            LogError( E_SOFT_S_S, "Error writing ", pFileName);
            goto Lerror;
            }
        }
    /* If there are comments, write out blank ones into the comment area */
    if( cbControl.iCommentOffset != NO_COMMENT )
        {
        for(index = 0; index < VFILE_COMMENT_SIZE; index++)
            acComment[index] = EOS;
        for(index = 0; index < iMaxNumberOfPictures; index++)
            {
            if ( QWrite( vfdTemp.pQFile, VFILE_COMMENT_SIZE, (char *)acComment)
                    < VFILE_COMMENT_SIZE)
                {
                LogError( E_SOFT_S_S, "Error writing ", pFileName);
                goto Lerror;
                }
            }
        } if ( QClose( vfdTemp.pQFile ) < 0 )
        {
        LogError( E_FILE_CANT_OPEN, pFileName);
        goto Lerror;
        } if(glDebugVFile & DEBUG_VFILE_TASK)
        LogMsg("Video File %s Created", pFileName);
    return VFileOpen( pFileName );
```

```
Lerror:
    if( vfdTemp.pQFile != NULL )
        if ( QClose( vfdTemp.pQFile ) < 0 )
            {
            LogError( E_FILE_CANT_OPEN, pFileName);
            }
    return( VFILE_NONE );
}
/*- VIDEO
 * VFileOpen()
 * This function will open the named VFile, and return a handle to the client
 * as the return value. The client can then use the handle to access the
 * VFile in other operations. The VFile must exist, or this function will
 * return NULL.
 * We could implement an svlist of open files, and check this list
 * every time we open a file so no file is opened by more than 1 client.
 * Right now there is only 1 client, so we will put this off.
 * Returns:    VFile handle, or NULL.
 */
VFile VFileOpen( char * pFileName )
{
    VFILE_FD            *vfd;
    uint                index;
    VFILE_HEADER        vfHeader;
    SVLIST              *psvList = (SVLIST *)NULL;

if((vfd = (VFILE_FD *)WinMemAlloc(sizeof(VFILE_FD))) == NULL)
        {
        LogError(E_MALLOC, sizeof(VFILE_FD));
        goto Lerror;
        }
    vfd->psvList = (SVLIST *)NULL;
    vfd->pQFile = (struct QFILE *)NULL;
    if((psvList = (SVLIST *)WinMemAlloc(sizeof(SVLIST))) == NULL)
        {
        LogError(E_MALLOC, sizeof(SVLIST));
        goto Lerror;
        }
    if ( (vfd->pQFile = QOpen( pFileName, "r+" )) == NULL )
        {
        LogError( E_FILE_CANT_OPEN, pFileName);
        goto Lerror;
        }
    if ( QRead( vfd->pQFile, sizeof(vfd->ControlBlock),
            (char *)&vfd->ControlBlock) < sizeof(vfd->ControlBlock) )
        {
        LogError( E_SOFT_S_S, "Error reading video file header for %s",
            pFileName);
        goto Lerror;
```

```c
        }
    if(vfd->ControlBlock.iPictureType != (SystemIsNtsc() ? NTSC_VIDEO
            : PAL_VIDEO))
        goto Lerror;

/* Try to Check the integrity of the file just opened
     */
    if(vfd->ControlBlock.iPictureSize >= N_PICT_SIZES)
        goto Lerror;
    if(vfd->ControlBlock.iPictureType > PAL_VIDEO)
        goto Lerror;
    if(vfd->ControlBlock.iNumberOfPictures > VFILE_NUMBER_OF_PICTURES)
        goto Lerror;

CK_LOG(SVListInit( psvList, VFCmp, VFSearch,
        sizeof(VFILE_HEADER)));

vfd->psvList = psvList;
    for(index = 0; index < vfd->ControlBlock.iNumberOfPictures; index++)
        {
        if ( QRead( vfd->pQFile, sizeof(vfHeader.Header),
                (char *)&vfHeader.Header) < sizeof(vfHeader.Header) )
            {
            LogError( E_SOFT_S_S, "Error reading video file header for %s",
                pFileName);
            goto Lerror;
            } if(vfHeader.Header.tyTime != TIME_TYPE_EMPTY)
            {
            if(glDebugVFile & DEBUG_VFILE_TASK)
                LogMsg("Entry number %d not empty", index);
            }
        vfHeader.iSlotNumber = index;
        /* Initially Set the comments to empty. */
        vfHeader.pComments = NULL;
        CK_LOG(SVListAdd( vfd->psvList, &vfHeader));
        }
    CK_LOG(VFileReadCommentsFromDisk( vfd ));

if( ( vfd->mtxAccess = MutexCreate() ) == 0 )
        goto Lerror;

if(glDebugVFile & DEBUG_VFILE_TASK)
        LogMsg("Video File %s Opened", pFileName);
    return ( VFile )vfd;
Lerror:
    if( vfd != NULL )
        {
```

```
        if( vfd->pQFile !=NULL )
            CK_LOG( QClose(vfd->pQFile ) );
        if( vfd->psvList != NULL )
            CK_LOG( SVListFree( vfd->psvList) );
        if( psvList != NULL )
            CK_LOG( WinMemFree(psvList));
        CK_LOG( WinMemFree(vfd));
        }
    return VFILE_NONE;
}

/*- VFILE
 * VFileClose()
 * Close the named video file.
 */
enum ERC VFileClose( VFile pHandle )
{
    VFILE_FD    * pVFileFD;

VFILE_VERIFY( pHandle );
    pVFileFD = (VFILE_FD *)pHandle;

#if 0
    FlushVFileHeader( pHandle );
endif if( pVFileFD->pQFile !=NULL )
        CK_LOG( QClose(pVFileFD->pQFile ) );
    if(glDebugVFile & DEBUG_VFILE_TASK)
        LogMsg("Video File %s Closed", pVFileFD->pQFile->pFileName);

CK_LOG(VFileSVListFree(pVFileFD->psvList));
    CK_LOG( WinMemFree(pVFileFD));

return E_OK;
}

/*- VIDEO
 * VFileGetListOfAllVFiles()
 * This function searches the listed session directory, and looks for VFiles.
 * We will use one of the file attribute bits to delineate VFiles. Thus
 * this function will return the names of all files, with the VFile attribute
 * bit set, in the list pListOfNames.
 * Returns:   Error code, E_OK on success.
 */
enum ERC VFileGetListOfAllVFiles( char * pSessionDirectory,
    SVLIST * pListOfNames )
```

```
{
    char *  apNameList[MAX_NUM_OF_FILES];
    char    acPath[MAX_FILENAME_SIZE];
    uint    len;
    uint    count;
    uint    i;

if(glDebugVFile & DEBUG_VFILE_TASK)
        LogMsg("Getting list of VFile Names for Directory %s",
            pSessionDirectory );

CK_LOG( SVListInit( pListOfNames, NULL, NULL, sizeof( acPath ) ) );
    StrNCopy( acPath, pSessionDirectory, MAX_FILENAME_SIZE, TERMINATE );
    len = strlen( acPath );
    acPath[ len ] = '*';
    acPath[ len + 1 ] = '\0';

if( ( count = ListDirectory( HARD0, acPath, apNameList ) ) <= 0 )
        return E_OK;
    if( apNameList[0] == NULL )
        return E_OK;

for( i = 0; apNameList[i] != NULL && i < count; i++ )
    {
        if( ( len = strlen( apNameList[i] ) ) < 4 )
            continue;
        if( strcmp( VFILE_EXTENSION, &apNameList[i][ len - 4 ] ) == 0 )
        {
            StrNCopy( acPath, apNameList[i], MAX_FILENAME_SIZE, TERMINATE );
            CK_LOG( SVListAdd( pListOfNames, acPath ) );
        }
        free( apNameList[i] );
        apNameList[i] = NULL;
    }
    return E_OK;
} enum ERC VFileShow( VFile pHandle )
{
    VFILE_FD      * pVFileFD;
    VFILE_HEADER  * pHeader;
    uint            i;
    char            acTemp[100];

VFILE_VERIFY( pHandle );
    pVFileFD = (VFILE_FD *)pHandle;
    printf("***** VFile %s For Session %s *****\n", pVFileFD->pQFile->pFileName,
        pVFileFD->ControlBlock.acSessionName );
    printf("Pict Size %d Type %d Number %d Offsets: Comment %d Video %d\n",
```

```
            pVFileFD->ControlBlock.iPictureSize,
            pVFileFD->ControlBlock.iPictureType,
            pVFileFD->ControlBlock.iNumberOfPictures,
            pVFileFD->ControlBlock.iCommentOffset,
            pVFileFD->ControlBlock.iVideoOffset );
    for( i=0; i < pVFileFD->psvList->nItems; i++ )
        {
        if( ( pHeader = (VFILE_HEADER *)SVListGetItemPtr(pVFileFD->psvList,
            i ) ) == NULL )
            {
            return E_OK;
            }
        if( pHeader->Header.tyTime == TIME_TYPE_EMPTY )
            continue;
        printf("Slot %d ", pHeader->iSlotNumber );
        switch( pHeader->Header.tyTime )
            {
            default :
            case TIME_TYPE_EMPTY :
                break;
            case TIME_TYPE_TIMECODE :
                StrNPrintf(acTemp, 100, "Time %0t",
                    &pHeader->Header.Time.tcPicture );
                printf("%s ", acTemp );
                break;
            }
        switch( pHeader->Header.tyRefTime )
            {
            default :
            case TIME_TYPE_EMPTY :
                break;
            case TIME_TYPE_TIMECODE :
                StrNPrintf(acTemp, 100, "RefTime %0t",
                    &pHeader->Header.RefTime.tcPicture );
                printf("%s ", acTemp );
                break;
            }
        printf("Reel %s Picture %d\n", &pHeader->Header.acReelName,
            pHeader->Header.fPictureExists );
        printf("    Dur %d Speed %d Chan %d TyClip %d TySeg %d\n",
            pHeader->Header.lnFields, pHeader->Header.lSpeed,
            pHeader->Header.lChMask, pHeader->Header.tyClip,
            pHeader->Header.tySegment );
        printf("    RunLen %d FileOff %d %s\n", pHeader->Header.iRunLength,
            pHeader->Header.iFileOffset, pHeader->pComments );
        }
    printf("\n");

return E_OK;
}
```

```
/*- VIDEO
 * VFileGetInfo()
 * This function will return the parameters associated with a Video File.
 * Returns:    Error code, E_OK on success.
 */
enum ERC VFileGetInfo( VFile pHandle, uint16 * iPictureSize,
    uint16 * iMaxNumberOfPictures, boolean * fComments, boolean * fVideo,
    char * pSessionName, uint sSessionName, char * pFileName, uint sFileName )
{
    VFILE_FD    *pVFileFD;

VFILE_VERIFY( pHandle );
    pVFileFD = (VFILE_FD *)pHandle;

if( iPictureSize != NULL )
        *iPictureSize = pVFileFD->ControlBlock.iPictureSize;
    if( iMaxNumberOfPictures != NULL )
        *iMaxNumberOfPictures = pVFileFD->ControlBlock.iNumberOfPictures;
    if( fComments != NULL )
        *fComments = ( pVFileFD->ControlBlock.iCommentOffset != NO_COMMENT );
    if( fVideo != NULL )
        *fVideo = ( pVFileFD->ControlBlock.iVideoOffset != NO_COMMENT );
    if( pSessionName != NULL )
        StrNCopy( pSessionName, pVFileFD->ControlBlock.acSessionName,
            sSessionName, TERMINATE );
    if( pFileName != NULL )
        StrNCopy( pFileName, pVFileFD->pQFile->pFileName,
            sFileName, TERMINATE );
    if(glDebugVFile & DEBUG_VFILE_TASK)
        LogMsg("Getting Info for VFile %s Handle %d",
            pVFileFD->pQFile->pFileName, pHandle );

return E_OK;
}

/*- VIDEO
 * VFileGetEmptySlot()
 * This function will search the indicated VFile for an empty slot. If one
 * is found, it will be marked as non-empty, and returned in iSlotNumber.
 * Returns:    TRUE if an empty slot was found, slot is in iSlotNumber.
 */
enum ERC VFileGetEmptySlot( VFile pHandle, SLOT_NUMBER * iSlotNumber )
{
    VFILE_FD      *  pVFileFD;
    VFILE_HEADER  *  pHeader;
    uint             EmptySlot;
```

```
    VFILE_VERIFY( pHandle );
    pVFileFD = (VFILE_FD *)pHandle;
    if( iSlotNumber == NULL )
        return LogError( E_BAD_PTR );

if(glDebugVFile & DEBUG_VFILE_TASK)
        LogMsg("Attempting to get empty slot for VFile %s Handle %d",
            pVFileFD->pQFile->pFileName, pHandle );
    MutexTake( pVFileFD->mtxAccess );
    /* Find an empty Slot Number */
    for( EmptySlot = 0; EmptySlot < pVFileFD->psvList->nItems; EmptySlot++ )
        {
        if( ( pHeader = (VFILE_HEADER *)SVListGetItemPtr(pVFileFD->psvList,
            EmptySlot ) ) == NULL )
            {
            MutexGive( pVFileFD->mtxAccess );
            return( ReLogError());
            }
        if( pHeader->Header.tyTime == TIME_TYPE_EMPTY )
            {
            if(glDebugVFile & DEBUG_VFILE_TASK)
                LogMsg("Got empty slot %d", EmptySlot );
            *iSlotNumber = EmptySlot;
            pHeader->Header.tyTime = TIME_TYPE_ALLOCATED;
            pHeader->iSlotNumber = EmptySlot;
            MutexGive( pVFileFD->mtxAccess );
            return E_OK;
            }
        }
    /* File is Full */
    MutexGive( pVFileFD->mtxAccess );
    return LogError( E_SOFTWARE, "File Full" );
}

/*- VIDEO
 * VFileGetSlotInfo()
 * This function will get information about the picture in the indicated
 * slot of the indicated file. The information will be returned in a
 * VFILE_SEG_INFO structure, and comments will be returned in pComments.
 * either of these pointers may be NULL.
 * Returns:    Error code, E_OK on success. And pvfInfo, pComments.
 */
enum ERC VFileGetSlotInfo( VFile pHandle, SLOT_NUMBER iSlotNumber,
    VFILE_SEG_INFO * pvfInfo, char * pComments, uint sComments )
{
    VFILE_FD     * pVFileFD;
    VFILE_HEADER * pHeader;

VFILE_VERIFY( pHandle );
```

```
    pVFileFD = (VFILE_FD *)pHandle;
    if(glDebugVFile & DEBUG_VFILE_TASK)
        LogMsg("Attempting to get slot info for VFile %s Handle %d",
            pVFileFD->pQFile->pFileName, pHandle );
    MutexTake( pVFileFD->mtxAccess );
    if( SVListSearch( pVFileFD->psvList, (void *)iSlotNumber,
        (void **)&pHeader ) != E_OK )
        {
        MutexGive( pVFileFD->mtxAccess );
        return LogError( E_CANT_FIND_S_I, "Slot", iSlotNumber );
        }
    if( pComments != NULL )
        {
        if( pHeader->pComments == NULL )
            {
            if( sComments > 0 )
                pComments[0] = '\0';
            }
        else
            StrNCopy( pComments, pHeader->pComments, sComments, TERMINATE );
        }
    if( pvfInfo != NULL )
        {
        pvfInfo->Time1.Time = pHeader->Header.Time;
        pvfInfo->Time1.tyTime = pHeader->Header.tyTime;
        pvfInfo->Time2.Time = pHeader->Header.RefTime;
        pvfInfo->Time2.tyTime = pHeader->Header.tyRefTime;
        pvfInfo->lnFields = pHeader->Header.lnFields;
        pvfInfo->lChMask = pHeader->Header.lChMask;
        pvfInfo->tyPicture = pHeader->Header.tyClip;
        pvfInfo->tySegment = pHeader->Header.tySegment;
        pvfInfo->fPictureExists = pHeader->Header.fPictureExists;
        pvfInfo->iPictureSize = pVFileFD->ControlBlock.iPictureSize;
        StrNCopy( pvfInfo->acReelName, pHeader->Header.acReelName,
            VFILE_REEL_NAME_LENGTH, TERMINATE );
        }
    MutexGive( pVFileFD->mtxAccess );
    return E_OK;
}

/*- VIDEO
 * VFileWriteSlot()
 * This function will overwrite the current slot info for the indicated slot
 * with new data. If pMem is NULL the video for this picture will remain the
 * same, otherwise video will be transferred from main memory location pMem
 * to the VFile slot indicated. If pComments is NULL, the current
 * comment for the slot will be kept. To blank out the comment, the string
 * "\0" must be passed in.
```

```
 *  Returns:    Error code, E_OK on success.
 */
enum ERC VFileWriteSlot( VFile pHandle, SLOT_NUMBER iSlotNumber, uint8 * pMem,
    uint iPictureSize, VFILE_SEG_INFO * pvfInfo, char * pComments )
{
    VFILE_FD      * pVFileFD;
    VFILE_HEADER  * pHeader;

VFILE_VERIFY( pHandle );
    pVFileFD = (VFILE_FD *)pHandle;
    if(glDebugVFile & DEBUG_VFILE_TASK)
        LogMsg("Attempting to write slot %d for VFile %s Handle %d",
            iSlotNumber, pVFileFD->pQFile->pFileName, pHandle );

MutexTake( pVFileFD->mtxAccess );
    if( SVListSearch( pVFileFD->psvList, (void *)iSlotNumber,
        (void **)&pHeader ) != E_OK )
        {
        MutexGive( pVFileFD->mtxAccess );
        return ReLogError();
        }
    if( pvfInfo != NULL )
        {
        pHeader->Header.Time = pvfInfo->Time1.Time;
        pHeader->Header.tyTime = pvfInfo->Time1.tyTime;
        pHeader->Header.RefTime = pvfInfo->Time2.Time;
        pHeader->Header.tyRefTime = pvfInfo->Time2.tyTime;
        pHeader->Header.lnFields = pvfInfo->lnFields;
        pHeader->Header.lChMask = pvfInfo->lChMask;
        pHeader->Header.tyClip = pvfInfo->tyPicture;
        pHeader->Header.tySegment = pvfInfo->tySegment;
        pHeader->Header.fPictureExists = pvfInfo->fPictureExists;
        StrNCopy( pHeader->Header.acReelName, pvfInfo->acReelName,
            VFILE_REEL_NAME_LENGTH, TERMINATE );

CK_LOG( WriteHeaderItem( pVFileFD, pHeader ) );
        }
    if( pComments != NULL )
        {
        if( pHeader->pComments != NULL )
            FreeString( pHeader->pComments );
        pHeader->pComments = DupString( pComments );
        CK_LOG(WriteComment(pVFileFD, pHeader));
        } if( pMem != NULL && iPictureSize == pVFileFD->ControlBlock.iPictureSize )
        GetPictureFromMemToDisk(pVFileFD, pHeader, pMem );
    MutexGive( pVFileFD->mtxAccess );
    return E_OK;
}
```

```
/*- VIDEO
 * VFileClearSlot()
 * This function will clear the indicated slot in the VFile. Afterwards,
 * the slot is left as empty.
 * Returns:    Error code, E_OK on success.
 */
enum ERC VFileClearSlot( VFile pHandle, SLOT_NUMBER iSlotNumber )
{
    VFILE_FD     *  pVFileFD;
    VFILE_HEADER *  pHeader;
    VFILE_HEADER    vfHeader;

VFILE_VERIFY( pHandle );
    pVFileFD = (VFILE_FD *)pHandle;

if(glDebugVFile & DEBUG_VFILE_TASK)
        LogMsg("Attempting to clear slot %d for VFile %s Handle %d",
            iSlotNumber, pVFileFD->pQFile->pFileName,  pHandle );
    MutexTake( pVFileFD->mtxAccess );
    if( SVListSearch( pVFileFD->psvList, (void *)iSlotNumber,
        (void **)&pHeader ) != E_OK )
        {
        MutexGive( pVFileFD->mtxAccess );
        return ReLogError();
        }

InitAHeader( &pHeader->Header );
    if( pHeader->pComments != NULL )
        FreeString( pHeader->pComments );
    vfHeader.pComments = NULL;

CK_LOG( WriteHeaderItem( pVFileFD, pHeader ) );
    CK_LOG(WriteComment(pVFileFD, pHeader));
    MutexGive( pVFileFD->mtxAccess );
    return E_OK;
}

/*- VIDEO
 * VFileRequestTransfer()
 * This function is used to transfer pictures from disk to video output
 * memory. Because of bandwidth constraints of the hard disk and image
 * cruncher memory, an application should not perform a transfer of a video
 * picture under its context. The solution is to make the VFile task
 * responsible for performing the transfers, and do all the blocking.
 * The VFile task will have a queue of transfer requests that it will read
 * from to get its transfers. To place a transfer request, this function is
 * called with the necessary info. The pfnTransferComplete
```

```
 * function will be called when the transfer is complete. The requestor will
 * fill in the pClientNumber number with a special number unique to this
 * client. The pClientID will also be filled in by the requestor, and
 * contains client specific data.
 * Returns:    Error code, E_OK on success.
 */
enum ERC VFileRequestTransfer( VFile pHandle, SLOT_NUMBER iSlotNumber,
    uint8 * pVOMem, pfnVFileCallback pfnTransferComplete,
    void * pClientNumber, void * pClientID, void * pClientInfo )
{
    VFILE_FD          * pVFileFD;
    VFILE_QUEUE_ELEMENT Element;
    GET_PICT_ELEMENT  * pElement;
    VFILE_HEADER      * pHeader;

VFILE_VERIFY( pHandle );
    pVFileFD = (VFILE_FD *)pHandle;

MutexTake( pVFileFD->mtxAccess );
    if( SVListSearch( pVFileFD->psvList, (void *)iSlotNumber,
        (void **)&pHeader ) != E_OK )
        {
        MutexGive( pVFileFD->mtxAccess );
        return ReLogError();
        }
    if( !pHeader->Header.fPictureExists )
        {
        MutexGive( pVFileFD->mtxAccess );
        return E_OK;
        }
    if(glDebugVFile & DEBUG_VFILE_TASK)
        LogMsg("Request Transfer of video to slot %d for VFile %s Handle %d",
            iSlotNumber, pVFileFD->pQFile->pFileName, pHandle );

pElement = &Element.GetPict;

pElement->base.tyRequest = TY_REQUEST_GET_PICT;
    pElement->base.fCancel = FALSE;
    pElement->base.pHandle = pHandle;
    pElement->base.iSlotNumber = iSlotNumber;
    pElement->base.pfnActionComplete = pfnTransferComplete;
    pElement->base.pClientNumber = pClientNumber;
    pElement->base.pClientID = pClientID;
    pElement->base.pClientInfo = pClientInfo;
    pElement->iRunLength = pHeader->Header.iRunLength;
    pElement->iFileOffset = pHeader->Header.iFileOffset;
    pElement->pVOMem = pVOMem;

MutexTake( VFileQueue.mtxQueueAccess );
    CK_LOG( SVListAdd( &VFileQueue.svQueue, (void *)pElement ) );
```

```
        MutexGive( VFileQueue.mtxQueueAccess );

MutexGive( pVFileFD->mtxAccess );

semGive( VFileQueue.semQueueSync);
        return E_OK;
}

/*- VIDEO
 *  VFileCancelFromTransferQueue()
 *  Between the time an application places a transfer request into the VFile
 *  tasks queue, and the picture reaches video output memory, the application
 *  may decide it does not need the picture. This function will be used
 *  to cancel a transfer request. The pHandle and iSlot number will be used
 *  to find elements in the transfer request queue that match. When a match
 *  is found the pfnCompare function will be called with pClientID. This
 *  function should compare the pClientID field with the pClientID field
 *  passed in on the VFileRequestTransfer call. Once a complete match is
 *  found the request will be cancelled. If in the event the transfer is
 *  at a point where it cannot be canceled, the fSuccess flag will be set
 *  to FALSE, thus signifying the transfer is still in progress. If the
 *  tranfer is successfully cancelled, fSuccess is TRUE, then the
 *  pfnTransferComplete callback will not be called, otherwise it will be.
 *  When a transfer fails to cancel, this callback must be used by the
 *  client to recover from the failure and clean up.
 *  Returns:    Error code, E_OK on success.
 */
enum ERC VFileCancelFromTransferQueue( VFile pHandle, SLOT_NUMBER iSlotNumber,
    pfnVFileClientCmp pfnCompare, void * pClientNumber, void * pClientID,
    boolean * fSuccess )
{
    VFILE_QUEUE_ELEMENT *   pElement;
    uint                    i;

*fSuccess = FALSE;
    VFILE_VERIFY( pHandle );
    if(glDebugVFile & DEBUG_VFILE_TASK)
        LogMsg("Attempting to cancel trans for slot %d for VFile Handle %d",
            iSlotNumber,  pHandle );

MutexTake( VFileQueue.mtxQueueAccess );
    for( i = 0; i < VFileQueue.svQueue.nItems; i++ )
        {
        if( ( pElement = (VFILE_QUEUE_ELEMENT *)
            SVListGetItemPtr(&VFileQueue.svQueue, i ) ) == NULL )
            {
            MutexGive( VFileQueue.mtxQueueAccess );
            return ReLogError();
            }
```

```
        if( QueueElementCmp( pHandle, iSlotNumber, TY_REQUEST_GET_PICT,
                pfnCompare, pClientNumber, pClientID, pElement ) )
            {
            *fSuccess = TRUE;
            pElement->Base.fCancel = TRUE;
            MutexGive( VFileQueue.mtxQueueAccess );
            return E_OK;
            }
        }
    /* Check for any In Progress */
    if( VFileQueue.QueueState == QUEUE_STATE_IN_PROGRESS )
        {
        if( QueueElementCmp( pHandle, iSlotNumber, TY_REQUEST_GET_PICT,
                pfnCompare, pClientNumber, pClientID,
                &VFileQueue.CurrentElement ) )
            {
            *fSuccess = TRUE;
            VFileQueue.CurrentElement.Base.fCancel = TRUE;
            MutexGive( VFileQueue.mtxQueueAccess );
            return E_OK;
            }
        }
    MutexGive( VFileQueue.mtxQueueAccess );
    return E_OK;.
}
```

```c
/*
 * markFile.h 1.9 04/09/93
 * Copyright (C) 1992 Accom Corporation
 */
#ifndef MARK_FILE_WIN_INC
define MARK_FILE_WIN_INC /*--- includes ---*/
ifndef SVLIST_INC
include "svlist.h"
endif ifndef VIDEO_INC
include "video.h"
endif ifndef VWIN_INC
include "vwin.h"
endif ifndef _XtIntrinsic_h
include <X11/Intrinsic.h>
#endif

/*--- defines ---*/
/* labels should be about 25 chars in width. */
#define MARK_FILE_CMNT_STR_SIZE         50
#define MARK_FILE_MAX_LABEL_LEN         (MARK_FILE_CMNT_STR_SIZE / 2
)
#define MARK_FILE_TC_STR_SIZE           12
#define MARK_FILE_SPEED_STR_SIZE        3
#define MARK_FILE_TYPE_STR_SIZE         12
#define MARK_FILE_REEL_NAME_STR_SIZE    31
#define MF_NUM_OF_TC_LABELS             3
#define MF_NUM_OF_TYPE_LABELS           2
define MF_NUM_OF_NOTE_LINES            2 define NUM_OF_ROWS_OF_MARKS            2
define NUM_OF_MARKS_PER_ROW            4
#define NUM_OF_MARKS_DISPLAYED          (NUM_OF_MARKS_PER_ROW * NUM_OF_ROWS_OF_M
ARKS)
/* NOTE: This should be defined somewhere else. */
#define MAX_NUM_OF_NTSC_MARKS           48
#define MAX_NUM_OF_PAL_MARKS            32
#define MARK_FILE_NUM_OF_TC_LBLS        2
#define MARK_FILE_NUM_OF_TYPE_LBLS      2

/* cursor movement */
/* NOTE: must correspond to the arg entry in keybd.cfg. */
#define MF_MOVE_LEFT                    0
#define MF_MOVE_RIGHT                   1
#define MF_MOVE_UP                      2
```

```
#define MF_MOVE_DOWN                    3
#define MF_PAGE_UP                      4
#define MF_PAGE_DOWN                    5
#define MF_MOVE_TO_START                6
#define MF_MOVE_TO_END                  7
#define MF_POPDOWN_WINDOW               8
#define MF_TO_PREV_PICT                 9
#define MF_TO_NEXT_PICT                 10

/* drawing mask */
#define MARK_FILE_DRAW_NONE             0x00
#define MARK_FILE_DRAW_MARK_ID          0x01
#define MARK_FILE_DRAW_TC_LABEL         0x02
#define MARK_FILE_DRAW_TYPE_LABEL       0x04
#define MARK_FILE_DRAW_NOTES_LABEL      0x08
#define MARK_FILE_DRAW_ALL_LABELS       (MARK_FILE_DRAW_MARK_ID | MARK_FILE_DRAW
_TC_LABEL | MARK_FILE_DRAW_TYPE_LABEL | MARK_FILE_DRAW_NOTES_LABEL )

/* static strings */
#define MF_TYPE_STR                     "TYPE"
#define MF_UNKNOWN_STR                  "Unknown"

/*--- data defs ---*/
typedef struct
{
    XFontStruct     *pFontInfo;
    Pixel           fgColor;
    Pixel           bgColor;
    Pixel           vidColor;
    Pixel           noVidColor;
    Pixel           modifyHighlight;
    sint            textBorder;
    sint            pictTopOffset;
    sint            pictLeftOffset;
    sint            tcLabelTopOffset;
    sint            labelTopOffset;
    sint            labelLeftOffset;
    sint            labelBottomOffset;
    sint            labelFrameWidth;
} MarkFileRsrcsSt, *PMarkFileRsrc;

typedef struct
{
    Widget          markFilePict;
    Widget          tcLabel;
    Widget          notesLabel;
    Widget          typeLabel;
    Widget          markID;
    VWin            vidWin;
    char            acCommentStr[MARK_FILE_CMNT_STR_SIZE + 2];
    char            acTcStr[MARK_FILE_TC_STR_SIZE];
```

```
        char               acSpeedStr[MARK_FILE_SPEED_STR_SIZE + 1];
        char               acDurStr[MARK_FILE_TC_STR_SIZE + 1];
        uint               iMarkType;
        uint               iItemNumber;
        boolean            fHasPict;
} MarkFileItemSt;

typedef struct
{
    SEG_LIB_ITEM           SegItem;
    uint8 *                pCurrentPicture;
    SEG_LIB_PICTURE_TYPE   tyPicture;
    char                   acCommentStr[MARK_FILE_CMNT_STR_SIZE + 1];
    boolean                fSegItemChanged;
    boolean                fPictureChanged;
    boolean                fCommentChanged;
}NewSegmentSt;

/* The User Task controls lastPageIndex, currItemIndex, and currIndex.
 * The Window Task controls pCurrItem currFirstIndex.
 */ typedef struct
{
    Widget                 markFileShell;
    Widget                 markFileTitle;

/* Drawing GCs and vid pict info. */
    GC                     textGC;
    GC                     videoGC;
    GC                     noVideoGC;
    Dimension              pictHeight;
    Dimension              pictWidth;
    sint                   iMarkPictBorder;

/* text info */
    sint                   yCharHeight;
    sint                   iOneCharWidth;
    sint                   borderWidth;
    sint                   iLabelPixLen;
    sint                   iTcWidth;

MUTEX_ID               mtxMarkFileAccess;
    boolean                fModifyMode;
    uint8 *                pLiveVOMem;
    NewSegmentSt           newSegment;

boolean                fPopedup;
    uint                   fRedrawType;
```

```
        sint            lastPageIndex;  /* Index of 1st segment last request*/
        SVLIST          markItemList;   /* List of Picture Info             */
        MarkFileItemSt  *pCurrItem;     /* Current ptr of markItemList      */
        sint            currItemIndex;  /* Index into markItemList          */
        sint            currIndex;      /* Index into pCurrentSegList       */
        sint            currFirstIndex; /* Index of 1st segment last drawn  */
        SegmentListSt * pCurrentSegList;/* Ptr to Current Segment List      */
        MarkFileRsrcsSt markFileRsrcs;
        char            acCurrSrcName[MARK_FILE_REEL_NAME_STR_SIZE +1];
} MarkFileWindSt;

/*--- function defs ---*/ extern enum ERC MarkfileSegLibCallback( SegLibClientID clientID,
        SegLibSegmentID segmentID, void * pClientData,
        TY_CALLBACK_ACTION tyAction );

extern enum ERC MarkFileMoveCursor( void * pData );
extern enum ERC SelectMark( void * pData );

extern enum ERC MarkFilePopdown( void * pData );
extern enum ERC PopupVideoMarkFileWind( SegLibClientID clientID,
        SegmentListSt * pCurrentSegList );

extern enum ERC PopupMarkFileCmntWin( void * pData );
extern enum ERC ChangeMarkFileMode( void * pData );
extern enum ERC MarkFileChangeSrc( void * arg );
extern enum ERC MarkFileModifyCommit( void * arg );
extern enum ERC MarkFileMarkInOutDur( enum CMD_CODE iCmd, void * arg );
extern enum ERC MarkFileSetInOutDur( enum CMD_CODE iCmd, void * arg );
extern enum ERC MarkFileRecallInOutDur( enum CMD_CODE iCmd, void * arg );
extern enum ERC MarkFileAddEffect( enum CMD_CODE iCmd, void * arg );
extern enum ERC MarkFileGoto( enum CMD_CODE iCmd, void * arg );
extern enum ERC MarkFileAdd( enum CMD_CODE iCmd, void * arg );

#endif
```

```
#ifndef BLAST_ID
static char file_id[] = "@(#) segmentLib.h 1.4@(#), 04/13/93, 18:29:22";
#endif
/*
 * Copyright (C) 1993 Axial Corporation
 *
 */

/*
 * This module contains the Segment Librarian.
 */ define SEG_LIB_VFILE_ROOT_NAME  "AxialVFile"
define SEG_LIB_TEXTVF_SIZE      200
define SEG_LIB_VIDEOVF_SIZE     48 define SEG_LIB_REEL_NAME_LENGTH  29
define SEG_LIB_COMMENT_SIZE      64 typedef uint32  SegLibClientID;

typedef uint32  SegLibSegmentID;

define SEG_LIB_CLIENT_ID_NONE    0 define SEG_LIB_SEGMENT_ID_NONE   0 typedef struct
{
    SegLibSegmentID segmentID;
    struct TIMECODE tcStart;
    struct TIMECODE tcEnd;
    uint32          lChMask;
    uint32          tySegment;
    char            acReelName[SEG_LIB_REEL_NAME_LENGTH];
    I_ENODE         iEnode;
    I_REV           iRev;
    boolean         HeadPictures[N_PICT_SIZES];
    boolean         TailPictures[N_PICT_SIZES];
    uint            nSequencePictures[N_PICT_SIZES];
    boolean         IconPictures[N_PICT_SIZES];
}SEG_LIB_ITEM;

typedef enum
{
    ACTION_TRANSFER_COMPLETE,
    ACTION_TRANSFER_CANCELED,
    ACTION_SEGMENT_MODIFIED,
    ACTION_SEGMENT_DELETED,
```

```
    ACTION_SEGMENT_ADDED,
    TY_CALLBACK_ACTION_MAX
}TY_CALLBACK_ACTION;

typedef enum ERC (*pfnSegLibSegChanged)( SegLibClientID, SegLibSegmentID,
        void *, TY_CALLBACK_ACTION);

/* Query Stuff
 */
typedef enum
{
    SEG_LIB_MATTE_SEG,
    SEG_LIB_FILL_SEG,
    SEG_LIB_BACKGROUND_SEG,
    SEG_LIB_WIDE_SHOT_SEG,
    SEG_LIB_CLOSEUP_SHOT_SEG,
    SEG_LIB_HEAD_SHOT_SEG,
    SEG_LIB_BEAUTY_SEG,
    SEG_LIB_SEGMENT_TYPE_MAX
}SEG_LIB_SEGMENT_TYPE;

typedef enum
{
    SEG_LIB_TY_PICUTRE_HEAD_PICTURE,
    SEG_LIB_TY_PICUTRE_TAIL_PICTURE,
    SEG_LIB_TY_PICUTRE_ICON_PICTURE,
    SEG_LIB_TY_PICUTRE_SEQUENCE_PICTURE,
    SEG_LIB_PICTURE_TYPE_MAX
}SEG_LIB_PICTURE_TYPE;

typedef union
{
    char *                  pReelName;   /* Reel Name                    */
    struct TIMECODE         tcStart;     /* Start Timecode Range         */
    struct TIMECODE         tcEnd;       /* End Timecode Range           */
    struct TIMECODE         tcEnclosing;/* End Timecode Range            */
    sint32                  lChMask;     /* Channel Mask                 */
    char *                  pKeyWord;    /* Key Words in comment field   */
    SEG_LIB_SEGMENT_TYPE    tySegment;   /* Type of Segment              */
    struct
    {
        uint                iPictSize;   /* Size of Picture              */
        SEG_LIB_PICTURE_TYPE tyPicture;  /* Type of Picture              */
    }PictType;
}QUALIFIER;

typedef enum
{
```

```
    QUALIFIER_REEL_NAME,
    QUALIFIER_START_TC,
    QUALIFIER_END_TC,
    QUALIFIER_ENCLOSING_TC,
    QUALIFIER_CH_MASK,
    QUALIFIER_KEYWD,
    QUALIFIER_PICTURE_TYPE,
    QUALIFIER_SEGMENT_TYPE,
    QUALIFIER_TYPE_MAX,
}QUALIFIER_TYPE;

typedef enum
{
    CONSTRAIN_QUALIFIER,
    INCLUDE_QUALIFIER,
    QUALIFIER_ACTION_MAX,
}QUALIFIER_ACTION;

typedef struct
{
    QUALIFIER_ACTION    Action;
    QUALIFIER_TYPE      tyQualifier;
    QUALIFIER           QueryQualifier;
}SEG_LIB_QUERY_ELEMENT;

enum ERC SegLibAddFileToSegDBase( char * pFileName );

enum ERC SegLibGetVFiles();

SegLibClientID SegLibClientCreate( char * pClientName,
    pfnSegLibSegChanged pfnCallback, void * pClientData );

enum ERC SegLibDiscardClient( SegLibClientID clientID );

enum ERC SegLibGetSegmentInfo( SegLibClientID clientID,
    SegLibSegmentID segmentID, SEG_LIB_ITEM * pSegItem, char * pCommentBuff,
    uint sCommentBuff );

enum ERC SegLibAddNewSegment( SegLibClientID clientID,
    SegLibSegmentID * psegmentID, SEG_LIB_ITEM * pSegItem, uint8 * pMem,
    SEG_LIB_PICTURE_TYPE tyPicture, uint iPictSize,  char * pComments );

enum ERC SegLibRedefineSegment( SegLibClientID clientID,
    SegLibSegmentID segmentID, SEG_LIB_ITEM * pSegItem, uint8 * pMem,
    SEG_LIB_PICTURE_TYPE tyPicture, uint iPictSize, char * pComments );

enum ERC SegLibGetPictureForSegment( SegLibClientID clientID,
    SegLibSegmentID segmentID, SEG_LIB_PICTURE_TYPE tyPicture, uint iPictSize,
    uint8 * pVOMem );
```

```
enum ERC SegLibCancelPictureForSegment( SegLibClientID clientID,
    SegLibSegmentID segmentID, SEG_LIB_PICTURE_TYPE tyPicture, uint iPictSize,
    boolean * pfSuccess );

enum ERC SegLibQueryASegment( SegLibClientID clientID,
    SVLIST * psvQueryElements, SegLibSegmentID segmentID, boolean * fStatus );

enum ERC SegLibQuerySegments( SegLibClientID clientID,
    SVLIST * psvQueryElements, SVLIST * psvSegItems, SVLIST * psvComments );

enum ERC SegLibGetSegmentsbyEditSeg( SegLibClientID clientID,
    I_ENODE iEnode, I_REV iRev, SVLIST * psvSegItems, SVLIST * psvComments );

enum ERC SegLibSetTySegmentMask( uint32 * tySegment,
    SEG_LIB_SEGMENT_TYPE iType, boolean fSetOn );

enum ERC SegLibQueryTySegmentMask( uint32 tySegment,
    SEG_LIB_SEGMENT_TYPE iType, boolean * fIsOn );
```

```
/*
 * <@(#) vwin.h 1.8@(#), 04/09/93 22:37:49>
 * Copyright (C) 1990 Axial Corporation
 */
/*
 * Clients must import video.h before this file.
 */ ifndef VWIN_INC
define VWIN_INC

/*
 * This file present the VideoWin facilities for managing
 *   the video window server of the axial editor.
 * The video window server is supported by three boards in the
 *   system. The server software, together with the memory management
 *   facilities described in vxmem.h, manage the resources and
 *   operation of these boards.
 * The boards are:
 *       the Input Video board (IV),
 *       the Image Cruncher board (IC), and
 *       the Output Video board (OV).
 * The function of these boards is presented elsewhere; in summary:
 * IV provides selection from among 10 input feeds to two Video
 * channels available for presenting Live video onscreen.
 * IC decimates the video to 4 sizes, reads or writes decimated data
 * to and from IC memory, and can convert the IC YUV pictures to
 * RGB pictures in VO board memory.
 * VO mixes the graphics for the X/Motif windows with the Video Windows
 * for monitor display.
 *
 * Application software built on top of these facilities include
 *   the normal editor source display windows, the trimClips facility,
 *   and the Video Still Database (VSDB) Manager.
 *
 * Video Windows are created as either Live or Still windows.
 *   A Live window can act like a Still window, depending on the
 *   allocation of the Live video channels.
 *   A Still window cannot be made Live (it has no permanently
 *   allocated Image Cruncher Memory block).
 *
 * Each Video Channel can be allocated to at most one Video Window
 *   for a given field.
 *
 * Requests for a given configuration are queued during user time,
 *   and are processed during the Vertical interrupt.
 *
 *   INCOMPLETE - More of the interfaces should support the fUpdateScreen
 *   parameter, to optimize the Tilemap rebuilding.
 */
```

```
typedef void *      VWin;       /* opaque handle */ define VWIN_NONE          NULL define CREATE_HIDDEN      TRUE
define CREATE_SHOWN       FALSE define UPDATE_SCREEN        TRUE
define DONT_UPDATE_SCREEN   FALSE

/*- VWIN
 * VWinCreateLive creates a Live VWin object, with associated buffer
 *  space in IC and VO memory.
 * VWinCreateStill creates a Still VWin object, with associated buffer
 *  space in VO memory.
 *
 * RETURNS VWIN_NONE on any errors.
 */
VWin VWinCreateLive(
        uint      pictSize,        /* PICT_X8 .. PICT_X1         */
        uint16    xDest,           /* left edge on display       */
        uint16    yDest,           /* top edge on display        */
        uint8 *   pICBuff,         /* Image Cruncher buffer      */
        uint8 *   pVOBuff,         /* Video Output buffer        */
        boolean   fCreateHidden ); /* Do not display at first    */

VWin VWinCreateStill(
        uint      pictSize,        /* PICT_X8 .. PICT_X1   */
        uint16    xDest,           /* left edge on display */
        uint16    yDest,           /* top edge on display  */
        uint8 *   pVOBuff,         /* Video Output buffer  */
        boolean   fCreateHidden ); /* Do not display at first */

/*- VWIN
 * VWinClose frees a vwin, and associated buffer(s). It will vanish.
 *
 * RETURNS errors for bad vwins and for a vwin with an allocated channel.
 */
enum ERC VWinClose( VWin vwin );

/*- VWIN
 * VWinHide hides a vwin. This just precludes the window from appearing
 *  in the tile map, which will keep it offscreen.
 *
 * RETURNS errors for bad vwins.
 */
```

```
enum ERC VWinHide( VWin vwin );

/*- VWIN
 * VWinShow "un-hides" a vwin. This just assures that the window appears
 * in the tile map, which will put it offscreen.
 *
 * RETURNS errors for bad vwins.
 */
enum ERC VWinShow( VWin vwin );

/*- VWIN
 * VWinIsHidden returns TRUE if vwin exists but is hidden,
 * and returns FALSE if vwin exists and is not hidden.
 *
 * RETURNS errors for bad vwins.
 */
enum ERC VWinIsHidden( VWin vwin, boolean *pfIsHidden );

/*- VWIN
 * VWinCreatedLive for after the fact type checking.
 * This does not indicate the active state of a Live VWin,
 * but rather only the type as created.
 * Use VWinHasVChannel to determine if the window owns one
 * of the live video channels.
 *
 * RETURNS errors for bad vwins.
 */ define VWIN_CREATED_LIVE   TRUE
define VWIN_CREATED_STILL  FALSE enum ERC VWinCreatedLive( VWin vwin, boolean *fIsLive );

/*- VWIN
 * VWinGetSize for after the fact type checking.
 *
 * RETURNS errors for bad vwins.
 */
enum ERC VWinGetSize( VWin vwin, uint *pictSize );

/*- VWIN
 * VWinGetICBuffer is used to get a pointer to the IC memory
 * buffer associated with a Live vwin. This can be used to
 * set up stills for a Live vwin in Still mode.
 *
```

```
 * Caveat Emptor: This will return the pointer even if the
 *  vwin is currently in Live mode, i.e. has a channel allocated to it.
 *
 *  RETURNS errors for bad vwins, or for vwins created as Still.
 */
enum ERC VWinGetICBuffer( VWin vwin, uint8 **ppICBuffer );

/*- VWIN
 * VWinGetVOMemLocation is used to get a pointer to the Video Output memory
 *  location associated with a video window. This can be used by another
 *  vwin to share the same output.
 */
enum ERC VWinGetVOMemLocation( VWin vwin, uint8 **ppVOMem );

/*- VWIN
 * VWinHasVChannel sets the flag TRUE if the VWin owns one of the
 *  Live channels. It returns an erc if the VWin is a Still win,
 *  or is otherwise invalid.
 */
enum ERC VWinHasVChannel( VWin vwin, boolean *fIsLive );

/*- VWIN
 * VWinLower pushes the window to the bottom of the stack.
 *  It will rebuild the tiling map, but will NOT Call VOTileBankReset().
 *
 *  RETURNS errors for bad vwins.
 */
enum ERC VWinLower( VWin vwin );

/*- VWIN
 * VWinMakeLive allocates the indicated channel to vwin.
 *  It also selects the indicated source on that channel.
 *
 *  RETURNS errors for bad vwins, bad iSrcInput, or if Video Channel
 *              is unavailable. I.e. client must free a channel for
 *              use in order to re-use it.
 */
enum ERC VWinMakeLive( VWin vwin, boolean VCh_AorB, uint iSrcInput );

/*- VWIN
 * VWinMakeStill frees an allocated channel, associated with vwin.
 *
 *  RETURNS errors for bad vwins. No error for a vwin with no channel.
 */
enum ERC VWinMakeStill( VWin vwin );
```

```
/*- VWIN
 * VWinRaise pushes the window to the top of the stack.
 *   It will rebuild the tiling map, but will NOT Call VOTileBankReset().
 *
 *   RETURNS errors for bad vwins.
 */
enum ERC VWinRaise( VWin vwin );

/*- VWIN
 * VWinResetStill requests that the still picture be reset to
 *   display from the passed VideoOutput Buffer.
 * If fUpdateScreen is true, the VIdeoOuput control memory will
 *   be rebuilt and updated. If false, then the video output will
 *   not be affected until the next window change requests an update.
 *   This is useful for resetting a series of stills. The flag is
 *   set FALSE for all but the last call.
 *
 *   RETURNS errors for bad vwins. Error if vwin has an allocated channel.
 */
enum ERC VWinResetStill( VWin vwin, uint8 * pVOBuff, boolean fUpdateScreen );

/*- VWIN
 * VWinLoadStill requests that the passed Mem buffer be converted to
 *   the VO buffer for the passed still window, passing through
 *   the transfer channel for the vwin's size.
 *
 *   NOTE: This will block until the channel is available for transfer.
 *
 *   RETURNS errors for bad vwins. Error if vwin has an allocated channel.
 */
enum ERC VWinLoadStill( VWin vwin, uint8 * pMemBuff );

/*- VWIN
 * VidOutPictLoadStill requests that the passed Mem buffer be converted to
 *   the passed VO buffer, passing through
 *   the transfer channel for the passed size.
 *
 *   NOTE: This will block until the channel is available for transfer.
 *
 *   RETURNS errors for bad vwins. Error if vwin has an allocated channel.
 */
enum ERC VidOutPictLoadStill( uint8 * pVOBuff, uint8 * pMemBuff, uint pictSize);

/*- VWIN
 * VWinSetLocation Sets the location of the window, without raising
 *   or lowering it. It will allow setting position offscreen.
```

```
*
*   RETURNS errors for bad vwins, etc.
*/
enum ERC VWinSetLocation(
        VWin        vwin,
        uint16      xDest,              /* left edge on display     */
        uint16      yDest );             /* top edge on display      */

/*- VWIN
* TrimClipsDaemon is the background daemon that maintains the
*   IC buffers for the trimclips, and handles pushing the same
*   buffers across to the VO board when thr trimclips popup is popped up.
*
*   NEVER RETURNS;
*/
void TrimClipsDaemon();

/*- VWIN
* SetTrimClipDaemon is the interface to the TrimClipsDaemon to set up
*   marking for a source, using the associated channel.
*
*   RETURNS:    errors if cLSrc is not available.
*/
enum ERC SetTrimClipDaemon( char cLSrc, boolean VCh_AorB );

typedef void (*pfnPictTransfer)( uint8 * pICMem, uint iPictSize );

/*- VWIN
* SetTrimClipMark is the interface to the TrimClipsDaemon to set
*   a mark and start gathering pictures after the mark.
*
*   RETURNS:    errors if cLSrc is not marking.
*/
#ifdef TIMECODE_INC
enum ERC SetTrimClipMark( char cLSrc, struct TIMECODE * ptc,
    boolean fCapturePicture, pfnPictTransfer pfnCallback );
endif TIMECODE_INC /*- VWIN
* TrimClipsRequestTCPicture is the interface to requesting trim clip
* pictures from the TrimClipsDaemon for the trim clip popup.
*
*   RETURNS:    errors if trim clip pictures not available.
*/
enum ERC TrimClipsRequestTCPicture( uint iPict, uint8 * pVOMem, void * pData );

/*- VWIN
* TrimClipsGetCurrentICMem is called during Rave Loading when a device has
```

```
 * reached a rave picture that needs to be captured. It returns the current
 * IC mem location.
 *
 * RETURNS:    E_OK or erc
 */
#ifdef TIMECODE_INC
enum ERC TrimClipsGetCurrentICMem( struct TIMECODE * ptc, uint8 ** ppICMem );
endif TIMECODE_INC /*- VWIN
 * LoadTrimClips is the interface to the TrimClipsDaemon to move
 * buffers across to the VO board when the trimclips popup is popped up.
 *
 * RETURNS:    errors if no mark context;
 */
enum ERC LoadTrimClips();

/*- VWIN
 * GetMarkAndPrecedingFrames is an interface to the TrimClips buffers
 * to get the list of obtained frames by timecode. All 25 times are
 * returned, with frames that could not be obtained set to UNDEFINED.
 *
 * RETURNS:    errors if mark context is incorrect.
 */
#ifdef TIMECODE_INC
enum ERC GetTrimClipFrames(
            char                cLSrcMark,
            struct TIMECODE *   ptcMark,        /* Input, for reference */
            struct TIMECODE *   ptcFrames );    /* RETURN values        */
endif TIMECODE_INC endif VWIN_INC
```

```
#ifndef BLAST_ID
static char file_id[] = "@(#) vomem.h 1.1@(#), 02/12/93, 11:03:26";
#endif
#ifndef VOMEM_INC
define VOMEM_INC /*
 *   This file contains the exported interface to the Video Output Memory
 *   Manager or VOMM.
 *   Video Output Memory is divided into blocks of a fixed size. The sizes
 *   a block can have correspond to 1 of the 4 picture sizes. Clients
 *   may register themselves, and then request blocks of certain sizes which
 *   they can use, and then Free when done.
 */

/*
 *   The definition of the Client ID Handle.
 */
typedef uint32      VOMemClientID;
#define VO_MEM_CLIENT_ID_NONE   0

/*
 *   The definition of a Block ID Handle.
 */
typedef uint32      VOMemBlockID;
define VO_MEM_BLOCK_ID_NONE    0 typedef enum ERC    (*pfnVOMemMgrCallback)(VOMemBlockID, void *);

VOMemClientID VOMemClientCreate( char * pCliendName,
                                 pfnVOMemMgrCallback pfnCallback,
                                 void * pClientState                );

enum ERC    VOMemDiscardClient( VOMemClientID clientID              );

VOMemBlockID VOMemAlloc(  VOMemClientID clientID, uint iPictSize,
                          uint8 ** ppVOMem     );

enum ERC    VOMemFree(    VOMemClientID clientID, VOMemBlockID blockID );

enum ERC    VOMemUnlock(  VOMemClientID clientID, VOMemBlockID blockID );

enum ERC    VOMemRelock(  VOMemClientID clientID, VOMemBlockID blockID,
                          boolean * pfReLocked );

enum ERC VOMemTouch( VOMemClientID clientID, VOMemBlockID blockID    );

enum ERC VOMemGetPtr(  VOMemClientID clientID, VOMemBlockID blockID,
                       uint8 ** ppVOMem                              );

enum ERC VOMemIsLocked(  VOMemClientID clientID, VOMemBlockID blockID,
                         boolean * pfLocked                           );
```

```
#endif VOMEM_INC
```

```
/*
 * <@(#) vfile.h 1.30@(#), 05/13/92 10:49:00>
 * Copyright (C) 1992 Axial Corporation
 */
#ifndef VFILE_INC
define VFILE_INC ifndef SVLIST_INC
include "svlist.h"
endif ifndef VIDEO_INC
include "video.h"
endif ifndef VXSEM_INC
include "vxsem.h"
endif typedef void *   VFile;

define VFILE_NONE           NULL define VFILE_EXTENSION         ".vmf"
define VFILE_DEFAULT_REEL_NAME "No Reel"

#define VFILE_COMMENT_SIZE          64
#define VFILE_NUMBER_OF_PICTURES    48
#define VFILE_REEL_NAME_LENGTH      29
define VFILE_SESSION_NAME_LENGTH   80 define VFILE_CLIENT_MARKFILE       0
define VFILE_CLIENT_LIBRARIAN      1

/*
 * TIME TYPES.
 */
#define TIME_TYPE_EMPTY         0x97
#define TIME_TYPE_ALLOCATED     0x9F
#define TIME_TYPE_TIMECODE      1
#define TIME_TYPE_INDEX         2
define TIME_TYPE_FOOTFRAME     3 typedef struct
{
    uint32   ifeet;
    uint32   iframe;
}FOOT_FRAME;

typedef struct
```

```
{
    I_ENODE   iEnode;
    I_REV     iRev;
}DBASE_CLIP;

typedef union
{
    struct TIMECODE  tcPicture;
    uint32           iPicture;
    FOOT_FRAME       ffPicture;
    DBASE_CLIP       dbPicture;
}PICTURE_TIME;

typedef struct
{
    PICTURE_TIME  Time;
    uint8         tyTime; /* Specifies the member of the union of Time */
}VFILE_TIME_REC;

/*
 * PICTURE TYPES
 */
typedef enum
{
    VFILE_TY_PICTURE_STILL,
    VFILE_TY_PICTURE_MARK,
    VFILE_TY_PICTURE_HARRY_CLIP,
    VFILE_TY_PICTURE_HEAD,
    VFILE_TY_PICTURE_TAIL,
    VFILE_TY_PICTURE_ICON,
}VFILE_PICTURE_TYPE;

/* Can have values from VFILE_PICTURE_TYPE, or an integer from 0 - 127 */
typedef uint8     PICTURE_TYPE;

/* SEGMENT_TYPE Specifies the attributes of the segment defined in this entry.
 * It is a bitmapped uint16 with these bits, VFILE_SEGMENT_BEAUTY,
 * VFILE_SEGMENT_MATTE, VFILE_SEGMENT_BACKGROUND, VFILE_SEGMENT_FILL...
 */

/*
 * Segment Types are a bitmap.
 */
#define VFILE_TY_SEGMENT_BEAUTY        0x0001
#define VFILE_TY_SEGMENT_MATTE         0x0002
#define VFILE_TY_SEGMENT_BACKGROUND    0x0004
#define VFILE_TY_SEGMENT_FILL          0x0008
#define VFILE_TY_SEGMENT_WIDE          0x0010
#define VFILE_TY_SEGMENT_CLOSEUP       0x0020
#define VFILE_TY_SEGMENT_HEADSHOT      0x0040
```

```
typedef uint16      SEGMENT_TYPE;

define FIRST_SLOT      0 typedef uint       SLOT_NUMBER;

typedef struct
{
    VFILE_TIME_REC  Time1;
    VFILE_TIME_REC  Time2;
    uint32          lnFields;
    sint32          lSpeed;
    uint32          lChMask;
    PICTURE_TYPE    tyPicture;
    SEGMENT_TYPE    tySegment;
    boolean         fPictureExists;
    uint            iPictureSize;
    char            acReelName[VFILE_REEL_NAME_LENGTH];
}VFILE_SEG_INFO;

typedef enum
{
    TY_REQUEST_GET_PICT,
    TY_REQUEST_PUT_PICT,
    TY_REQUEST_FLUSH
}VFILE_TY_REQUEST;

typedef enum ERC (*pfnVFileCallback)( VFile, SLOT_NUMBER, VFILE_TY_REQUEST,
    void *, void *, void *);

typedef enum ERC (*pfnVFileClientCmp)( void *, void *, void *, void *,
    sint * );

enum ERC CopyFromICtoMem( uint8 * pICMem, uint8 * pMem, uint iPictureSize );

uint32  GetSizeOfPicture( uint iPictureSize );

extern enum ERC VFileMarkHasBeenSet( struct TIMECODE * pMarkTc, char cLSrc,
    boolean fTail );

VFile VFileCreate( uint16 iPictureSize, uint16 iMaxNumberOfPictures,
    char * pSessionName, char * pFileName, boolean fComments, boolean fVideo );

VFile VFileOpen( char * pFileName );

enum ERC VFileClose( VFile pHandle );
```

```
enum ERC VFileGetListOfAllVFiles( char * pSessionDirectory,
    SVLIST * pListOfNames );

enum ERC VFileShow( VFile pHandle );

enum ERC VFileGetInfo( VFile pHandle, uint16 * iPictureSize,
    uint16 * iMaxNumberOfPictures, boolean * fComments, boolean * fVideo,
    char * pSessionName, uint sSessionName, char * pFileName, uint sFileName );

enum ERC VFileGetEmptySlot( VFile pHandle, SLOT_NUMBER * iSlotNumber );

enum ERC VFileGetSlotInfo( VFile pHandle, SLOT_NUMBER iSlotNumber,
    VFILE_SEG_INFO * pvfInfo, char * pComments, uint sComments );

enum ERC VFileWriteSlot( VFile pHandle, SLOT_NUMBER iSlotNumber, uint8 * pMem,
    uint iPictureSize, VFILE_SEG_INFO * pvfInfo, char * pComments );

enum ERC VFileClearSlot( VFile pHandle, SLOT_NUMBER iSlotNumber );

enum ERC VFileRequestTransfer( VFile pHandle, SLOT_NUMBER iSlotNumber,
    uint8 * pVOMem, pfnVFileCallback pfnTransferComplete,
    void * pClientNumber, void * pClientID, void * pClientData );

enum ERC VFileCancelFromTransferQueue( VFile pHandle, SLOT_NUMBER iSlotNumber,
    pfnVFileClientCmp pfnCompare, void * pClientNumber, void * pClientData,
    boolean * fSuccess );

#endif
```

```
/*-
 *  Copyright (C) 1992 Accom Corporation
 *  markFile.c - File contains functions that create the markfile
 *         window.
 */
/*--- includes ---*/
#include "ax_types.h"
include "ax_string.h"
#include "stdlib.h"
#include "error.h"
#include "kbd.h"
#include "menu.h"
#include "pipe.h"
#include "task.h"
#include "svlist.h"
#include "focus.h"
#include "timecode.h"
#include "user_def.h"
#include "dataEntry.h"
#include "sync.h"                       /* SystemIsNtsc() */
#include "winPRIVATE.h"
#include "fileSFn.h"
#include "speed.h"
#include "mutex.h"

#include "vmem.h"
#include "vfile.h"

#include <Xm/Form.h>
#include <Xm/Frame.h>
#include <Xm/Label.h>
#include <Xm/LabelG.h>
#include <Xm/DrawnB.h>
#include <Xm/DrawingA.h>
#include <Xm/Separator.h>
include <Xm/RowColumn.h> include "segmentLib.h"
include "vomem.h"
#include "segList.h"
#include "markFile.h"
#include "markFRsrc.h"
#include "commentWin.h"
#include "winUtils.h"
#include "winSvcs.h"
#include "srcPicts.h"
#include "trimClip.h"
#include "device.h"
#include "devSlct.h"
#include "enode.h"
```

```c
#include "clip.h"
#include "channel.h"
#include "marksPlt.h"
#include "dataEntry.h"
#include "../workspace/timeUtils.h"
#include "workspace.h"
#include "edit_utils.h"

/*--- defines ---*/
#define EFF_NAME_LEN        40
#define DEBUG_MARKFILE_ADD  0x01
#define PUSH_FOCUS          TRUE
#define RESET_FOCUS         FALSE
#define CONVERT_INDEX_TO_LOCAL(index) (index % NUM_OF_MARKS_DISPLAYED)
#define BASE_MARK_FILE           "BASE_MARK_FILE"
#define MARK_FILE_MODIFY         "MARK_FILE_MODIFY"
#define MARK_FILE_SET_ENTER      "MARK_FILE_SET_ENTER"
#define MARK_FILE_EFF_ADD_CONFIRM   "MARK_FILE_EFF_ADD_CONFIRM"

/*--- data ---*/
static MarkFileWindSt       markFileSt;

/* Used to pass to the window task. */
typedef struct {
    MarkFileItemSt      *pMarkItem;
    sint                iMarkDisp;
    uint                iDrawMask;
} MarkFileWinMsgSt;

uint32  glDebugMarkfile = 0;

#define FULL_REDRAW      0
#define CURSOR_REDRAW    1
#define NEW_PICT_REDRAW  2
define FORCE_REDRAW     3 define GET_ALL_PICTURES    -1 define PICT_EMPTY      0
define PICT_ALLOCATED  1
#define PICT_REQUESTED  2
define PICT_GOTTEN     3 static boolean   fMarkFileVWinSetup = FALSE;
static boolean   fMarkingRavePicts = FALSE;

static VOMemClientID    vomClientHandle = VO_MEM_CLIENT_ID_NONE;
static SegLibClientID   mfSegClientID = SEG_LIB_CLIENT_ID_NONE;
static enum CMD_CODE    iCmdHold = CMD_NONE;
```

```c
static SegLibSegmentID   CurrentRaveSegmentID = SEG_LIB_SEGMENT_ID_NONE;

static char      *apcMarkItemTypes[] = {
        " ",
        "Foreground",
        "2-Shot",
        "ECU",
        };

/* used to setup the highlight. */
static uint       fFirstTime = 1;

enum ERC GetCurrentMarkFileName(char * pFullFileName, uint iFullLen,
        char * pBaseFileName, uint iBaseLen );

enum ERC GetCurrentMarkFile( VFile * ppHandle );

/*--- function defs ---*/
static void              ResetMarkFileWindow(void);

/*--- static funcs ---*/

/*--- WinSend ---*/
static void
WinSendMarkFilePopup( void )
{
    union REQUEST           requestSelect;

InitRequest( &requestSelect );
    requestSelect.reqWinService.tyReq = TY_REQ_WIN_SERVICE;
    requestSelect.reqWinService.winService = WIN_SVC_MARK_FILE_POPUP;
    requestSelect.reqWinService.pData = (void *) NULL;
    (void) SendRequest( I_TASK_WINDOW, &requestSelect );
} static void
WinSendMarkFileRedraw( void * pData )
{
    union REQUEST           requestSelect;

InitRequest( &requestSelect );
    requestSelect.reqWinService.tyReq = TY_REQ_WIN_SERVICE;
    requestSelect.reqWinService.winService = WIN_SVC_MARK_FILE_REDRAW;
    requestSelect.reqWinService.pData = (void *) pData;
    (void) SendRequest( I_TASK_WINDOW, &requestSelect );
} static void
WinSendMarkFilePopdown( void )
```

```
{
    union REQUEST          requestSelect;

InitRequest( &requestSelect );
    requestSelect.reqWinService.tyReq = TY_REQ_WIN_SERVICE;
    requestSelect.reqWinService.winService = WIN_SVC_MARK_FILE_POPDOWN;
    requestSelect.reqWinService.pData = (void *) NULL;
    (void) SendRequest( I_TASK_WINDOW, &requestSelect );
} void
WinSendMarkFileCopyICMem( uint8 * pICMem, uint iPictSize )
{
    union REQUEST          requestSelect;

InitRequest( &requestSelect );
    requestSelect.reqWinService.tyReq = TY_REQ_WIN_SERVICE;
    requestSelect.reqWinService.winService = WIN_SVC_MARK_FILE_COPY_IC_MEM;
    requestSelect.reqWinService.pData = (void *)pICMem;
    (void) SendRequest( I_TASK_WINDOW, &requestSelect );
}

/*- WIN
 *   RedrawMFNotesLabel()
 *   FIX ME: This function is only good for notes label with 2 lines.
 */
static void
RedrawMFNotesLabel(
    Widget          w,
    XtPointer       clientData,
    XtPointer       callData )
{
    sint            iLineLen;
    sint            iLabelEnd;
    sint            iLinePixLen;
    char            *pNextLine;
    char            acStrToDisp[MARK_FILE_CMNT_STR_SIZE + 1];
    sint            iData = (sint) clientData;
    MarkFileItemSt  *pMarkItem;

if (iData < 0 || iData > (NUM_OF_ROWS_OF_MARKS *
                              NUM_OF_MARKS_PER_ROW) )
        {
        LogError(E_BAD_INDEX, iData);
        return;
        } pMarkItem = (MarkFileItemSt *)
            P_SVLIST_ITEM(&markFileSt.markItemList, iData);
```

```
XClearArea( XtDisplay(pMarkItem->notesLabel),
        XtWindow(pMarkItem->notesLabel),
        markFileSt.markFileRsrcs.textBorder, 0,
        (uint) markFileSt.iLabelPixLen,
        (uint) (markFileSt.yCharHeight + markFileSt.borderWidth)
                * MF_NUM_OF_NOTE_LINES,
        FALSE );

if (pMarkItem->acCommentStr[0] != '\0')
    {
    /* Check whether the line has a \n, and replace it with a ' '. */
    (void) strcpy(acStrToDisp, pMarkItem->acCommentStr);
    while ( (pNextLine = index(acStrToDisp, '\n')) != NULL)
        {
        *pNextLine = ' ';
        }

/*
     * Now check the width of the line. If the line is longer
     * than the label, then chop it off at the first white space
     * from the right; else just chop it at the end of the label
     * length.
     */
    iLineLen = strlen(acStrToDisp);
    iLinePixLen = XTextWidth( markFileSt.markFileRsrcs.pFontInfo,
                acStrToDisp,
                iLineLen );
    iLabelEnd = markFileSt.iLabelPixLen - markFileSt.borderWidth;
    if (iLinePixLen > iLabelEnd)
            {
            boolean     fLineNeedsToBeChopped = TRUE;
            char        *pChopPoint;
            char        acTempStr[MARK_FILE_CMNT_STR_SIZE + 1];
            sint        iPixLenCheck, iTempLen;

strcpy(acTempStr, acStrToDisp);
            while ( fLineNeedsToBeChopped )
                {
                if ((pChopPoint = rindex(acTempStr, ' ')) != NULL)
                    {
                    iTempLen = pChopPoint - &acTempStr[0];
                    iPixLenCheck = XTextWidth(
                            markFileSt.markFileRsrcs.pFontInfo,
                            acStrToDisp,
                            iTempLen );

if( iPixLenCheck < iLabelEnd )
                        {
                        iLineLen = iTempLen;
```

```
                        fLineNeedsToBeChopped = FALSE;
                        }
                    else
                        *pChopPoint = '\0';
                    }
                else
                    {
                    /* Make a rough guess */
                    iLineLen = iLabelEnd / markFileSt.iOneCharWidth;
                    fLineNeedsToBeChopped = FALSE;
                    } pNextLine = &acStrToDisp[iLineLen];
                }

}

XDrawString( XtDisplay(pMarkItem->notesLabel),
                XtWindow(pMarkItem->notesLabel),
                markFileSt.textGC,
                markFileSt.markFileRsrcs.textBorder,
                markFileSt.yCharHeight,
                acStrToDisp,
                iLineLen );

if (pNextLine != NULL && *pNextLine != '\0')
            {
            XDrawString( XtDisplay(pMarkItem->notesLabel),
                    XtWindow(pMarkItem->notesLabel),
                    markFileSt.textGC,
                    markFileSt.markFileRsrcs.textBorder,
                    markFileSt.yCharHeight * MF_NUM_OF_NOTE_LINES,
                    pNextLine,
                    strlen(pNextLine) );
            }
        }

}

/*- WIN
 *   RedrawMFTcLabel()
 */
static void
RedrawMFTcLabel(
    Widget          w,
    XtPointer       clientData,
    XtPointer       callData )
{
    sint            iData = (sint) clientData;
    sint            iSpeedPixLen, iPixLen;
```

```
sint                    iStart;
MarkFileItemSt          *pMarkItem;

if (iData < 0 || iData > (NUM_OF_ROWS_OF_MARKS *
                                    NUM_OF_MARKS_PER_ROW) )
    {
    LogError(E_BAD_INDEX, iData);
    return;
    } pMarkItem = (MarkFileItemSt *)
        P_SVLIST_ITEM(&markFileSt.markItemList, iData);

if( markFileSt.fModifyMode && pMarkItem == markFileSt.pCurrItem )
    {
    XClearArea( XtDisplay(pMarkItem->tcLabel),
                XtWindow(pMarkItem->tcLabel),
                markFileSt.iTcWidth, 0,
                0, markFileSt.yCharHeight,
                FALSE );
    }
else
    {
    XClearArea( XtDisplay(pMarkItem->tcLabel),
                XtWindow(pMarkItem->tcLabel),
                0, 0,
                markFileSt.iLabelPixLen,
                markFileSt.yCharHeight,
                FALSE );

if (pMarkItem->acTcStr[0] != '\0')
        {
        XDrawString( XtDisplay(pMarkItem->tcLabel),
                XtWindow(pMarkItem->tcLabel),
                markFileSt.textGC,
                markFileSt.markFileRsrcs.textBorder,
                markFileSt.yCharHeight,
                pMarkItem->acTcStr,
                strlen(pMarkItem->acTcStr) );
        }
    } if (pMarkItem->acSpeedStr[0] != '\0')
    {
    iSpeedPixLen = XTextWidth( markFileSt.markFileRsrcs.pFontInfo,
                pMarkItem->acSpeedStr,
                strlen(pMarkItem->acSpeedStr) );
    iStart = (markFileSt.iLabelPixLen - iSpeedPixLen) / 2;
    XDrawString( XtDisplay(pMarkItem->tcLabel),
            XtWindow(pMarkItem->tcLabel),
```

```
                    markFileSt.textGC,
                    iStart,
                    markFileSt.yCharHeight,
                    pMarkItem->acSpeedStr,
                    strlen(pMarkItem->acSpeedStr) );
        } if (pMarkItem->acDurStr[0] != '\0')
        {
            iPixLen = XTextWidth( markFileSt.markFileRsrcs.pFontInfo,
                        pMarkItem->acDurStr,
                        strlen(pMarkItem->acDurStr) );
            XDrawString( XtDisplay(pMarkItem->tcLabel),
                    XtWindow(pMarkItem->tcLabel),
                    markFileSt.textGC,
                    markFileSt.iLabelPixLen - iPixLen
                            - markFileSt.markFileRsrcs.textBorder,
                    markFileSt.yCharHeight,
                    pMarkItem->acDurStr,
                    strlen(pMarkItem->acDurStr) );
        }
}

/*- WIN
 *  RedrawMFTypeLabel()
 */
static void
RedrawMFTypeLabel(
        Widget                  w,
        XtPointer               clientData,
        XtPointer               callData )
{
        sint                    iData = (sint) clientData;
        sint                    iStart, iTypePixLen;
        MarkFileItemSt          *pMarkItem;

if (iData < 0 || iData > (NUM_OF_ROWS_OF_MARKS *
                                    NUM_OF_MARKS_PER_ROW) )
        {
            LogError(E_BAD_INDEX, iData);
            return;
        } pMarkItem = (MarkFileItemSt *)
                P_SVLIST_ITEM(&markFileSt.markItemList, iData);

XClearArea( XtDisplay(pMarkItem->typeLabel),
                XtWindow(pMarkItem->typeLabel),
                0, 0,
                markFileSt.iLabelPixLen,
```

```
                markFileSt.yCharHeight,
                FALSE );

/* Center the type string. */
    iTypePixLen = XTextWidth( markFileSt.markFileRsrcs.pFontInfo,
                apcMarkItemTypes[pMarkItem->iMarkType],
                strlen(apcMarkItemTypes[pMarkItem->iMarkType]) );
    iStart = (markFileSt.iLabelPixLen - iTypePixLen) / 2;
    XDrawString( XtDisplay(pMarkItem->typeLabel),
            XtWindow(pMarkItem->typeLabel),
            markFileSt.textGC,
            iStart,
            markFileSt.yCharHeight,
            apcMarkItemTypes[pMarkItem->iMarkType],
            strlen(apcMarkItemTypes[pMarkItem->iMarkType]) );
}
/*- WIN
 * RedrawMarkFilePict()
 */
static void
RedrawMarkFilePict(
    Widget      w,
    XtPointer   clientData,
    XtPointer   callData)
{
    MarkFileItemSt  *pMarkItem;
    sint            iData = (sint) clientData;
    GC              GCtoUse;

if (iData < 0 || iData > (NUM_OF_ROWS_OF_MARKS *
                                NUM_OF_MARKS_PER_ROW) )
        {
        LogError(E_BAD_INDEX, iData);
        return;
        } pMarkItem = (MarkFileItemSt *)
            P_SVLIST_ITEM(&markFileSt.markItemList, iData);

if (pMarkItem->fHasPict)
        GCtoUse = markFileSt.videoGC;
    else
        GCtoUse = markFileSt.noVideoGC;

XFillRectangle( XtDisplay(pMarkItem->markFilePict),
            XtWindow(pMarkItem->markFilePict),
            GCtoUse,
            markFileSt.iMarkPictBorder, markFileSt.iMarkPictBorder,
            markFileSt.pictWidth + 1, markFileSt.pictHeight + 1 );
```

```
}
/*- WIN
 * RedrawMarkFileInfoLabel()
 */
static void
RedrawMarkFileInfoLabel( MarkFileItemSt *pMarkItem, sint iMarkDisp, uint iDrawMask )
{
    XmString            oneXmStr;

if (iDrawMask & MARK_FILE_DRAW_MARK_ID)
        {
        char                acStrNum[4];

(void) StrNPrintf(acStrNum, 4, "%3d", pMarkItem->iItemNumber, TRUE);
        oneXmStr = XmStringCreateSimple(acStrNum);
        XtVaSetValues(pMarkItem->markID,
                XmNlabelString, oneXmStr,
                NULL );
        XmStringFree(oneXmStr);
        } if (iDrawMask & MARK_FILE_DRAW_TC_LABEL)
        {
        RedrawMFTcLabel(NULL, (XtPointer) iMarkDisp, NULL);
        } if (iDrawMask & MARK_FILE_DRAW_TYPE_LABEL)
        {
        RedrawMFTypeLabel(NULL, (XtPointer) iMarkDisp, NULL);
        } if (iDrawMask & MARK_FILE_DRAW_NOTES_LABEL)
        {
        RedrawMFNotesLabel(NULL, (XtPointer) iMarkDisp, NULL);
        }
}
/*-
 * WIN
 * InitMarkFileItem -
 */
static MarkFileItemSt *
InitMarkFileItem(void)
{
    MarkFileItemSt      *pOneItem;

pOneItem = ShortTermMemAllocType(MarkFileItemSt);
    bzero( (char *) pOneItem, sizeof(MarkFileItemSt) );
```

```
    pOneItem->fHasPict = FALSE;

return(pOneItem);
}

/*- WIN
 * ClearOutMarkItemLabels(MarkFileItemSt *pMarkItem)
 */
static enum ERC
ClearOutMarkItemLabels( MarkFileItemSt *pMarkItem )
{
    enum ERC                    erc;

CK_E( VALIDATE_PTR( pMarkItem ) );

(void) StrNCopy(pMarkItem->acTcStr, MF_UNKNOWN_STR,
            MARK_FILE_TC_STR_SIZE, TERMINATE);
    pMarkItem->acDurStr[0] = '\0';
    pMarkItem->acSpeedStr[0] = '\0';
    pMarkItem->acCommentStr[0] = '\0';

return( E_OK );
}

/*- WIN
 * UpdateMarkItemLabels()
 * This function just updates the label information as well as any
 * display info.
 */
static enum ERC
UpdateMarkItemLabels(MarkFileItemSt *pDispMarkItem, sint iMarkNum )
{
    SEG_LIB_ITEM            SegItem;
    SegmentListElementSt *  pSegListElement;
    struct TIMECODE         tcDelta;

if (mfSegClientID == SEG_LIB_CLIENT_ID_NONE || pDispMarkItem == NULL)
        {
        return LogError(E_SOFTWARE, "No VFileList or mark display item.");
        } if( ClearOutMarkItemLabels(pDispMarkItem) != E_OK )
        {
        return ReLogError();
        }

/*
     * Update the mark file item labels.  Maek sure the data exist; if
     * not, just null out the first char in the display buffer.
```

```
    */
#if 0
    pDispMarkItem->fHasPict = FALSE;
#endif
    pDispMarkItem->iItemNumber = iMarkNum + 1;

if( iMarkNum < markFileSt.pCurrentSegList->segmentList.nItems )
        {
        if( ( pSegListElement = (SegmentListElementSt *)SVListGetItemPtr(
                &markFileSt.pCurrentSegList->segmentList, iMarkNum ) ) == NULL )
            {
            return ReLogError();
            }
        if( SegLibGetSegmentInfo( mfSegClientID, pSegListElement->segmentID,
            &SegItem, pDispMarkItem->acCommentStr, MARK_FILE_CMNT_STR_SIZE )
            != E_OK )
            {
            return( LogError( E_SOFT_S_I_I,
                "Can't get Info for Picture %d Segment %d", iMarkNum,
                pSegListElement->segmentID ) );
            }

(void) StrNPrintf(pDispMarkItem->acTcStr, MARK_FILE_TC_STR_SIZE,
                "%0t", &SegItem.tcStart );
        CK_LOG( TcComputeDeltaTc( &SegItem.tcEnd, &SegItem.tcStart,
            &tcDelta ) );
        (void) StrNPrintf(pDispMarkItem->acDurStr,
                    MARK_FILE_TC_STR_SIZE,
                    "%+t", &tcDelta );
        pDispMarkItem->acSpeedStr[0] = '\0';
        } return( E_OK );
} static enum ERC
ChangeToLiveCursor( )
{
    MarkFileItemSt          *pMarkItem;

if ( markFileSt.currItemIndex < 0
            || markFileSt.currItemIndex >= NUM_OF_MARKS_DISPLAYED)
        return LogError(E_BAD_INDEX, markFileSt.currItemIndex);

pMarkItem = (MarkFileItemSt *) P_SVLIST_ITEM(&markFileSt.markItemList,
                markFileSt.currItemIndex);

if( markFileSt.pLiveVOMem != NULL )
        {
        if ( VWinResetStill( pMarkItem->vidWin, markFileSt.pLiveVOMem,
```

```
                    UPDATE_SCREEN ) != E_OK )
                ReLogError();
        }
        return E_OK;
}

/*-
 * SetCurrentMarkItem()
 * This function sets the value of pCurrItem from currItemIndex, and
 * changes the window focus accordingly.
 */
static enum ERC
SetCurrentMarkItem( boolean fPushFocus )
{
    if ( markFileSt.currItemIndex < 0
            || markFileSt.currItemIndex >= NUM_OF_MARKS_DISPLAYED)
        return LogError(E_BAD_INDEX, markFileSt.currItemIndex);

markFileSt.pCurrItem = (MarkFileItemSt *)
            P_SVLIST_ITEM(&markFileSt.markItemList, markFileSt.currItemIndex);

if( glDebugMarkfile & DEBUG_MARKFILE_ADD )
        LogMsg(
            "MARKFILE: Selecting Local %d, Current %d, Current Ptr Item %d",
            markFileSt.currItemIndex, markFileSt.currIndex,
            markFileSt.pCurrItem->iItemNumber);
    if( fPushFocus)
    {
        if ( fFirstTime )
        {
            PushFocus( markFileSt.markFileShell );
            PopFocus();
            fFirstTime = 0;
        }
        PushFocus(markFileSt.pCurrItem->markFilePict);

}
    else
        SetTopFocus( markFileSt.pCurrItem->markFilePict);

return( E_OK );
}

/*- WIN
 *  CreateRowOfMarks -
 */
static void
CreateRowOfMarks(
    Widget          parent,
    Widget          widgetAbove,
```

```
        sint            numID,
        Widget          *pNextWidgetHook)
{
        sint                    i;
        sint                    totalCharHeight;
        Dimension               iNewWidth, iNewHeight;
        Dimension               iHighlightWidth, iShadowWidth;
        sint                    iLabelWidth, iPictOffset;
        char                    acName[32];
        char                    acID[4];
        Widget                  widgetOnLeft = NULL;
        Widget                  notesLabelFrame;
        Widget                  tcFrame, tglFrame;
        XmString                tyStr;
        MarkFileItemSt          *pMarkItem;

iPictOffset = markFileSt.markFileRsrcs.pictLeftOffset
                    + markFileSt.markFileRsrcs.labelLeftOffset;
        for (i = numID; i < (numID + NUM_OF_MARKS_PER_ROW); i++)
        {
            /* First, create an instance of the MarkFileItemSt */
            pMarkItem = InitMarkFileItem();

/* Create the number label */
            sprintf(acName, "%s%d", "markFileID", i);
            sprintf(acID, "%03d", i);
            tyStr = XmStringCreateSimple(acID);

pMarkItem->markID = XtVaCreateManagedWidget(
                        acName,
                        xmLabelGadgetClass,
                        parent,
                        XmNtopAttachment, XmATTACH_WIDGET,
                        XmNtopWidget, widgetAbove,
                        XmNrecomputeSize, FALSE,
                        XmNtopOffset, markFileSt.markFileRsrcs.pictTopOffset,
                        XmNleftAttachment, (i == numID) ?
                                    XmATTACH_FORM : XmATTACH_WIDGET,
                        XmNleftWidget, (i == numID) ?
                                    NULL : widgetOnLeft,
                        XmNleftOffset, markFileSt.markFileRsrcs.labelLeftOffset,
                        XmNalignment, XmALIGNMENT_END,
                        XmNlabelString, tyStr,
                        NULL );
            XmStringFree(tyStr);

/* Assign the Number */
            sprintf(acID, "%3d", i);
            tyStr = XmStringCreateSimple(acID);
            XtVaSetValues( pMarkItem->markID,
```

```
                    XmNlabelString, tyStr,
                    NULL );

XmStringFree(tyStr);

/* Create the picture widget */
sprintf(acName, "%s%d", "markFilePict", i);
pMarkItem->markFilePict = XtVaCreateManagedWidget(
            acName,
            xmDrawnButtonWidgetClass,
            parent,
            XmNtopAttachment, XmATTACH_WIDGET,
            XmNtopWidget, widgetAbove,
            XmNtopOffset, markFileSt.markFileRsrcs.pictTopOffset,
            XmNleftAttachment, (i == numID) ?
                    XmATTACH_FORM : XmATTACH_WIDGET,
            XmNleftWidget, (i == numID) ?
                    NULL : widgetOnLeft,
            XmNleftOffset, iPictOffset,
            NULL );
XtAddCallback(pMarkItem->markFilePict, XmNexposeCallback,
            RedrawMarkFilePict, (XtPointer) (i - 1) );

/* Get the border info and reset the width and height. */
XtVaGetValues( pMarkItem->markFilePict,
            XmNhighlightThickness, &iHighlightWidth,
            XmNshadowThickness, &iShadowWidth,
            XmNheight, &markFileSt.pictHeight,
            XmNwidth, &markFileSt.pictWidth,
            NULL );
markFileSt.iMarkPictBorder = iHighlightWidth + iShadowWidth;
iNewHeight = markFileSt.pictHeight + (2 * markFileSt.iMarkPictBorder);
iNewWidth = markFileSt.pictWidth + (2 * markFileSt.iMarkPictBorder);
XtVaSetValues( pMarkItem->markFilePict,
            XmNheight, iNewHeight,
            XmNwidth, iNewWidth,
            XmNrecomputeSize, False,
            NULL );

/*
 * If the pict is the last one in the row, then put in an
 * offset to the right; this is just for looks.
 */
if (i == (numID + NUM_OF_MARKS_PER_ROW - 1))
    {
    XtVaSetValues(pMarkItem->markFilePict,
            XmNrightAttachment, XmATTACH_FORM,
            XmNrightOffset, iPictOffset,
            NULL );
```

```
        }

/*
 * Create the tc, speed, and duration label.  Calculate the
 * label width.
 */
sprintf(acName, "%s%d", "mfTCFrame", i);
iLabelWidth = (2 * markFileSt.markFileRsrcs.pictLeftOffset) + iNewWidth;
totalCharHeight = markFileSt.yCharHeight + (2 * markFileSt.borderWidth);
tcFrame = XtVaCreateManagedWidget(
            acName,
            xmFrameWidgetClass,
            parent,
            XmNleftAttachment, XmATTACH_OPPOSITE_WIDGET,
            XmNleftWidget, pMarkItem->markID,
            XmNrightAttachment, XmATTACH_OPPOSITE_WIDGET,
            XmNrightWidget, pMarkItem->markFilePict,
            XmNrightOffset, -markFileSt.markFileRsrcs.pictLeftOffset,
            XmNtopAttachment, XmATTACH_WIDGET,
            XmNtopWidget, pMarkItem->markFilePict,
            XmNtopOffset, markFileSt.markFileRsrcs.tcLabelTopOffset,
            XmNshadowThickness, markFileSt.markFileRsrcs.labelFrameWidth

NULL );

pMarkItem->tcLabel = XtVaCreateManagedWidget(
            acName,
            xmDrawingAreaWidgetClass,
            tcFrame,
            XmNwidth,  iLabelWidth,
            XmNheight, totalCharHeight,
            NULL );
XtAddCallback(pMarkItem->tcLabel, XmNexposeCallback,
            RedrawMFTcLabel, (XtPointer) (i - 1) );

/* Create the notes label widget. */
sprintf(acName, "%s%d", "mfNotesFrame", i);
notesLabelFrame = XtVaCreateManagedWidget(
            acName,
            xmFrameWidgetClass,
            parent,
            XmNleftAttachment, XmATTACH_OPPOSITE_WIDGET,
            XmNleftWidget, pMarkItem->markID,
            XmNrightAttachment, XmATTACH_OPPOSITE_WIDGET,
            XmNrightWidget, tcFrame,
            XmNtopAttachment, XmATTACH_WIDGET,
            XmNtopWidget, tcFrame,
            XmNtopOffset, markFileSt.markFileRsrcs.labelTopOffset,
            XmNshadowThickness, markFileSt.markFileRsrcs.labelFrameWidth

NULL );
```

```
            totalCharHeight = (2 * (markFileSt.yCharHeight + (2 * markFileSt.borderW
idth) ) );
        sprintf(acName, "%s%d", "mfNotesLabel", i);
        pMarkItem->notesLabel = XtVaCreateManagedWidget(
                acName,
                xmDrawingAreaWidgetClass,
                notesLabelFrame,
                XmNheight, totalCharHeight,
                XmNwidth, iLabelWidth,
                NULL );
        XtAddCallback(pMarkItem->notesLabel, XmNexposeCallback,
                RedrawMFNotesLabel, (XtPointer) (i - 1) );

/* Create the "type" label. */
        totalCharHeight = markFileSt.yCharHeight + (2 * markFileSt.borderWidth);
        sprintf(acName, "%s%d", "mfTglFrame", i);
        tglFrame = XtVaCreateManagedWidget(
                acName,
                xmFrameWidgetClass,
                parent,
                XmNleftAttachment, XmATTACH_OPPOSITE_WIDGET,
                XmNleftWidget, pMarkItem->markID,
                XmNrightAttachment, XmATTACH_OPPOSITE_WIDGET,
                XmNrightWidget, tcFrame,
                XmNtopAttachment, XmATTACH_WIDGET,
                XmNtopWidget, notesLabelFrame,
                XmNtopOffset, markFileSt.markFileRsrcs.labelTopOffset,
                XmNshadowThickness, markFileSt.markFileRsrcs.labelFrameWidth

NULL );

sprintf(acName, "%s%d", "mfToggleLabel", i);
        pMarkItem->typeLabel = XtVaCreateManagedWidget(
                acName,
                xmDrawingAreaWidgetClass,
                tglFrame,
                XmNwidth, iLabelWidth,
                XmNheight, totalCharHeight,
                NULL );
        XtAddCallback(pMarkItem->typeLabel, XmNexposeCallback,
                RedrawMFTypeLabel, (XtPointer) (i - 1) );

widgetOnLeft = tcFrame;
        *pNextWidgetHook = tglFrame;

/*
         * Now get some data or do some modifications, depending upon
         * which widget.
         */
        /* Store the actual label width for drawing purposes. */
        if (i == 1)
            {
```

```
            markFileSt.iLabelPixLen = iLabelWidth -
                    (2 * markFileSt.markFileRsrcs.labelFrameWidth);
            }
        /*
         * If the mark is the first item of the last row, then an offset
         * off the bottom of the form ( for looks ).
         */
        else if ( i == (NUM_OF_MARKS_DISPLAYED - NUM_OF_MARKS_PER_ROW + 1) )
            {
            XtVaSetValues(tglFrame,
                XmNbottomAttachment, XmATTACH_FORM,
                XmNbottomOffset, markFileSt.markFileRsrcs.labelBottomOffset,
                NULL);
            }

/* Give Mark a default iItemNumber */
        pMarkItem->iItemNumber = i;
        (void) SVListAdd(&markFileSt.markItemList, pMarkItem);
        CK_LOG( ShortTermMemFree( (void *) pMarkItem ) );

}

}
/*-
 *   ()
 */
static void
CancelPicturesNotNeeded( void )
{
    sint                    index;
    SegmentListElementSt *  pSegListElement;
    uint                    iOldPageIndex;
    boolean                 fSuccess;

MutexTake( markFileSt.mtxMarkFileAccess );
    /* Check for No Change since last redraw.
     */
    if( markFileSt.lastPageIndex == -1 )
        {
        markFileSt.lastPageIndex = markFileSt.currIndex -
                markFileSt.currItemIndex;
        iOldPageIndex = markFileSt.lastPageIndex;
        }
    else
        {
        iOldPageIndex = markFileSt.lastPageIndex;
        markFileSt.lastPageIndex = markFileSt.currIndex -
                markFileSt.currItemIndex;
        if( iOldPageIndex == markFileSt.lastPageIndex)
```

```
        {
        if( glDebugMarkfile & DEBUG_MARKFILE_ADD )
            LogMsg("Redraw: No change since last pictures gotten");
        MutexGive( markFileSt.mtxMarkFileAccess );
        return;
        }
    }
/*
 * Clean up the the old page by canceling all picture requests for
 * pictures we wont need after paging and unlocking all locked pictures.
 */
if( ( index = iOldPageIndex - NUM_OF_MARKS_DISPLAYED ) < 0 )
    index = 0;
for( ; ( index < iOldPageIndex + (2 * NUM_OF_MARKS_DISPLAYED) )
    && ( index < markFileSt.pCurrentSegList->segmentList.nItems ); index++ )
    {
    if( ( pSegListElement = (SegmentListElementSt *)SVListGetItemPtr(
            &markFileSt.pCurrentSegList->segmentList,
            index ) ) == NULL )
        {
        ReLogError();
        MutexGive( markFileSt.mtxMarkFileAccess );
        return;
        }
    if( pSegListElement->blockID == VO_MEM_BLOCK_ID_NONE )
        continue;
    if( glDebugMarkfile & DEBUG_MARKFILE_ADD )
        LogMsg("Cleaning up slot %d", index );
    if( index < markFileSt.lastPageIndex - NUM_OF_MARKS_DISPLAYED ||
        index >= markFileSt.lastPageIndex + (2 * NUM_OF_MARKS_DISPLAYED) )
        {
        if( pSegListElement->fPictRequested )
            {
            CK_LOG( SegLibCancelPictureForSegment( mfSegClientID,
                pSegListElement->segmentID, SEG_LIB_TY_PICUTRE_HEAD_PICTURE,
                PICT_X4, &fSuccess ) );
            if( fSuccess )
                {
                CK_LOG( VOMemUnlock( vomClientHandle,
                    pSegListElement->blockID ) );
                pSegListElement->fPictRequested  = FALSE;
                }
            continue;
            }
        }
    /* If its not for the page we want, and its locked, and there
     * isn't a picture transfering for it, unlock it.
     */
    if( ( index < markFileSt.lastPageIndex ||
        index >= markFileSt.lastPageIndex + NUM_OF_MARKS_DISPLAYED ) &&
```

```
            !pSegListElement->fPictRequested )
            {
            boolean fLocked = FALSE;

CK_LOG( VOMemIsLocked( vomClientHandle, pSegListElement->blockID,
                &fLocked ) );
            if( fLocked )
                {
                CK_LOG( VOMemUnlock( vomClientHandle,
                    pSegListElement->blockID ) );
                }
            }
        )
    MutexGive( markFileSt.mtxMarkFileAccess );
}

/*-
 * GetNewPicturesForPage() - Gets the video pictures for the current page,
 * and the page before and after the current one.  If iGet >=0, it
 * specifies that picture iGet should be re-gotten.
 */
static void
GetNewPicturesForPage( sint iGet )
{
    uint8               *   pVOBuff = NULL;
    sint                    index;
    sint                    iMark;
    sint                    iBefore;
    sint                    iAfter;
    SegmentListElementSt *  pSegListElement;

MutexTake( markFileSt.mtxMarkFileAccess );
    /*
     * Get the pictures for the new Page.
     */
    if( glDebugMarkfile & DEBUG_MARKFILE_ADD )
          LogMsg("GetNewPicturesForPage FirstIndex %d, Num Items %d",
              markFileSt.lastPageIndex,
              markFileSt.pCurrentSegList->segmentList.nItems );
    for( index = 0, iMark = markFileSt.lastPageIndex;
            index < NUM_OF_MARKS_DISPLAYED; index++, iMark++ )
        {
        if( iMark < markFileSt.pCurrentSegList->segmentList.nItems )
            {
            boolean fReLocked = FALSE;
            boolean fLocked = FALSE;

if( ( pSegListElement = (SegmentListElementSt *)SVListGetItemPtr(
                    &markFileSt.pCurrentSegList->segmentList, iMark ) ) == NULL )
```

```
        {
        ReLogError();
        MutexGive( markFileSt.mtxMarkFileAccess );
        return;
        }
    }
if( pSegListElement->blockID == VO_MEM_BLOCK_ID_NONE )
    {
    if( ( pSegListElement->blockID = VOMemAlloc( vomClientHandle,
            PICT_X4, &pVOBuff ) ) == VO_MEM_BLOCK_ID_NONE )
        {
        ReLogError();
        MutexGive( markFileSt.mtxMarkFileAccess );
        return;
        }
    }
else
    {
    CK_LOG( VOMemIsLocked( vomClientHandle,
        pSegListElement->blockID, &fLocked ) );
    if( !fLocked )
        {
        CK_LOG( VOMemRelock( vomClientHandle,
            pSegListElement->blockID, &fReLocked ) );
        if( !fReLocked )
            {
            if( ( pSegListElement->blockID = VOMemAlloc(
                    vomClientHandle, PICT_X4, &pVOBuff ) )
                    == VO_MEM_BLOCK_ID_NONE )
                {
                ReLogError();
                MutexGive( markFileSt.mtxMarkFileAccess );
                return;
                }
            }
        }
    }
if( ( !fReLocked && !fLocked ) || ( iGet == index ) )
    {
    /* This is a little kludgy, we should really re-write to
     * just handle the iGet picture alone.
     */
    if( iGet == index )
        {
        if( VOMemGetPtr( vomClientHandle, pSegListElement->blockID,
                &pVOBuff ) != E_OK )
            {
            MutexGive( markFileSt.mtxMarkFileAccess );
            ReLogError();
            return;
            }
```

```
            }
            pSegListElement->fPictRequested = TRUE;
            CK_LOG( SegLibGetPictureForSegment( mfSegClientID,
                pSegListElement->segmentID, SEG_LIB_TY_PICUTRE_HEAD_PICTURE,
                PICT_X4, pVOBuff ) );
            }
        }
    }
/*
 * Get the look ahead pictures around the new page.
 */
for( index = 0; index < NUM_OF_MARKS_DISPLAYED; index++ )
    {
    iBefore = markFileSt.lastPageIndex - index - 1;
    iAfter = markFileSt.lastPageIndex + index + NUM_OF_MARKS_DISPLAYED;
    if( iBefore >= 0 && iBefore <
        markFileSt.pCurrentSegList->segmentList.nItems )
        {
        if( ( pSegListElement = (SegmentListElementSt *)SVListGetItemPtr(
                &markFileSt.pCurrentSegList->segmentList,
                iBefore ) ) == NULL )
            {
            ReLogError();
            MutexGive( markFileSt.mtxMarkFileAccess );
            return;
            }
        if( pSegListElement->blockID == VO_MEM_BLOCK_ID_NONE )
            {
            if( ( pSegListElement->blockID = VOMemAlloc( vomClientHandle,
                PICT_X4, &pVOBuff ) ) == VO_MEM_BLOCK_ID_NONE )
                {
                ReLogError();
                continue;
                }
            pSegListElement->fPictRequested = TRUE;
            CK_LOG( SegLibGetPictureForSegment( mfSegClientID,
                pSegListElement->segmentID, SEG_LIB_TY_PICUTRE_HEAD_PICTURE,
                PICT_X4, pVOBuff ) );
            }
        }
    if( iAfter >=0 && iAfter <
        markFileSt.pCurrentSegList->segmentList.nItems )
        {
        if( ( pSegListElement = (SegmentListElementSt *)SVListGetItemPtr(
                &markFileSt.pCurrentSegList->segmentList,
                iAfter ) ) == NULL )
            {
            ReLogError();
            MutexGive( markFileSt.mtxMarkFileAccess );
            return;
```

```
                    }
            if( pSegListElement->blockID == VO_MEM_BLOCK_ID_NONE )
                {
                if( ( pSegListElement->blockID = VOMemAlloc( vcmClientHandle,
                        PICT_X4, &pVOBuff ) ) == VO_MEM_BLOCK_ID_NONE )
                    {
                    ReLogError();
                    continue;
                    }
                pSegListElement->fPictRequested = TRUE;
                CK_LOG( SegLibGetPictureForSegment( mfSegClientID,
                        pSegListElement->segmentID, SEG_LIB_TY_PICUTRE_HEAD_PICTURE,
                        PICT_X4, pVOBuff ) );
                }
            }
        }
    MutexGive( markFileSt.mtxMarkFileAccess );
} enum ERC SrcPictsChangedCallback( uint iPictSize, uint8 * pVOMem )
{
    if( iPictSize != PICT_X4 )
        markFileSt.pLiveVOMem = NULL;
    else
        markFileSt.pLiveVOMem = pVOMem;

return E_OK;
} enum ERC ExitModifyMode( uint iData )
{
    static struct KEY_GROUP * pMarkFileModifyKeygroup = NULL;

if( pMarkFileModifyKeygroup == NULL )
        pMarkFileModifyKeygroup = KeyGroupFindByName( MARK_FILE_MODIFY );
    if( glDebugMarkfile & DEBUG_MARKFILE_ADD )
        LogMsg("Exiting Modify Mode");
    CK_LOG( KeyGroupDeactivate( pMarkFileModifyKeygroup ) );
    MutexTake( markFileSt.mtxMarkFileAccess );

/* Notify Src wins callback */
    CK_LOG( SetSrcPictsChngCallback( NULL ) );
    CK_LOG( SetSecondaryStatusLabel( 0, 0, 0, 0, 0, 0, TRUE ) );
    markFileSt.pLiveVOMem = NULL;
    markFileSt.fModifyMode = FALSE;

/* Reset The Still to its previous Picture */
```

```
        markFileSt.fRedrawType = FORCE_REDRAW;
        MutexGive( markFileSt.mtxMarkFileAccess );
        WinSendMarkFileRedraw( (void *)GET_ALL_PICTURES );
        return E_OK;
} enum ERC EnterModifyMode( void * arg )
{
        enum ERC                        erc = E_OK;
        SegmentListElementSt *          pSegListElement;
        char                            cLetter;
        struct DEVICE *                 pDev;
        static struct KEY_GROUP *       pMarkFileModifyKeygroup = NULL;
        I_ENODE                         iClip;
        I_REV                           iRevClip;

if( pMarkFileModifyKeygroup == NULL )
                pMarkFileModifyKeygroup = KeyGroupFindByName( MARK_FILE_MODIFY );
        CK_LOG( KeyGroupActivate( pMarkFileModifyKeygroup ) );

if( glDebugMarkfile & DEBUG_MARKFILE_ADD )
                LogMsg("Entering Modify Mode");
        MutexTake( markFileSt.mtxMarkFileAccess );
        markFileSt.newSegment.fSegItemChanged = FALSE;
        markFileSt.newSegment.fPictureChanged = FALSE;
        markFileSt.newSegment.fCommentChanged = FALSE;
        markFileSt.newSegment.tyPicture = SEG_LIB_TY_PICUTRE_HEAD_PICTURE;
        /* Change to a Src */
        if( markFileSt.currIndex == markFileSt.pCurrentSegList->segmentList.nItems )
                {
                if( ( pDev = DefaultDevGet() ) == NULL )
                        {
                        UserMsg( "Unable to Select current device" );
                        goto Lerror;
                        }
                cLetter = DevGetLetter( pDev );
                if( LetterToClip( cLetter, I_REV_LATEST, &iClip, &iRevClip ) != E_OK )
                        {
                        goto Lerror;
                        }
                if( EnodeGetName( iClip, iRevClip,
                        markFileSt.newSegment.SegItem.acReelName, MARK_FILE_CMNT_STR_SIZE )
                        == NULL )
                        {
                        goto Lerror;
                        }
                markFileSt.newSegment.SegItem.lChMask = CH_V1234;
                markFileSt.newSegment.SegItem.tySegment = SEG_LIB_BACKGROUND_SEG;
                markFileSt.newSegment.SegItem.iEnode = I_ENODE_NONE;
                markFileSt.newSegment.SegItem.iRev = I_REV_NONE;
```

```
            CK_LOG( TcZero( &markFileSt.newSegment.SegItem.tcStart, FALSE ) );
            CK_LOG( TcZero( &markFileSt.newSegment.SegItem.tcEnd, FALSE ) );
            }
        else
            {
            if( ( pSegListElement = (SegmentListElementSt *)SVListGetItemPtr(
                    &markFileSt.pCurrentSegList->segmentList,
                    markFileSt.currIndex ) ) == NULL )
                {
                erc = ReLogError();
                goto Lerror;
                }
            if( SegLibGetSegmentInfo( mfSegClientID, pSegListElement->segmentID,
                    &markFileSt.newSegment.SegItem, NULL, 0 ) != E_OK )
                {
                erc = ReLogError();
                goto Lerror;
                }
            if( ( pDev = DevFindByName( NULL,
                    markFileSt.newSegment.SegItem.acReelName )) == NULL )
                {
                erc = ReLogError();
                UserMsg( "Unable to Select Reel '%s'",
                    markFileSt.newSegment.SegItem.acReelName );
                goto Lerror;
                }
            cLetter = DevGetLetter( pDev );
            }
        if( DevSelect( pDev, FALSE ) != E_OK )
            {
            erc = ReLogError();
            goto Lerror;
            }
        /* Notify Src wins callback */
        CK_LOG( SetSrcPictsChngCallback( SrcPictsChangedCallback ) );
        MutexGive( markFileSt.mtxMarkFileAccess );
        WinSendSetSourceFocus( cLetter, RESET_CURSOR, NO_EXTEND_CURSOR );
        MutexTake( markFileSt.mtxMarkFileAccess );
/*
 * X call out of user Task?
 *
 */
        CK_LOG( SetSecondaryStatusLabel( markFileSt.pCurrItem->tcLabel,
                markFileSt.markFileRsrcs.textBorder,
                markFileSt.iTcWidth, markFileSt.yCharHeight, markFileSt.textGC,
                cLetter, FALSE ) );

CK_LOG( ChangeToLiveCursor( ) );

markFileSt.fModifyMode = TRUE;
```

```
        markFileSt.fRedrawType = FORCE_REDRAW;
        MutexGive( markFileSt.mtxMarkFileAccess );
        WinSendMarkFileRedraw( (void *)GET_ALL_PICTURES );
        return E_OK;

Lerror:
        MutexGive( markFileSt.mtxMarkFileAccess);
        CK_LOG( KeyGroupDeactivate( pMarkFileModifyKeygroup ) );
        return erc;
} enum ERC MarkFileModifyCommit( void * pData )
{
        enum ERC                 erc = E_OK;
        SegLibSegmentID          segmentID;
        SegmentListElementSt *   pSegListElement;

MutexTake( markFileSt.mtxMarkFileAccess);
        if( markFileSt.currIndex == markFileSt.pCurrentSegList->segmentList.nItems )
            {
            if( !markFileSt.newSegment.fSegItemChanged )
                {
                UserMsg("Segment Undefined");
                goto Lerror;
                }
            CK_LOG( SegLibAddNewSegment( mfSegClientID, &segmentID,
                    &markFileSt.newSegment.SegItem,
                    markFileSt.newSegment.fPictureChanged ?
                    markFileSt.newSegment.pCurrentPicture : NULL,
                    markFileSt.newSegment.tyPicture, PICT_X4,
                    markFileSt.newSegment.fCommentChanged ?
                    markFileSt.newSegment.acCommentStr : NULL ) );
            }
        else
            {
            if( ( pSegListElement = (SegmentListElementSt *)SVListGetItemPtr(
                    &markFileSt.pCurrentSegList->segmentList,
                    markFileSt.currIndex ) ) == NULL )
                {
                erc = ReLogError();
                goto Lerror;
                }
            CK_LOG( SegLibRedefineSegment( mfSegClientID,
                    pSegListElement->segmentID, markFileSt.newSegment.fSegItemChanged ?
                    &markFileSt.newSegment.SegItem : NULL,
                    markFileSt.newSegment.fPictureChanged ?
                    markFileSt.newSegment.pCurrentPicture : NULL,
                    markFileSt.newSegment.tyPicture, PICT_X4,
                    markFileSt.newSegment.fCommentChanged ?
```

```
                markFileSt.newSegment.acCommentStr : NULL ) );
        }
    CK_LOG( ExitModifyMode( 0 ) );
Lerror:
    MutexGive( markFileSt.mtxMarkFileAccess );
    return erc;
}
enum ERC MarkFileMarkInOutDur( enum CMD_CODE iCmd, void * pData )
{
    enum ERC              ercBad = E_OK;
    struct DEVICE *       pDev;
    char                  cLSrc;
    struct TIMECODE       markTc;
    boolean               fSrcFieldDominance;
    sint                  tyMark;

if( ( pDev = DefaultDevGet() ) == NULL || ( !IS_POSITIONAL_DEVICE(pDev ) ) )
        {
        UserMsg( "Unable to Select current device" );
        ercBad = UserError( E_MARKT_CANT_MARK );
        goto Lerror;
        }
    cLSrc = DevGetLetter( pDev );
    if( SrcLetterGetFieldDominance( cLSrc,
            I_REV_LATEST, &fSrcFieldDominance ) != E_OK )
        {
        ReLogError();
        fSrcFieldDominance = FIELD2;
        }
    if( DevGetTcPositionAt( DevPositional(pDev),
            FieldCountGet(), &markTc, NULL ) != E_OK )
        {
        ercBad = ReLogError();
        goto Lerror;
        }
    if( fSrcFieldDominance == FIELD1 )
        markTc.lnFields &= ~0x1;
    else
        markTc.lnFields |= 0x1;

MutexTake( markFileSt.mtxMarkFileAccess );
    switch( iCmd )
        {
        default:
        case CMD_MARK_FILE_MARK_IN:
            tyMark = TRIMCLIP_FOR_MKFILE_IN;
            markFileSt.newSegment.SegItem.tcStart = markTc;
            markFileSt.newSegment.fSegItemChanged = TRUE;
            markFileSt.newSegment.tyPicture = SEG_LIB_TY_PICUTRE_HEAD_PICTURE;
```

```
            break;
        case CMD_MARK_FILE_MARK_OUT:
            tyMark = TRIMCLIP_FOR_MKFILE_OUT;
            markFileSt.newSegment.SegItem.tcEnd = markTc;
            markFileSt.newSegment.fSegItemChanged = TRUE;
            markFileSt.newSegment.tyPicture = SEG_LIB_TY_PICUTRE_HEAD_PICTURE;
            break;
        }
    MutexGive( markFileSt.mtxMarkFileAccess);
    if( glDebugMarkfile & DEBUG_MARKFILE_ADD )
        LogMsg("Marking %s at %0t on device %c",
               tyMark == TRIMCLIP_FOR_MKFILE_IN ? "IN" : "OUT", &markTc, cLSrc );
    CK_LOG( SetTrimClipContext( cLSrc, I_ENODE_NONE, I_ENODE_NONE,
            0, CH_V1234, FALSE, &markTc, tyMark, FALSE ) );

Lerror:
    return ercBad;
} enum ERC MarkFileAddEffect( enum CMD_CODE iCmd, void * pData )
{
    enum ERC                    erc = E_OK;
    enum ERC                    ercBad = E_OK;
    static char                 acEffName[ EFF_NAME_LEN ] = "\0";
    static uint                 iEffNameLen = 0;
    static struct KEY_GROUP *   pMarkFileEffAddConfigKeygroup = NULL;
    I_ENODE                     iEnodeEdit;
    I_ENODE                     iEnodeSeg;
    I_ENODE                     iEnodeNew;
    I_ENODE                     iClip;
    SegmentListElementSt *      pSegListElement;
    SEG_LIB_ITEM                SegItem;
    char                        cLSrc;

if( pMarkFileEffAddConfigKeygroup == NULL )
        pMarkFileEffAddConfigKeygroup = KeyGroupFindByName(
            MARK_FILE_EFF_ADD_CONFIRM );

CK_E( KeyGroupDeactivate( pMarkFileEffAddConfigKeygroup ));
    MutexTake( markFileSt.mtxMarkFileAccess);
    switch( iCmd )
        {
        default:
        case CMD_MARK_FILE_EFF_ADD_CONF :
            if( !(uint)pData )
                {
                MutexGive( markFileSt.mtxMarkFileAccess);
                return E_OK;
                }
```

```
        if( ( pSegListElement = (SegmentListElementSt *)SVListGetItemPtr(
                &markFileSt.pCurrentSegList->segmentList,
                markFileSt.pCurrItem->iItemNumber - 1 ) ) == NULL )
            {
            erc = ReLogError();
            goto Lerror;
            }
        if( SegLibGetSegmentInfo( mfSegClientID,
                pSegListElement->segmentID, &SegItem, NULL, 0 ) != E_OK )
            {
            erc = ReLogError();
            goto Lerror;
            }
        if( ( iClip = ClipFindByName( SegItem.acReelName ) )
            == I_ENODE_NONE )
            {
            ercBad = ReLogError();
            UserMsg( "Unable to Find Reel %s", SegItem.acReelName );
            goto Lerror;
            } if(GetWorkspaceAddEffectContext(&iEnodeEdit, &iEnodeSeg) != E_OK)
            {
            erc = ReLogError();
            break;
            }
        if( EditAddEffectForEnode( iEnodeEdit, iEnodeSeg,
            acEffName, I_ENODE_NONE, &SegItem.tcStart, &SegItem.tcEnd,
            iClip, I_REV_LATEST, FALSE, &iEnodeNew ) != E_OK )
            {
            ercBad = ReLogError();
            goto Lerror;
            }
        if( ClipToLetter( iClip, I_REV_LATEST, I_REV_LATEST,
            &cLSrc ) != E_OK )
            {
            cLSrc = '\0';
            }
        WinSendUpdateAndRedrawWorkspace( iEnodeNew, I_ENODE_NONE,
            CH_V1234, cLSrc );
        break;
    case CMD_MARK_FILE_EFF_ADD :
        CK_LE( KeyGroupActivate( pMarkFileEffAddConfigKeygroup ) );
        iEffNameLen = StrNCopyLen( acEffName, (char *)pData,
            EFF_NAME_LEN, TERMINATE);
        UserPrompt( "Select the Segment you want to use." );
        break;
    }
```

```
Lerror:
    MutexGive( markFileSt.mtxMarkFileAccess );
    if( erc != E_OK )
        ercBad = erc;
    return erc;
} enum ERC MarkFileAdd( enum CMD_CODE iCmd, void * pData )
{
    enum ERC            erc = E_OK;
    enum ERC            ercBad = E_OK;
    sint                iNumOfMarksDisp;
    sint                iTopLastPage;
    boolean             fPageWindow = FALSE;
    boolean             fChanged = FALSE;

MutexTake( markFileSt.mtxMarkFileAccess );
    iNumOfMarksDisp = NUM_OF_ROWS_OF_MARKS * NUM_OF_MARKS_PER_ROW;

iTopLastPage = ( markFileSt.pCurrentSegList->segmentList.nItems
            / iNumOfMarksDisp ) * iNumOfMarksDisp;
    if( ( markFileSt.currIndex - markFileSt.currItemIndex )
            < iTopLastPage )
        {
        fPageWindow = TRUE;
        } if( markFileSt.currIndex != markFileSt.pCurrentSegList->segmentList.nItems )
        {
        markFileSt.currItemIndex =
            markFileSt.pCurrentSegList->segmentList.nItems - iTopLastPage;
        markFileSt.currIndex =
            markFileSt.pCurrentSegList->segmentList.nItems;
        fChanged = TRUE;
        } if (fPageWindow)
        {
        if( markFileSt.fModifyMode )
            {
            MutexGive( markFileSt.mtxMarkFileAccess );
            CancelPicturesNotNeeded();
            CK_LOG( ExitModifyMode( 0 ) );
            GetNewPicturesForPage( GET_ALL_PICTURES );
            }
        else
            {
            markFileSt.fRedrawType = FULL_REDRAW;
            MutexGive( markFileSt.mtxMarkFileAccess );
            CancelPicturesNotNeeded();
```

```
            WinSendMarkFileRedraw( (void *)GET_ALL_PICTURES );
            GetNewPicturesForPage( GET_ALL_PICTURES );
            }
        }
    else if (fChanged)
        {
        if( markFileSt.fModifyMode )
            {
            MutexGive( markFileSt.mtxMarkFileAccess );
            CK_LOG( ExitModifyMode( 0 ) );
            }
        else
            {
            markFileSt.fRedrawType = CURSOR_REDRAW;
            MutexGive( markFileSt.mtxMarkFileAccess );
            WinSendMarkFileRedraw( (void *)GET_ALL_PICTURES );
            }
        }
    else
        MutexGive( markFileSt.mtxMarkFileAccess );

CK_LOG( EnterModifyMode( 0 ) );

if( erc != E_OK )
        ercBad = erc;
    return erc;
}
enum ERC MarkFileGoto( enum CMD_CODE iCmd, void * pData )
{
    enum ERC                  erc = E_OK;
    enum ERC                  ercBad = E_OK;
    SegmentListElementSt *    pSegListElement;
    SEG_LIB_ITEM              SegItem;
    DE_Value_Rec              DataValue;

MutexTake( markFileSt.mtxMarkFileAccess);
    if( ( pSegListElement = (SegmentListElementSt *)SVListGetItemPtr(
            &markFileSt.pCurrentSegList->segmentList,
            markFileSt.pCurrItem->iItemNumber - 1 ) ) == NULL )
        {
        erc = ReLogError();
        goto Lerror;
        }

CK_LE( DataEntryGetValue( &DataValue ) );
    if( DataValue.tyValue == DE_EMPTY )
        goto Lerror;

if( SegLibGetSegmentInfo( mfSegClientID, pSegListElement->segmentID,
```

```
                &SegItem, NULL, 0 ) != E_OK )
            {
            erc = ReLogError();
            goto Lerror;
            }
        switch( iCmd )
            {
            default:
            case 0:
                - CK_EBAD( DataEntryRecallTc( &SegItem.tcStart ) );
                break;
            case 1:
                CK_EBAD( DataEntryRecallTc( &SegItem.tcEnd ) );
                break;
            }
Lerror:
    MutexGive( markFileSt.mtxMarkFileAccess);
    if( erc != E_OK )
        ercBad = erc;
    return erc;
} enum ERC MarkFileRecallInOutDur( enum CMD_CODE iCmd, void * pData )
{
    enum ERC                    erc = E_OK;
    enum ERC                    ercBad = E_OK;
    SegmentListElementSt *      pSegListElement;
    SEG_LIB_ITEM                SegItem;
    sint                        lDelta;

MutexTake( markFileSt.mtxMarkFileAccess);
    if( ( pSegListElement = (SegmentListElementSt *)SVListGetItemPtr(
            &markFileSt.pCurrentSegList->segmentList,
            markFileSt.pCurrItem->iItemNumber - 1 ) ) == NULL )
        {
        erc = ReLogError();
        goto Lerror;
        }
    if( SegLibGetSegmentInfo( mfSegClientID, pSegListElement->segmentID,
            &SegItem, NULL, 0 ) != E_OK )
        {
        erc = ReLogError();
        goto Lerror;
        }
    switch( iCmd )
        {
        default:
        case CMD_MARK_FILE_RECALL_IN :
            CK_EBAD( DataEntryRecallTc( &SegItem.tcStart ) );
            break;
```

```
            case CMD_MARK_FILE_RECALL_OUT :
                CK_EBAD( DataEntryRecallTc( &SegItem.tcEnd ) );
                break;
            case CMD_MARK_FILE_RECALL_DUR :
                if( ( ercBad = TcSubTc( &SegItem.tcEnd, &SegItem.tcStart,
                    &lDelta ) ) != E_OK )
                    {
                    ReLogError();
                    break;
                    }
                CK_EBAD( DataEntryRecallInt( lDelta/2 ) );
                break;
        }
Lerror:
    MutexGive( markFileSt.mtxMarkFileAccess);
    if( erc != E_OK )
        ercBad = erc;
    return erc;
} enum ERC MarkFileSetInOutDur( enum CMD_CODE iCmd, void * pData )
{
    enum ERC                    erc = E_OK;
    enum ERC                    ercBad = E_OK;
    static struct KEY_GROUP *   pMarkFileSetEnterKeygroup = NULL;
    char                        cLSrc;
    DE_Value_Rec                DataValue;

if( pMarkFileSetEnterKeygroup == NULL )
        pMarkFileSetEnterKeygroup = KeyGroupFindByName(
            MARK_FILE_SET_ENTER );

CK_E( KeyGroupDeactivate( pMarkFileSetEnterKeygroup ));
    if( iCmd == CMD_MARK_FILE_SET_CANCEL )
        {
        UserPrompt( "SET/TRIM sequence cancelled." );
        return E_OK;
        }
    if( !markFileSt.fModifyMode )
        {
        return E_OK;
        }
    if( ( cLSrc = DevGetLetter( DefaultDevGet() ) ) == 0 )
        {
        UserMsg( "Unable to Select current device" );
        goto Lerror;
        }
    UpdateTcType( cLSrc, FALSE );
    CK_LE( DataEntryGetValue( &DataValue ) );
```

```
switch( DataValue.tyValue )
    {
    default:
        if(!( DataValue.tyValue & DE_TRIM_VALUE ))
            {
            ercBad = LogError( E_BAD_INDEX, DataValue.tyValue );
            goto Lerror;
            }
        switch( DataValue.tyValue & -DE_TRIM_VALUE )
            {
            default:
                /* Force Frame-value trims for timecodes */
                DataValue.tcValue.lnFields &= -0x1;
                break;
            case DE_INC_VALUE:
            case DE_DEC_VALUE:
            case DE_FIELD_COUNT:
                break;
            }
        break;
    case DE_FIELD_COUNT:
    case DE_FRAME_COUNT:
    case DE_TIMECODE:
        break;

case DE_CLEAR_VALUE:
        DataValue.tcValue.fUndef = TC_UNDEF;
        if( ( iCmd == CMD_MARK_FILE_SET_DUR ) ||
            ( ( iCmd == CMD_MARK_FILE_SET_ENTER ) &&
              ( iCmdHold == CMD_MARK_FILE_SET_DUR ) ) )
            iCmd = CMD_MARK_FILE_SET_OUT;
        break;

case DE_EMPTY:
        if( iCmd == CMD_MARK_FILE_SET_ENTER )
            {
            UserMsg( "No value set" );
            goto Lerror;
            }
        else
            {
            if( ( iCmdHold = iCmd ) == CMD_SET_DUR )
                {
                CK_E( DataEntrySetRequest( REQ_FRAME_COUNT ));
                }
            else
                {
                CK_E( DataEntrySetRequest( REQ_TIMECODE ));
                }
            CK_E( KeyGroupActivate( pMarkFileSetEnterKeygroup ));
```

```
                return E_OK;
                }
        }
        if( iCmd == CMD_MARK_FILE_SET_ENTER )
            {
            iCmd = iCmdHold;
            }
        MutexTake( markFileSt.mtxMarkFileAccess );
        switch( iCmd )
            {
            default:
                break;
            case CMD_MARK_FILE_SET_IN:
                if( !( DataValue.tyValue & DE_TRIM_VALUE ) )
                    {
                    markFileSt.newSegment.SegItem.tcStart = DataValue.tcValue;
                    markFileSt.newSegment.fSegItemChanged = TRUE;
                    }
                else    /* TRIM Value */
                    {
                    CK_LOG( TcAddDeltaTc(
                        &markFileSt.newSegment.SegItem.tcStart,
                        &DataValue.tcValue,
                        &markFileSt.newSegment.SegItem.tcStart ) );
                    markFileSt.newSegment.fSegItemChanged = TRUE;
                    }
                break;
            case CMD_MARK_FILE_SET_OUT:
                if( !( DataValue.tyValue & DE_TRIM_VALUE ) )
                    {
                    markFileSt.newSegment.SegItem.tcEnd = DataValue.tcValue;
                    markFileSt.newSegment.fSegItemChanged = TRUE;
                    }
                else    /* TRIM Value */
                    {
                    CK_LOG( TcAddDeltaTc(
                        &markFileSt.newSegment.SegItem.tcEnd,
                        &DataValue.tcValue,
                        &markFileSt.newSegment.SegItem.tcEnd ) );
                    markFileSt.newSegment.fSegItemChanged = TRUE;
                    }
                break;
            }
        MutexGive( markFileSt.mtxMarkFileAccess );
    if( ercBad == E_OK )
        {
        UpdateTcType( cLSrc, TRUE );
        }
Lerror:
```

```
        DataEntryReset();
        if( erc != E_OK )
            ercBad = erc;

return ercBad;
}

/*- WIN
 *   PageMarkFileWind()
 */
enum ERC
PageMarkFileWind( uint direction )
{
        sint                    iNumOfMarksDisp;
        sint                    iTopLastPage;
        boolean                 fPageWindow = FALSE;

MutexTake( markFileSt.mtxMarkFileAccess );
        iNumOfMarksDisp = NUM_OF_ROWS_OF_MARKS * NUM_OF_MARKS_PER_ROW;
        if (direction == MF_PAGE_UP)
            {
            if (markFileSt.currIndex > (iNumOfMarksDisp - 1) )
                {
                markFileSt.currIndex -= iNumOfMarksDisp;
                fPageWindow = TRUE;
                }
            }
        else if (direction == MF_PAGE_DOWN)
            {
            if( NUM_OF_MARKS_DISPLAYED - 1 - markFileSt.currItemIndex +
                    markFileSt.currIndex <
                    markFileSt.pCurrentSegList->segmentList.nItems )
                {
                if( markFileSt.currIndex + iNumOfMarksDisp >
                        markFileSt.pCurrentSegList->segmentList.nItems )
                    {
                    markFileSt.currItemIndex =
                        markFileSt.pCurrentSegList->segmentList.nItems -
                        ( markFileSt.pCurrentSegList->segmentList.nItems
                        / iNumOfMarksDisp ) * iNumOfMarksDisp;
                    markFileSt.currIndex =
                        markFileSt.pCurrentSegList->segmentList.nItems;
                    }
                else
                    markFileSt.currIndex += iNumOfMarksDisp;
                fPageWindow = TRUE;
                }
            }
        else if (direction == MF_MOVE_TO_START)
```

```
            {
            if (markFileSt.currIndex > (iNumOfMarksDisp - 1) )
                {
                markFileSt.currItemIndex = 0;
                markFileSt.currIndex = 0;
                fPageWindow = TRUE;
                }
            }
        else /* direction == MF_MOVE_TO_END */
            {
            iTopLastPage = ( markFileSt.pCurrentSegList->segmentList.nItems
                / iNumOfMarksDisp ) * iNumOfMarksDisp;
            if ( ( markFileSt.currIndex - markFileSt.currItemIndex )
                    < iTopLastPage )
                {
                markFileSt.currItemIndex =
                    markFileSt.pCurrentSegList->segmentList.nItems - iTopLastPage;
                markFileSt.currIndex =
                    markFileSt.pCurrentSegList->segmentList.nItems;
                fPageWindow = TRUE;
                }
            } if (fPageWindow)
            {
            if( markFileSt.fModifyMode )
                {
                MutexGive( markFileSt.mtxMarkFileAccess );
                CancelPicturesNotNeeded();
                CK_LOG( ExitModifyMode( 0 ) );
                GetNewPicturesForPage( GET_ALL_PICTURES );
                }
            else
                {
                markFileSt.fRedrawType = FULL_REDRAW;
                MutexGive( markFileSt.mtxMarkFileAccess );
                CancelPicturesNotNeeded();
                WinSendMarkFileRedraw( (void *)GET_ALL_PICTURES );
                GetNewPicturesForPage( GET_ALL_PICTURES );
                }
            }
        else
            MutexGive( markFileSt.mtxMarkFileAccess );

return( E_OK );
    }

/*- WIN
 * MoveToNextMarkItem()
 * This function should be called from the window task.
```

```
*/
enum ERC
MoveToNextMarkItem(uint action)
{
    boolean             fPageWindow = FALSE;
    boolean             fChanged = FALSE;
    sint                iNumOfMarksDisp;
    sint                iIndexCheck;
    enum ERC            erc = E_OK;

iNumOfMarksDisp = NUM_OF_ROWS_OF_MARKS * NUM_OF_MARKS_PER_ROW;
    MutexTake( markFileSt.mtxMarkFileAccess );
    switch(action)
        {
        default:
            LogError(E_BAD_INDEX, action);
            break;

case MF_TO_NEXT_PICT:
            if( markFileSt.currIndex >=
                    markFileSt.pCurrentSegList->segmentList.nItems )
                break;
            if( markFileSt.currItemIndex == iNumOfMarksDisp - 1 )
                {
                markFileSt.currIndex++;
                markFileSt.currItemIndex = 0;
                fPageWindow = TRUE;
                }
            else
                {
                fChanged = TRUE;
                markFileSt.currIndex++;
                markFileSt.currItemIndex++;
                }
            break;

case MF_TO_PREV_PICT:
            if( markFileSt.currIndex <= 0 )
                break;
            if( markFileSt.currItemIndex == 0 )
                {
                markFileSt.currIndex--;
                markFileSt.currItemIndex = iNumOfMarksDisp - 1;
                fPageWindow = TRUE;
                }
            else
                {
                fChanged = TRUE;
                markFileSt.currIndex--;
                markFileSt.currItemIndex--;
```

```
            }
        break;

case MF_MOVE_LEFT:
    if ( (markFileSt.currItemIndex % NUM_OF_MARKS_PER_ROW) != 0 )
        {
        fChanged = TRUE;
        markFileSt.currIndex--;
        markFileSt.currItemIndex--;
        }
    break;

case MF_MOVE_RIGHT:
    iIndexCheck = markFileSt.currItemIndex % NUM_OF_MARKS_PER_ROW;
    if ( iIndexCheck < (NUM_OF_MARKS_PER_ROW - 1) &&
            markFileSt.currIndex < .
            markFileSt.pCurrentSegList->segmentList.nItems  )
        {
        fChanged = TRUE;
        markFileSt.currIndex++;
        markFileSt.currItemIndex++;
        }
    break;

case MF_MOVE_UP:
    if ( markFileSt.currItemIndex < NUM_OF_MARKS_PER_ROW )
        {
        CK_LOG(PageMarkFileWind( MF_PAGE_UP ));
        }
    else
        {
        fChanged = TRUE;
        markFileSt.currIndex -= NUM_OF_MARKS_PER_ROW;
        markFileSt.currItemIndex -= NUM_OF_MARKS_PER_ROW;
        } break;

case MF_MOVE_DOWN:
    if ( markFileSt.currItemIndex < ((NUM_OF_ROWS_OF_MARKS *
            NUM_OF_MARKS_PER_ROW) - NUM_OF_MARKS_PER_ROW) )
        {
        if( markFileSt.currIndex + NUM_OF_MARKS_PER_ROW <=
            markFileSt.pCurrentSegList->segmentList.nItems )
            {
            fChanged = TRUE;
            markFileSt.currIndex += NUM_OF_MARKS_PER_ROW;
            markFileSt.currItemIndex += NUM_OF_MARKS_PER_ROW;
            }
        }
```

```
                else if( NUM_OF_MARKS_DISPLAYED - 1 - markFileSt.currItemIndex +
                        markFileSt.currIndex <
                        markFileSt.pCurrentSegList->segmentList.nItems )
                    {
                    CK_LOG(PageMarkFileWind( MF_PAGE_DOWN ));
                    }
                break;
            }
        if (fChanged)
            {
            if( markFileSt.fModifyMode )
                {
                MutexGive( markFileSt.mtxMarkFileAccess );
                CK_LOG( ExitModifyMode( 0 ) );
                }
            else
                {
                markFileSt.fRedrawType = CURSOR_REDRAW;
                MutexGive( markFileSt.mtxMarkFileAccess );
                WinSendMarkFileRedraw( (void *)GET_ALL_PICTURES );
                }
            }
        else if (fPageWindow)
            {
            if( markFileSt.fModifyMode )
                {
                MutexGive( markFileSt.mtxMarkFileAccess );
                CancelPicturesNotNeeded();
                CK_LOG( ExitModifyMode( 0 ) );
                GetNewPicturesForPage( GET_ALL_PICTURES );
                }
            else
                {
                markFileSt.fRedrawType = FULL_REDRAW;
                MutexGive( markFileSt.mtxMarkFileAccess );
                CancelPicturesNotNeeded();
                WinSendMarkFileRedraw( (void *)GET_ALL_PICTURES );
                GetNewPicturesForPage( GET_ALL_PICTURES );
                }
            }
        else
            MutexGive( markFileSt.mtxMarkFileAccess );
            MutexGive( markFileSt.mtxMarkFileAccess );

return( erc );
    }
```

```
/*-
 *  InitMarkFileData()
 */
static void
InitMarkFileData(Widget parent)
{
    XGCValues       values;
    XCharStruct     charInfo;
    sint            ascent, descent, junk;
    static struct KEY_GROUP * pBaseMarkFileKeygroup = NULL;

if( pBaseMarkFileKeygroup == NULL )
        pBaseMarkFileKeygroup = KeyGroupFindByName( BASE_MARK_FILE );
    CK_LOG( KeyGroupActivate( pBaseMarkFileKeygroup ) );

/* Init the data struct */
    SVListInit(&markFileSt.markItemList, NULL, NULL, sizeof(MarkFileItemSt));
    markFileSt.currIndex = 0;
    markFileSt.currItemIndex = 0;
    markFileSt.pCurrItem = NULL;
    markFileSt.lastPageIndex = 0;
    markFileSt.currFirstIndex = 0;
    markFileSt.pCurrentSegList = NULL;
    markFileSt.newSegment.pCurrentPicture = NULL;
    markFileSt.newSegment.fSegItemChanged = FALSE;
    markFileSt.newSegment.fPictureChanged = FALSE;
    markFileSt.newSegment.fCommentChanged = FALSE;
    markFileSt.fPopedup = FALSE;

if( ( markFileSt.mtxMarkFileAccess = MutexCreate() ) == 0 )
        {
        LogError( errnoGet() );
        return;
        }
    MutexGive(markFileSt.mtxMarkFileAccess);

XtGetApplicationResources(parent,
            &markFileSt.markFileRsrcs,
            resources,
            XtNumber(resources),
            NULL, 0);

/* Create the notes GC */
    values.foreground = markFileSt.markFileRsrcs.fgColor;
    values.font = markFileSt.markFileRsrcs.pFontInfo->fid;
    markFileSt.textGC = XCreateGC( XtDisplay(parent),
                RootWindowOfScreen(XtScreen(parent)),
                ( GCForeground | GCFont ),
                &values );
```

```c
    /* Create the video GC */
    values.foreground = markFileSt.markFileRsrcs.vidColor;
    markFileSt.videoGC = XCreateGC( XtDisplay(parent),
            RootWindowOfScreen(XtScreen(parent)),
            GCForeground, &values );

/* Create the no video GC */
    values.foreground = markFileSt.markFileRsrcs.noVidColor;
    markFileSt.noVideoGC = XCreateGC( XtDisplay(parent),
            RootWindowOfScreen(XtScreen(parent)),
            GCForeground, &values );

/* Get the text height. */
    XTextExtents( markFileSt.markFileRsrcs.pFontInfo,
            "Q", 1,
            &junk,
            &ascent, &descent,
            &charInfo );
    markFileSt.yCharHeight = ascent + descent;
    markFileSt.borderWidth = markFileSt.markFileRsrcs.textBorder;
    markFileSt.iOneCharWidth = charInfo.width;
}

/*-
 * SetupMarkFileVidWinds()
 */
static enum ERC
SetupMarkFileVidWinds( void )
{
    MarkFileItemSt      *pMarkItem;
    enum ERC            erc = E_OK;
    sint                index = 0;

/* Check to make sure the windows are aligned correctly. */
    FOR_EACH_SVLIST_INDEX(&markFileSt.markItemList, index)
        {
        sint        xPos, yPos;
        Window      wJunk;
        uint8 *     pVOMem;

pMarkItem = (MarkFileItemSt *)
                P_SVLIST_ITEM(&markFileSt.markItemList,
                    index );

pMarkItem->fHasPict = FALSE;

XTranslateCoordinates( XtDisplay(pMarkItem->markFilePict),
            XtWindow(pMarkItem->markFilePict),
            RootWindowOfScreen(XtScreen(pMarkItem->markFilePict)),
            markFileSt.iMarkPictBorder, markFileSt.iMarkPictBorder,
```

```c
                &xPos, &yPos, &wJunk );
        if(( xPos < 0 ) || ( xPos & 0xf )
                || ( yPos < 0 ) || ( yPos & 0xf ))
            {
            LogError(E_SOFTWARE, "MarkFile pict not aligned to 16 pixels.");
            LogMsg("MarkItem %d at (%d, %d).", index, xPos, yPos);
            }
        /*
         * For Now, we will not pass in a VOMem location.
         */
        pVOMem = NULL;
        if ( (pMarkItem->vidWin =
                    VWinCreateStill( PICT_X4, xPos, yPos, pVOMem,
                        CREATE_HIDDEN )) == VWIN_NONE )
            erc = ReLogError();

if (erc == E_OK)
            fMarkFileVWinSetup = TRUE;
        } return( erc );
}

/*-
 * PopupMarkFileVidWinds()
 */
static enum ERC
PopupMarkFileVidWinds( void )
{
    sint            index = 0;
    MarkFileItemSt  *pMarkItem;
    enum ERC        erc = E_OK;

MutexTake( markFileSt.mtxMarkFileAccess );
    FOR_EACH_SVLIST_INDEX(&markFileSt.markItemList, index)
        {
        pMarkItem = (MarkFileItemSt *)
                    P_SVLIST_ITEM(&markFileSt.markItemList,
                        index );
        if (VWinShow(pMarkItem->vidWin) != E_OK )
            erc = ReLogError();
        if (VWinRaise(pMarkItem->vidWin) != E_OK )
            erc = ReLogError();
        }

MutexGive( markFileSt.mtxMarkFileAccess );
    return erc;
}
```

```
#if 0
static VOMemBlockID
AllocVOMemAroundWindow( )
{
    VOMemBlockID    blockID;

if( ( blockID = VOMemAlloc( vomClientHandle, PICT_X4, NULL ) )
        == VO_MEM_BLOCK_ID_NONE )
    {
        /* Look for a locked one we are not using.
         */

ReLogError();
    }
    return blockID;
}
endif

/*-
 * ResetMarkFileWindow()
 */
static void
ResetMarkFileWindow( void )
{
    uint8              *  pVOBuff;
    uint8              *  pVOTemp;
    sint                  index;
    sint                  iMark;
    MarkFileItemSt     *  pMarkItem;
    MarkFileItemSt     *  pMarkTemp = NULL;
    SegmentListElementSt * pSegListElement;
    boolean               fUpdateScreen = UPDATE_SCREEN;

markFileSt.currFirstIndex = markFileSt.currIndex - markFileSt.currItemIndex;

if( glDebugMarkfile & DEBUG_MARKFILE_ADD )
        LogMsg("ResetMarkFileWindow FirstIndex %d, Num Items %d",
            markFileSt.currFirstIndex,
            markFileSt.pCurrentSegList->segmentList.nItems );
    for( index = 0, iMark = markFileSt.currFirstIndex;
            index < NUM_OF_MARKS_DISPLAYED; index++, iMark++ )
    {
        pMarkItem = (MarkFileItemSt *) P_SVLIST_ITEM(&markFileSt.markItemList,
                        index );

/* Turn on fHasPict for Modify Cursor on the current mark */
        if( markFileSt.fModifyMode && markFileSt.currItemIndex == index )
            pMarkItem->fHasPict = TRUE;
```

```
else
    pMarkItem->fHasPict = FALSE;
if( iMark < markFileSt.pCurrentSegList->segmentList.nItems )
    {
    boolean fReLocked = FALSE;
    boolean fLocked = FALSE;

if( ( pSegListElement = (SegmentListElementSt *)SVListGetItemPtr(
        &markFileSt.pCurrentSegList->segmentList, iMark ) ) == NULL )
        {
        ReLogError();
        return;
        }
    if( pSegListElement->blockID != VO_MEM_BLOCK_ID_NONE )
        {
        CK_LOG( VOMemIsLocked( vomClientHandle,
            pSegListElement->blockID, &fLocked ) );
        if( !fLocked )
            {
            CK_LOG( VOMemRelock( vomClientHandle,
                pSegListElement->blockID, &fReLocked ) );
            }
        }
    if( fReLocked || fLocked )
        {
        if( VOMemGetPtr( vomClientHandle, pSegListElement->blockID,
            &pVOBuff ) != E_OK )
            {
            ReLogError();
            return;
            }
        pMarkTemp = pMarkItem;
        pVOTemp = pVOBuff;
        if( !markFileSt.fModifyMode || pMarkItem !=
            markFileSt.pCurrItem )
            {
            if ( VWinResetStill( pMarkItem->vidWin, pVOBuff,
                    UPDATE_SCREEN ) != E_OK )
                ReLogError();
            if( !pSegListElement->fPictRequested )
                pMarkItem->fHasPict = TRUE;
            }
        if( glDebugMarkfile & DEBUG_MARKFILE_ADD )
            LogMsg("Using a Cache Picture %d", iMark );
        }
    }
if( !pMarkItem->fHasPict )
    fUpdateScreen = DONT_UPDATE_SCREEN;
UpdateMarkItemLabels(pMarkItem, iMark);
}
```

```
#if 0
    if( fUpdateScreen == UPDATE_SCREEN && pMarkTemp != NULL )
    {
        if( !markFileSt.fModifyMode || pMarkItem !=
            markFileSt.pCurrItem )
        if ( VWinResetStill( pMarkTemp->vidWin, pVOTemp,
                UPDATE_SCREEN ) != E_OK )
            ReLogError();
    }
endif
}

/*--- global funcs ---*/

/*- WIN
 *  CreateMarkFileWind -
 */
void
CreateMarkFileWind( Widget parent )
{
    Widget          markFileFrame;
    Widget          markFileForm;
    Widget          mfSeparator;
    Widget          widgetToAttach;
    Widget          nextWidgetToAttach;
    sint            i;
    sint            startID;
    char            acTc[MARK_FILE_TC_STR_SIZE];
    struct TIMECODE tcTemp;

InitMarkFileData(parent);

markFileSt.markFileShell = XtCreatePopupShell(
            "markFileShell",
            transientShellWidgetClass,
            parent,
            NULL, 0);

markFileFrame = XtVaCreateManagedWidget(
            "markFileFrame",
            xmFrameWidgetClass,
            markFileSt.markFileShell,
            NULL );

markFileForm = XtVaCreateManagedWidget(
            "markFileForm",
            xmFormWidgetClass,
```

```
            markFileFrame,
            NULL );

markFileSt.markFileTitle = XtVaCreateManagedWidget(
            "markFileTitle",
            xmLabelGadgetClass,
            markFileForm,
            XmNtopAttachment, XmATTACH_FORM,
            XmNleftAttachment, XmATTACH_FORM,
            XmNrightAttachment, XmATTACH_FORM,
            NULL );

mfSeparator = XtVaCreateManagedWidget(
            "mfSeparator",
            xmSeparatorWidgetClass,
            markFileForm,
            XmNtopAttachment, XmATTACH_WIDGET,
            XmNtopWidget, markFileSt.markFileTitle,
            XmNleftAttachment, XmATTACH_FORM,
            XmNrightAttachment, XmATTACH_FORM,
            NULL );

widgetToAttach = mfSeparator;
    for (i = 1, startID = 1;  i < (NUM_OF_ROWS_OF_MARKS + 1); i++)
        {
        CreateRowOfMarks(markFileForm, widgetToAttach, startID,
            &nextWidgetToAttach);
        startID += NUM_OF_MARKS_PER_ROW;
        widgetToAttach = nextWidgetToAttach;
        }

CK_LOG( TcZero( &tcTemp, FALSE ) );
    (void) StrNPrintf(acTc, MARK_FILE_TC_STR_SIZE,
            "%0t", &tcTemp );
    markFileSt.iTcWidth = XTextWidth( markFileSt.markFileRsrcs.pFontInfo,
            acTc, strlen(acTc) );
}

/*-
 * UpdateNotesInCurrMark()
 * This function is called by the comment window callback.
 */
enum ERC
UpdateNotesInCurrMark( char *pString )
{ return( E_OK );
} static  SegLibClientID  GrabModeSegClientID = SEG_LIB_CLIENT_ID_NONE;
```

```
enum ERC MarkFileEnterRaveGrabMode()
{
    if( GrabModeSegClientID == SEG_LIB_CLIENT_ID_NONE )
    {
        if( ( GrabModeSegClientID = SegLibClientCreate( "Grab Mode",
            NULL, NULL ) ) == SEG_LIB_CLIENT_ID_NONE )
        {
        return ReLogError();
        }
    } mfSegClientID = GrabModeSegClientID;

fMarkingRavePicts = TRUE;

return E_OK;
} enum ERC MarkFileExitRaveGrabMode()
{
    fMarkingRavePicts = FALSE;

return E_OK;
} enum ERC MarkfileSetCurrentRaveSegment( SegLibSegmentID segmentID )
{
    if( !fMarkingRavePicts )
        return LogError( E_SOFT_S_I, "Unable to add Pict for segment",
            segmentID );
    CurrentRaveSegmentID = segmentID;
    return E_OK;
}

/*--- Request funcs ---*/

/* Danger Warning!! This is a complete kludge. pCurrentPicture is shared
 *      between 2 different modes of operation. They must never operate
 *      at the same time.
 */
void
RequestMarkFileCopyICMem( void * pData )
{
```

```
    uint8 * pAddress = (uint8 *)pData;

MutexTake( markFileSt.mtxMarkFileAccess);
    if( pAddress == NULL )
        {
        LogError(E_SOFTWARE, "Unable to get this particular picture");
        MutexGive( markFileSt.mtxMarkFileAccess);
        return;
        }
    if( markFileSt.newSegment.pCurrentPicture == NULL )
        if( ( markFileSt.newSegment.pCurrentPicture =
                (uint8 *)ShortTermMemAlloc( GetSizeOfPicture( PICT_X4 ) ) )
                == NULL )
            {
            ReLogError();
            MutexGive( markFileSt.mtxMarkFileAccess);
            return;
            }
    if( CopyFromICtoMem( pAddress, markFileSt.newSegment.pCurrentPicture,
            PICT_X4 ) != E_OK )
        {
        ReLogError();
        MutexGive( markFileSt.mtxMarkFileAccess);
        return;
        }
    if( fMarkingRavePicts )
        {
        CK_LOG( SegLibRedefineSegment( mfSegClientID, CurrentRaveSegmentID,
            NULL, markFileSt.newSegment.pCurrentPicture,
            SEG_LIB_TY_PICUTRE_HEAD_PICTURE, PICT_X4, NULL ) );
        }
    else
        markFileSt.newSegment.fPictureChanged = TRUE;
    MutexGive( markFileSt.mtxMarkFileAccess);
    return;
} enum ERC
MShow()
{
    SegmentListElementSt *  pSegListElement;
    uint                    index;

printf(" Segment List for %d\n", markFileSt.pCurrentSegList->pListName );
    for( index = 0; index < markFileSt.pCurrentSegList->segmentList.nItems;
        index++ )
        {
        if( ( pSegListElement = (SegmentListElementSt *)SVListGetItemPtr(
                &markFileSt.pCurrentSegList->segmentList,
                index ) ) == NULL )
```

```
            {
            return ReLogError();
            }
        printf("Segment ID  %d      Block ID  %d     PictReq %s\n",
            pSegListElement->segmentID,
            pSegListElement->blockID,
            ( pSegListElement->fPictRequested ? "Yes" : "No" ) );
        }
    return E_OK;
} enum ERC
MarkfileSegLibCallback( SegLibClientID clientID, SegLibSegmentID
    segmentID, void * pClientData, TY_CALLBACK_ACTION tyAction )
{
    SegmentListElementSt *    pSegListElement;
    uint                      index;
    uint                      i;
    boolean                   fClean = TRUE;
    uint8                  *  pVOBuff;

if( glDebugMarkfile & DEBUG_MARKFILE_ADD )
        LogMsg("Mark File Callback for Segment %d", segmentID );
    MutexTake( markFileSt.mtxMarkFileAccess);
    if( tyAction == ACTION_SEGMENT_ADDED )
        {
        CK_LOG( SegListNotifyOfNewSegment( segmentID ) );
        markFileSt.fRedrawType = FORCE_REDRAW;
        MutexGive( markFileSt.mtxMarkFileAccess );
        /* This can be optimized later.
         */
        GetNewPicturesForPage( GET_ALL_PICTURES );
        WinSendMarkFileRedraw( (void *)GET_ALL_PICTURES );
        return E_OK;
        }
    for( index = 0; index < markFileSt.pCurrentSegList->segmentList.nItems;
        index++ )
        {
        if( ( pSegListElement = (SegmentListElementSt *)SVListGetItemPtr(
                &markFileSt.pCurrentSegList->segmentList,
                index ) ) == NULL )
            {
            MutexGive( markFileSt.mtxMarkFileAccess);
            return ReLogError();
            }
        if( pSegListElement->segmentID == segmentID )
            {
            switch( tyAction )
                {
```

```
default:
case ACTION_SEGMENT_MODIFIED :
    if( markFileSt.fPopedup )
        {
        markFileSt.fRedrawType = FORCE_REDRAW;
        MutexGive( markFileSt.mtxMarkFileAccess );
        /* This can be optimized later.
         */
        if( index >= markFileSt.currFirstIndex && index <
            markFileSt.currFirstIndex + NUM_OF_MARKS_DISPLAYED )
            {
            GetNewPicturesForPage( index -
                markFileSt.currFirstIndex );
            WinSendMarkFileRedraw( (void *)GET_ALL_PICTURES );
            }
        }
    else
        {
        MutexGive( markFileSt.mtxMarkFileAccess );
        }
    return E_OK;
case ACTION_TRANSFER_COMPLETE :
    pSegListElement->fPictRequested  = FALSE;
    if( markFileSt.fPopedup )
        {
        /* If picture is not used on current page, unlock its
         * VOMem.
         */
        if( index < markFileSt.currFirstIndex || index >=
            markFileSt.currFirstIndex + NUM_OF_MARKS_DISPLAYED )
            {
            CK_LOG( VOMemUnlock( vomClientHandle,
                pSegListElement->blockID ) );
            }
        else
            {
            MarkFileItemSt *    pMarkItem;
            MarkFileItemSt *    pMarkTemp;
            boolean             fUpdateScreen = UPDATE_SCREEN;

pMarkItem = (MarkFileItemSt *)
                P_SVLIST_ITEM(&markFileSt.markItemList, index -
                markFileSt.currFirstIndex );
            pMarkItem->fHasPict = TRUE;
            for( i = 0; i < NUM_OF_MARKS_DISPLAYED;
                i++ )
                {
                pMarkTemp = (MarkFileItemSt *)
                    P_SVLIST_ITEM(&markFileSt.markItemList,
                    i );
```

```
                    if( pMarkTemp->fHasPict == FALSE )
                    {
                        fUpdateScreen = DONT_UPDATE_SCREEN;
                        break;
                    }
                }
                if( VOMemGetPtr( vomClientHandle,
                    pSegListElement->blockID, &pVOBuff ) != E_OK )
                {
                    MutexGive( markFileSt.mtxMarkFileAccess);
                    return ReLogError();
                }
                fUpdateScreen = UPDATE_SCREEN;
                if( !markFileSt.fModifyMode || pMarkItem !=
                    markFileSt.pCurrItem )
                    if ( VWinResetStill( pMarkItem->vidWin, pVOBuff,
                        fUpdateScreen ) != E_OK )
                        ReLogError();
                if( glDebugMarkfile & DEBUG_MARKFILE_ADD )
                    LogMsg("Requesting Redraw for %d",
                        index - markFileSt.currFirstIndex );
                WinSendMarkFileRedraw( (void * )( index -
                    markFileSt.currFirstIndex ) );
                }
                MutexGive( markFileSt.mtxMarkFileAccess);
                return E_OK;
            }
            else
            {
                CK_LOG( VOMemFree( vomClientHandle,
                    pSegListElement->blockID ) );
                pSegListElement->blockID = VO_MEM_BLOCK_ID_NONE;
            }
            break;
        }
        }
        if( pSegListElement->fPictRequested )
            fClean = FALSE;
    }
    if( !markFileSt.fPopedup && fClean )
    {
        markFileSt.pCurrentSegList = NULL;
    }
    MutexGive( markFileSt.mtxMarkFileAccess);
    return E_OK;
} enum ERC
MarkfileVOMemCallback( VOMemBlockID blockID, void * pClientState )
{
```

```
    SegmentListElementSt *    pSegListElement;
    uint                      index;

MutexTake( markFileSt.mtxMarkFileAccess );
    for( index = 0; index < markFileSt.pCurrentSegList->segmentList.nItems;
         index++ )
        {
        if( ( pSegListElement = (SegmentListElementSt *)SVListGetItemPtr(
                &markFileSt.pCurrentSegList->segmentList,
                index ) ) == NULL )
            {
            MutexGive( markFileSt.mtxMarkFileAccess );
            return ReLogError();
            }
        if( pSegListElement->blockID == blockID )
            {
            pSegListElement->blockID = VO_MEM_BLOCK_ID_NONE;
            MutexGive( markFileSt.mtxMarkFileAccess );
            return E_OK;
            }
        }
    MutexGive( markFileSt.mtxMarkFileAccess );
    return E_OK;
} void
RequestMarkFilePopup(void * pData)
{
    XmString        tyStr;
    char            acTitle[25];

/* Set the current item and index. */

MutexTake( markFileSt.mtxMarkFileAccess );

/* Popup the window. */
    XtPopup(markFileSt.markFileShell, XtGrabExclusive);
    markFileSt.fPopedup = TRUE;
    SetCurrentMarkItem( PUSH_FOCUS );

/* Check VO Mem Client ID */
    if( vomClientHandle == VO_MEM_CLIENT_ID_NONE )
        {
        if( ( vomClientHandle = VOMemClientCreate( "Markfile",
            MarkfileVOMemCallback, NULL ) ) == VO_MEM_CLIENT_ID_NONE )
            {
            ReLogError();
            goto Lerror;
            }
```

```
        }

/* Reset the title */
    if( markFileSt.pCurrentSegList->pListName != NULL )
        {
        (void) StrNCopy(markFileSt.acCurrSrcName,
                markFileSt.pCurrentSegList->pListName,
                MARK_FILE_REEL_NAME_STR_SIZE, TERMINATE);
        }
    else
        {
        (void) StrNCopy(markFileSt.acCurrSrcName, MF_UNKNOWN_STR,
                MARK_FILE_REEL_NAME_STR_SIZE, TERMINATE);
        }

(void) StrNPrintf(acTitle, 25, "Seg List: %s",
            markFileSt.acCurrSrcName, TERMINATE);
    tyStr = XmStringCreateSimple(acTitle);
    XtVaSetValues(markFileSt.markFileTitle,
        XmNlabelString, tyStr,
        NULL );
    XmStringFree(tyStr);

/* Setup the video window stuff. */
    if (fMarkFileVWinSetup == FALSE)
        {
        if (SetupMarkFileVidWinds() != E_OK)
            {
            ReLogError();
            CK_LOG( KeyGroupDeactivate(
                        KeyGroupFindByName( "MARK_FILE_WINDOW" ) ) );
            CK_LOG( MainMenuSet( NULL ) );
            PopFocus();
            markFileSt.fPopedup = FALSE;
            XtPopdown(markFileSt.markFileShell);
            MutexGive( markFileSt.mtxMarkFileAccess );
/*-->*/     return;
            }
        } if (PopupMarkFileVidWinds() != E_OK)
        ReLogError();

CancelPicturesNotNeeded();
    ResetMarkFileWindow();
    GetNewPicturesForPage( GET_ALL_PICTURES );
    MutexGive( markFileSt.mtxMarkFileAccess );
    return;
```

```
Lerror:
    LogError(E_SOFTWARE, "Unable to Popup Mark File" );
    UserMsg( "Unable to Popup Mark File" );
    CK_LOG( KeyGroupDeactivate(
            KeyGroupFindByName( "MARK_FILE_WINDOW" ) ) );
    CK_LOG( MainMenuSet( NULL ) );
    PopFocus();
    markFileSt.fPopedup = FALSE;
    XtPopdown(markFileSt.markFileShell);
    MutexGive( markFileSt.mtxMarkFileAccess );
} extern void _XmHighlightBorder( Widget w );

void
RequestMarkFileRedraw(void * pData)
{
    uint              i;
    MarkFileItemSt    *pMarkItem;
    static boolean    fCursorDrawnModify = FALSE;
    static Pixel      browseCursorColor;

MutexTake( markFileSt.mtxMarkFileAccess );
    if( !markFileSt.fPopedup )
        {
        MutexGive( markFileSt.mtxMarkFileAccess );
        return;
        }
    if( markFileSt.fModifyMode && !fCursorDrawnModify )
        {
        pMarkItem = (MarkFileItemSt *) P_SVLIST_ITEM(&markFileSt.markItemList,
                markFileSt.currItemIndex );
        XtVaGetValues( pMarkItem->markFilePict,
                XmNhighlightColor, &browseCursorColor,
                NULL );
        XtVaSetValues( pMarkItem->markFilePict,
                XmNhighlightColor, markFileSt.markFileRsrcs.modifyHighlight,
                NULL );
        fCursorDrawnModify = TRUE;
        }
    else if( !markFileSt.fModifyMode && fCursorDrawnModify )
        {
        XtVaSetValues( markFileSt.pCurrItem->markFilePict,
                XmNhighlightColor, browseCursorColor,
                NULL );
        fCursorDrawnModify = FALSE;
        }
    if( (sint)pData != GET_ALL_PICTURES )
        {
        RedrawMarkFilePict( NULL, (XtPointer) (sint)pData, NULL );
```

```
            MutexGive( markFileSt.mtxMarkFileAccess );
            return;
            }
    if( markFileSt.fRedrawType == FULL_REDRAW
            || markFileSt.fRedrawType == FORCE_REDRAW )
        {
        if( markFileSt.fRedrawType == FULL_REDRAW &&
            markFileSt.currFirstIndex == markFileSt.currIndex -
                markFileSt.currItemIndex )
            {
            if( glDebugMarkfile & DEBUG_MARKFILE_ADD )
                LogMsg("Redraw: No change since last page %d drawn",
                    markFileSt.currFirstIndex );
            MutexGive( markFileSt.mtxMarkFileAccess );
            return;
            }

ResetMarkFileWindow();
        /* Redraw the status and picts. */
        for (i = 0; i <  NUM_OF_ROWS_OF_MARKS * NUM_OF_MARKS_PER_ROW; i++)
            {
            pMarkItem = (MarkFileItemSt *)
                        P_SVLIST_ITEM(&markFileSt.markItemList, i);

if( glDebugMarkfile & DEBUG_MARKFILE_ADD )
                LogMsg(" Redrawing Mark Picture %d", i );
            RedrawMarkFilePict( NULL, (XtPointer) i, NULL );

RedrawMarkFileInfoLabel( pMarkItem, i, MARK_FILE_DRAW_ALL_LABELS );
            }
        }
    CK_LOG( SetCurrentMarkItem( RESET_FOCUS ) );
    MutexGive( markFileSt.mtxMarkFileAccess );
} enum ERC
MarkFileMoveCursor(void * pData)
{
    uint        action = (uint) pData;

switch (action)
        {
        default:
            LogError(E_BAD_INDEX, action);
            break;

case MF_MOVE_LEFT:
        case MF_MOVE_RIGHT:
        case MF_MOVE_UP:
        case MF_MOVE_DOWN:
```

```
        case MF_TO_PREV_PICT:
        case MF_TO_NEXT_PICT:
            CK_LOG(MoveToNextMarkItem(action));
            break;

case MF_PAGE_UP:
        case MF_PAGE_DOWN:
        case MF_MOVE_TO_START:
        case MF_MOVE_TO_END:
            CK_LOG(PageMarkFileWind(action));
            break;
        }
    return E_OK;
} enum ERC
pfnMarkfileCmp( void * pClientNumber1, void * pClientData1,
        void * pClientNumber2, void * pClientData2, sint * cmpResult )
{
    if( pClientNumber1 == pClientNumber2 )
        *cmpResult = CMP_EQUAL;
    else
        *cmpResult = CMP_GREATER;
    return E_OK;
} void
RequestMarkFilePopdown( void * pData )
{
    uint                  index = 0;
    MarkFileItemSt      * pMarkItem;
    boolean               fClean;
    SegmentListElementSt * pSegListElement;

PopFocus();
    MutexTake( markFileSt.mtxMarkFileAccess );
    markFileSt.fPopedup = FALSE;
    MutexGive( markFileSt.mtxMarkFileAccess );
    XtPopdown(markFileSt.markFileShell);

CK_LOG( ExitModifyMode( 0 ) );
    FOR_EACH_SVLIST_INDEX(&markFileSt.markItemList, index)
        { pMarkItem = (MarkFileItemSt *)
                    P_SVLIST_ITEM(&markFileSt.markItemList,
                            index );
            if( VWinHide( pMarkItem->vidWin) != E_OK )
                ReLogError();
        }
```

```
        fClean = TRUE;
        if( glDebugMarkfile & DEBUG_MARKFILE_ADD )
            LogMsg("Poping down with %d segments",
                markFileSt.pCurrentSegList->segmentList.nItems );
        for( index = 0; index < markFileSt.pCurrentSegList->segmentList.nItems;
            index++ )
            { if( ( pSegListElement = (SegmentListElementSt *)SVListGetItemPtr(
                    &markFileSt.pCurrentSegList->segmentList,
                    index ) ) == NULL )
                {
                ReLogError();
                MutexGive( markFileSt.mtxMarkFileAccess);
                return;
                }
            if( pSegListElement->blockID == VO_MEM_BLOCK_ID_NONE )
                continue;
            if( pSegListElement->fPictRequested )
                {
                boolean fSuccess;

CK_LOG( SegLibCancelPictureForSegment( mfSegClientID,
                    pSegListElement->segmentID, SEG_LIB_TY_PICUTRE_HEAD_PICTURE,
                    PICT_X4, &fSuccess ) );
                if( fSuccess )
                    pSegListElement->fPictRequested  = FALSE;
                else
                    fClean = FALSE;
                }
            if( !pSegListElement->fPictRequested )
                {
                CK_LOG( VOMemFree( vomClientHandle, pSegListElement->blockID ) );
                pSegListElement->blockID = VO_MEM_BLOCK_ID_NONE;
                }
            }
        if( fClean )
            {
            markFileSt.pCurrentSegList = NULL;
            }
        MutexGive( markFileSt.mtxMarkFileAccess);
} enum ERC
MFFileSelectResult(char *pFileName)
{
    enum ERC        erc = E_OK;

#if 0
```

```
    if( pFileName == NULL )
        {
        return LogError( E_BAD_PTR );
        }

(void) StrNCopy(markFileSt.acFileName, pFileName,
                    80, TERMINATE);
    CK_E( KeyGroupActivate(
            KeyGroupFindByName( "MARK_FILE_WINDOW" ) ) );
    WinSendMarkFilePopup();

#endif
    return(erc);
} enum ERC SetCurrentSegList( SegmentListSt *,pCurrentSegList )
{
    markFileSt.pCurrentSegList = pCurrentSegList;
    return E_OK;
}

/*--- User funcs ---*/
/* These functions should only be called in the user task!! */
/*- WIN USER
 * UpdateMarkFileWind - This function pulls in the tc marks, it's
 * corresponding picts, and the mark names.
 */
enum ERC
PopupVideoMarkFileWind( SegLibClientID clientID,
    SegmentListSt * pCurrentSegList )
{
    enum ERC        erc = E_OK;

CK_E( KeyGroupActivate(
            KeyGroupFindByName( "MARK_FILE_WINDOW" ) ) );
    mfSegClientID = clientID;
    CK_E( SetCurrentSegList( pCurrentSegList ) );

WinSendMarkFilePopup();
    CK_LOG( MainMenuSet( MenuFindByName( "MARK_FILE_MENU" ) ) );
    return(erc);
}

/*- WIN USER
 * PopdownMarkFileWind()
 */
enum ERC
MarkFilePopdown( void * pData )
{
```

```
    /* Do some cleanup. */
    CK_LOG( KeyGroupDeactivate(
              KeyGroupFindByName( "MARK_FILE_WINDOW" ) ) );
    CK_LOG( MainMenuSet( NULL ) );

WinSendMarkFilePopdown( );
    return E_OK;
}

/*- WIN USER
 *  AddMarkToMarkFile()
 */
enum ERC
AddMarkToMarkFile( void )
{
    /* Get the current mark. */

/* Get the info and format it. */

/* Build the window message and update the window (if allowed) */ return( E_OK );
}

/*- WIN USER
 *  ClearMarkItemInWin()
 */
enum ERC
ClearMarkItemInWin( void )
{
    return( E_OK );
}

/*- WIN USER
 *  SelectMark - This function selects the highlighted mark and then
 *         sends it's info to ...????.
 *  May Need Semaphore Protection?
 */
enum ERC
SelectMark( void * pData )
{
    enum ERC                 erc = E_OK;
    SEG_LIB_ITEM             SegItem;
    SegmentListElementSt *   pSegListElement;

MutexTake( markFileSt.mtxMarkFileAccess );
    /* Get the current mark info. */
    if ( markFileSt.pCurrItem->acTcStr[0] != '\0' &&
```

```
                strcmp(markFileSt.pCurrItem->acTcStr, MF_UNKNOWN_STR) != 0 )
            {
            if( markFileSt.pCurrItem->iItemNumber - 1 >=
                markFileSt.pCurrentSegList->segmentList.nItems )
                {
                MutexGive( markFileSt.mtxMarkFileAccess);
                return E_OK;
                }
            if( ( pSegListElement = (SegmentListElementSt *)SVListGetItemPtr(
                    &markFileSt.pCurrentSegList->segmentList,
                    markFileSt.pCurrItem->iItemNumber - 1 ) ) == NULL )
                {
                ReLogError();
                MutexGive( markFileSt.mtxMarkFileAccess);
                return E_OK;
                }
            if( SegLibGetSegmentInfo( mfSegClientID, pSegListElement->segmentID,
                    &SegItem, NULL, 0 ) != E_OK )
                {
                ReLogError();
                MutexGive( markFileSt.mtxMarkFileAccess);
                return E_OK;
                }
            if( (erc = DataEntryRecallTc(&SegItem.tcStart)) != E_OK )
                {
                ReLogError();
                MutexGive( markFileSt.mtxMarkFileAccess);
                return( erc );
                }
            CK_LOG( MarkFilePopdown(NULL) );
            }
        else
            UserMsg("No timecode available in selected mark.");
        MutexGive( markFileSt.mtxMarkFileAccess);
        return E_OK;
    }

/*-
 * SetMarkItemComment()
 * This callback is called from the comment window after a CTRL-ENTER.
 */
static enum ERC
SetMarkItemComment( void *clientData, boolean fCancel )
{
    char                    * pString = (char *) clientData;
    SegmentListElementSt    * pSegListElement;

CK_LOG( KeyGroupActivate(
            KeyGroupFindByName( "MARK_FILE_WINDOW" ) ) );
```

```
    if (fCancel == FALSE && pString != NULL)
    {
        (void) StrNCopy( markFileSt.pCurrItem->acCommentStr, pString,
            MARK_FILE_CMNT_STR_SIZE, TERMINATE );

CK_LOG( EdlMemFree( clientData ) );

/* If this picture in not in SVLIST ( Undefined for this file),
         * then bail out.
         */
        if ( mfSegClientID == SEG_LIB_CLIENT_ID_NONE )
            {
            return LogError(E_SOFTWARE, "No VFileList.");
            }
        /*
         * Get the header of the current mark, and reset the comments
         * pointer (to the new string) and send it off to the vfile server.
         */
        MutexTake( markFileSt.mtxMarkFileAccess);
        UserPrompt("Updating current mark's comments ...");
        if( ( pSegListElement = (SegmentListElementSt *)SVListGetItemPtr(
                &markFileSt.pCurrentSegList->segmentList,
                markFileSt.pCurrItem->iItemNumber - 1 ) ) == NULL )
            {
            MutexGive( markFileSt.mtxMarkFileAccess);
            return ReLogError();
            } if( SegLibRedefineSegment( mfSegClientID,
                pSegListElement->segmentID, NULL, NULL, 0, 0,
                markFileSt.pCurrItem->acCommentStr ) != E_OK )
            {
            ReLogError();
            UserError(E_SOFT_S, "Problem in updating mark file with the current
mark's comments.");
            }
        else
            {
            UserPrompt(" ");

markFileSt.fRedrawType = FORCE_REDRAW;

WinSendMarkFileRedraw( (void *)GET_ALL_PICTURES );
            }
    }

MutexGive( markFileSt.mtxMarkFileAccess);
    return( E_OK );
}
```

```
/*- WIN USER
 *  PopupMarkFileCmntWind()
 */
enum ERC
PopupMarkFileCmntWin( void * pData )
{
    char            *pStr;

if ( mfSegClientID == SEG_LIB_CLIENT_ID_NONE )
        {
        return LogError(E_SOFTWARE, "No VFileList.");
        }
    MutexTake( markFileSt.mtxMarkFileAccess);
    if( markFileSt.pCurrItem->iItemNumber - 1 >=
        markFileSt.pCurrentSegList->segmentList.nItems )
        {
        markFileSt.pCurrItem->acCommentStr[0] = '\0';
        MutexGive( markFileSt.mtxMarkFileAccess);
        return E_OK;
        }
    if( KeyGroupDeactivate(
            KeyGroupFindByName( "MARK_FILE_WINDOW" ) ) != E_OK )
        {
        ReLogError();
        MutexGive( markFileSt.mtxMarkFileAccess);
        return E_OK;
        } if (markFileSt.pCurrItem->acCommentStr[0] != '\0')
        {
        pStr = (char *) EdlMemAlloc(
                strlen(markFileSt.pCurrItem->acCommentStr) + 1);
        (void) StrNCopy(pStr, markFileSt.pCurrItem->acCommentStr,
                MARK_FILE_CMNT_STR_SIZE, TERMINATE);
        }
    else
        pStr = NULL;

MutexGive( markFileSt.mtxMarkFileAccess);
    if (WinSendPopupCommentWin( TY_POPUP_COMMENT, pStr,
            SetMarkItemComment ) != E_OK)
        {
        CK_LOG( KeyGroupActivate(
                KeyGroupFindByName( "MARK_FILE_WINDOW" ) ) );
        }
    return E_OK;
} enum ERC MarkFileChangeSrc( void * arg )
{
```

```
        return E_OK;
} enum ERC ChangeMarkFileMode( void * arg )
{

MutexTake( markFileSt.mtxMarkFileAccess );

if( markFileSt.fModifyMode )
        {
        MutexGive( markFileSt.mtxMarkFileAccess);
        CK_LOG( ExitModifyMode( 0 ) );
        }
    else
        {
        MutexGive( markFileSt.mtxMarkFileAccess);
        CK_LOG( EnterModifyMode( arg ) );
        }
    return E_OK;
}
```

What is claimed is:

1. An asynchronous media server request processing system for presenting information from media servers in response to media access requests from a client, including:

a main computer having a main memory;

at least one resource accessed in response to said media access requests by said client, including at least one of said media servers coupled to said main computer and having storage means for storing information;

an input device coupled to said main computer for user input of said media access requests;

first program means stored in said main memory for assigning a first client priority to a first media access request;

means for generating a reprioritizing request by said client for assigning a second client priority to said first media access request;

an output device coupled to said main computer for outputting information associated with said media access requests; and second program means, stored in at least one of said main memory and a memory of one of said media servers, for executing said media access requests, including:

a client module for defining a client object for each one of said media access requests;

a media server module for: generating a queue for storing a plurality of said media access requests; placing said first media access request at a first position in said queue, said first position depending upon said first priority associated with said first media access request; removing from said queue ones of said media access requests which have been executed; controlling said at least one resource during execution of said first media access request; and outputting said information associated with said first media access request to said output device upon execution;

means for servicing said reprioritizing request by removing said first media access request from said first position in said queue and releasing any resource which is currently controlled by said media server module prior to completion of an execution of said first media access request; and means for delaying said reprioritizing request servicing if said reprioritizing request is generated during a predefined portion of said execution of said first media access request.

2. The system of claim 1, wherein:

said reprioritizing request comprises a request from said client for assigning said second client priority to said first media access request for changing a priority of execution of said first media access request relative to said plurality of said media access requests stored in said queue; and said servicing means includes means for repositioning said first media access request to a second position in said queue corresponding to said second client priority.

3. The system of claim 2, including means for preventing said servicing means from carrying out said reprioritization request during a predefined portion of said execution of said first media access request.

4. The system of claim 1, wherein said reprioritizing request generating means comprises a user input device coupled to said main computer.

5. The system of claim 1, wherein said reprioritizing request generating means comprises a portion of said second program means.

6. An asynchronous media server request processing system for presenting information from media servers in response to media access requests from a client, including:

a main computer having a main memory;

at least one media server coupled to said main computer and having storage means for storing information;

at least one resource accessed to response to said media access requests by said client;

an input device coupled to said main computer for generating a media access request by said client, said media access request including client priority information;

means for generating a reprioritizing request by said client including means for assigning a revised client priority to an issued media access request;

an output device coupled to said main computer for outputting information associated with said media access requests; and means stored in at least one of said main memory and a memory of one of said media servers, for executing said media access requests, including a media server module for generating a queue for storing a plurality of issued media access requests; placing an issued media access request at a first position in said queue, said first position depending upon associated client priority information; removing from said queue ones of said media access requests which have been executed; controlling said at least one resource during execution of said media access requests; and outputting said information associated with said media access requests to said output device upon execution;

means for servicing said reprioritizing request by removing said issued media access request from said first position in said queue and releasing any resource which is currently controlled by said media server module prior to completion of execution of said issued media access request; and means for delaying said reprioritizing request servicing if said reprioritizing request is generated during a predefined portion of execution of said issued media access request.

7. The apparatus of claim 6 wherein responsive to said reprioritizing request said servicing means positions said issued media access request to a second position in said queue dependent upon said revised client priority.

8. The apparatus of claim 6 wherein responsive to said reprioritizing request said servicing means cancels said issued media access request.

9. The apparatus of claim 6 wherein said means for generating a reprioritizing request further includes a handle generator responsive to said issued media access requests for generating a unique handle associated with each issued media access request, said reprioritizing request including said unique handle for identifying a specific issued media access request for reprioritizing.

10. The apparatus of claim 6 wherein said means for executing said media access requests further includes means for prioritizing said media access requests based on predetermined system resource allocation criteria.

11. In a computer system including a main computer having a memory, at least one media server coupled to said main computer and having a server memory for storing information, generating means coupled to said main computer for generating media access requests by a client, and an output device coupled to said main computer, a method for asynchronously executing media access requests to said at least one media server for outputting said information over said output device, including the steps of:

generating, in said generating means, a first media access request directed to an associated one of said at least one media server;

placing said first media access request in a queue of pending media access requests in said associated one of said at least one media server;

processing said first media access request when it reaches to the top of said queue, including retrieving information from said associated one of said at least one media server indicated by said first media access request and providing said retrieved information to said output device;

if a cancellation request is received from said client during said processing step, canceling said first media access request by removing said first media access request from said queue and releasing resources which are accessed during said processing step, including said associated one of said at least one media server;

if said resources are currently being accessed by said first media access request, said canceling step including implementing a cancellation delay procedure if said cancellation request is received during execution of a predefined procedure during processing of said first media access request; and assigning a client priority to said first media access request;

wherein said placing step includes placing said first media access request in said queue at a position corresponding to said client priority.

12. The method of claim 11, wherein said assigning step is carried out based upon client parameters selected from the group consisting of application specific functionality and client desired behavior.

13. The method of claim 11, wherein said assigning step is carried out based upon previously generated user input events.

14. The method of claim 11, wherein said assigning step includes the step of submitting said first media access request and priority information to said associated one of said at least one media server, and said placing step is performed by said associated one of said at least one media server, said placing step including comparing said priority to previously generated priorities assigned to previously queued media access requests.

15. The method of claim 11, wherein said generating means comprises a user input device coupled to said main computer.

16. The method of claim 11, wherein said generating means comprises program logic stored in said main computer memory.

17. The method of claim 11, wherein said predefined procedure is governed by a server program module of said at least one media server and controls a resource managed by a client program module stored in said main computer memory.

18. The method of claim 17, wherein said predefined procedure comprises loading of said information indicated by said first media access request from said server memory into said main computer memory.

19. In a computer system including a main computer having a memory, at least one media server coupled to said main computer and having a server memory for storing information, generating means coupled to said main computer for generating media access requests, and an output device coupled to said main computer, a method for asynchronously executing media access requests to said at least one media server for outputting information over said output device, including the steps of:

(1) generating, in said generating means, an access request to a media server;

(2) in conjunction with said generating step, assigning to said access request a first client priority;

(3) positioning by said media server said generated access request at a first position in a queue of media access requests, said first position being dependent upon said first priority;

(4) processing said access request when it reaches to the top of said queue, including retrieving a portion of said information from an associated one of said at least one media server and providing said portion of information to said output device; and (5) if a reprioritizing request is received from said client after said assigning step, assigning a new priority to said access request based upon said reprioritizing request, said reprioritizing request comprises a request for cancellation of said access request; and wherein step (5) includes implementing a reprioritizing delay procedure if said reprioritizing request is received during execution of a predefined procedure during processing of said access request, and further comprising the steps of: removing said access request from said first position in said queue; releasing resources which are accessed during step 4, including an associated media server, if said resources are currently being accessed by said access request; and discarding said access request after said removal from said queue.

20. The method of claim 19, wherein:

said reprioritizing request comprises a request for changing a priority of execution of said access request relative to other access requests;

if said access request is not currently being processed, step 5 includes the steps of removing said access request from said first position in said queue, and repositioning said access request to a second position in said queue corresponding to said new priority; and if said access request is currently being processed, said reprioritizing request is not carried out.

21. The method of claim 19, wherein:

said reprioritizing request comprises a request for assigning a new client priority to said media access request, said new client priority corresponding to a cancellation of said first media access request; and step 5 includes the step of discarding said first media access request after a removal of said access request from said first position in said queue.

22. In a computer system including a main computer having a memory and at least one media server coupled to said main computer, a method for asynchronously executing media access requests generated by a client to a media server for outputting associated information over an output device, including the steps of:

(1) issuing a client prioritized access request to said media server having a first client priority;

(2) positioning said client prioritized access request at a first position in a queue of media access requests in said media server, said first position being dependent upon said first client priority;

(3) processing said client prioritized access request when it reaches a top of said queue, including retrieving a portion of information from said media server and providing said portion of information to said output device; and (4) if a reprioritizing request is received from said client after said issuing step indicating a new client priority for said client prioritized access request issued in step (1), processing said reprioritizing request by removing said client prioritized access request from said queue and placing said client prioritized access request issued in step (1) in a second position in said queue dependent upon said new client priority, said processing delayed by a reprioritizing delay procedure if said reprioritizing request is received during execution of a predefined procedure during processing of said request.

23. The method of claim 22 wherein said reprioritizing request cancels said client prioritized access request.

* * * * *